United States Patent
Shigemura et al.

(10) Patent No.: US 9,204,133 B2
(45) Date of Patent: Dec. 1, 2015

(54) STEREOSCOPIC DISPLAY DEVICE, METHOD FOR GENERATING IMAGE DATA FOR STEREOSCOPIC DISPLAY, AND PROGRAM THEREFOR

(75) Inventors: Koji Shigemura, Kanagawa (JP); Di Wu, Kanagawa (JP); Michiaki Sakamoto, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 791 days.

(21) Appl. No.: 13/511,173

(22) PCT Filed: Dec. 3, 2010

(86) PCT No.: PCT/JP2010/071708
§ 371 (c)(1),
(2), (4) Date: Jun. 20, 2012

(87) PCT Pub. No.: WO2011/068210
PCT Pub. Date: Jun. 9, 2011

(65) Prior Publication Data
US 2012/0257018 A1    Oct. 11, 2012

(30) Foreign Application Priority Data
Dec. 4, 2009    (JP) ................................. 2009-276439

(51) Int. Cl.
*G09G 3/36*    (2006.01)
*G09G 5/10*    (2006.01)
(Continued)

(52) U.S. Cl.
CPC ........ *H04N 13/0404* (2013.01); *G02B 27/2214* (2013.01); *G09G 3/003* (2013.01); *H04N 13/0497* (2013.01); *G09G 2300/023* (2013.01); *G09G 2320/041* (2013.01)

(58) Field of Classification Search
CPC ............... G02B 27/2214; G09G 3/003; G09G 2320/041; H04N 13/0497
USPC ........................................................ 348/46
See application file for complete search history.

(56) References Cited

U.S. PATENT DOCUMENTS

| 8,049,772 B2 | 11/2011 | Lipton et al. |
| 2007/0097502 A1 | 5/2007 | Lipton et al. |

(Continued)

FOREIGN PATENT DOCUMENTS

| JP | 9-189883 | 7/1997 |
| JP | 2005-189864 | 7/2005 |

(Continued)

OTHER PUBLICATIONS

Extended European Search Report dated Apr. 7, 2014; Application No. 10834660.2.
(Continued)

*Primary Examiner* — Andy Rao
*Assistant Examiner* — Nguyen Truong
(74) *Attorney, Agent, or Firm* — Young & Thompson

(57) ABSTRACT

Provided is a stereoscopic display device provided with a stereoscopic display panel and a display controller, the stereoscopic display panel including a lenticular lens, a color filter substrate, a TFT substrate, etc. Unit pixels arranged in a horizontal direction parallel to the direction in which both eyes of viewer are arranged are alternately used as left-eye pixels and right-eye pixels. The display controller determined, according to temperature information from a temperature sensor, the contraction/expansion of the lens by a stereoscopic image generating module and generates 3D image data for driving the display panel in which the amount of disparity in a specific disparity direction is corrected on the basis of parameter information defined by an effective linear expansion coefficient inherent in the stereoscopic display panel, or the like and the magnitude of the temperature to thereby ensure a predetermined stereoscopic visual recognition range even when the lens are contracted/expanded.

32 Claims, 104 Drawing Sheets

(51) Int. Cl.
  *G09G 5/00* (2006.01)
  *H04N 13/04* (2006.01)
  *G02B 27/22* (2006.01)
  *G09G 3/00* (2006.01)

(56) References Cited

U.S. PATENT DOCUMENTS

2007/0109401 A1 5/2007 Lipton et al.
2008/0284844 A1 11/2008 Woodgate et al.
2010/0033556 A1 2/2010 Saishu et al.

FOREIGN PATENT DOCUMENTS

| | | |
|---|---|---|
| JP | 2006-184900 | 7/2006 |
| JP | 3816813 | 8/2006 |
| JP | 2008-067095 | 3/2008 |
| JP | 2009-016384 | 1/2009 |
| JP | 2009-514030 | 4/2009 |
| JP | 2009-521137 | 5/2009 |
| JP | 2009-157301 | 7/2009 |
| WO | 2012046655 | 4/2012 |

OTHER PUBLICATIONS

International Search Report PCT/JP2010/071708 dated Feb. 15, 2011, with English Translation.

POPUP IMAGE PARALLAX IMAGE

DEPTH IMAGE PARALLAX IMAGE

DEPTH IMAGE

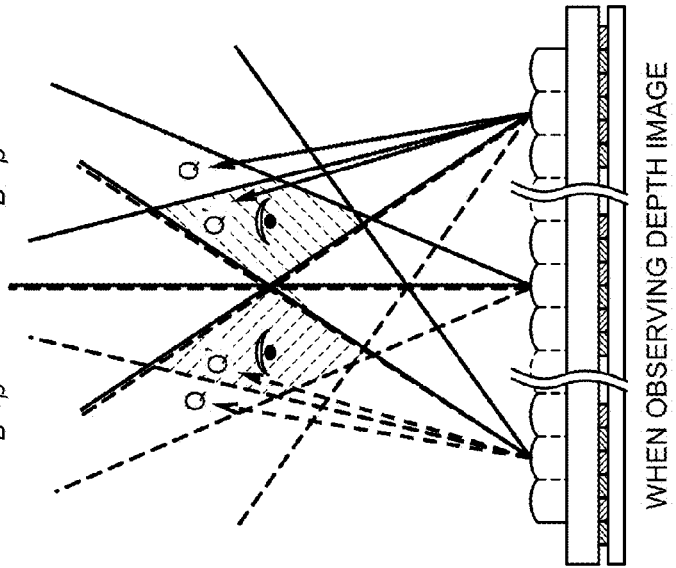
FIG. 4A — WHEN OBSERVING POPUP IMAGE
FIG. 4B — WHEN OBSERVING DEPTH IMAGE

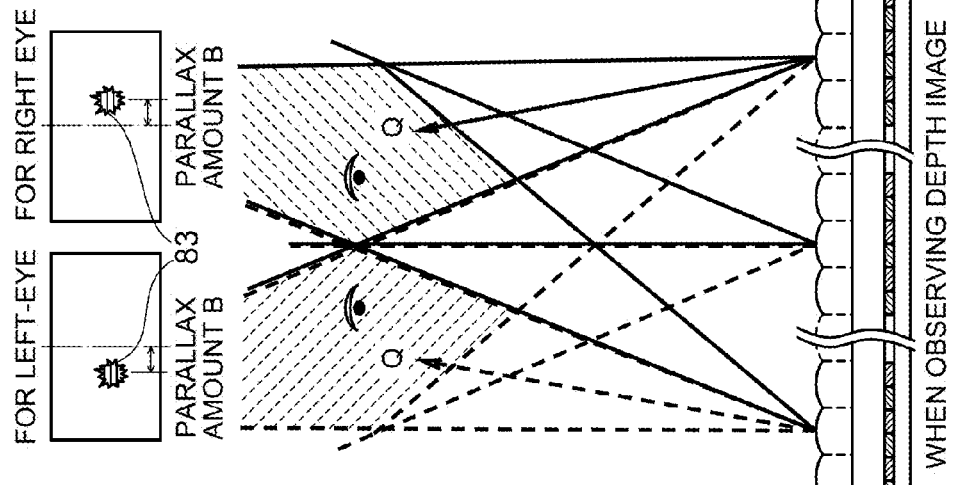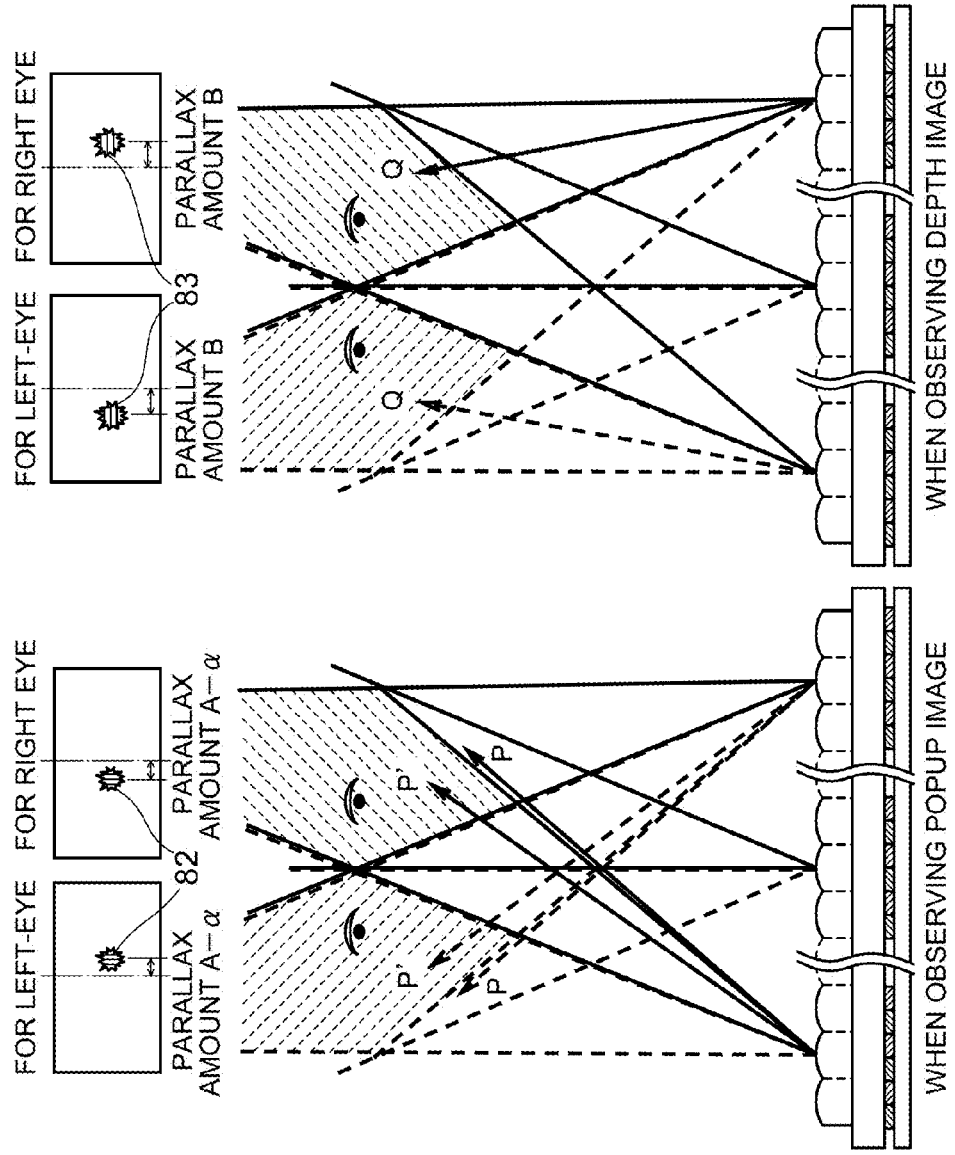

z≧0 RENDERING PROCESSING z<0 RENDERING PROCESSING

SYNTHESIZING PROCESSING $z \leqq 0$ RENDERING PROCESSING $z > 0$ RENDERING PROCESSING

SYNTHESIZING PROCESSING

AFTER PROCESSING STEP S104

AFTER PROCESSING STEP S112

AFTER PROCESSING STEP S117

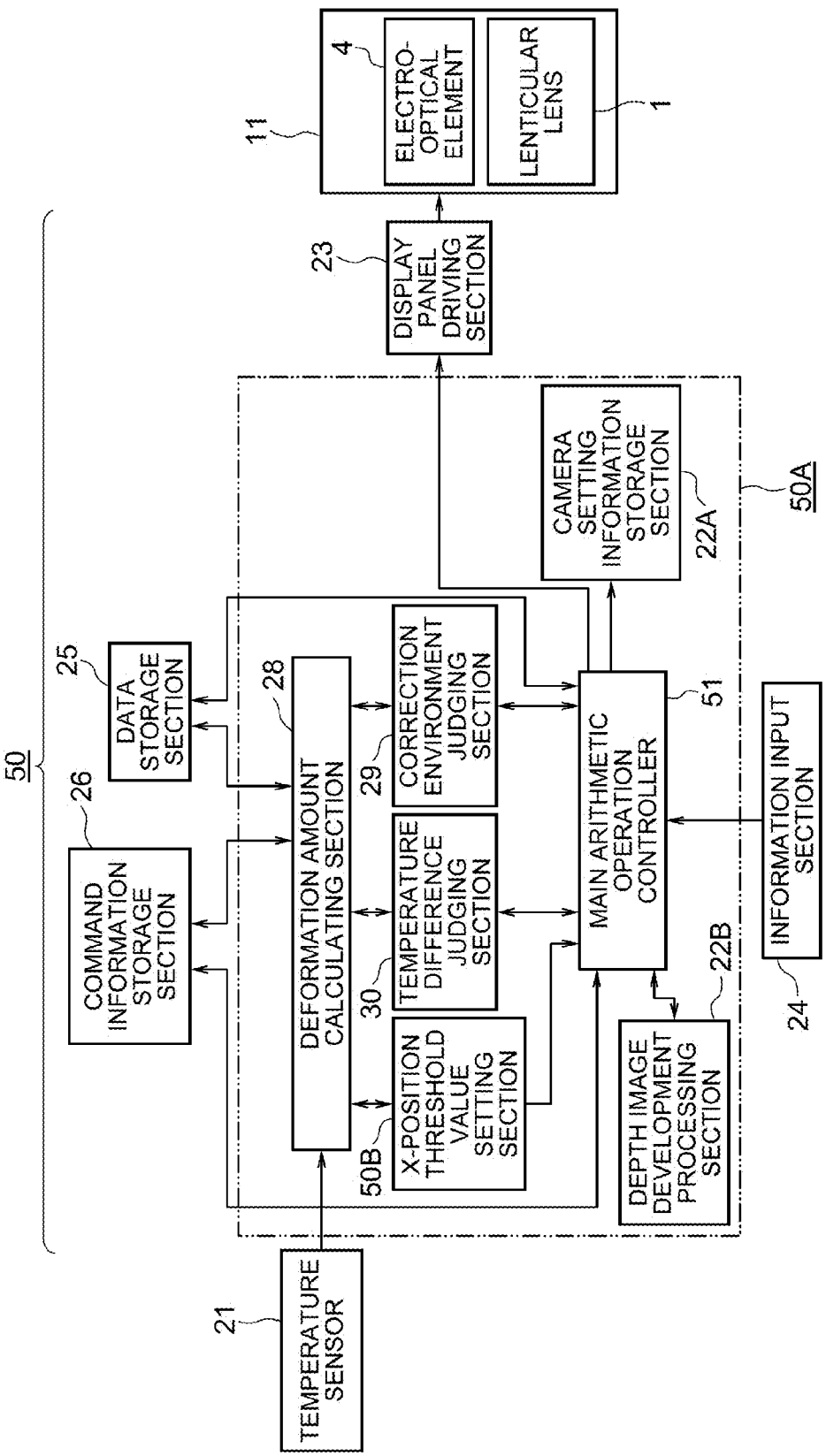

AFTER PROCESSING STEP S204

AFTER PROCESSING STEP S216

AFTER PROCESSING STEP S224

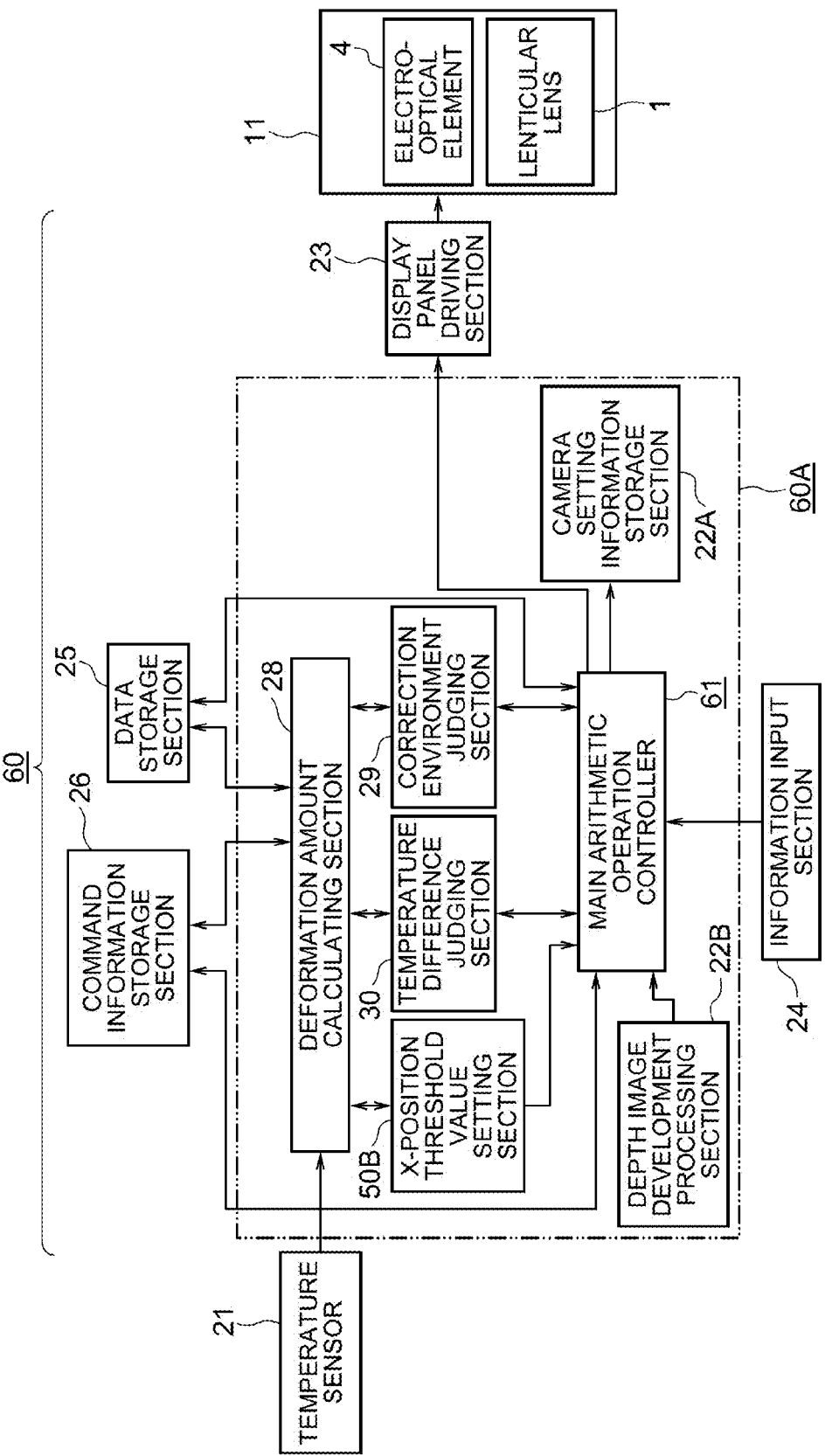

AFTER PROCESSING STEP S304

AFTER PROCESSING STEP S316

AFTER PROCESSING STEP S324

AFTER PROCESSING STEP S304

AFTER PROCESSING STEP S357

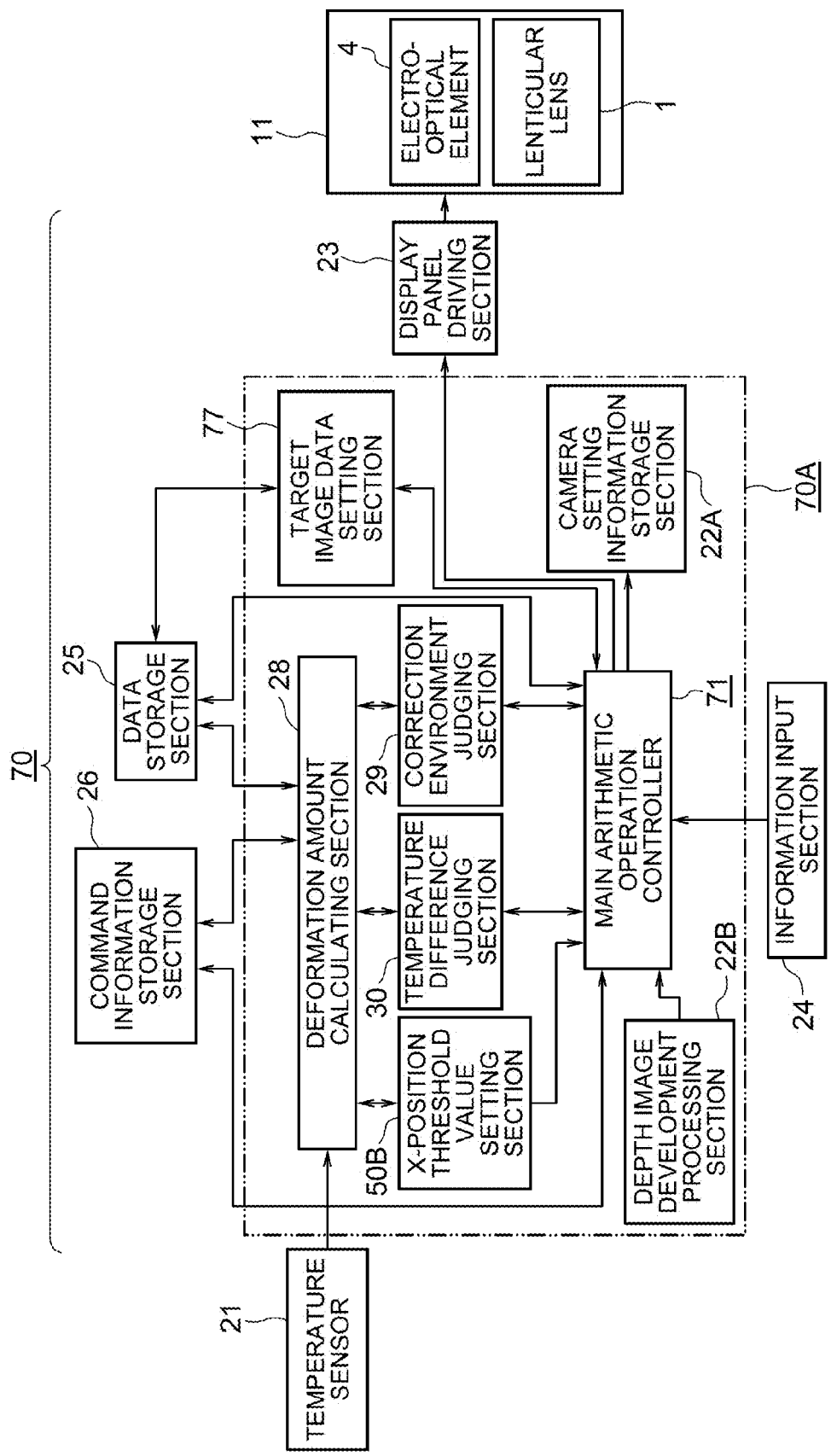

AFTER PROCESSING STEP S403: DEPTH MAP A

AFTER PROCESSING STEP S409: DEPTH MAP B

AFTER PROCESSING STEP S412: DEPTH MAP C

AFTER PROCESSING STEP S403: DEPTH MAP A

AFTER PROCESSING STEP S409: DEPTH MAP B

AFTER PROCESSING STEP S412: DEPTH MAP C

AFTER PROCESSING STEP S403: DEPTH MAP A

AFTER PROCESSING STEP S409: DEPTH MAP B

AFTER PROCESSING STEP S412: DEPTH MAP C

AFTER PROCESSING STEP S403:DEPTH MAP A

AFTER PROCESSING STEP S452: DEPTH MAP B

AFTER PROCESSING STEP S453: DEPTH MAP C

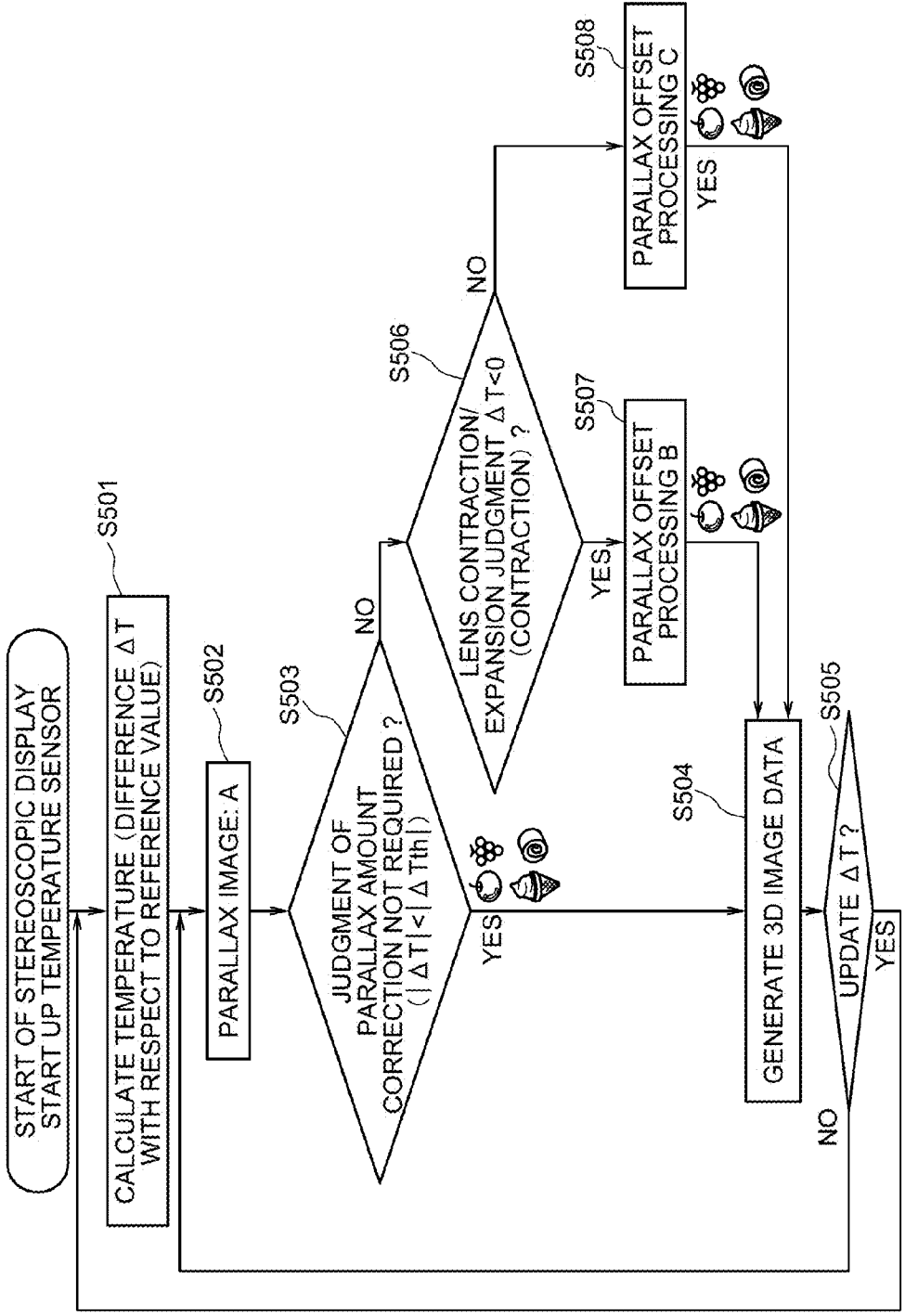

FIG. 36A
PARALLAX IMAGE A
LEFT-EYE IMAGE              RIGHT-EYE IMAGE
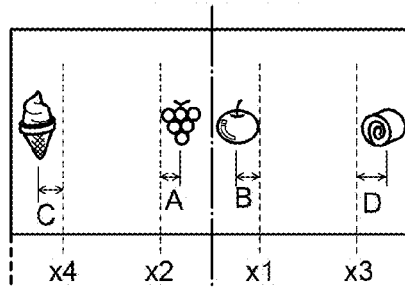 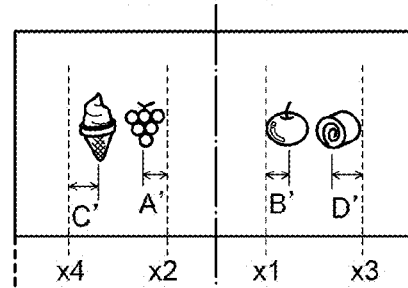
FIG. 36B
OFFSET PROCESSING
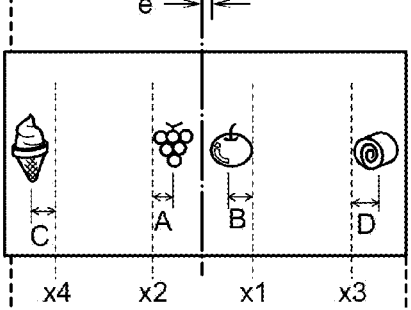 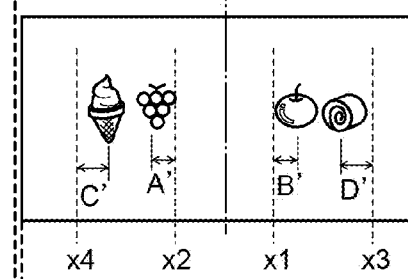
FIG. 36C
PARALLAX IMAGE B
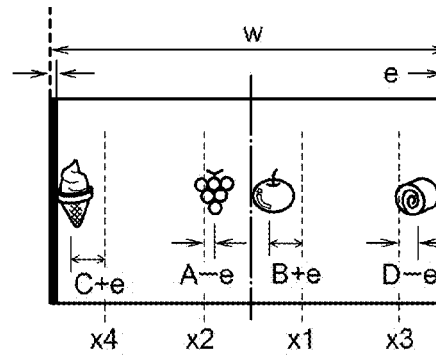 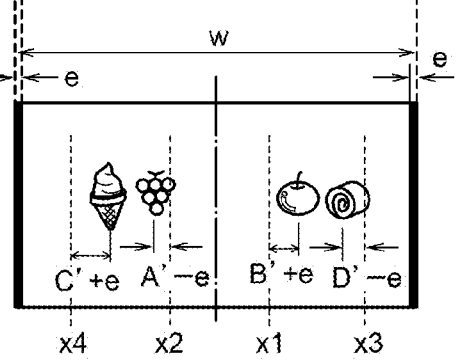

FIG. 45

| PARALLAX AMOUNT BEFORE CORRECTION \ TEMPERATURE | T1(°C) | T2(°C) | T3(°C) | T4(°C) | T5(°C) | T6(°C) | T7(°C) |
|---|---|---|---|---|---|---|---|
| Δu1 | Δu7 | Δu13 | Δu19 | Δu25 | Δu31 | Δu37 | Δu43 |
| Δu2 | Δu8 | Δu14 | Δu20 | Δu26 | Δu32 | Δu38 | Δu44 |
| Δu3 | Δu9 | Δu15 | Δu21 | Δu27 | Δu33 | Δu39 | Δu45 |
| Δu4 | Δu10 | Δu16 | Δu22 | Δu28 | Δu34 | Δu40 | Δu46 |
| Δu5 | Δu11 | Δu17 | Δu23 | Δu29 | Δu35 | Δu41 | Δu47 |
| Δu6 | Δu12 | Δu18 | Δu24 | Δu30 | Δu36 | Δu42 | Δu48 |

PARALLAX AMOUNT CORRECTION LUT SIGNAL AT EACH TEMPERATURE

FIG. 47

| TEMPERATURE / PARALLAX AMOUNT | STEREOSCOPIC VIEWING REGION MEASUREMENT VALUE FOR PARALLAX AMOUNT AT EACH TEMPERATURE | | | |
|---|---|---|---|---|
| | 25 (°C) | 45 (°C) | 50 (°C) | 55 (°C) |
| 15 (PIXEL) | 70% | 70% | 70% | 70% |
| 10 (PIXEL) | 90% | 90% | 90% | 90% |
| 5 (PIXEL) | 100% | 100% | 100% | 100% |
| −5 (PIXEL) | 100% | 90% | 80% | 70% |
| −10 (PIXEL) | 90% | 80% | 70% | 60% |
| −15 (PIXEL) | 70% | 60% | 50% | 40% |

CORRECTION TARGET

FIG. 48

PARALLAX AMOUNT CORRECTION LUT SIGNAL AT EACH TEMPERATURE

| PARALLAX AMOUNT BEFORE CORRECTION \ TEMPERATURE | 25 (°C) | 45 (°C) | 50 (°C) | 55 (°C) |
|---|---|---|---|---|
| 15 (PIXEL) | 15 (PIXEL) | 15 (PIXEL) | 15 (PIXEL) | 15 (PIXEL) |
| 10 (PIXEL) | 10 (PIXEL) | 10 (PIXEL) | 10 (PIXEL) | 10 (PIXEL) |
| 5 (PIXEL) | 5 (PIXEL) | 5 (PIXEL) | 5 (PIXEL) | 5 (PIXEL) |
| −5 (PIXEL) | −5 (PIXEL) | −4 (PIXEL) | −3 (PIXEL) | −2 (PIXEL) |
| −10 (PIXEL) | −10 (PIXEL) | −5 (PIXEL) | −4 (PIXEL) | −3 (PIXEL) |
| −15 (PIXEL) | −15 (PIXEL) | −12 (PIXEL) | −10 (PIXEL) | −5 (PIXEL) |

FIG. 51

PARALLAX AMOUNT CORRECTION LUT 0 SIGNAL AT EACH TEMPERATURE

| TEMPERATURE<br>PARALLAX AMOUNT BEFORE CORRECTION | T1(°C) | T2(°C) | T3(°C) | T4(°C) | T5(°C) | T6(°C) | T7(°C) |
|---|---|---|---|---|---|---|---|
| Δu1 | Δu'7 | Δu'13 | Δu'19 | Δu'25 | Δu'31 | Δu'37 | Δu'43 |
| Δu2 | Δu'8 | Δu'14 | Δu'20 | Δu'26 | Δu'32 | Δu'38 | Δu'44 |
| Δu3 | Δu'9 | Δu'15 | Δu'21 | Δu'27 | Δu'33 | Δu'39 | Δu'45 |
| Δu4 | Δu'10 | Δu'16 | Δu'22 | Δu'28 | Δu'34 | Δu'40 | Δu'46 |
| Δu5 | Δu'11 | Δu'17 | Δu'23 | Δu'29 | Δu'35 | Δu'41 | Δu'47 |
| Δu6 | Δu'12 | Δu'18 | Δu'24 | Δu'30 | Δu'36 | Δu'42 | Δu'48 |

FIG. 52

PARALLAX AMOUNT CORRECTION LUT 1 SIGNAL AT EACH TEMPERATURE

| PARALLAX AMOUNT BEFORE CORRECTION \ TEMPERATURE | T1(°C) | T2(°C) | T3(°C) | T4(°C) | T5(°C) | T6(°C) | T7(°C) |
|---|---|---|---|---|---|---|---|
| Δu1 | Δu″7 | Δu″13 | Δu″19 | Δu″25 | Δu″31 | Δu″37 | Δu″43 |
| Δu2 | Δu″8 | Δu″14 | Δu″20 | Δu″26 | Δu″32 | Δu″38 | Δu″44 |
| Δu3 | Δu″9 | Δu″15 | Δu″21 | Δu″27 | Δu″33 | Δu″39 | Δu″45 |
| Δu4 | Δu″10 | Δu″16 | Δu″22 | Δu″28 | Δu″34 | Δu″40 | Δu″46 |
| Δu5 | Δu″11 | Δu″17 | Δu″23 | Δu″29 | Δu″35 | Δu″41 | Δu″47 |
| Δu6 | Δu″12 | Δu″18 | Δu″24 | Δu″30 | Δu″36 | Δu″42 | Δu″48 |

AFTER PROCESSING STEP 704

AFTER PROCESSING STEP 704

AFTER PROCESSING STEP 715

POPUP IMAGE PARALLAX IMAGE

DEPTH IMAGE PARALLAX IMAGE

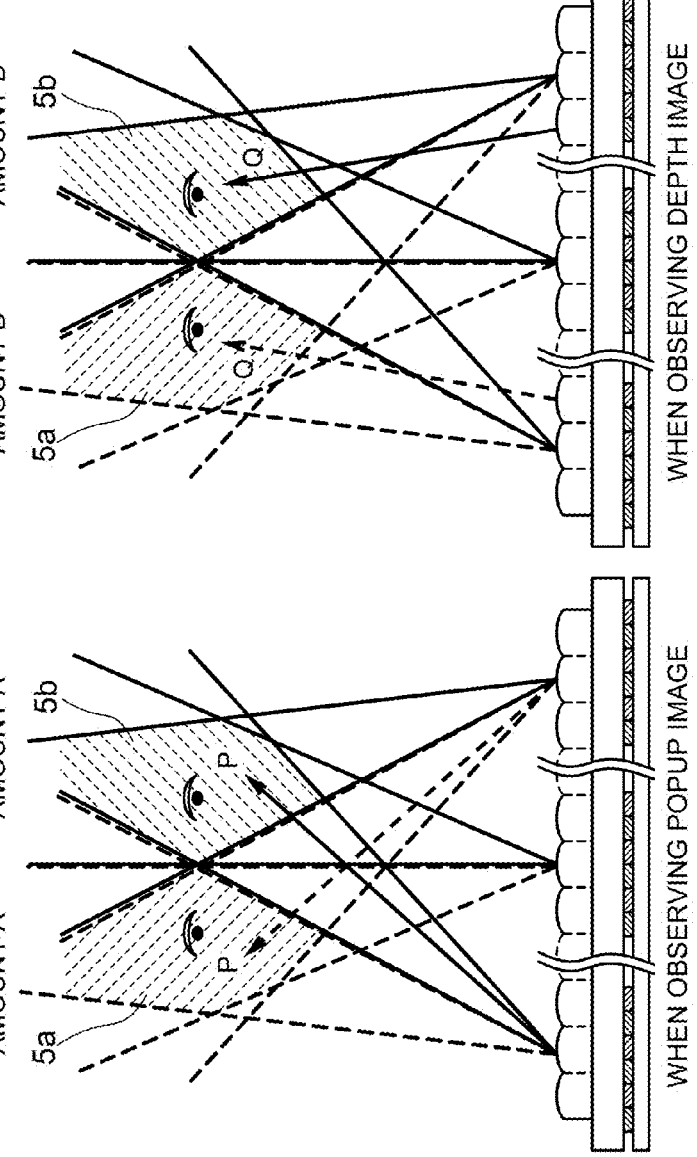

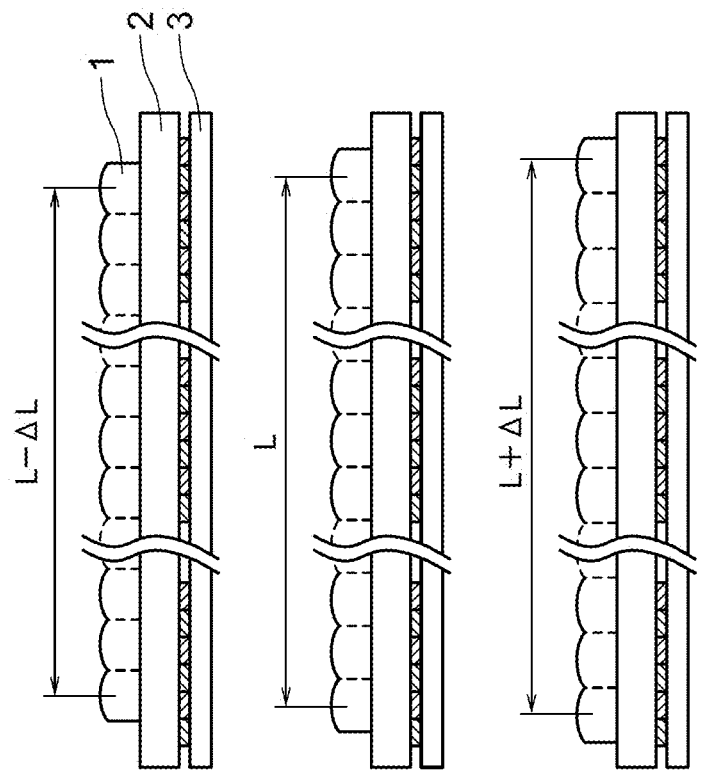

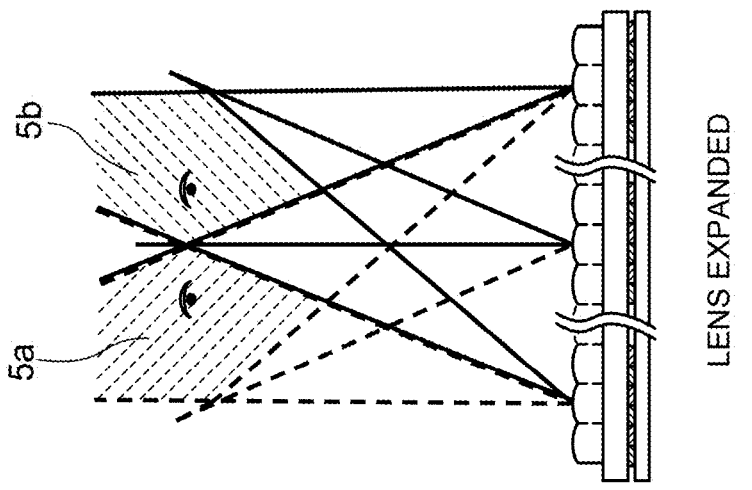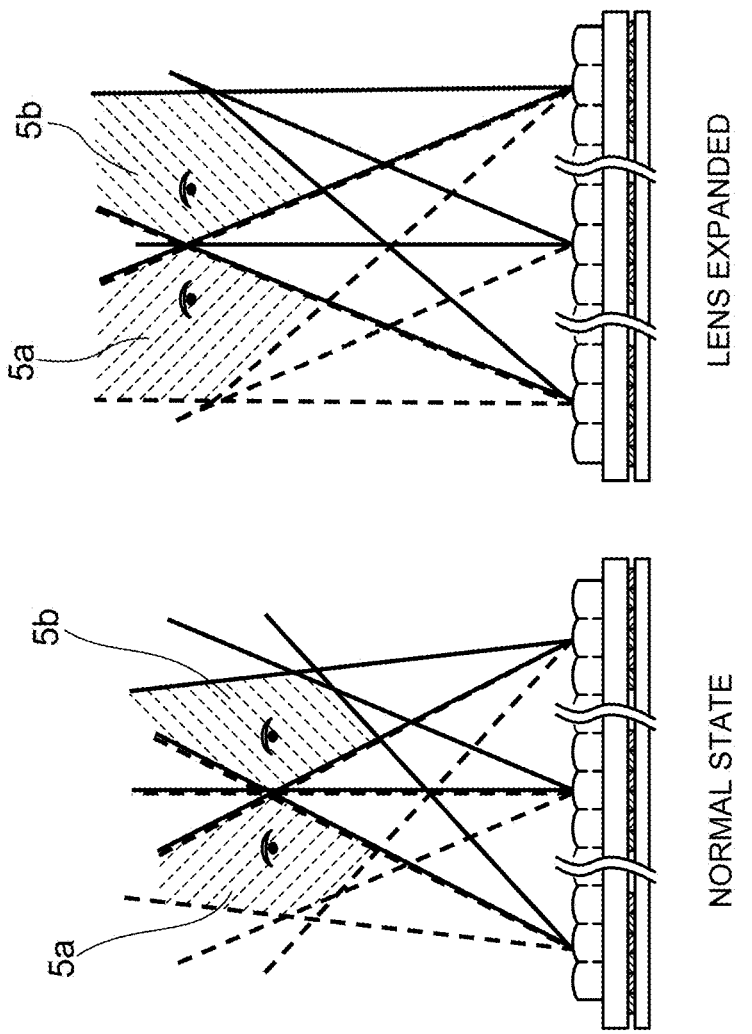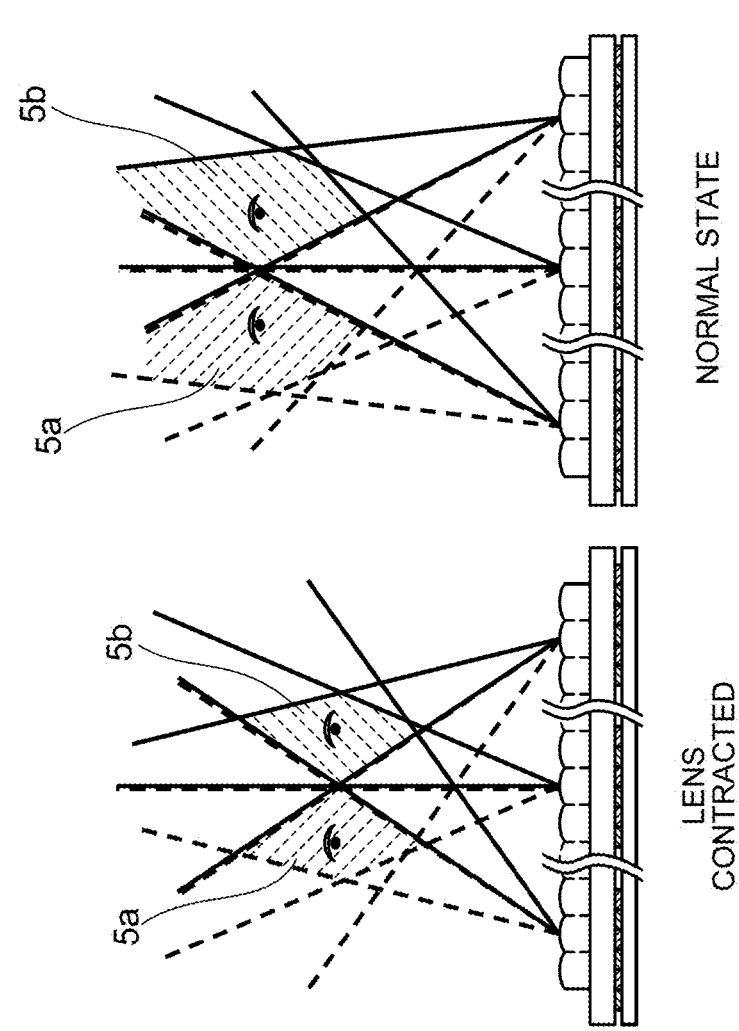

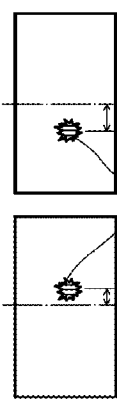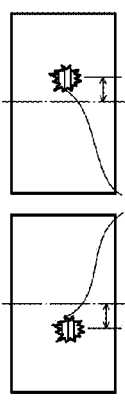
FIG. 72A / FIG. 72B

POPUP IMAGE

DEPTH IMAGE

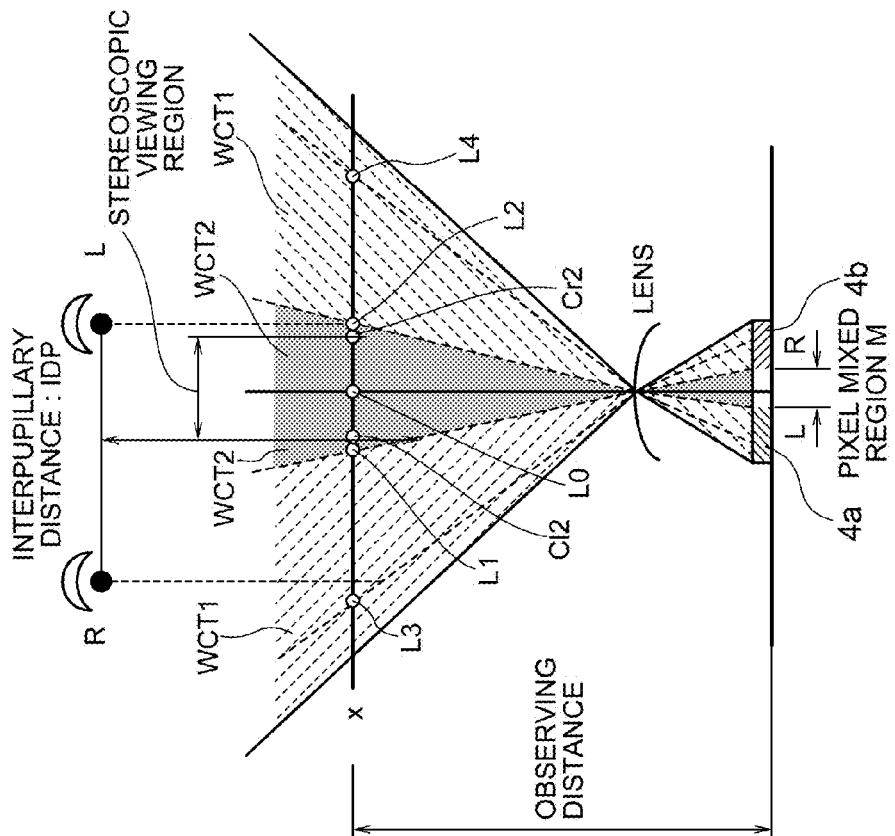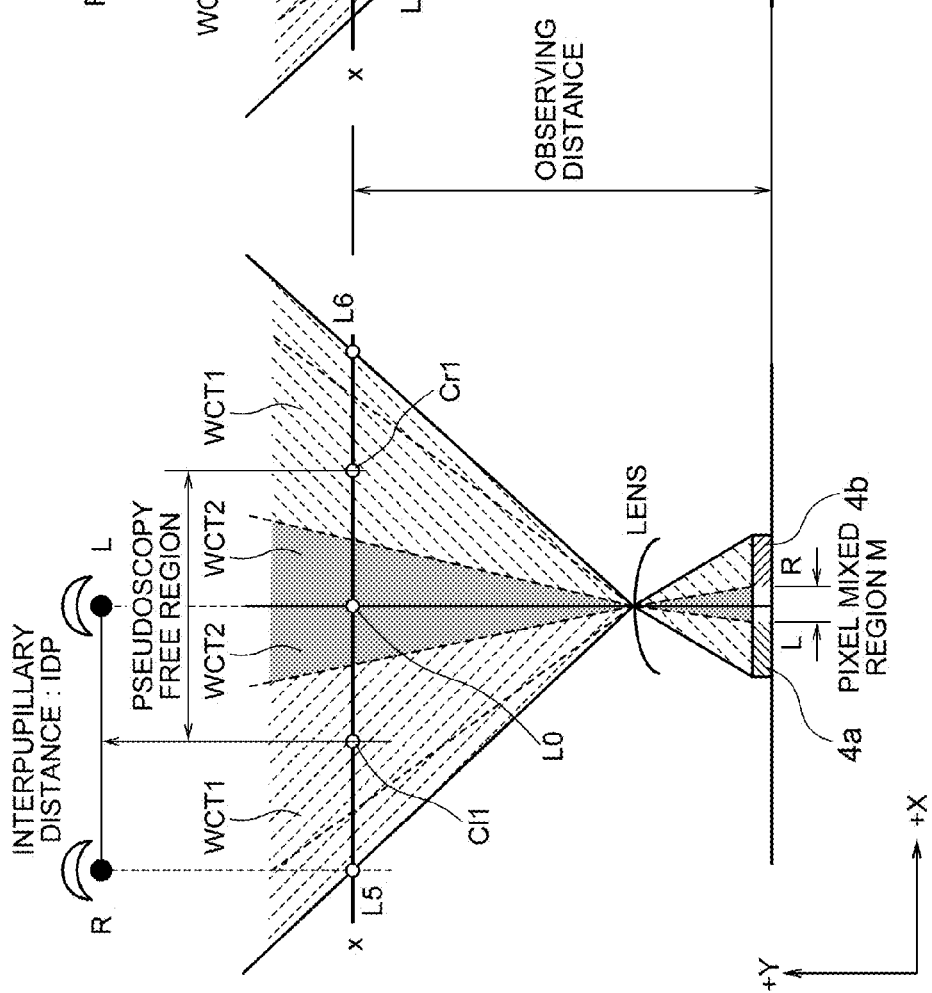

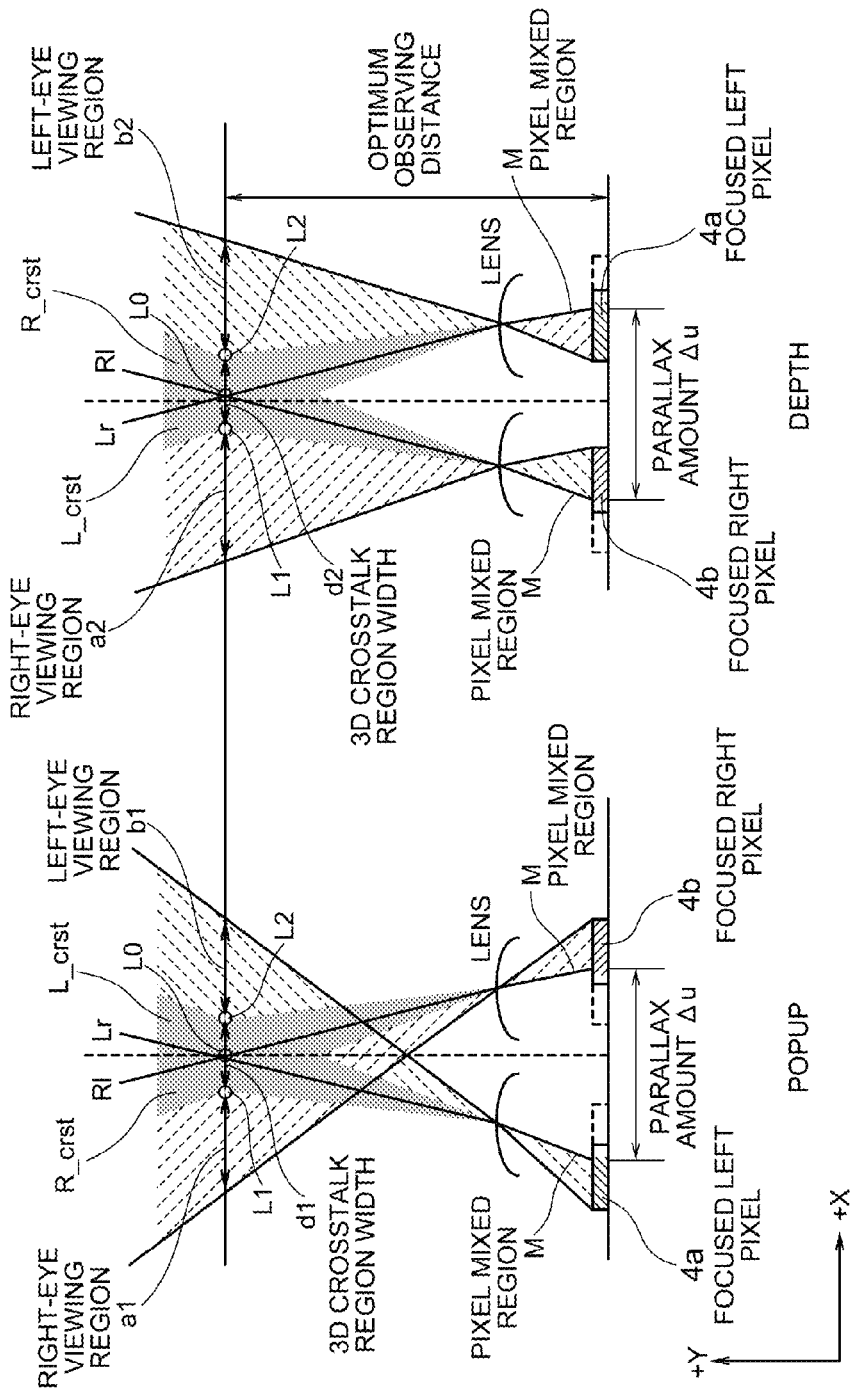

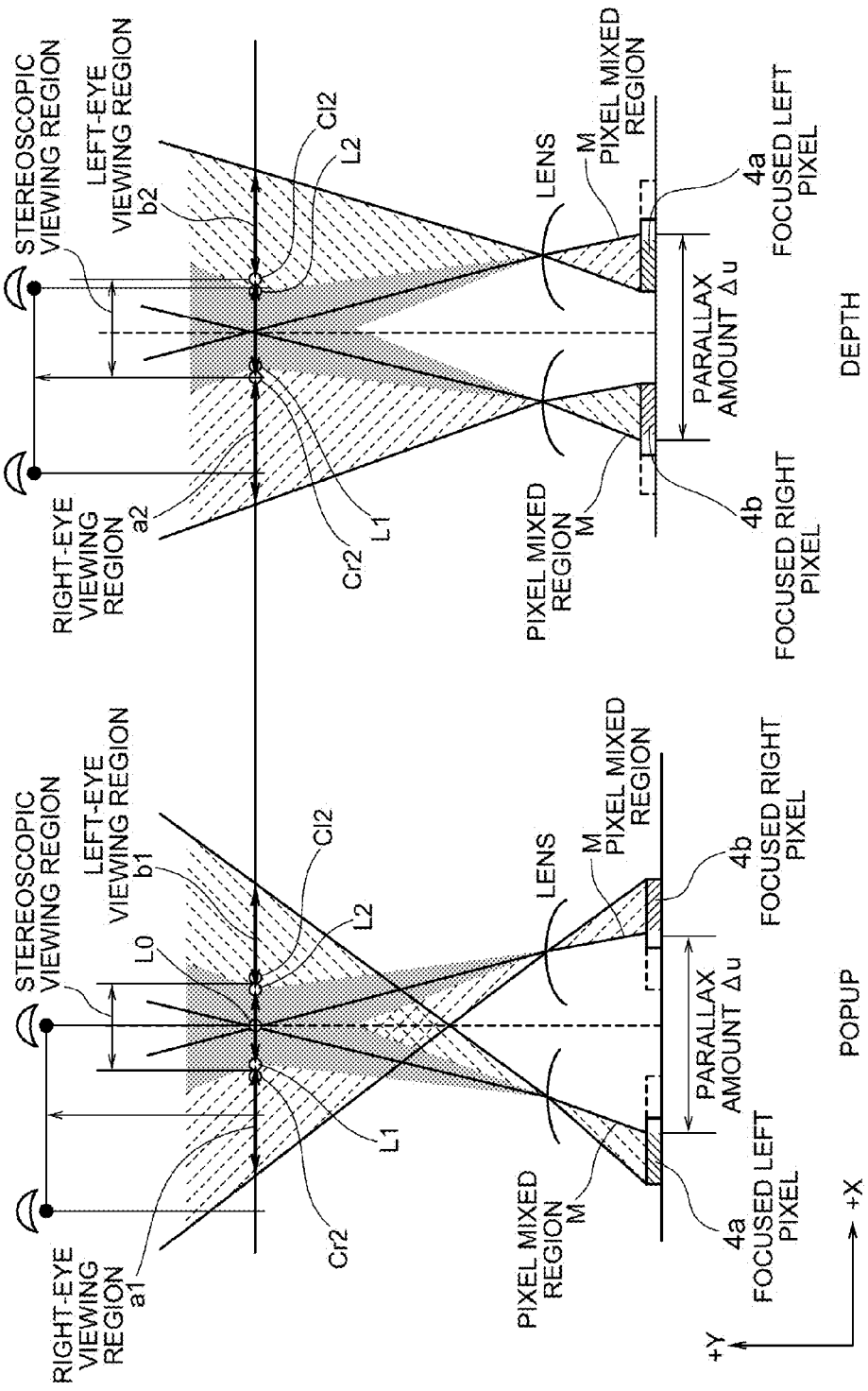

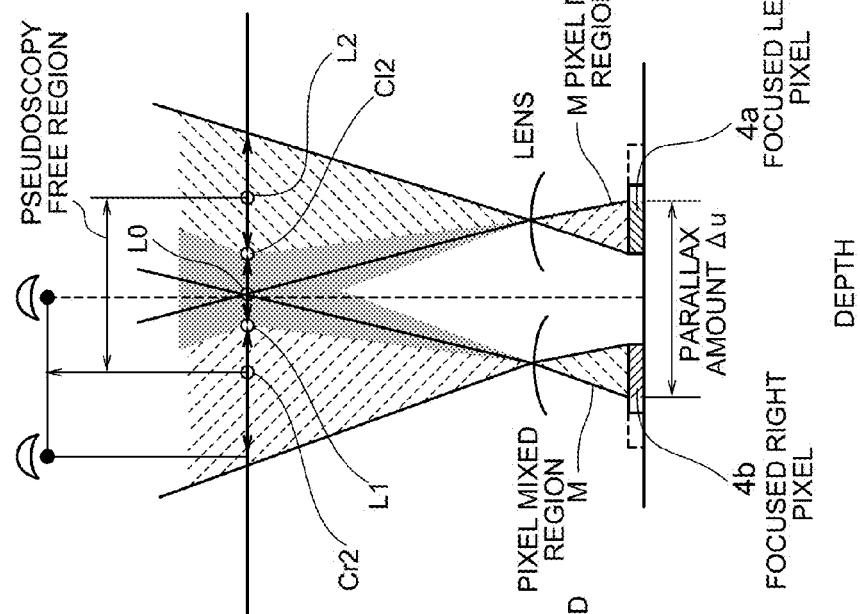
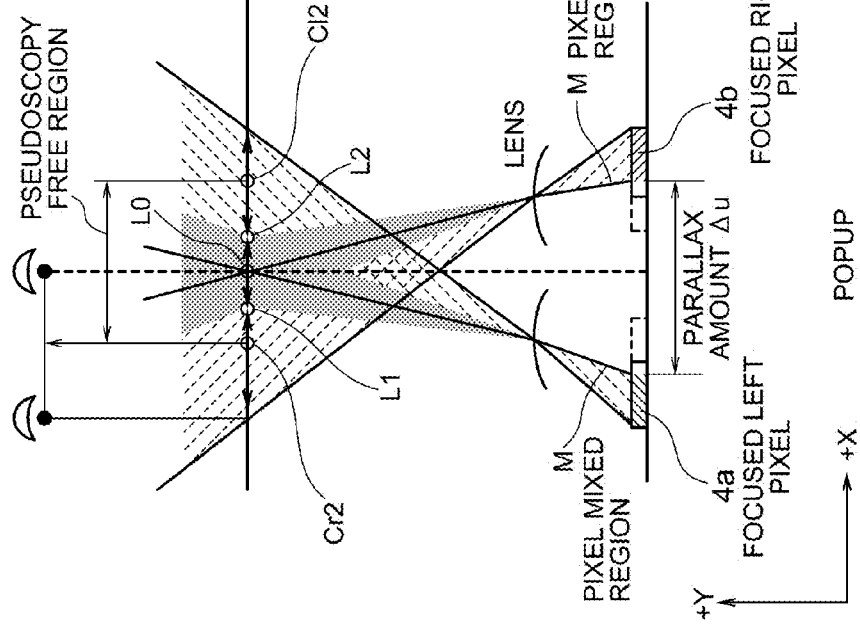

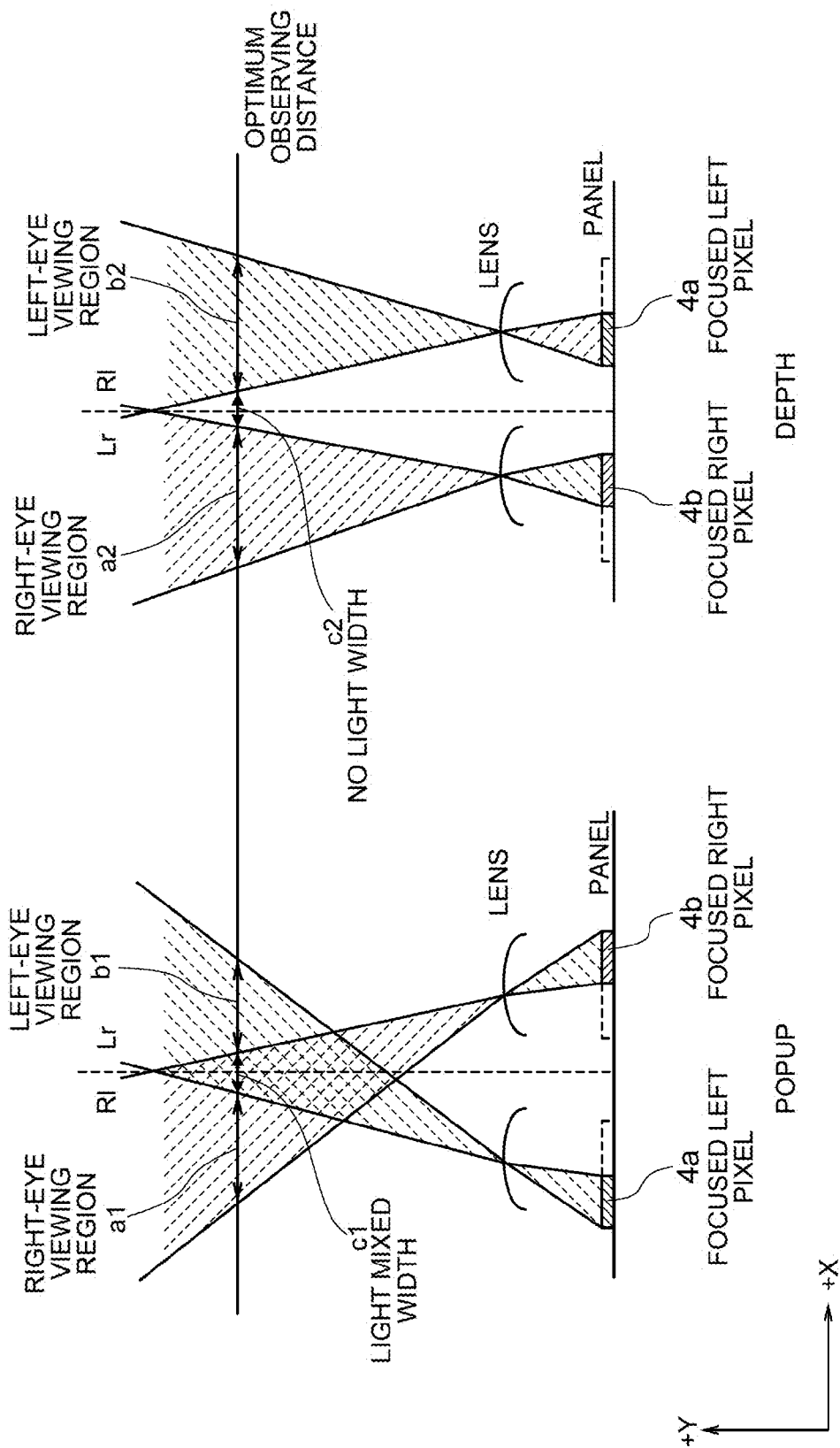

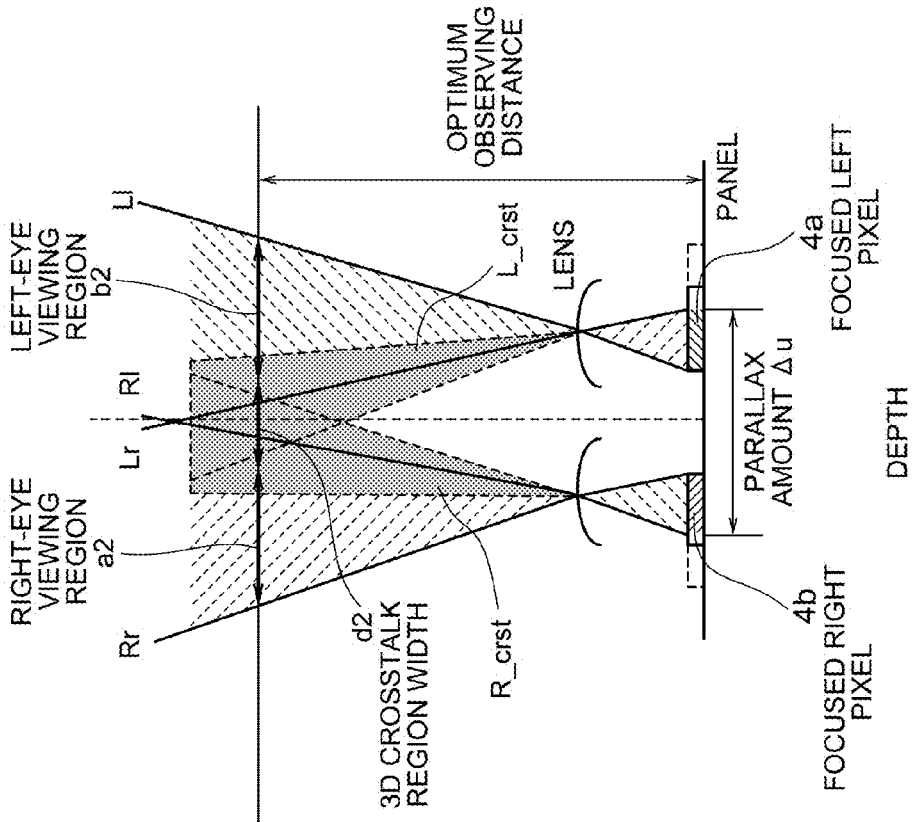
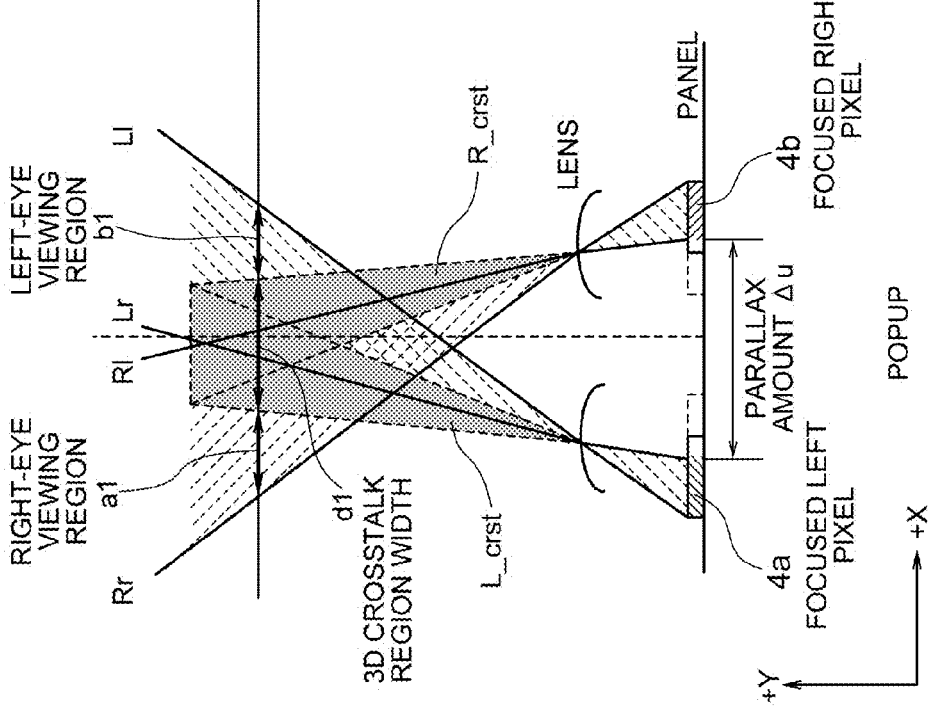

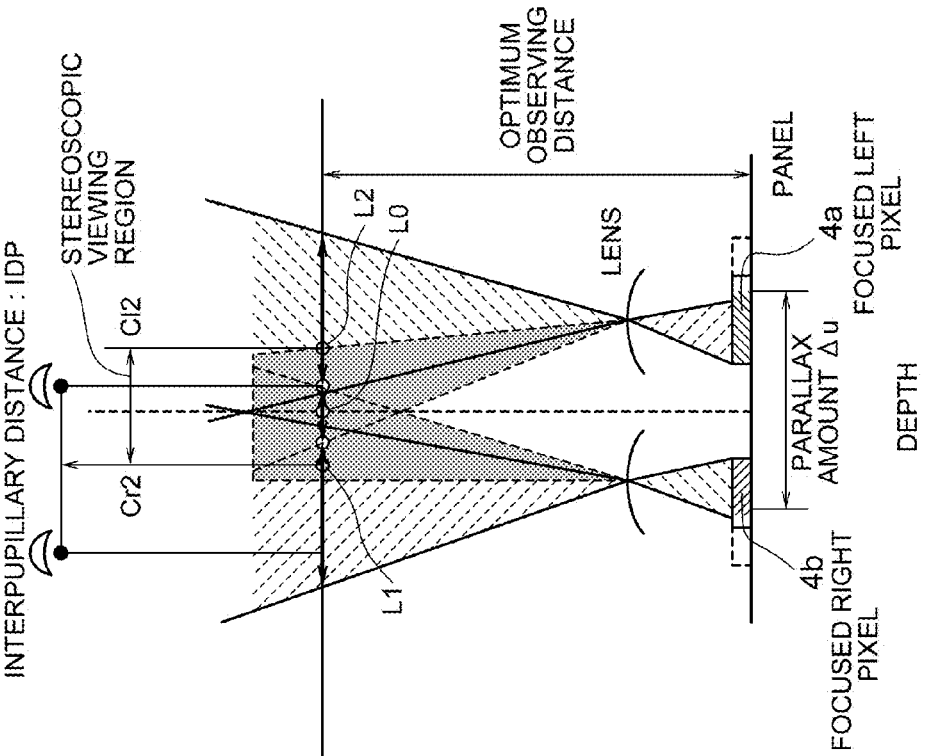
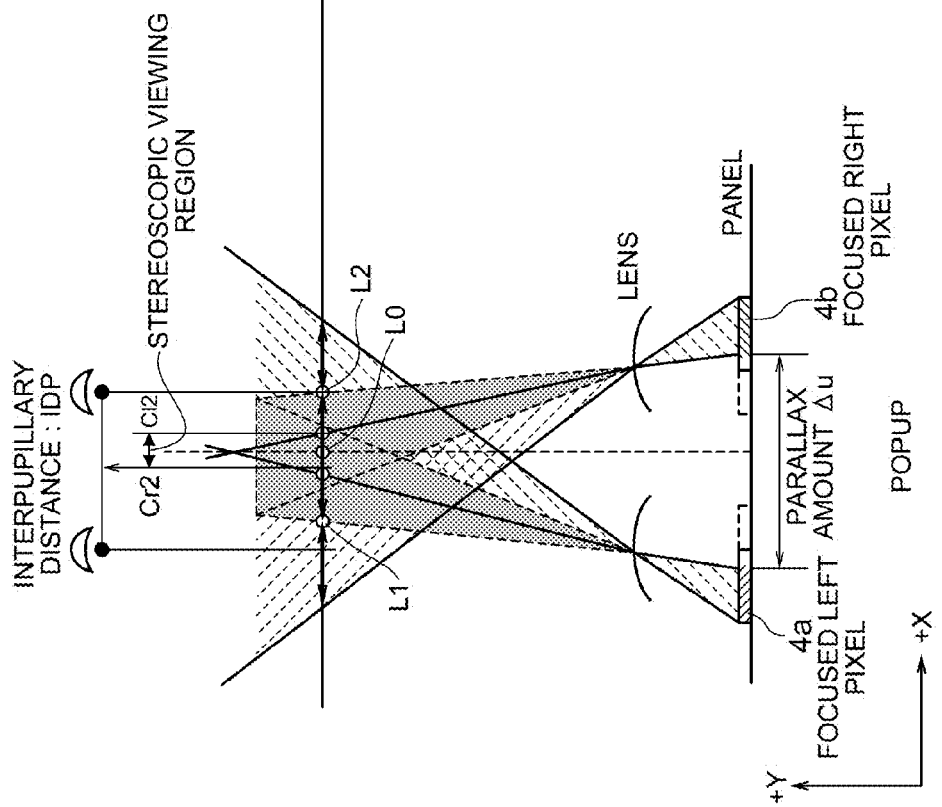

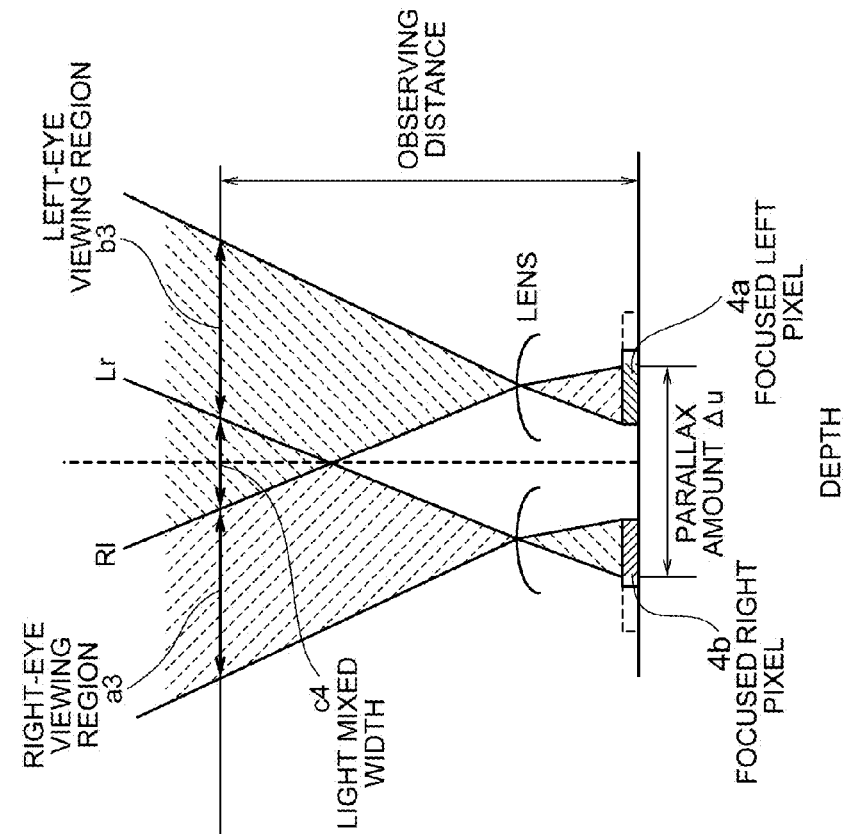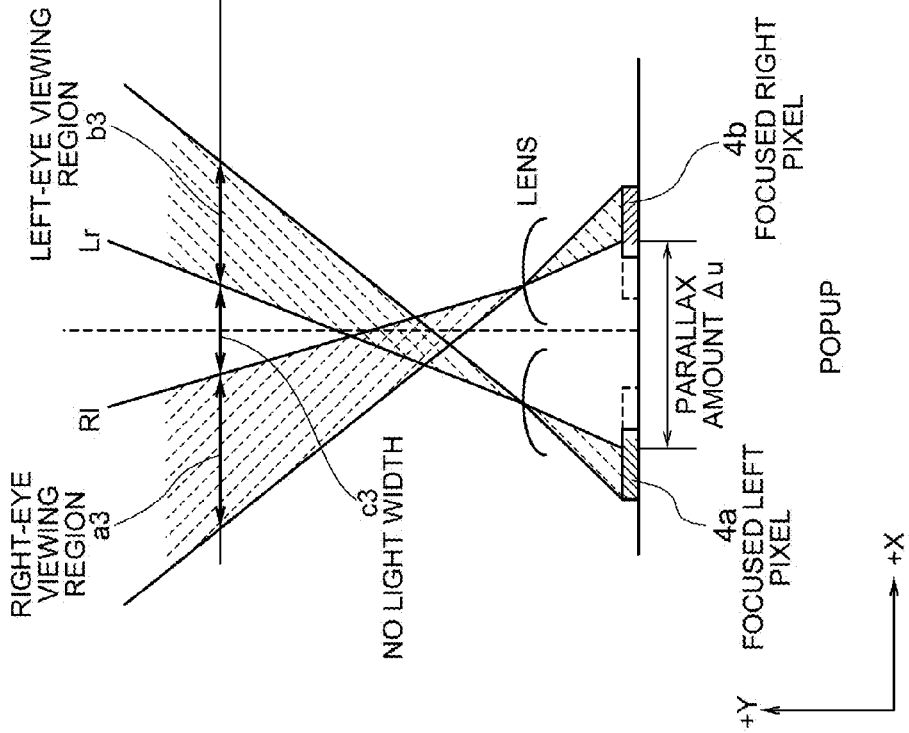

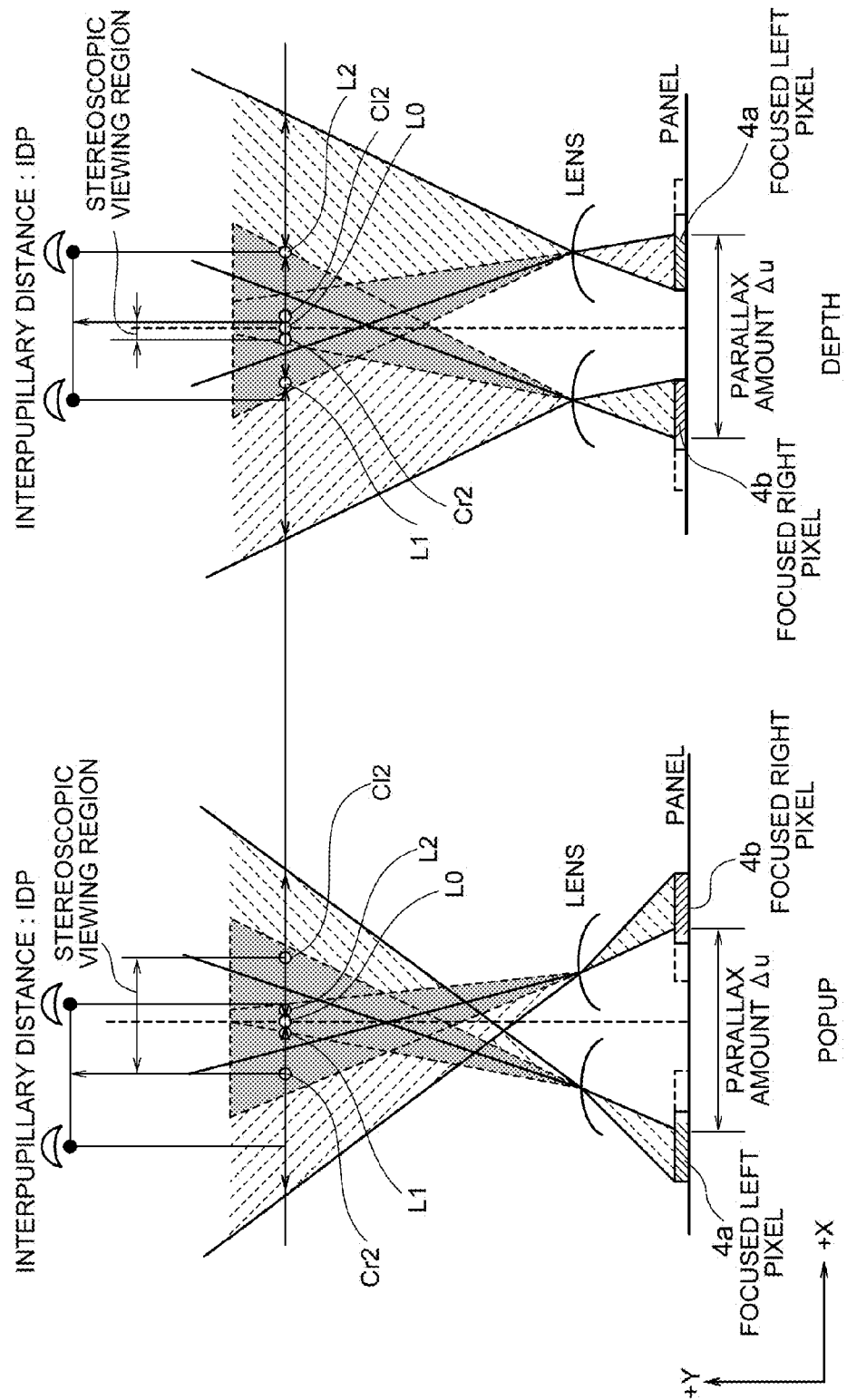

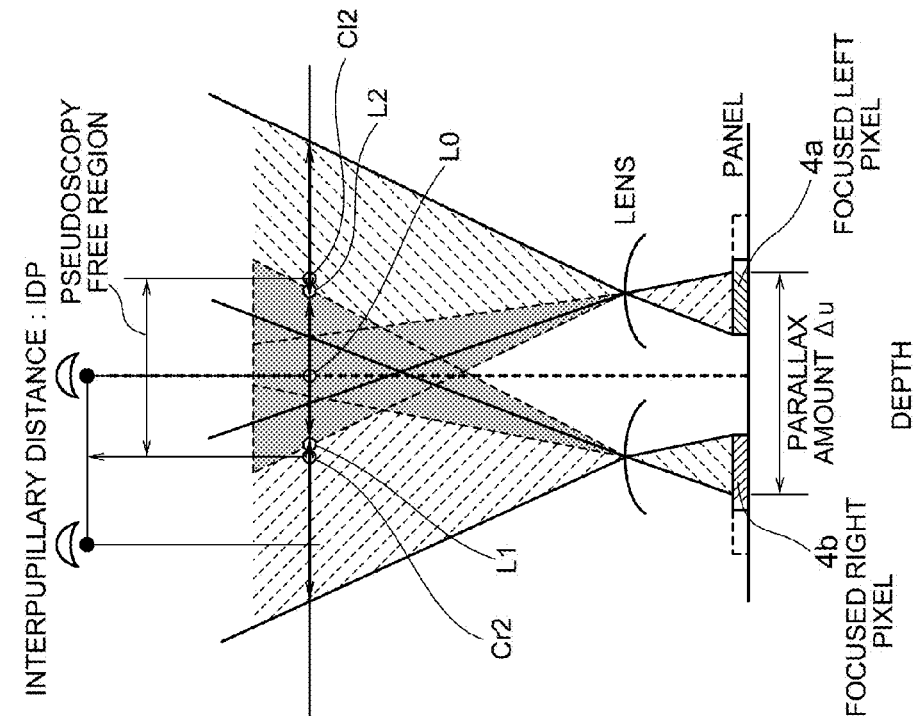
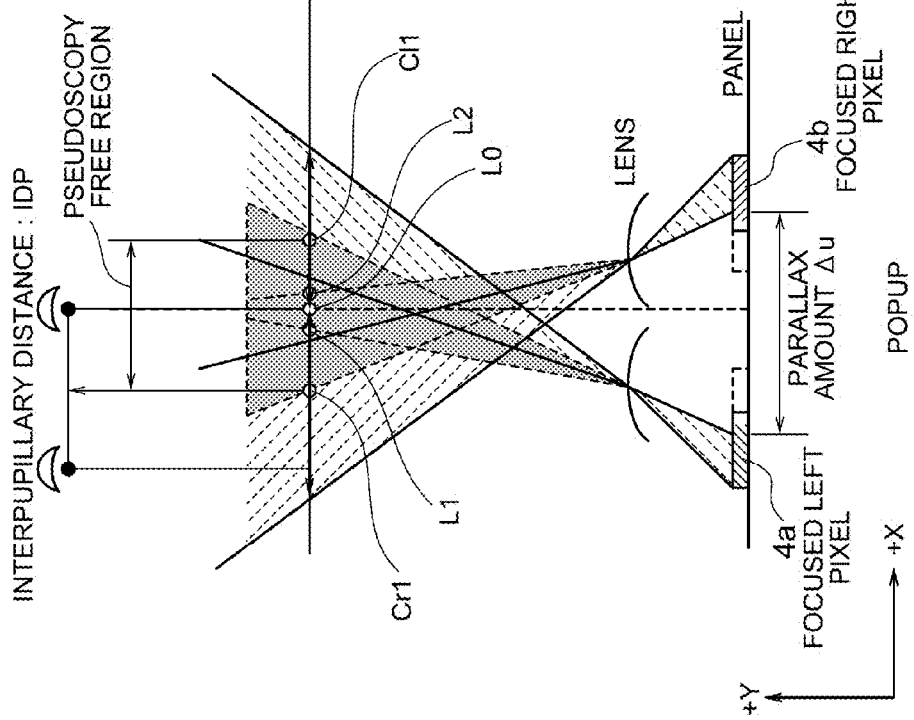

STEREOSCOPIC DISPLAY DEVICE, METHOD FOR GENERATING IMAGE DATA FOR STEREOSCOPIC DISPLAY, AND PROGRAM THEREFOR

TECHNICAL FIELD

The present invention relates to a stereoscopic display device, a method for generating stereoscopic display image data, and a program therefor. More specifically, the present invention relates to a stereoscopic display device capable for corresponding to temperature changes in use environments, a method for generating stereoscopic display image data, and a program therefor.

BACKGROUND ART

In accordance with the demands for present display devices to have sophisticated functions, a special display device capable of stereoscopic image display, viewing angle control, and the like by combining an optical element array such as a lenticular lens, a prism sheet, a diffusion sheet with a display panel using electro-optic element such as liquid crystal has come to be used. An example of such display device is shown in FIG. 75 to FIG. 92.

Among those, FIG. 75 shows an example of a lenticular lens sheet 109 formed by making a lenticular lens used in a stereoscopic image display device into a sheet type. Further, FIG. 92 schematically shows a structural example of a display device that uses the lenticular lens sheet 109 and an example of a method for providing stereoscopic display of an image corresponding to that.

As shown in FIG. 75, one face of the lenticular lens sheet 109 is constituted with a flat face, and a plurality of convex-type cylindrical lenses 101 having a cylindrical section are provided in parallel on the other face in a unified manner. This is extended sequentially to form a sheet.

As shown in FIG. 92, in a display panel 114, left-eye pixels 115a and right-eye pixels 115b are disposed alternately by corresponding to focal points of each of the above-described cylindrical lenses 101. Each of the cylindrical lenses 101 are formed in a unified manner in the manner as described above as the lenticular lens sheet 109 so as to function as an optical distribution module for the outside.

Further, when the lefty-eye pixels 115a and the right-eye pixels 115b are driven by a drive circuit (not shown) according to a prescribed signal, a left-eye image is formed in a left-eye region 120a and a right-eye image is formed in a right-eye region 120b, respectively, by the cylindrical lenses 101. Thereby, an observer can recognize a stereoscopic image. A typical two-dimensional image display can be provided when the left-eye pixels 115a and the right-eye pixels 115b are driven by a same signal, so that it is the structure that is also capable of achieving two-dimensional image display.

As a material of the lenticular lens sheet 109, an inorganic material such as glass or an organic material such as plastics may be used. However, in general, plastic materials are used often.

As the plastics, used are engineering plastics such as polymethyl methacrylate (PMMA), cyclopolyolefin (COP), polycarbonate (PC), etc.

Further, in general, a glass substrate is used for the display panel. Thus, in the structure as shown in FIG. 92, there is a difference in the coefficient of linear expansion generated between that of the lenticular lens sheet that is a plastic material. Therefore, when there is a change in the use temperature, the state of the stereoscopic image display varies due to contraction of the lenticular lens sheet 109. Thus, it may become impossible to achieve stereoscopic visual recognition in the worst cases.

For a series of issues regarding the changes in the use temperature, Patent Document 1 proposes a combination of the optical distribution module and the display panel described above.

FIG. 93 shows the technical content disclosed in Patent Document 1. In FIG. 93, when inputting a temperature signal showing the peripheral temperature of a multi-view display device, it is so depicted that the distortion amount of shielded positions of a light-shielding panel 208 for corresponding to the peripheral temperature can be corrected, and that highly accurate viewing angle and view field range adjustment can be achieved.

FIG. 94 schematically shows the basic structure of the present invention disclosed in Patent Document 2 that is another related technique. In the invention disclosed in Patent Document 2 shown in FIGS. 94A and 94B, the coefficients of linear expansion of the main materials constituting a lens array 260 and an original image 270 are set to be almost equivalent.

FIG. 95 and FIG. 96 show the basic content of the technique proposed in Patent Document 3.

As shown in FIG. 95, a prescribed signal is sent from a controller 322 to an image shift section 304 and a refracting section 318 of the image shift section 304 functioning as the optical distribution module controls an electric field according to the temperature information by being energized by the controller 322 by using a crystal such as calcite whose refractive index can be changed by an electric field as shown in FIG. 96.

Further, Patent Document 4 discloses a technique regarding a display device for measuring a peripheral atmosphere temperature of a light-emitting element, and setting the drive condition of the light-emitting element based thereupon (not shown). This technique is designed in view of the fact that fluctuation of the atmosphere temperature influences the light-emitting property of a light-emitting diode when the light-emitting diode is used as the light-emitting element, and the driving condition of the light-emitting diode is set and used by corresponding to the temperature.

Patent Document 1: Japanese Unexamined Patent Publication 2006-184900
Patent Document 2: Japanese Unexamined Patent Publication 2005-189864
Patent Document 3: JP 3816813 B
Patent Document 4: Japanese Unexamined Patent Publication 2009-16384

However, there are following inconvenient issues with the related techniques described above. In the case of the display device (FIG. 93) disclosed in Patent Document 1, the distortion amount due to the temperature change is considerably small, i.e., several ppm to several tens ppm.

Thus, in order to correct it only with the shielded positions of the light-shielding panel 208, at least ten to hundred times or higher of the resolution with respect to the resolution of a TFT-LCD (liquid crystal display element) 221 is required as the resolution of the light-shielding panel 208.

Thus, the device cost becomes extremely high.

In the case of the display device (FIG. 94) disclosed in Patent Document 2, there is a large restriction generated for selecting the materials in order to make the coefficients of linear expansion of the main materials constituting the lens array 260 and the original image 270 substantially equivalent. In particular, when glass is used as the main material of the member for forming the original image, it is difficult to use the plastic-based materials for the lens array.

This causes many inconveniences in terms of reduction in the cost, reduction in the weight, flexibility, and the like, which are the great disadvantage for being developed into a product.

In the case of the display device (FIG. 95 to FIG. 96) disclosed in Patent Document 3, it is required to employ an electric-field controllable material for the optical distribution module.

Thus, the device cost is extremely increased.

The display device disclosed in Patent Document 4 is a device in which the temperature dependency of the light-emitting diode is improved, and there is no disclosure regarding the temperature property of the lens array related to 3D.

An object of the present invention is to provide a stereoscopic display device, a method for generating stereoscopic display image data, and a program therefor capable of effectively displaying stereoscopic images by corresponding to the environmental condition where the use temperature changes, when a lens eye that is excellent in the productivity and the cost is used.

In order to achieve the foregoing object, as shown in FIG. 1 and FIG. 2, for example, the stereoscopic display device according to the present invention includes: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module which controls actions of the display panel driving section and generates 3D image data for driving the display panel based on three-dimensional data containing depth information of z-axis direction specified in advance.

Among those, the stereoscopic image generating module is provided with: a temperature sensor which detects temperatures of the image distributing section; and a data storage section which stores information regarding an effective linear expansion coefficient difference between the image distributing section and the display panel section when the both are in a fixed state, size of the display panel section, resolution of the unit pixels, a reference temperature, and 3D crosstalk characteristic as parameter information regarding an inherent stereoscopic viewing region of the stereoscopic display panel.

Further, the stereoscopic image generating module includes: a deformation amount calculating section which calculates a temperature difference $\Delta T$ between temperature information detected by the temperature sensor and the reference temperature, and calculates a deformation amount that is a contraction amount or an expansion amount which changes due to a change in surrounding environment temperatures of the image distributing section based on the temperature difference $\Delta T$ and the information stored in the data storage section; and a main arithmetic operation controller which, when the deformation amount regarding contraction or expansion is calculated by the deformation amount calculating section, generates 3D image data corresponding thereto and outputs the generated data to the display panel driving section for driving the display panel.

In order to achieve the foregoing object, as shown in FIG. 2 and FIG. 6, for example, the stereoscopic display image data generating method according to the present invention is used for a stereoscopic display device which includes: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module including a main arithmetic operation controller which controls actions of the display panel driving section and generates 3D image data for driving the display panel based on three-dimensional data containing depth information of z-axis direction specified in advance, and the method includes:

detecting temperatures of the image distributing section by a temperature sensor and calculating a temperature difference $\Delta T$ with respect to a reference temperature set in advance (a temperature difference calculating step); comparing the calculated temperature difference $\Delta T$ and a reference value $\Delta Tth$ set separately in advance by their absolute values and, in a case of $|\Delta T|>|\Delta Tth|$, judging that it is necessary to perform correction regarding a parallax amount specified on the x-axis of the 3D image data (correction necessity judging step); when judged in the judgment of the correction necessity as $|\Delta T| \leq |\Delta Tth|$ and that the correction is unnecessary, performing rendering processing on the three-dimensional data as it is (image processing step); and generating 3D image data for driving the display panel based on a result acquired by the rendering processing (3D image data generating step).

In order to achieve the foregoing object, as shown in FIG. 26 and FIG. 27, for example, the stereoscopic display image data generating method according to the present invention is used for a stereoscopic display device which includes: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module including a main arithmetic operation controller which controls actions of the display panel driving section and generates 3D image data for driving the display panel based on three-dimensional data containing depth information of z-axis direction specified in advance, wherein:

when generating the 3D image data, a temperature sensor measures temperatures of the display panel part in advance, and a deformation amount calculating section calculates a temperature difference $\Delta T$ with respect to a reference temperature set in advance based on the measurement value (temperature difference calculating step); then, 3D image data acquired by performing rendering processing on three-dimensional data is stored for a depth map (depth map information specifying step); a temperature difference judging section compares the calculated temperature difference $\Delta T$ with a reference value $\Delta Tth$ set separately in advance by their absolute values and, in a case of $|\Delta T|>|\Delta Tth|$, judges that it is necessary to perform correction regarding a parallax amount of the 3D image data (correction necessity judging step); and the image data stored in the data storage section is outputted as two-dimensional 3D depth map image data having depth information corresponding to the parallax amount of the three-dimensional data when it is judged in the correction necessity judging step that the temperature difference $\Delta T$ is $|\Delta T| \leq |\Delta Tth|$ and it is under a temperature environment that does not require correction of the parallax amount (3D image data generating step).

In order to achieve the foregoing object, as shown in FIG. 35, for example, the stereoscopic display image data generating method according to the present invention is used for a stereoscopic display device which includes: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module including a main arithmetic operation controller which controls actions of the display panel driving section and generates 3D image data for driving the display panel based on three-dimensional data containing depth information, wherein:

when a pair of parallax image data A for the right eye and the left eye rendering-processed in advance are inputted, the main arithmetic operation controller accumulates the data to a data storage section provided in advance for generating 3D image data (target image data setting step); a temperature difference $\Delta T$ with respect to a reference temperature set in advance is calculated based on the temperature of the image distributing section measured by a temperature sensor when collecting the parallax image data A (temperature difference calculating step); an arithmetic operation is individually performed regarding whether or not the temperature difference $|\Delta T|$ specified in the temperature difference calculating step is equal to or less than a reference value $|\Delta Tth|$ set in advance, and it is judged whether or not it is under a temperature environment that requires correction for parallax amount of each object specified on an x-axis on an xy plane that is a display face (temperature difference judging step); and when it is judged by the temperature difference judgment that the temperature difference $\Delta T$ is $|\Delta T| \leq |\Delta Tth|$ and it is under a temperature environment that does not require correction of the parallax amount, two-dimensional 3D image data having depth information that corresponds to the parallax amount is generated and outputted for driving the display panel based on the pair of parallax image data A stored in the data storage section.

In order to achieve the foregoing object, the stereoscopic display image data generating program according to the present invention is used for a stereoscopic display device which includes: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module including a main arithmetic operation controller which controls actions of the display panel driving section and generates 3D image data for driving the display panel based on three-dimensional data containing depth information captured separately, and the program causes a computer to execute:

a temperature difference calculating function which calculates a temperature difference $\Delta T$ with respect to a reference temperature set in advance separately, when a temperature of the image distributing section is inputted from a temperature sensor provided in advance; a correction necessity judging function which compares the calculated temperature difference $\Delta T$ and a reference value $\Delta Tth$ set in advance separately by their absolute values, judges that it is necessary to perform correction regarding a parallax amount specified on an x-axis of the 3D image data in a case of $|\Delta T| > |\Delta Tth|$, and judges that it is unnecessary to perform correction regarding the parallax amount in a case of $|\Delta T| \leq |\Delta Tth|$; an image processing function which performs rendering processing on the three-dimensional data when it is judged by the correction necessity judging function as $|\Delta T| \leq |\Delta Tth|$ and that the correction is unnecessary; and a 3D image data generating function which generates 3D image data for driving the display panel based on result acquired by the rendering processing.

In order to achieve the foregoing object, the stereoscopic display information generating program is used for a stereoscopic display device which includes: a stereoscopic display panel including a display panel section constituted with a plurality of unit pixels and an image distributing section for distributing and outputting visual recognition image data outputted from the display panel section as visual recognition stereoscopic image information towards outside; a display panel driving section which drives the display panel section of the stereoscopic display panel; and a stereoscopic image generating module including a main arithmetic operation controller which controls actions of the display panel driving section and generates 3D image data for driving the display panel based on three-dimensional data containing depth information captured separately, and the program causes a computer to execute:

a temperature difference calculating function which, when generating the 3D image data, calculates a temperature difference $\Delta T$ with respect to a reference temperature set in advance based on a temperature of the stereoscopic display panel part measured by a temperature sensor; a depth map information specifying function which stores 3D image data acquired by performing rendering processing on the captured three-dimensional data to a memory to be used for a depth map image; a correction necessity judging function which compares the calculated temperature difference $\Delta T$ with a reference value $\Delta Tth$ set in advance by their absolute values and, in a case of $|\Delta T| > |\Delta Tth|$, judges that it is necessary to perform correction regarding a parallax amount of the 3D image data; and a 3D image data generating function which operates when it is judged by the correction necessity judging function that the temperature difference $\Delta T$ is $|\Delta T| \leq |\Delta Tth|$ and it is under a temperature environment that does not require correction of the parallax amount to output the image data stored in the memory as two-dimensional 3D depth map image data having the depth information that corresponds to the parallax amount of the three-dimensional data.

In order to achieve the foregoing object, the stereoscopic display image data generating program is used for a stereoscopic display device which includes: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module which controls actions of the display panel driving section and generates 3D image data for driving the display panel based on three-dimensional data containing depth information, and the program causes the computer to execute:

a target image data setting function which, by the stereoscopic image generating module, inputs a pair of parallax image data A for the right eye and the left eye rendering-processed in advance for generating 3D image data, and accumulates those to a data storage section provided in advance; a temperature difference calculating function which calculates a temperature difference ΔT with respect to a reference temperature set in advance based on a measurement value of the temperature of the image distributing section measured by a temperature sensor when collecting the parallax image data A; a correction necessity judging function which individually performs an arithmetic operation regarding whether or not the temperature difference ΔT calculated by the temperature difference calculating function is equal to or less than an absolute value of a reference value ΔTth set in advance, and judges whether or not it is under a temperature environment that requires correction for parallax amount of each object specified on an x-axis on an xy plane that is a screen face as the display face containing z-axis information as depth information; and a 3D image data generating function which operates when it is judged by the correction necessity judging function that the temperature difference ΔT is |ΔT|≤|ΔTth| and it is under a temperature environment that does not require correction of the parallax amount to generate and output two-dimensional 3D image data having depth information that corresponds to the parallax amount based on the pair of parallax image data A stored in the data storage section for driving the display panel.

The present invention is structured to drive the stereoscopic display device panel by generating 3D image data by corresponding even to the temperature changes in the peripheral environments of the stereoscopic display device. Therefore, even when there is a change in the environment temperature, it is possible to display the 3D image in a stable state by corresponding to that.

Thus, the stereoscopic visibility can be improved without giving a sense of uncomfortablenss to the observers.

BRIEF DESCRIPTION OF THE DRAWINGS

FIGS. 2A-2C show an example of the stereoscopic display device disclosed in FIG. 1, in which FIG. 2A is a block diagram showing an entire structural example, FIG. 2B is a block diagram showing a main arithmetic operation controller as a main part thereof, and FIG. 2C is a block diagram showing a main part (a main arithmetic operation controller) of a modification example of the first exemplary embodiment disclosed in FIG. 2A;

FIG. 4 is a schematic chart showing an optical model in a lens contraction state at the time of displaying 3D image data in the first exemplary embodiment of FIG. 1, and showing an example of a case where a parallax image (A) on popup side of the image data of FIG. 3 and a parallax image (B) on depth side are displayed in a corresponding manner;

FIG. 5 is a schematic chart showing an optical model in a lens expansion state at the time of displaying 3D image data in the first exemplary embodiment of FIG. 1, and showing an example of a case where a parallax image (A) on popup side of the image data of FIG. 3 and a parallax image (B) on depth side are displayed in a corresponding manner;

FIGS. 16A-16C show an example of a stereoscopic display device according to a second exemplary embodiment, in which FIG. 16A is a block diagram showing an entire structural example, FIG. 16B is a block diagram showing a main arithmetic operation controller as a main part thereof, and FIG. 16C is a block diagram showing a main part (a main arithmetic operation controller) of a modification example of the second exemplary embodiment disclosed in FIG. 16A;

FIGS. 19A and 19B are block diagrams showing an example (First Example) of a stereoscopic display device according to a third exemplary embodiment of the present invention, in which FIG. 19A is a block diagram showing an entire structural example including 2D rendering processing and FIG. 19B is a block diagram showing a main arithmetic operation controller as a main part thereof;

FIGS. 23A and 23B are block diagrams showing modification examples of the main arithmetic operation controller which constitutes a part of the stereoscopic display device according to the third exemplary embodiment of the present invention, in which FIG. 23A shows a case of Modification Example (1) and FIG. 23B shows a case of Modification Example (2);

FIGS. 26A and 26B show an example of a stereoscopic display device according to a fourth exemplary embodiment of the present invention, in which FIG. 26A is a block diagram showing an entire structural example of a case where 3D image data is generated based on a depth map A set in advance and FIG. 26B is a block diagram showing the structure of a main arithmetic operation controller as a main unit thereof;

FIGS. 34A and 35B show an example of a stereoscopic display device according to a fifth exemplary embodiment of the present invention, in which FIG. 34A is a block diagram showing an entire structural example of a case where 3D image data is generated by executing offset processing according to the environmental temperature afterwards based on a parallax image A that is rendering-processed in advance and FIG. 34B is a block diagram showing the structure of a main arithmetic operation controller as the main unit thereof;

FIG. 35 is a flowchart showing an example of a 3D image data generating action of a case where 3D image data according to the environmental temperature is generated based on a parallax image A set in advance in the fifth exemplary embodiment disclosed in FIG. 34;

FIG. 36 is an explanatory chart showing a state of offset processing executed in a lens contraction state and an example of 3D image data acquired by the offset processing in the 3D image data generating action along the flowchart shown in FIG. 35;

FIGS. 39A and 39B show an example of a stereoscopic display device according to a sixth exemplary embodiment, in which FIG. 39A is a block diagram showing an entire structural example and FIG. 39B is a block diagram showing a main arithmetic operation controller as a main part thereof;

FIGS. 43A and 43B show examples of images having depth information, in which FIG. 43A is center image data and FIG. 43B is depth image data;

FIG. 45 is a table showing examples of parallax amount adjusting LUT signals at each temperature;

FIG. 47 is a table showing stereoscopic viewing regions for the temperatures (evaluation result) regarding a 3D object having a prescribed parallax amount;

FIG. 48 is a table showing examples of LUT signals generated based on FIG. 47;

FIG. 51 is a table showing LUT0 signals acquired from the evaluation result of the stereoscopic viewing region for the object at p0 position disclosed in FIG. 50;

FIG. 52 is a table showing LUT1 signals acquired from the evaluation result of the stereoscopic viewing region for the object at p1 position disclosed in FIG. 50;

FIG. 68 is an explanatory chart showing a case where respective parallax images at the depth position and the popup position disclosed in FIG. 65 are displayed for the optical model of FIG. 66;

FIG. 69 is an explanatory chart showing the lens contraction/expansion states (A), (B), and (C) generated due to an effective linear expansion coefficient between a lenticular lens and a display panel for the changes in the temperature of the display device;

FIG. 70 is an explanatory chart corresponding to FIG. 69, which shows an example of changes in the optical model where a parallax image is projected to both the left and right eyes of an observer when there is a change in the temperature of the lenticular lens;

FIG. 72 is an explanatory chart showing a state of a case where a parallax image is displayed for the optical model in a lens expansion state in FIG. 70;

FIG. 77 is an optical model which takes 3D crosstalk into consideration;

FIG. 79 is a schematic illustration showing popup and depth images at a normal temperature;

FIG. 80 is an explanatory chart of stereoscopic viewing regions in a case of showing popup and depth images at a normal temperature;

FIG. 81 is an explanatory chart of pseudoscopy free regions in a case of showing popup and depth images at a normal temperature;

FIG. 82 is an optical model which does not take 3D crosstalk region into consideration at a high temperature;

FIG. 83 is an optical model which takes 3D crosstalk region into consideration at a high temperature;

FIG. 84 is an explanatory chart of stereoscopic viewing regions in a case of showing popup and depth images at a high temperature;

FIG. 88 is an optical model which does not take 3D crosstalk region into consideration at a low temperature;

FIG. 90 is an explanatory chart of stereoscopic viewing regions in a case of showing popup and depth images at a low temperature;

FIG. 91 is an explanatory chart of pseudoscopy free regions in a case of showing popup and depth images at a low temperature;

BEST MODES FOR EMBODYING THE PRESENT INVENTION

Hereinafter, each of first to fifth exemplary embodiments according to the present invention will be described in order by referring to FIG. 1 to FIG. 38.

First, before explaining each of the first to fifth exemplary embodiments, a specific example of a stereoscopic image content (3D content) generating method executed in common in each of the first to fifth exemplary embodiments will be described by, referring to FIG. 64 to FIG. 74.

Thereafter, each of the first to fifth exemplary embodiments will be described in a specific manner.

Figure 64:
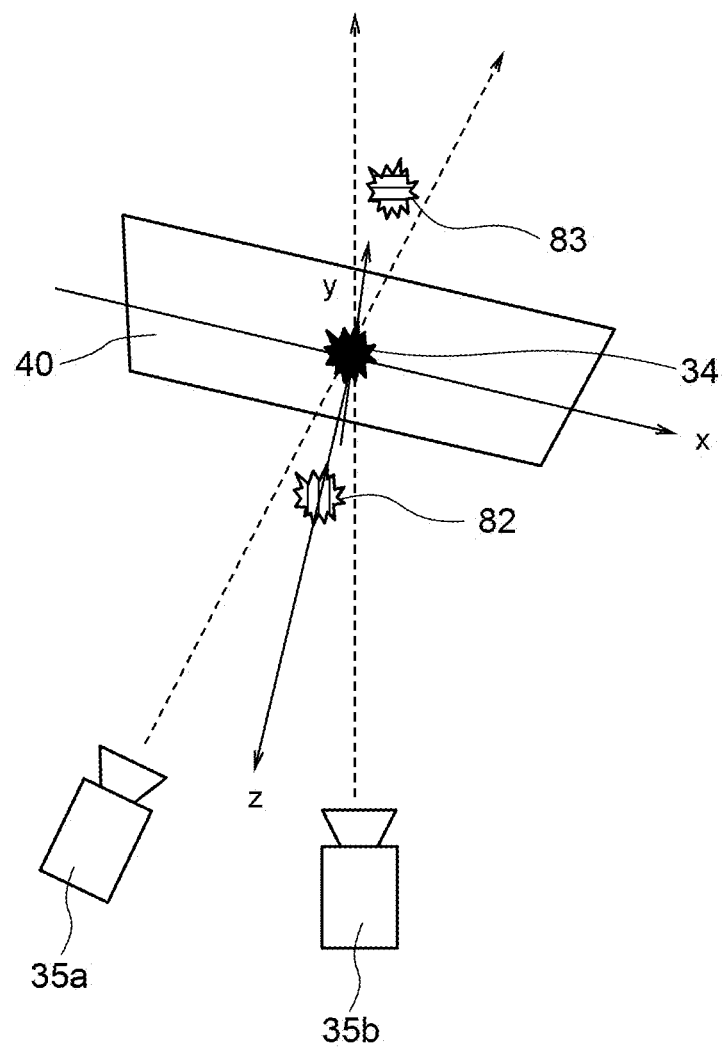
FIG. 64 is a chart showing a setting condition of a pair of cameras used in common in each of the first to fifth exemplary embodiments disclosed in FIG. 1 to FIG. 38 and showing an example of a 3D content generating method acquired thereby.

First, an example of the 3D content generating method is shown in FIG. 64 to FIG. 65. Note here that FIG. 64 is an image capturing method called a cross method, with which an intersection point 34 between each of optical axes of a left-eye camera 35a and a right-eye camera 35b is set at a reproduction point on a normal screen, i.e., on a screen face (image display face) 40.

Then, it is so defined that the horizontal direction of the screen face 40 is an x-axis, the direction orthogonal to the x-axis is a y-axis, the direction orthogonal to the xy plane provided by the x-axis and the y-axis is a z-axis, an intersection point 34 is the origin, and the positive and negative directions of the x-, y-, and z-axes are as shown in FIG. 64. The screen face 40 in FIG. 64 shows a state of being captured obliquely from the above on the cameras 35a and 35b side.

Figure 65A:
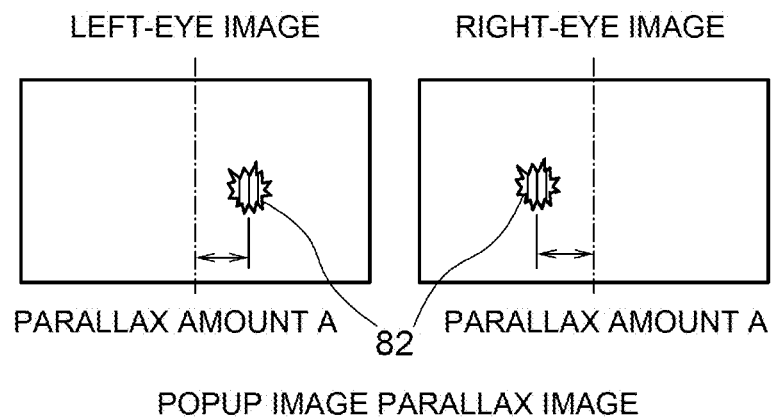
FIG. 65 is an explanatory chart showing an example of a 3D content image acquired under the camera setting disclosed in FIG. 64.
Figure 65B:
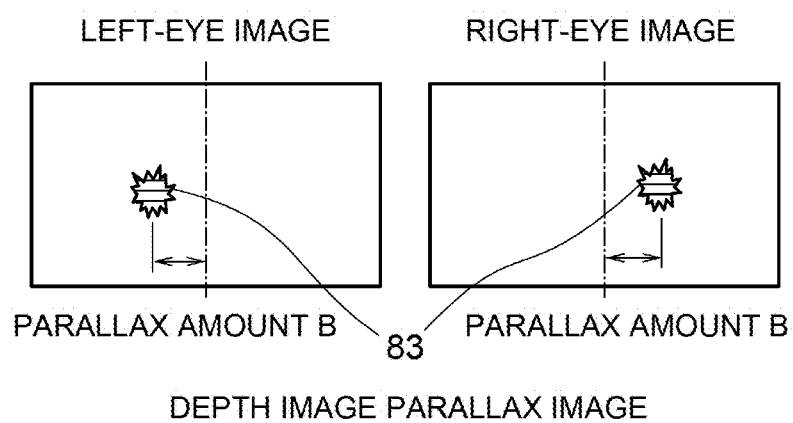

In this state, popup image parallax images as in FIG. 65A are generated for an object 82 whose z-axis is placed in the positive direction, and depth image parallax images as in FIG. 65B is generated for a depth object 83 whose z-axis is placed in the negative direction (depth direction).

For example, in a case where the object is placed in the center of the screen, regarding the popup image parallax images of FIG. 65A, the object 82 is located to the right side from the center of the screen by a parallax amount A in the left-eye image, while the object 82 is located to the left side from the center of the screen by a parallax amount A in the right-eye image. Inversely, regarding the depth image parallax images of FIG. 65B, the object 83 is located to the left side from the center of the screen by a parallax amount B in the left-eye image, while the object 83 is located to the right side from the center of the screen by a parallax amount B in the right-eye image. Note here that the extent of the parallax amount A and B are determined depending on the camera positions, distance between the cameras, object position, and the like.

Figure 66:
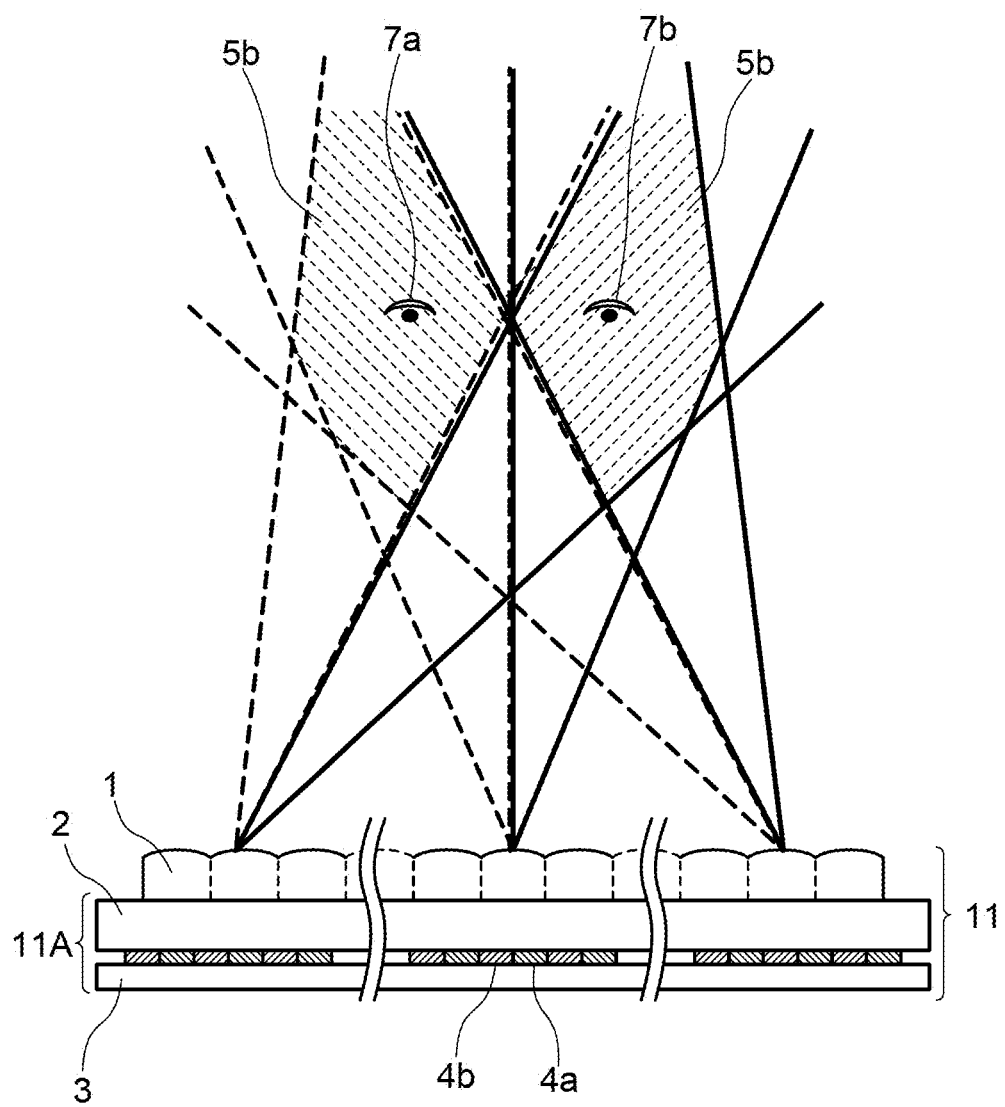
FIG. 66 is an explanatory chart showing an example of an optical model where a display image is projected to both the left and right eyes of the observer in a stereoscopic display device using a lens array.

In a stereoscopic display device using a lens array shown in FIG. 66, first, an example of an optical model which projects a parallax image to both of the left and right eyes of an observer is shown. This stereoscopic display device is constituted with a lenticular lens 1, a display panel section 11A, and a controller unit, not shown. Further, in the case of FIG. 66, the both eyes (left eye 7a and right eye 7b) of the observer are located at prescribed observing distances from the display face of the stereoscopic display device 11 in a positional relation where the center between both eyes and the center of the display panel match with each other.

The display panel section 11A is constituted with a plurality of pixels acquired by arranging optical modulators in matrix for one and the other substrates 2 and 3 as a pair. In FIG. 66, shown are each of the pixels at both ends of the panel and the center among the left-eye pixels 4a and the right-eye pixels 4b arranged alternately. The lenticular lens 1 functions as a means for distributing light rays emitted from each pixel to both eyes. A left-eye region 5a is formed by the light rays from the left-eye pixels 4a of both ends of the panel and the center, and a right-eye region 5b is formed by the light rays from the right-eye pixels 4b.

Then, the observer can observe a prescribed stereoscopic image when the left eye 7a is located within the left-eye region 5a and the right eye 7b is located within the right-eye region 7a.

Figure 67:
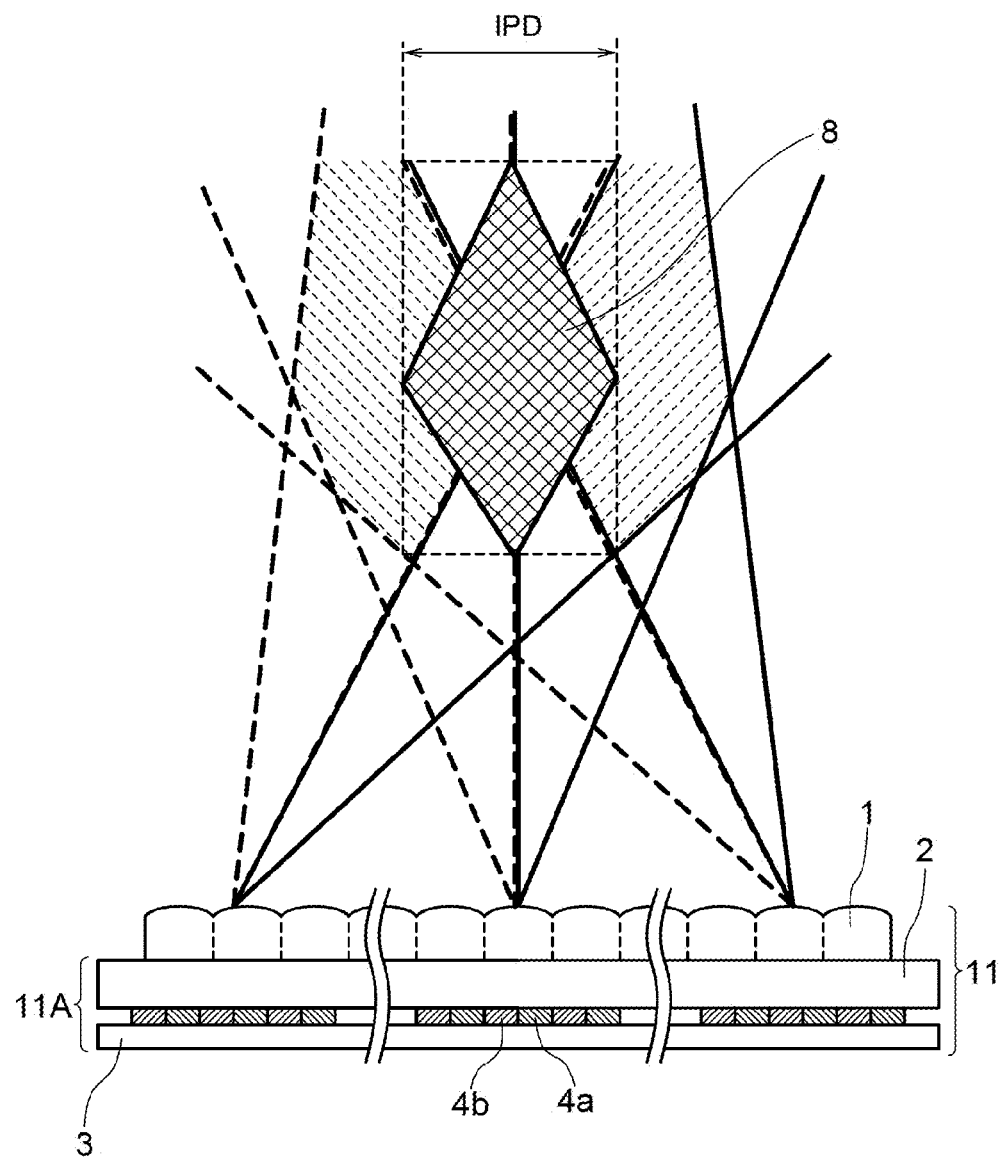
FIG. 67 is an explanatory chart showing a range of the center point of both eyes for an optical model shown in FIG. 66 and showing a maximum range of a stereoscopic viewing region defined based on interpupillary IPD at the same time.

FIG. 67 shows a range of the center point between the both eyes of the observer of FIG. 66 where the stereoscopic image can be recognized. The range stipulated by a range IPD indicating the distance between the both eyes is defined as a stereoscopic viewing region 8.

FIG. 68 shows a schematic chart of a case where popup and depth parallax images shown in FIG. 65 are displayed to the optical model of FIG. 66. FIG. 68A shows the case of observing the popup image. The position of object 82 for the right-eye image is located on the left side with respect to the center of the screen, while the object 82 for the left-eye image is located on the right side with respect to the center of the screen. Thus, the direction of the light ray towards the observing plane from the display face of the object video is a P-direction.

Further, FIG. 68B shows the case of observing the depth image. As in the case of the popup image, the position of the object 83 for the right-eye image is located on the right side with respect to the center of the screen, while the object 83 for the left-eye image is located on the left side with respect to the center of the screen. Thus, the direction of the light ray towards the observing plane from the display face of the object video is a Q-direction.

In general, a plastic material is used often for the lenticular lens 1 as described above. Further, in general, a glass material is used for the display panel section 11A. In the case of the structure using such typical materials, when there is a change in the use environmental temperature, the lens pitch L shown in FIG. 69B fluctuates for the pixels 4a and 4b due to a difference between the thermal expansion coefficients of the plastic material and the glass material.

For example, on the low-temperature side, there is generated contraction with which the lens pitch becomes "L−ΔL" as shown in FIG. 69A. On the high-temperature side, there is generated expansion with which the lens pitch becomes "L+ΔL" as shown in FIG. 69C. This difference in the linear expansion coefficients depends not only on the linear expansion coefficient difference inherent to the materials but practically depends largely on the method for fixing the display panel section 11A and the lenticular lens 1.

When the state where both of the display panel section 11A and the lenticular lens 1 are fixed is defined as the effective linear expansion coefficient difference, the effective linear expansion coefficient difference is greater in a case of fixing the lenticular lens 1 locally than in a case of fixing the lenticular lens 1 on the entire face. Further, the effective linear expansion coefficient depends on the fixing material mechanical property value even in the case of fixing it on the entire face.

Furthermore, it is also possible to interpose a polarization plate (not shown) between the display panel section 11A and the lenticular lens 1. In this case, the effective linear expansion coefficient difference depends also on the mechanical property value of the polarization plate material in addition to the above-described fixing method.

Regarding the case of having such temperature changes, changes in the optical model which projects the parallax image to both the left and right eyes of the observer are shown in and FIGS. 70A, 70B, and 70C.

FIG. 70A shows the left-eye region and the right-eye region of the lens contraction state, FIG. 70B shows the left-eye region and the right-eye region of the normal state, and FIG. 70C shows the left-eye region and the right-eye region of the lens expansion state, respectively. Note here that the refraction of the light ray in the panel outer end becomes larger as the lens pitch becomes smaller, i.e., there is a change in the direction along which the observing distance becomes shorter. At the same time, the size of the left-eye region and the right-eye region changes as well.

Figure 71A:
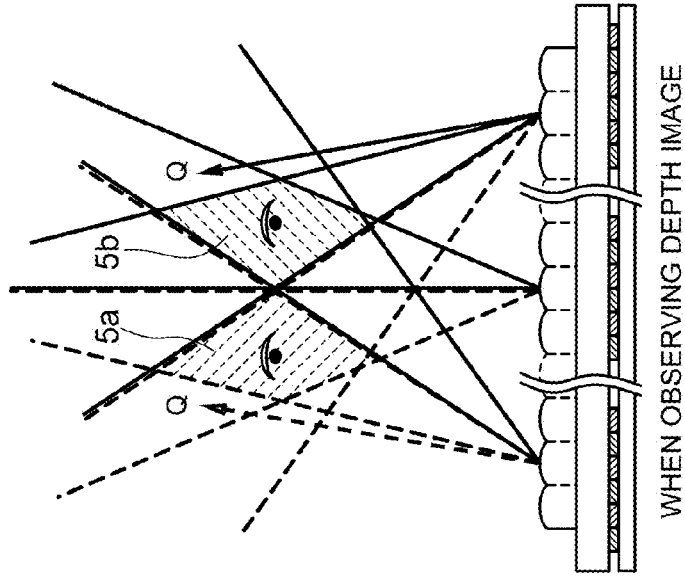
FIG. 71 is an explanatory chart showing a state of a case where a parallax image is displayed for the optical model in a lens contraction state in FIG. 70.
Figure 71B:
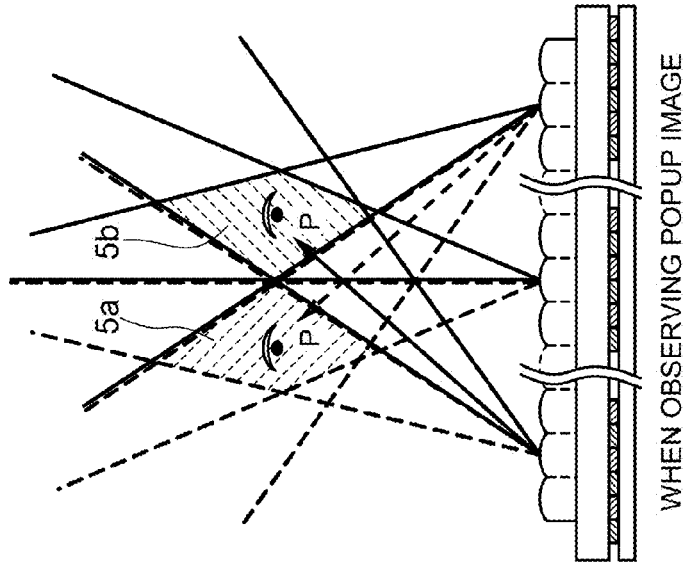

With respect to the optical models of the lens contraction state shown in FIG. 70A, FIGS. 71A and 71B are schematic views of the cases of each of the popup and depth parallax images shown in FIG. 65.

FIG. 71A shows the case at the time of observing the popup image. The light ray of the P-direction from the display face of the object video towards the observing plane described in FIG. 70A makes incident within the range of the left-eye region 5a and the right-eye region 5b.

In the meantime, FIG. 71B shows the case at the time of observing the depth image. The light ray of the Q-direction from the display face of the object video towards the observing plane described FIG. 70a does not make incident within the range of the left-eye region 5a and the right-eye region 5b. This means that the observer can recognize the popup image in the lens contraction state but cannot observe the depth image.

With respect to the optical models of the lens expansion state shown in FIG. 70C, FIG. 72A and FIG. 72B are schematic views of the cases of the popup and depth parallax images shown in FIG. 65.

FIG. 72A shows the case at the time of observing the popup image. The light ray of the P-direction from the display face of the object video towards the observing plane described in FIG. 70C does not make incident within the range of the left-eye region 5a and the right-eye region 5b.

In the meantime, FIG. 72B shows the case at the time of observing the depth image. The light ray of the Q-direction from the display face of the object video towards the observing plane described in FIG. 70C makes incident within the range of the left-eye region 5a and the right-eye region 5b. This means that the observer can recognize the depth image in the lens expansion state but cannot observe the popup image.

The Inventors conducted experiments regarding whether or not this phenomenon occurs really subjectively. Next, the result thereof will be described hereinafter.

First, FIG. 73 shows the stereoscopic viewing region evaluation result when the use environmental temperature of the stereoscopic display device is changed from −20° C. to 60° C.

The effective linear expansion coefficient difference of the display panel section 11A and the lenticular lens 1 is 30 ppm.

Figure 73A:
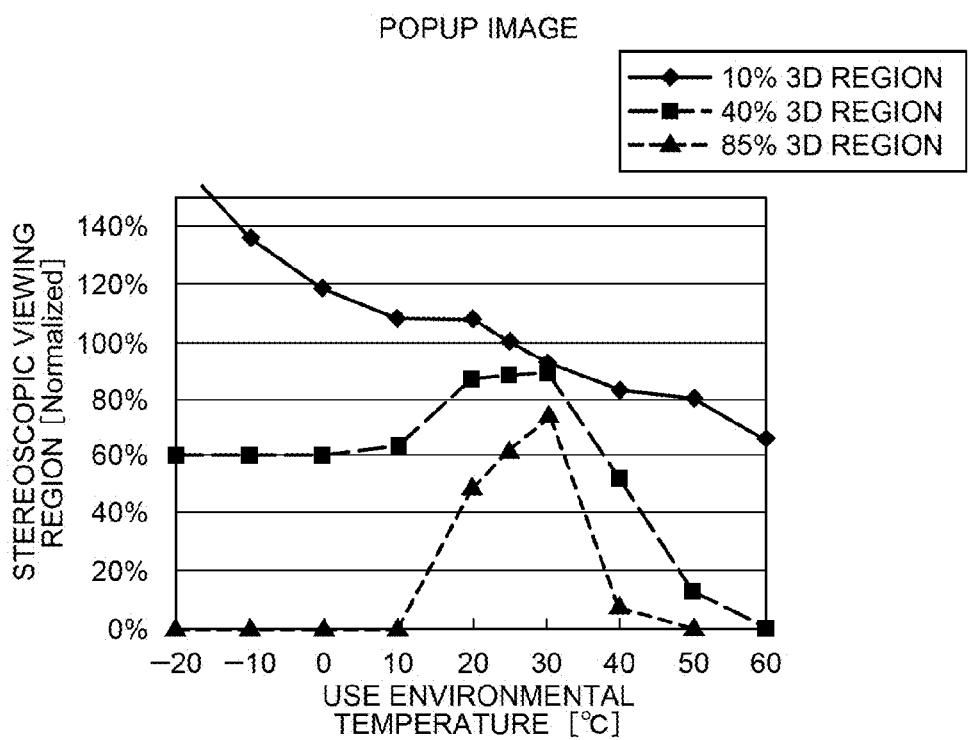
FIG. 73 shows graphs of a state of changes in the stereoscopic viewing region (evaluation result) when the use environmental temperature of the stereoscopic display device is changed from −20° C. to 60° C.
Figure 73B:
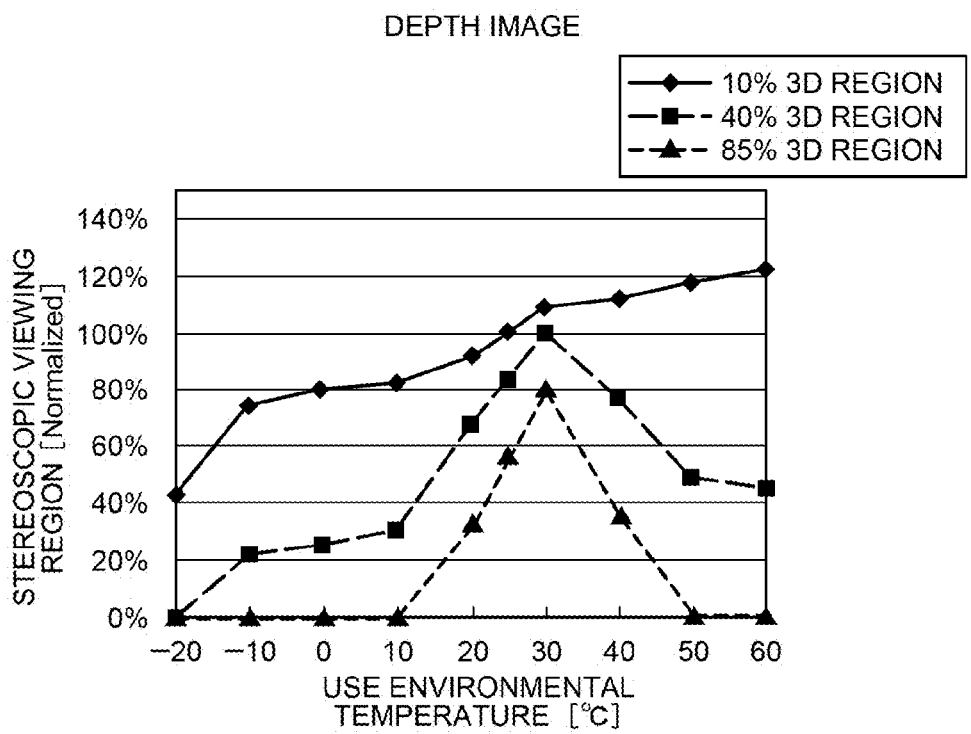

Note here that the evaluation was done under a condition that the proportion of the size of the parallax image with respect to the entire screen for the X-axis direction defined in FIG. 64 was considered as a stereoscopic viewing region (3D region) and parallax images with 10%, 40%, 85% of the 3D images from the center of the screen were prepared. That is, "10% 3D image" means that there is a parallax image in the center of the screen, and "85% 3D image" means that there is a parallax image in almost the entire screen. FIG. 73A is a stereoscopic viewing region at the time of observing the popup image, and FIG. 73B is a stereoscopic viewing region at the time of observing the depth image. Further, an average value of three test subjects is used for the stereoscopic viewing region.

According to the result, the stereoscopic viewing region when observing the popup image decreases largely on the high-temperature side, while the stereoscopic viewing region when observing the depth image decreases largely on the low-temperature side. This is a result that has no conflict with the explanations of FIG. 71 and FIG. 72.

Further, it is also confirmed that the fluctuation of the stereoscopic viewing region for the temperature change becomes smaller as the 3D region becomes smaller. This means that parallax image comes to exist near the center of the screen as the 3D region becomes smaller, so that there is less influence of the lens pitch fluctuation.

Figure 74:
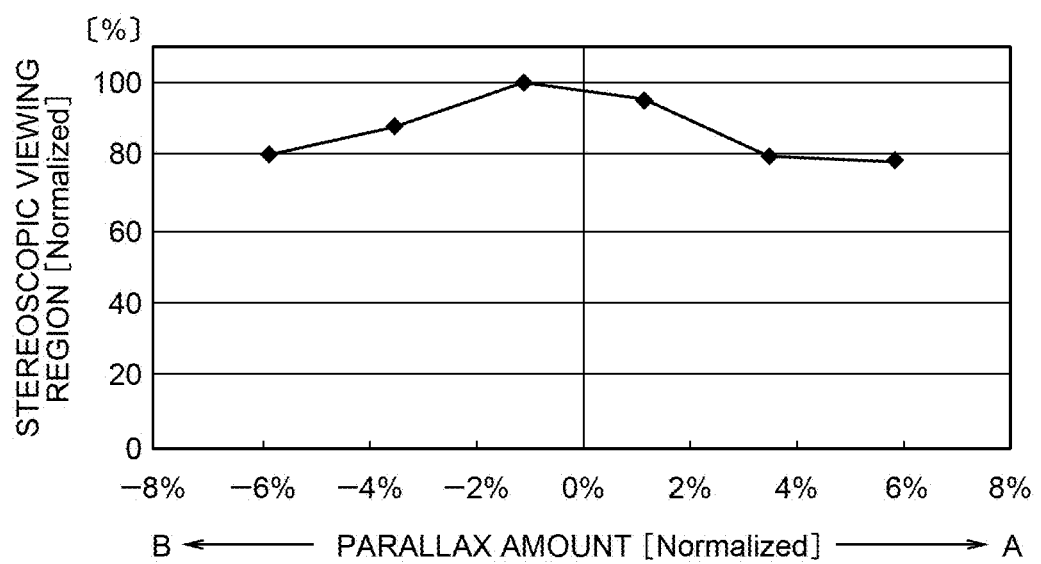
FIG. 74 is a related graph of FIG. 73, which is a graph showing fluctuations of the stereoscopic viewing region for the parallax amount at the temperature of 25° C.
Figure 75:
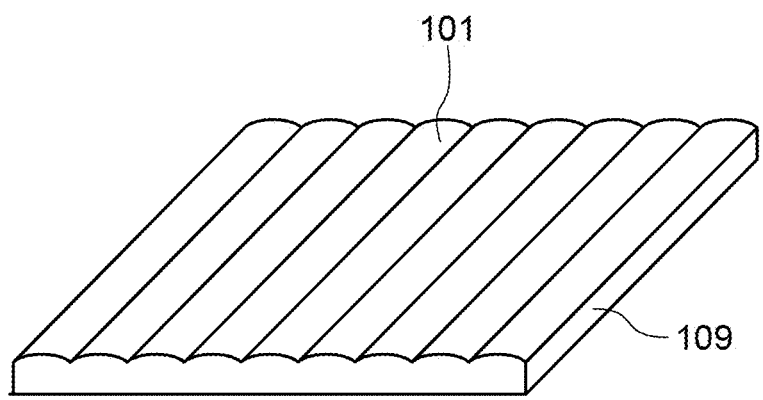
FIG. 75 is an explanatory chart showing an example of a lenticular lens sheet according to a related technique.

Further, FIG. 74 shows the fluctuation of the stereoscopic viewing region for the parallax amount at the temperature of 25° C. Regarding the positive and negative directions of the parallax amount, the positive direction is defined as the popup parallax amount A and the negative direction is defined as the depth parallax amount B.

Basically, the stereoscopic viewing region is almost equivalent in a case where the popup parallax amount and the depth parallax amount are the same. In a case where there is no lens pitch fluctuation due to the temperature fluctuation as described above, the difference of the stereoscopic viewing region for the parallax directions is extremely small. It can be seen that the change in the visually recognizable range for the popup and depth parallax directions as shown in FIG. 73 is a phenomenon inherent to the case of the change in the use environmental temperature.

In the meantime, it is also possible to describe the fluctuation in the stereoscopic viewing region for the temperature change by using the concept of 3D crosstalk. Note here that 3D crosstalk is mixture or leak of another viewpoint video into a given viewpoint video. As the factors for determining the 3D crosstalk, there are the pixel structure of the display panel, performances of the image distributing section (image forming performance in case of a lens, slit aperture ratio and the like in case of a barrier), and the like.

FIG. 70 to FIG. 91 show the cases where the parallax images are displayed based on an idealistic optical model. However, in a case where there are the pixel mixed regions M as in FIG. 76 as the pixel structure of the display panel, light generated from the left and right pixels is mixed in the boundary between the left and right viewing regions as shown in FIG. 77. As a result, a region WCT1 where the 3D crosstalk is less than a prescribed value and a region WCT2 where the 3D crosstalk is more than the prescribed value are generated. Note here that the prescribed value is a value determined based on the stereoscopic viewing region acquired subjectively, and the 3D crosstalk region WCT1 and the subjective stereoscopic viewing region are almost consistent. The quantitative numerical value of the 3D crosstalk depends on the measurement method and the evaluation device. Thus, the prescribed value fluctuates depending thereupon.

However, it is almost within 10%.

FIG. 77A is a chart for describing the pseudoscopy free region of a stereoscopic optical model in a case where the influence of the 3D crosstalk region WCT2 is taken into consideration FIG. 77B is a chart for describing the stereoscopic viewing region of the optical model that is the same as the model shown in FIG. 77A. In FIG. 77A, L0, L5, and L6 are positions where the luminance of the light emitted from the neighboring left pixel and right pixel is in the same value, i.e., positions where the 3D crosstalk becomes 100%.

Hereinafter, the luminance distribution state of the light emitted from the left and right pixels within the region by having L0 as the center will be described. As going away from L0 towards the left direction, the luminance of the light emitted from the right pixel becomes lower, while the luminance of the light emitted from the left pixel becomes higher. As going away from L0 towards the right direction, the luminance of the light emitted from the left pixel becomes lower, while the luminance of the light emitted from the right pixel becomes higher. L1 in FIG. 77B shows the position where the luminance of the light emitted from the left pixel is equal to or lower than the prescribed value, i.e., the boundary position between the 3D crosstalk regions WCT1 and WCT2. L2 shows the position where the luminance of the light emitted from the right pixel is equal to or lower than the prescribed value, i.e., the boundary position between the 3D crosstalk regions WCT1 and WCT2.

Figure 78:
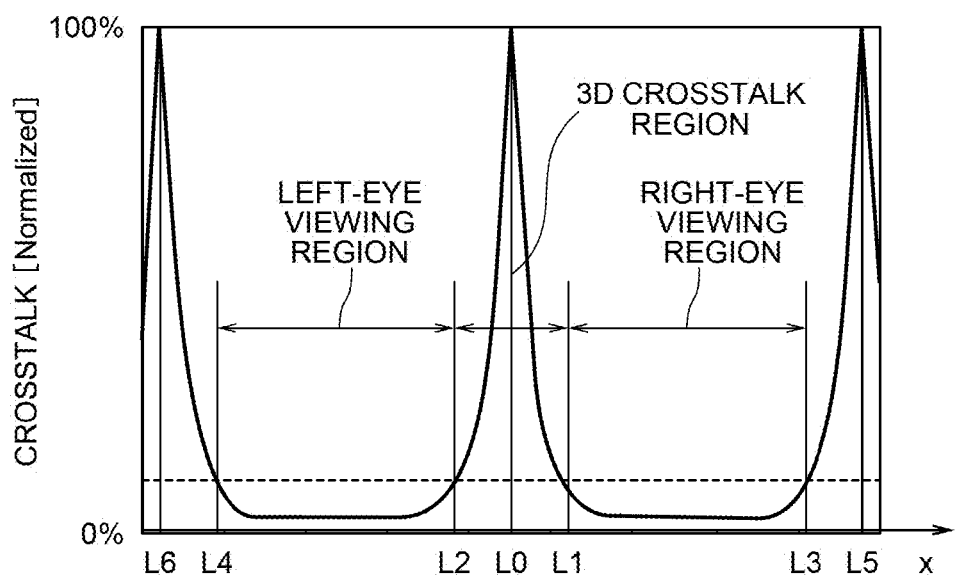
FIG. 78 shows 3D crosstalk for the viewing angle of light rays emitted from left and right pixels.

For verifying the explanations provided heretofore, FIG. 78 shows the result acquired by calculating the 3D crosstalk from the actual measurement values of the luminance distribution for the viewing angles of the light rays emitted from the left and right pixels of the display panel. Note here that a curve R is a mixture ratio of the left-eye video to the right-eye video, and a curve L is a mixture ratio of the right-eye video to the left-eye video. The position of the curve R at which the 3D crosstalk is equal to or lower than the prescribed value Q corresponds to L1 of FIG. 77b. The position of the curve L at which the 3D crosstalk is equal to or lower than the prescribed value Q corresponds to L1 of FIG. 77b. Further, the positions where the 3D crosstalk is equal to 100% correspond to L0, L5, and L6 of FIG. 77a. In FIG. 78, the 3D crosstalk region WCT1 from L2 to L4 is defined as a left-eye viewing region, and the 3D crosstalk region WCT1 from L1 to L3 is defined as a right-eye viewing region. Further, the 3D crosstalk region WCT2 from L1 to L2 is defined as a 3D crosstalk region.

When the both eyes shift from the center of the panel to the right direction (−X direction), a right-eye image starts to be viewed at the point where the left eye reaches L2, and a double image starts to appear. When shifted to the right direction (−X direction) further, the luminance of the right-eye video entering the left eye becomes increased. Thus, when the left eye is at the position of L0, the luminance of the right-eye video entering the left eye becomes almost equal to that of the left-eye video, thereby starting to fail as a 3D video. When the left eye shifts to the right direction (−X direction) further, the luminance of the right-eye video becomes higher than that of the left-eye video entering the left eye, thereby starting to enter a pseudoscopy region.

In this exemplary embodiment, as shown in FIG. 77a, the distance from a position Cl1 at the center of both eyes when the left eye shifts to the position of L0 to a position Cr1 at the center of both eyes when the right eye shifts to L0 is defined as the pseudoscopy free region. In the pseudoscopy free region where the center of the both eyes exist between Cl1 and Cr1, a double image enters at least to one of the eyes. However, as a 3D image, it is not failed and a stereoscopic view can be provided. Further, as shown in FIG. 77b, the distance from a position Cl2 at the center of both eyes when the left eye shifts to the position of L2 to a position Cr2 at the center of both eyes when the right eye shifts to L1 is defined as the stereoscopic viewing region. In the stereoscopic viewing region where the center of the both eyes exists between Cl2 and Cr2, a preferable stereoscopic view with no double image can be achieved. The region IPD showing the distance between the both eyes is constant, so that the stereoscopic viewing region becomes smaller as the crosstalk region becomes larger.

In FIG. 77 and FIG. 78, the parameters regarding the viewing region are described by using the simplest stereoscopic optical model. Hereinafter, the state of changes in each of the parameters regarding the viewing region will be described by using optical models of a case where a popup parallax image is displayed and a case where a depth parallax image is displayed under the conditions of a normal temperature, a low temperature, and a high temperature, respectively.

FIG. 79 shows a schematic chart showing a case of displaying popup and depth parallax images by taking influences of the 3D crosstalk into consideration when a 3D object is placed in the center of the screen at a normal temperature. Note here that the direction along which the left pixels and right pixels are repeatedly arranged is the X-direction, and the direction from the plane where the left pixels and the right pixels are disposed towards the lens is the Y-direction.

The directions of signs are as shown in FIG. 79. As shown in FIG. 79a, at the time of observing the popup image, the position of the right-eye image object (expressed as right-eye focused pixel hereinafter) is placed on the +X side than the center of the screen while the position of the left-eye image object (expressed as left-eye focused pixel hereinafter) is placed on the −X side than the center of the screen. Further, as shown in FIG. 79b, at the time of observing the depth image, the position of the right-eye image object (right-eye focused pixel) is placed on the −X side than the center of the screen while the position of the left-eye image object (left-eye focused pixel) is placed on the +X side than the center of the screen.

As shown in FIG. 79, when the parallax amount of the popup object and that of the depth object as well as the positions thereof on the display screen are the same, the intersection point L0 between the light ray Lr emitted from the +X side of the left-eye focused pixel and the light ray R1 emitted from the −X side of the right-eye focused pixel are at the same position in the schematic chart displaying the popup image and in the chart displaying the depth image both in the X-direction and the Y-direction.

Further, the exit direction of the light ray R1 emitted from the −X side of the right-eye focused pixel for displaying the popup image is consistent with the exit direction of the light ray Lr emitted from the +X side of the left-eye focused pixel for displaying the depth image, and the exit direction of the light ray R1 emitted from the −X side of the right-eye focused pixel for displaying the depth image is consistent with the exit direction of the light ray Lr emitted from the +X side of the left-eye focused pixel for displaying the popup image. Thus, at a normal temperature, a 3D crosstalk region L_crst having Lr as the center and a 3D crosstalk region R_crst having R1 as the center are equivalent.

At a normal temperature, when the distance from the panel surface to the intersection point L0 on the +Y side is set as an optimum observing distance, a 3D crosstalk region width at the optimum observing distance in the case of popup shown in FIG. 79a is defined as d1, and a 3D crosstalk region width at the optimum observing distance in the case of depth shown in FIG. 79b is defined as d2, d1 and d2 are the same width. Further, as described in FIG. 77, the position where the 3D crosstalk is 100% is expressed as L0, the position where the mixing ratio of the left-eye video mixed from the left-eye focused pixel into the right-eye video becomes equal to or more than a prescribed value is expressed as L1, and the position where the mixing ratio of the right-eye video mixed from the right-eye focused pixel into the left-eye video becomes equal to or more than a prescribed value is expressed as L2.

FIG. 80 is an explanatory chart of stereoscopic viewing regions in a case of showing popup and depth images at a normal temperature. As shown in FIG. 80, the distance from the center position Cr2 of the both eyes when the left eye shifts from the center of the screen to L2 on the −X side to the position Cl2 of the both eyes when the right eye shifts from the center of the screen to L1 on the +X side is the stereoscopic viewing region width at the optimum observing distance. Referring to FIG. 79, the 3D crosstalk region widths when displaying the popup and depth images at a normal temperature are the same, so that the stereoscopic viewing region widths when displaying the popup and depth images are equivalent. Further, as shown in FIG. 81, the distance from the position Cr1 at the center of the both eyes when the left eye shifts from the center of the screen to L0 on the −X side to the position cl1 at the center of the both eyes when the right eye shifts from the center of the screen to L1 on the +X side is a pseudoscopy free region width at the optimum observing distance. Since the distance IPD between the both eyes is a constant value, the pseudoscopy free regions when displaying the popup and depth images are equivalent.

Next, the state of changes in each of the parameters regarding the viewing region when displaying the popup and depth images on the high-temperature side will be described by referring to FIG. 82 to FIG. 87. As illustrated in FIG. 70*b*, there is a tendency that the lens pitch becomes larger and the refraction of the light rays on the outer end of the panel becomes smaller as the temperature increases. FIG. 82 shows a schematic chart which displays popup and depth parallax images on the high-temperature side without taking influences of crosstalk into consideration.

In FIG. 82*a*, a right-eye viewing regional shows a range where only the right-eye focused pixel showing the popup object at the optimum observing distance is viewed, and a left-eye viewing region b1 shows a range where only the left-eye focused pixel showing the popup object at the optimum observing distance is viewed. Similarly, in FIG. 82*a*, a right-eye viewing region a2 shows a range where only the right-eye focused pixel showing the depth object at the optimum observing distance is viewed, and a left-eye viewing region b2 shows a range where only the left-eye focused pixel showing the depth object at the optimum observing distance is viewed.

As shown in FIG. 82*a*, when a popup image is displayed, a region c1 where the light emitted from the left-eye focused pixel and the light emitted from the right-eye focused pixel are mixed is generated between the right-eye viewing regional and the left-eye viewing region b1 at the optimum observing distance. Note here that c1 is referred to as a light ray mixed width. When a depth image is displayed, a region c2 where both the light emitted from the left-eye focused pixel and the light emitted from the right-eye focused pixel do not pass through is generated between the right-eye viewing region a2 and the left-eye viewing region b2 at the optimum observing distance. Note here that c2 is referred to as a no light ray width.

As described above, the light ray Lr emitted from the +X side of the focused left pixel and the light ray R1 emitted from the −X side of the focused right pixel are symmetric with respect to the center of the panel regardless whether it is the popup image or the depth image, so that the light ray mixed width c1 and the no light ray width c2 are the same.

Figure 76:
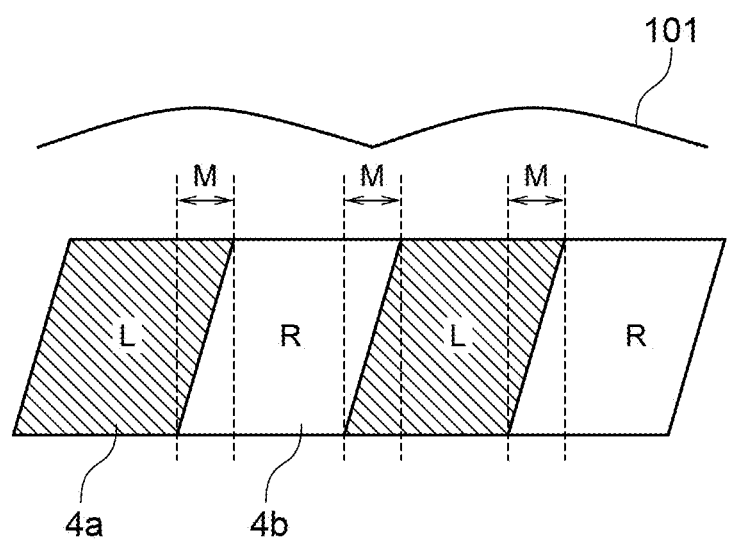
FIG. 76 is a pixel layout of a 3D panel in a case where there are pixel mixed regions M.

However, when the depth image is observed with a 3D panel as shown in FIG. 76, there is no position where the focused pixel showing the object cannot be viewed. Thus, it is necessary to consider the influence to the viewing region caused by the crosstalk region of the focused pixel described above. FIG. 83 shows an optical model of a case where a crosstalk region generated by the left and right pixels mixed region similar to that of FIG. 79 is taken into consideration. In a case of displaying a popup image, light emitted from the left-eye focused pixel is mixed into the right-eye viewing regional similar to that of FIG. 80*a* in addition to the original light ray mixed width c1 due to the influence of the 3D crosstalk regions L_crst, R_crst by having the light rays Lr and R1 as the centers. Further, light emitted from the right-eye focused pixel is also mixed into the left-eye viewing region b1. Thus, as shown in FIG. 83*a*, the actual 3D crosstalk region width d1 becomes larger than the light ray mixed region width c1 of the case of the ideal optical model.

When displaying the depth image, the +X side of the no light ray width is filled by the light of the left-eye focused pixel, and the −X side is filled by the light of the right-eye focused pixel.

Thus, as shown in FIG. 83*b*, a 3D crosstalk region d2 where the light from the left-eye focused pixel and the light from the right-eye focused pixel are mixed is generated at the optimum observing distance. The 3D crosstalk region d2 in the depth image is smaller than the 3D crosstalk region d1 in the popup image.

FIG. 84 is a chart of stereoscopic viewing regions at the time of observing a popup image and a depth image at a high temperature. FIG. 85 is a chart showing a pseudoscopy free region at the time of observing a popup image and a depth image at a high temperature. In FIG. 84 and FIG. 85, the position where the luminance of the light emitted from the left-eye focused pixel and the luminance of the light emitted from the right-eye focused pixel are the same value, i.e., the position where the 3D crosstalk is 100%, is expressed as L0, the position at which the mixed ratio of the left-eye video mixed from the left-eye focused pixel into the right-eye video is equal to or more than a prescribed value is expressed as L1, and the position at which the mixed ratio of the right-eye video mixed from the right-eye focused pixel into the left-eye video is equal to or more than a prescribed value is expressed as L2. As described above, the distance from the center position Cr2 of the both eyes when the left eye shifts from the center of the screen to L2 on the −X side to the center position C12 of the both eyes when the right eye shifts from the center of the screen to L1 on the +X side is the stereoscopic viewing region width at the optimum observing distance. Referring to FIG. 84, the 3D crosstalk region width when displaying the popup image on the high-temperature side is larger than that of the depth image.

Thus, the stereoscopic viewing region when displaying the popup image is smaller than that of the depth image.

Figure 85B:
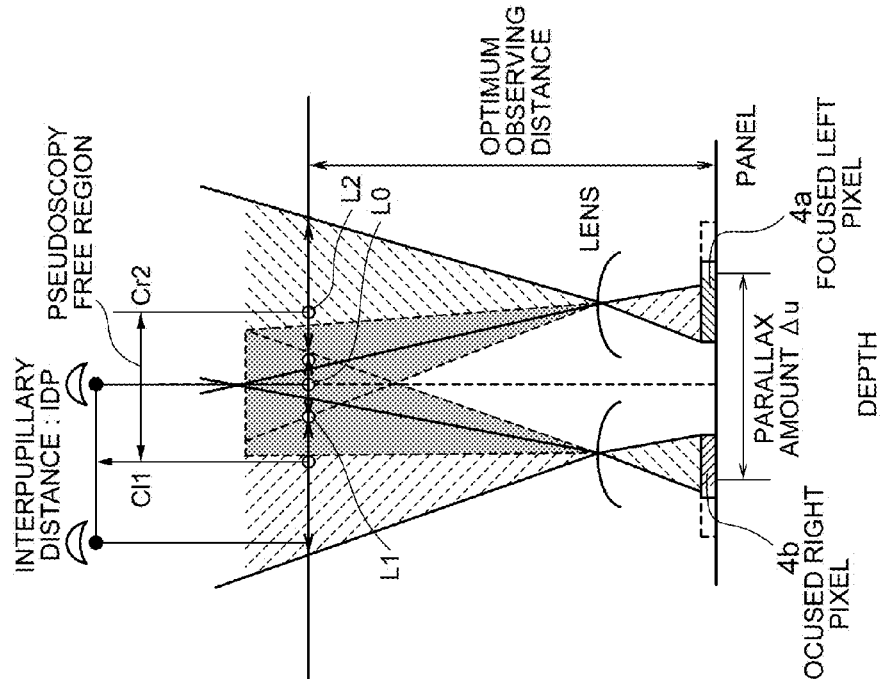
FIG. 85 is an explanatory chart of pseudoscopy free regions in a case of showing popup and depth images at a high temperature.
Figure 85A:
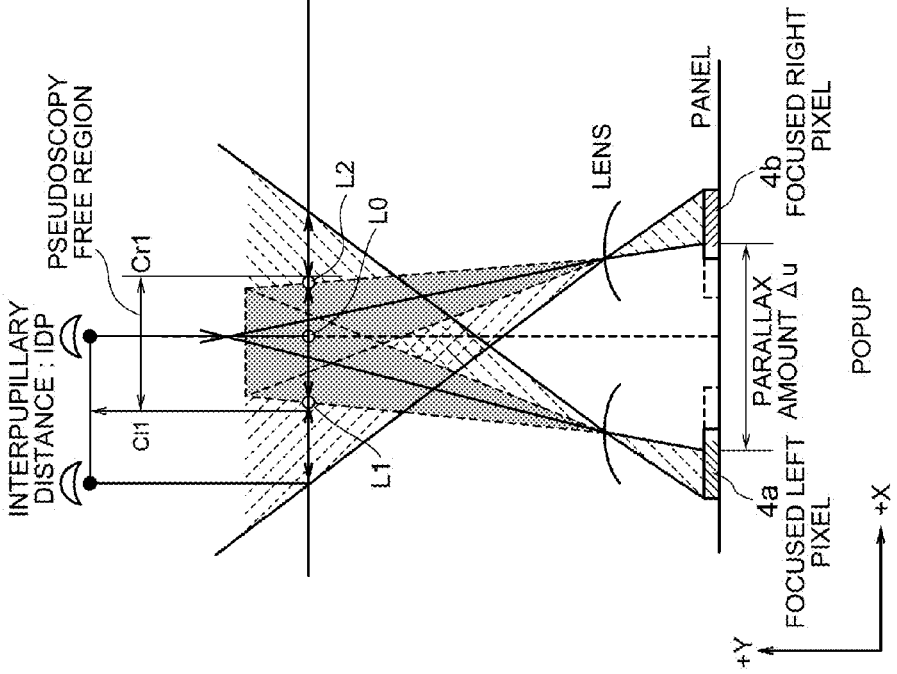

In the meantime, as in the explanation of FIG. 77*b*, FIG. 85*a* shows a pseudoscopy free region at the time of observing a popup image, and FIG. 85*b* shows a pseudoscopy free region at the time of observing a depth image. Comparing A with B of FIG. 85, it is found that the pseudoscopy free regions at the time of observing the popup image and the depth image are equivalent.

Figure 86:
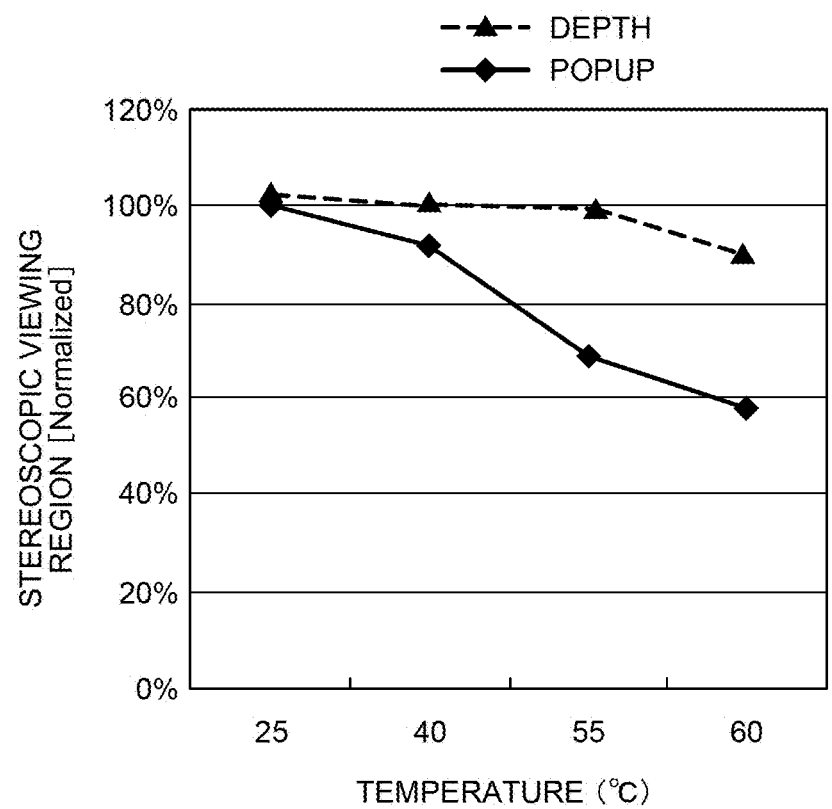
FIG. 86 shows graphs of an evaluation result of the stereoscopic viewing region when the use environmental temperature of the stereoscopic display device is changed from 25° C. to 60° C.
Figure 87:
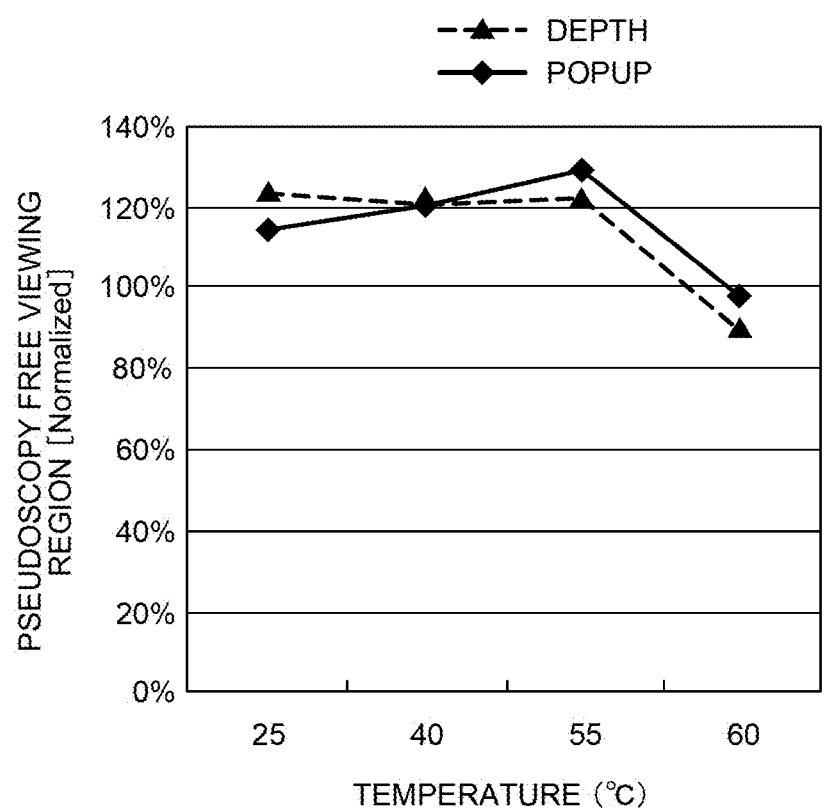
FIG. 87 shows graphs of an evaluation result of the pseudoscopy free region when the use environmental temperature of the stereoscopic display device is changed from 25° C. to 60° C.

In order to verify the explanations above, evaluation experiments were conducted by the Inventors. The results thereof are described by referring to FIG. 86 to FIG. 87. Note here that evaluations were conducted under a condition that the proportion of the size of the parallax image with respect to the entire screen in the X-axis direction defined in FIG. 88 was considered as a stereoscopic viewing region and the parallax images of the case where the 3D region was defined as 10% from the center of the screen were prepared. FIG. 86 shows the evaluation result of the stereoscopic viewing region when the use environmental temperature of the stereoscopic display device was changed from 25° C. to 60° C. FIG. 87 shows the evaluation result of the stereoscopic viewing region when the use environmental temperature of the stereoscopic display device was changed from 25° C. to 60° C. According to the result shown in FIG. 86, the stereoscopic viewing region when observing the popup image is largely decreased on the high-temperature side, and there is almost no change in the stereoscopic viewing region when observing the depth image. According to the result shown in FIG. 87, the pseudoscopy free regions when observing the popup image and the depth image are almost the same regardless of the increase in the temperatures.

While the changes in the stereoscopic viewing region and the pseudoscopy free region in the cases of displaying the popup and depth images at the high temperature are described above, the same can be described also in the cases of low temperatures.

As shown in FIG. 70*a*, there is a tendency that the lens pitch becomes smaller and the refraction of the light rays on the outer end of the panel becomes larger as the temperature decreases. FIG. 87 shows a schematic chart which displays popup and depth parallax images at a low temperature without taking influences of crosstalk into consideration.

As shown in FIG. 88, when a popup image is displayed, a region c3 where both the light emitted from the left-eye focused pixel and the light emitted from the right-eye focused pixel do not pass through is generated between a right-eye viewing region a3 and a left-eye viewing region b3 at the optimum observing distance. Note here that c3 is referred to as a no light ray width. When a depth image is displayed, a region c4 where the light emitted from the left-eye focused pixel and the light emitted from the right-eye focused pixel are mixed is generated between a right-eye viewing region a4 and a left-eye viewing region b4 at the optimum observing distance. Note here that c4 is referred to as a light ray mixed width.

As described above, the light ray Lr emitted from the +X side of the focused left pixel and the light ray R1 emitted from the −X side of the focused right pixel are symmetric with respect to the center of the panel regardless of the popup image or depth image, so that the light ray mixed width c4 and the no light ray width c3 are the same.

Figure 13A:
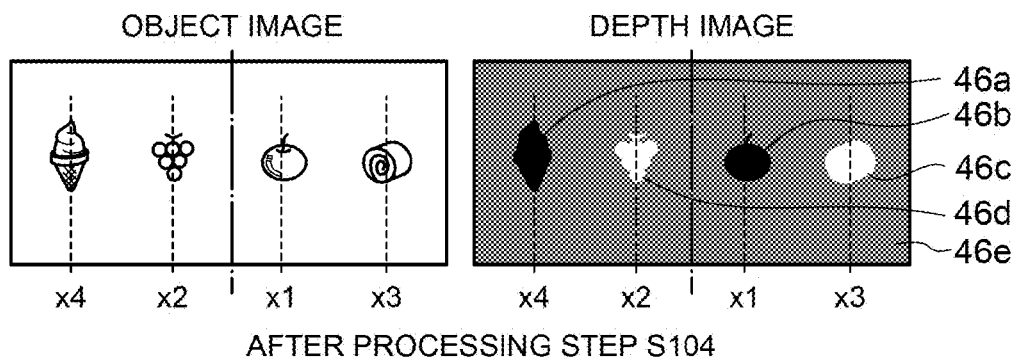
FIG. 13 is an explanatory chart showing an example of 3D image data having depth acquired by executing rendering processing in accordance with a lens contraction/expansion state in the procedure shown in FIG. 6 under the condition of FIG. 11.
Figure 13B:
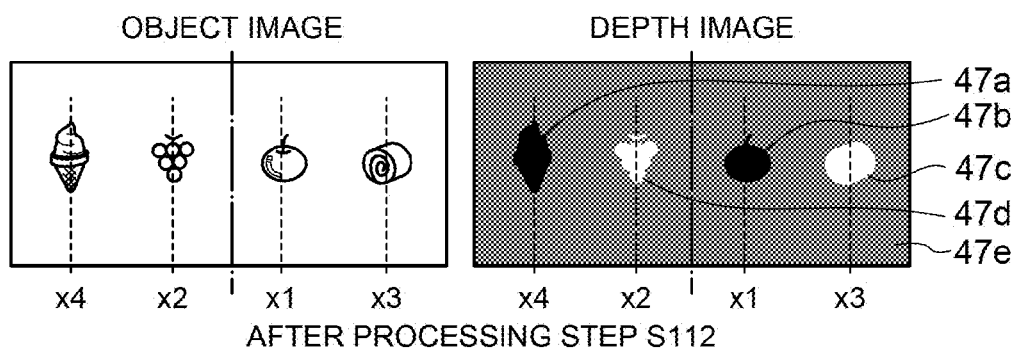
Figure 13C:
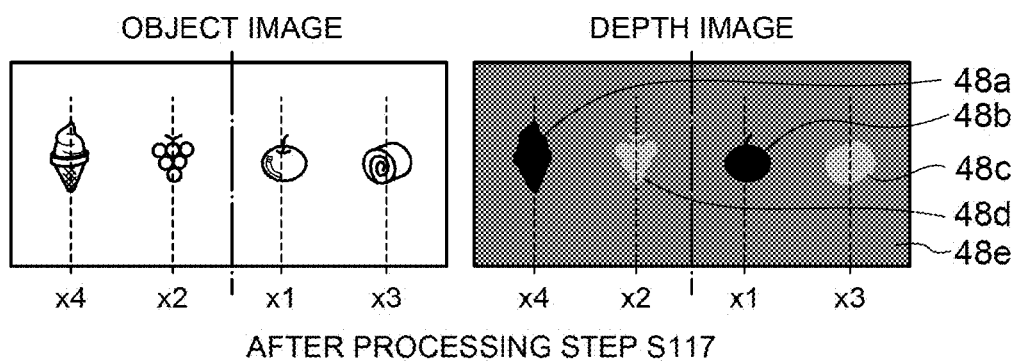
Figure 14:
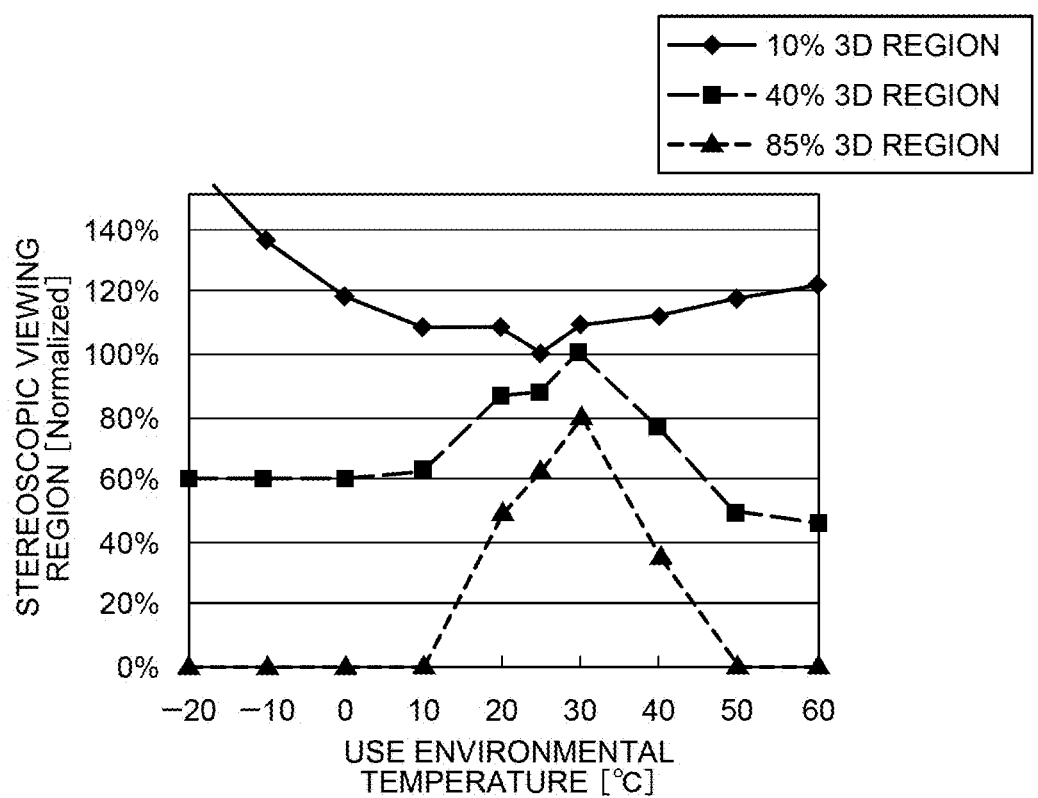
FIG. 14 is a graph showing a stereoscopic viewing region evaluation result when the use environmental temperature changes in a case where the first exemplary embodiment is employed.

FIG. 14 shows an optical model of a case where a crosstalk region actually generated by the left and right pixels mixed region is taken into consideration. In a case of displaying a depth image, light emitted from the left-eye focused pixel is mixed into the right-eye viewing region a4 shown in FIG. 13 in addition to the light ray mixed width c4 shown in FIG. 88 due to the influence of the 3D crosstalk regions L_crst, R_crst by having the light rays Lr and R1 as the centers.

Figure 89B:
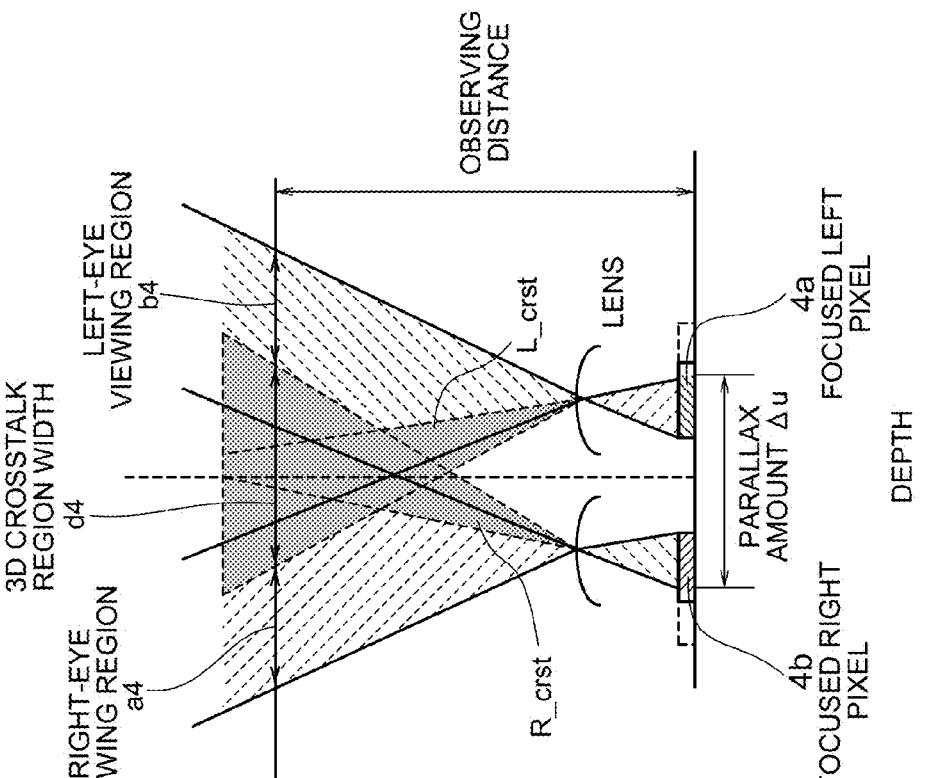
FIG. 89 is an optical model which takes 3D crosstalk region into consideration at a low temperature.

Further, light emitted from the right-eye focused pixel is also mixed into the left-eye viewing region b4. Thus, as shown in FIG. 89*b*, the actual 3D crosstalk region width d4 becomes larger than the light ray mixed region width c4 of the case of the ideal optical model.

Figure 89A:
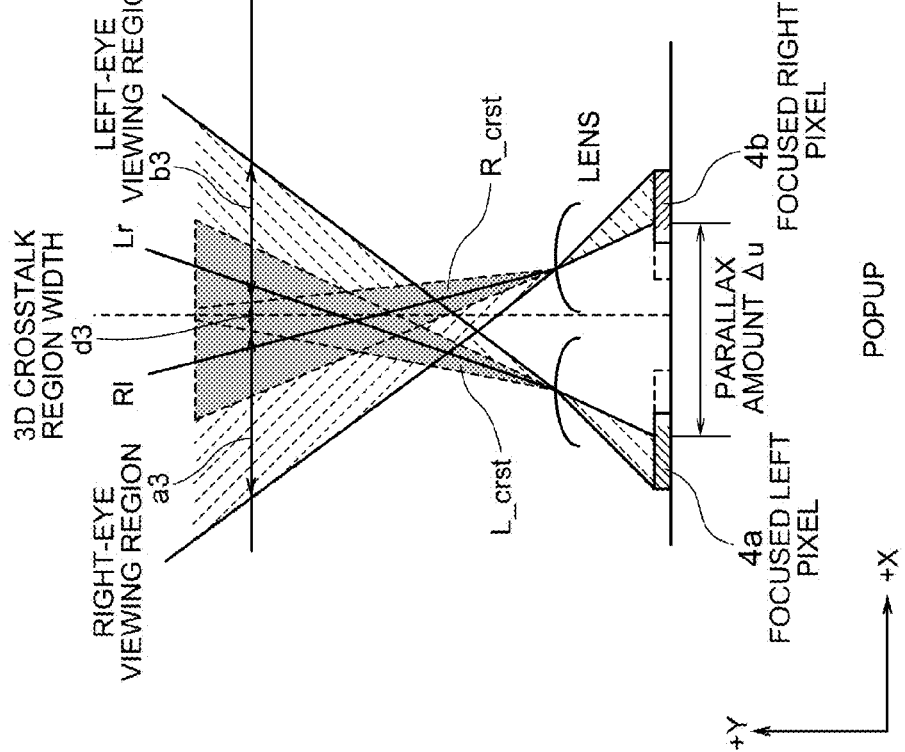
Figure 92:
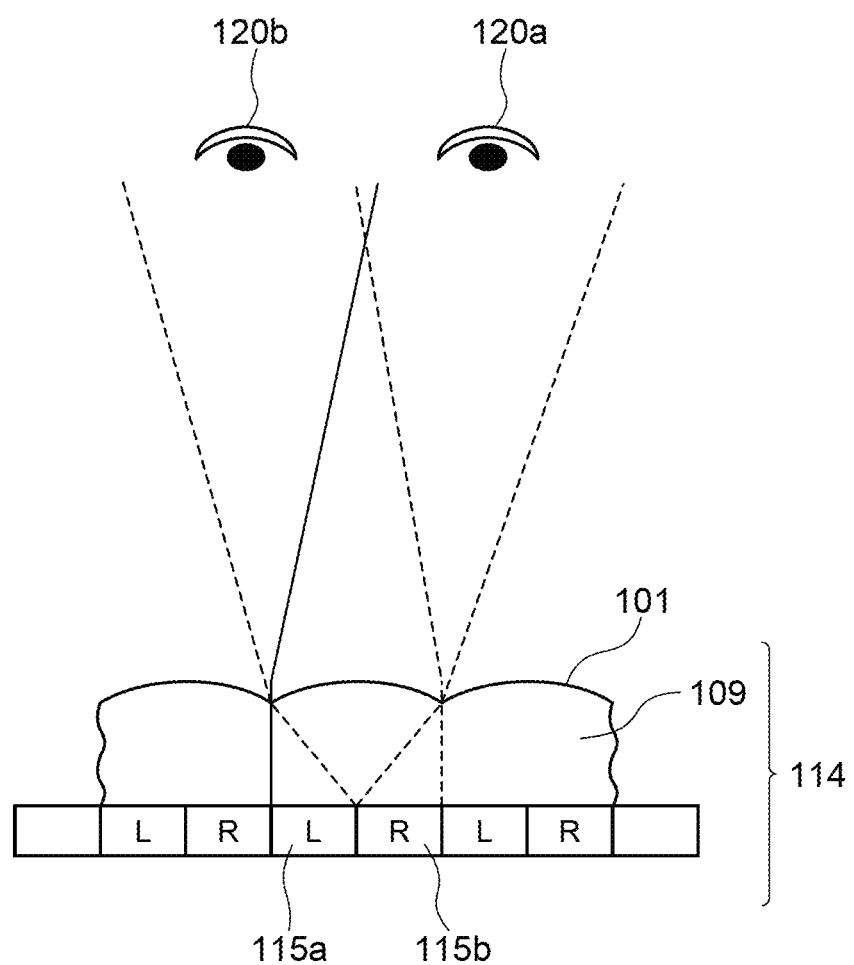
FIG. 92 is an explanatory chart showing an example of the structure of a display device that uses the lenticular lens sheet disclosed in FIG. 75 and showing an example of stereoscopic display corresponding thereto.
Figure 93:
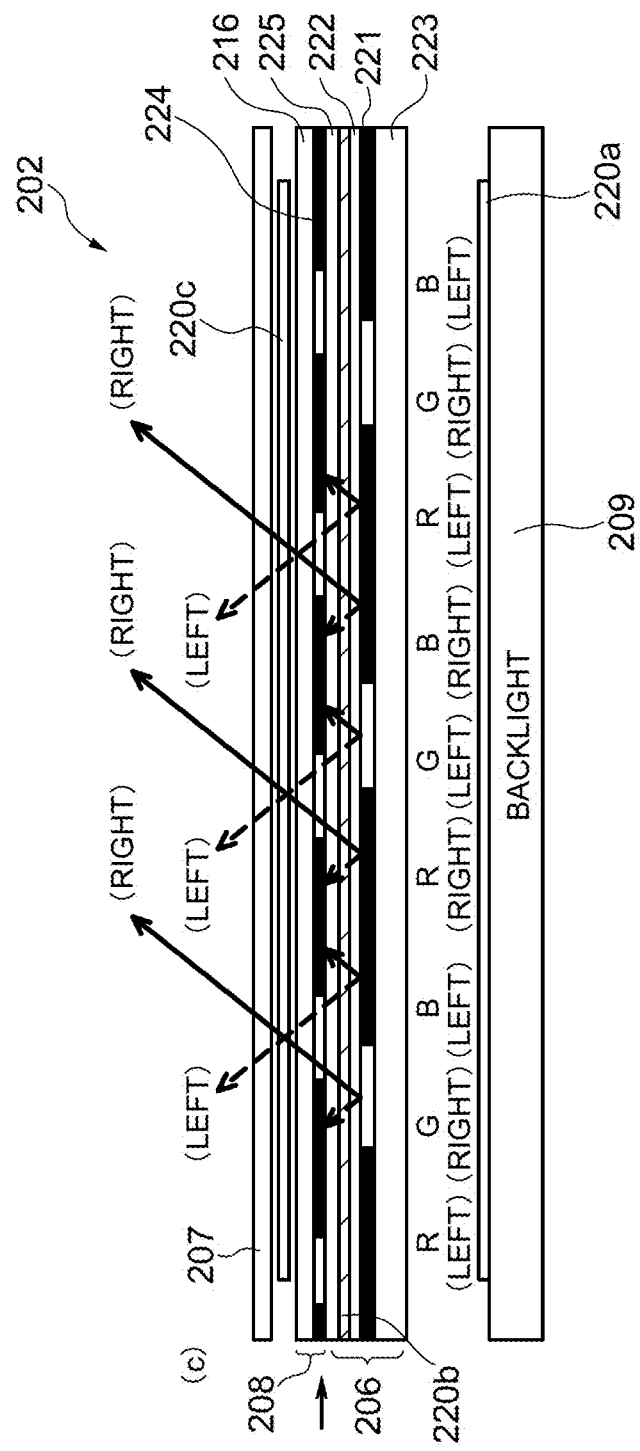
FIG. 93 is an explanatory chart showing the basic structure disclosed in Patent Document 1 as a related technique.
Figure 94A:
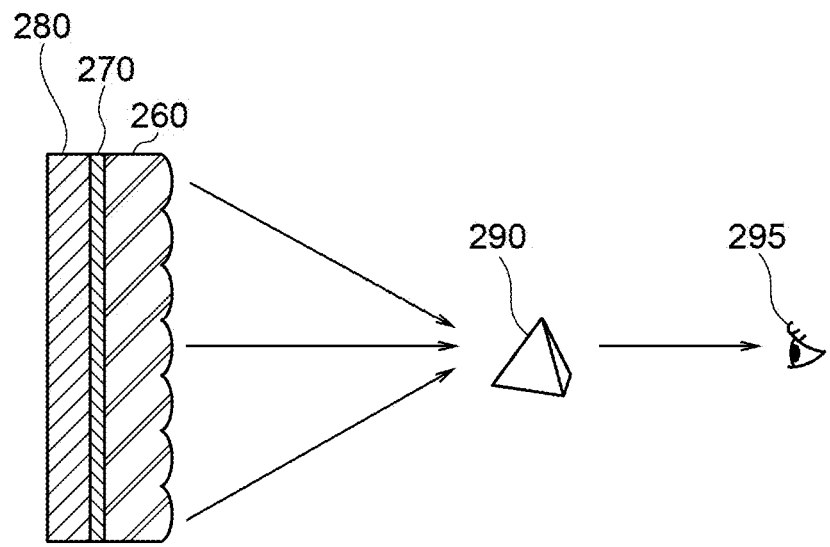
FIG. 94 is an explanatory chart showing the basic structure disclosed in Patent Document 2 as a related technique.
Figure 94B:
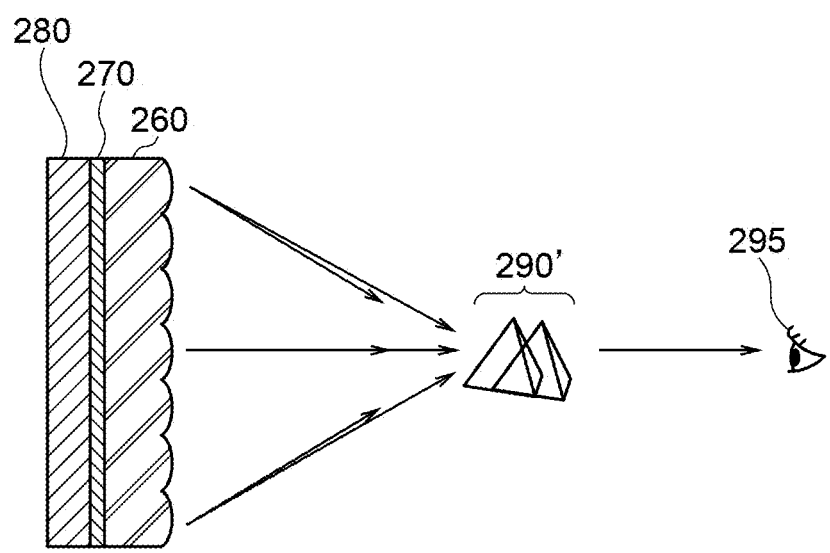
Figure 95:
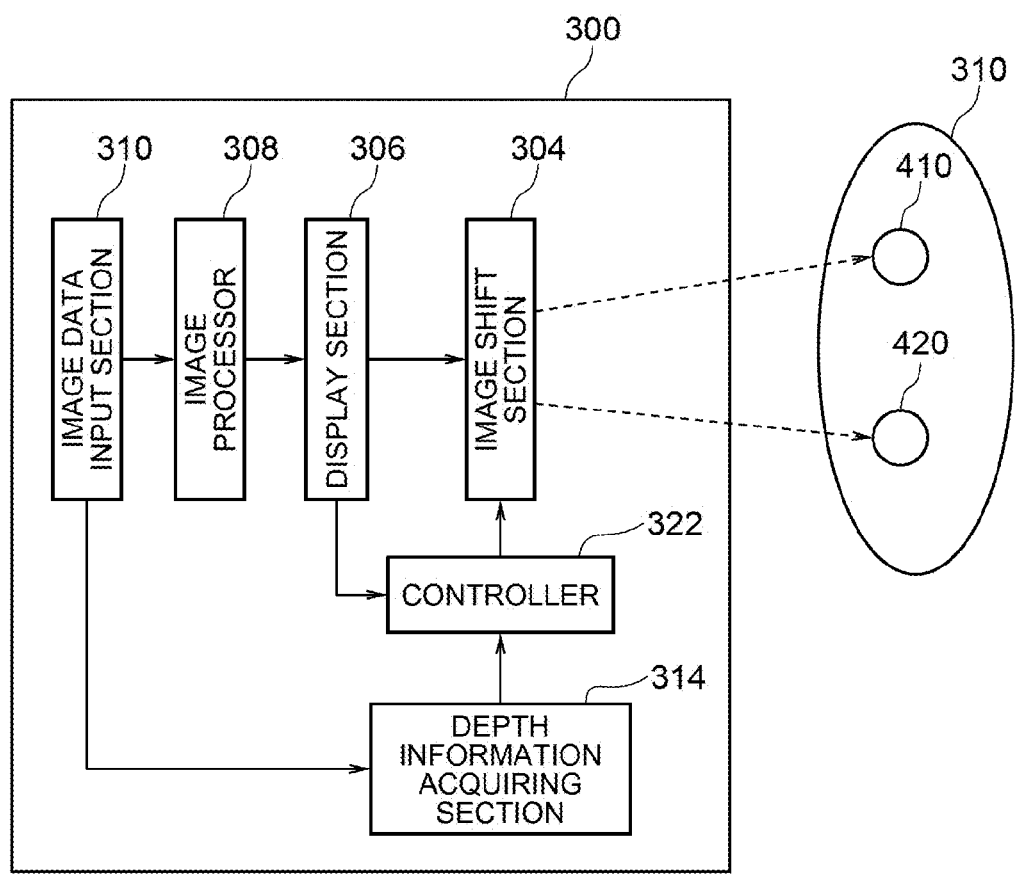
FIG. 95 is an explanatory chart showing the basic structure disclosed in Patent Document 3 as a related technique.
Figure 96:
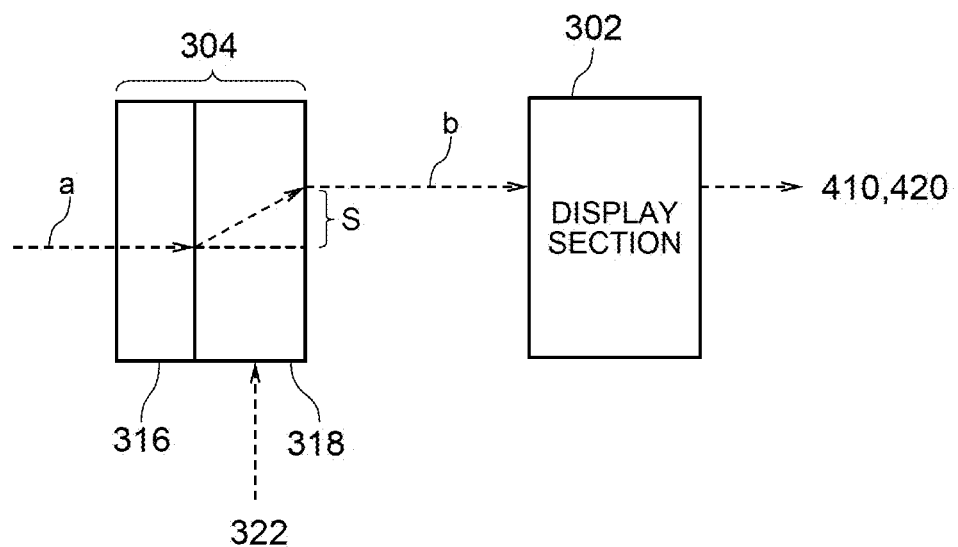
FIG. 96 is an explanatory chart showing a specific example of a pixel shift section disclosed within Patent Document 3 shown in FIG. 95.

When displaying the popup image, the +X side of the no light ray width is filled by the light of the left-eye focused pixel, and the −X side is filled by the light of the right-eye focused pixel. Thus, as shown in FIG. 89*a*, a 3D crosstalk region d3 where the light from the left-eye focused pixel and the light from the right-eye focused pixel are mixed is generated at the optimum observing distance. The 3D crosstalk region d3 in the popup image is smaller than the 3D crosstalk region d4 in the depth image.

FIG. 90 is a chart of stereoscopic viewing regions at the time of displaying a popup image and a depth image at a low temperature. FIG. 91 is a chart showing a pseudoscopy free regions at the time of displaying a popup image and a depth image at a low temperature. In FIG. 90 and FIG. 91, the position where the luminance of the light emitted from the left-eye focused pixel and the luminance of the light emitted from the right-eye focused pixel are the same value, i.e., the position where the 3D crosstalk is 100%, is expressed as L0, the position at which the mixed ratio of the left-eye video mixed from the left-eye focused pixel into the right-eye video is equal to or more than a prescribed value is expressed as L1, and the position at which the mixed ratio of the right-eye video mixed from the right-eye focused pixel into the left-eye video is equal to or more than a prescribed value is expressed as L2. As described above, the distance from the center position Cr2 of the both eyes when the left eye shifts from the center of the screen to L2 on the −X side to the center position C12 of the both eyes when the right eye shifts from the center of the screen to L1 on the +X side is the stereoscopic viewing region width at the optimum observing distance. Referring to FIG. 90, the 3D crosstalk region width when displaying the depth image on the low-temperature side is larger than that of the popup image. Thus, the stereoscopic viewing region when displaying the depth image is smaller than that of the popup image.

As in the case of high temperatures, the distance from the center C11 of the both eyes when the left eye is at L0 to the center Cr1 of the both eyes when the right eye is at L0 is defined as a pseudoscopy free region. FIG. 91*a* shows a pseudoscopy free region at the time of observing a popup image, and FIG. 91*b* shows a pseudoscopy free region at the time of observing a depth image. Comparing A with B of FIG. 91, it is found that the pseudoscopy free regions at the time of observing the popup image and the depth image are equivalent.

Therefore, there is a change in the stereoscopic viewing regions of the popup and depth images when there is a change in the temperature, while there is no change in the pseudoscopy free regions of the popup and depth images.

Next, each of first to fifth exemplary embodiments according to the present invention will be described in order by referring to the accompanying drawings.

(First Exemplary Embodiment)

Hereinafter, the first to fifth exemplary embodiments according to the present invention will be described by referring to FIG. 1 to FIG. 15.

First, the entire content of the first exemplary embodiment will be described, and a modification example of the first exemplary embodiment will be described thereafter.

Figure 1:
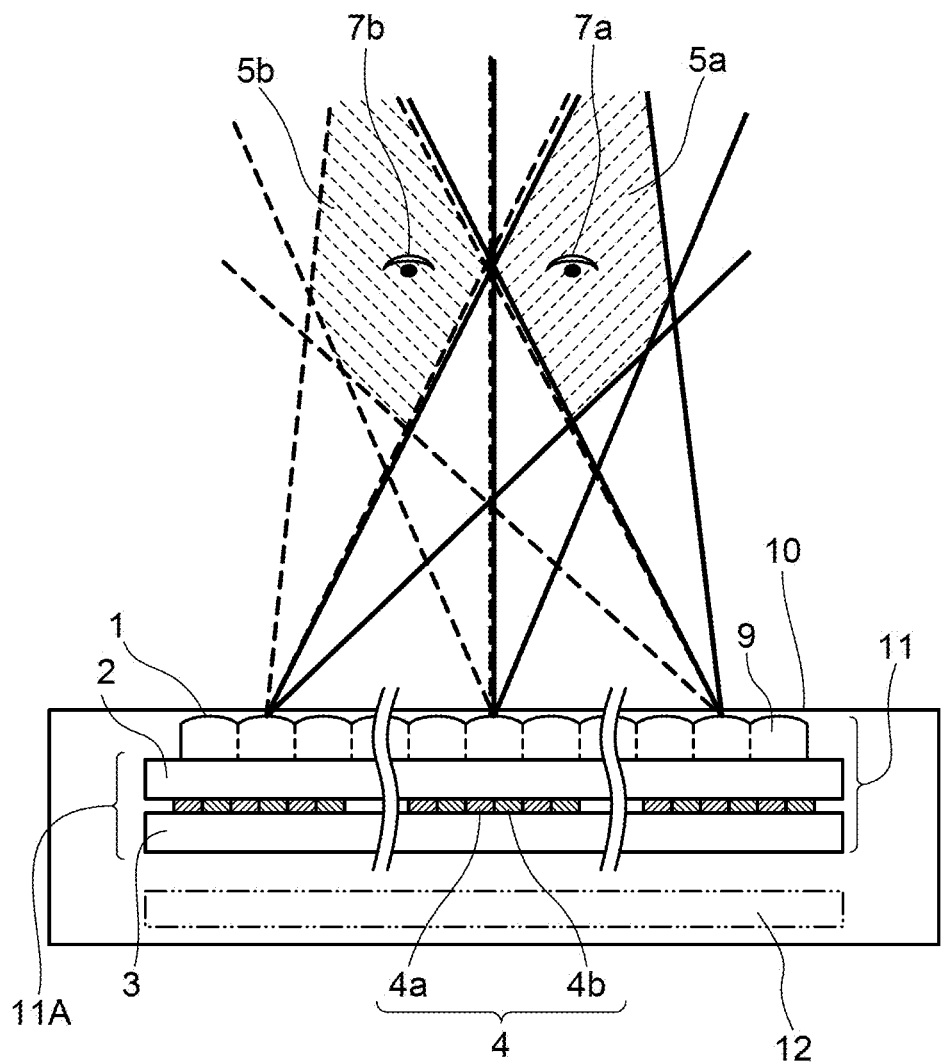
FIG. 1 is an explanatory chart showing an example of a stereoscopic display device according to a first exemplary embodiment of the present invention.
Figure 2A:
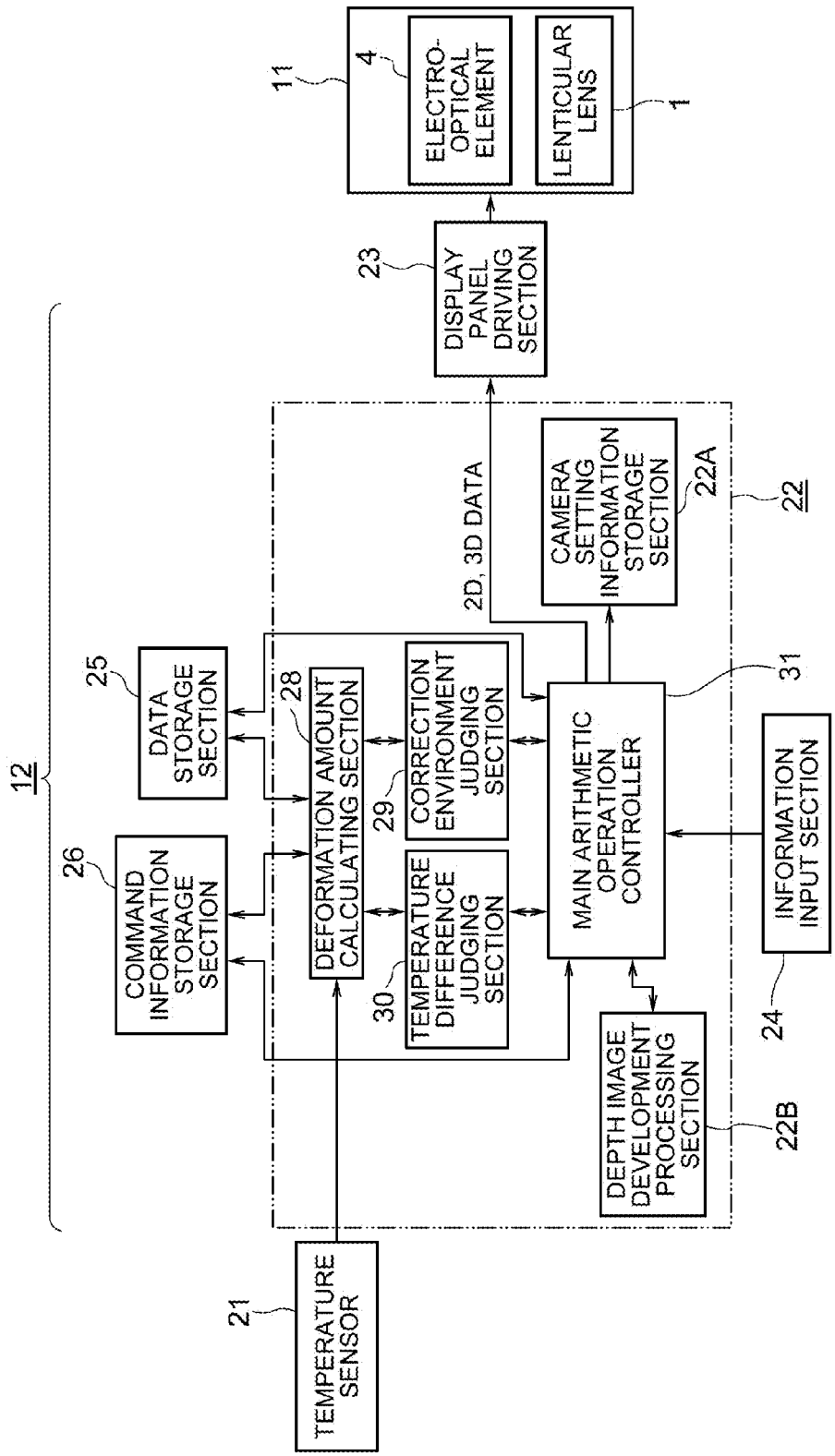
Figure 2B:
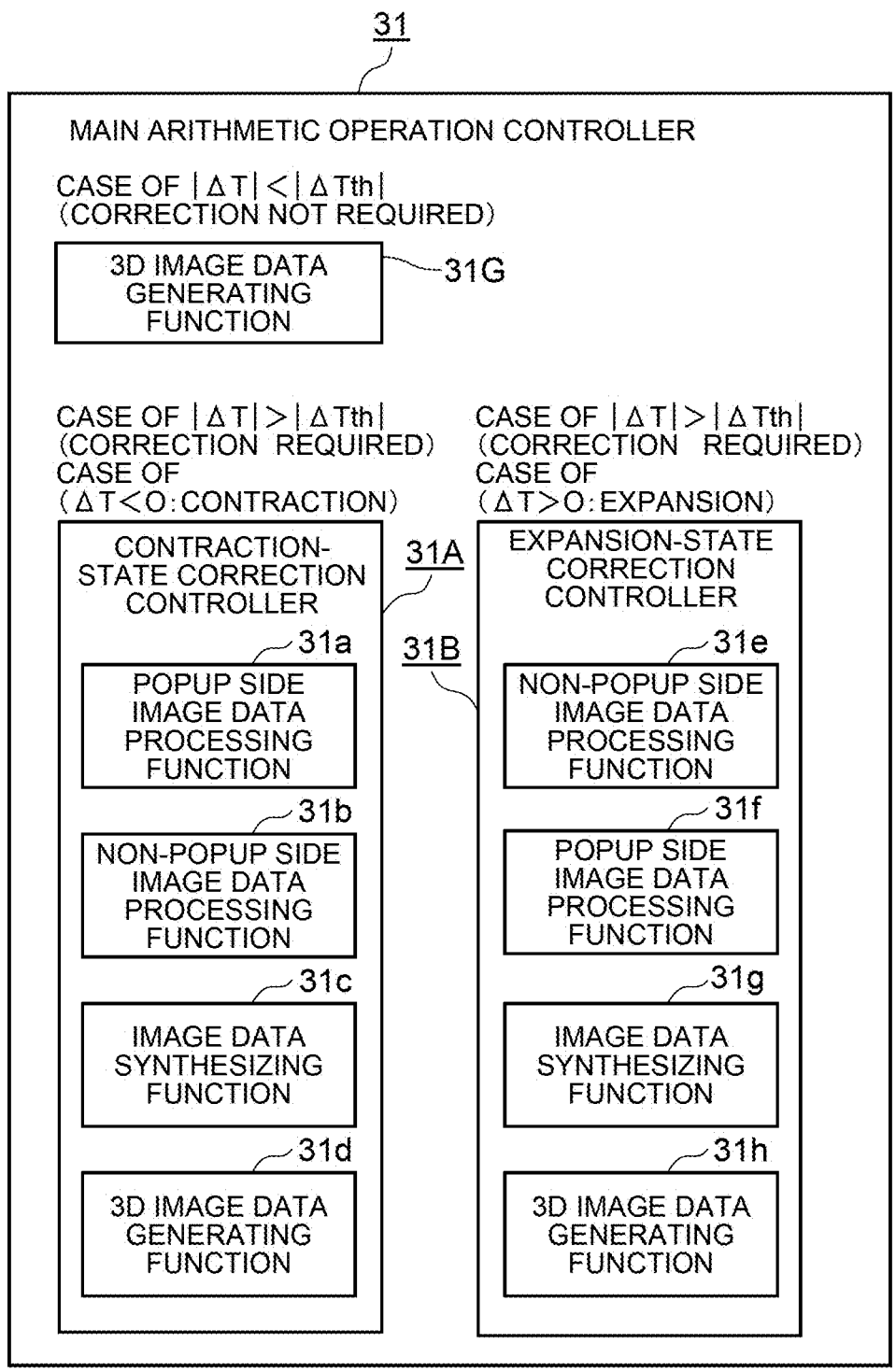
Figure 2C:
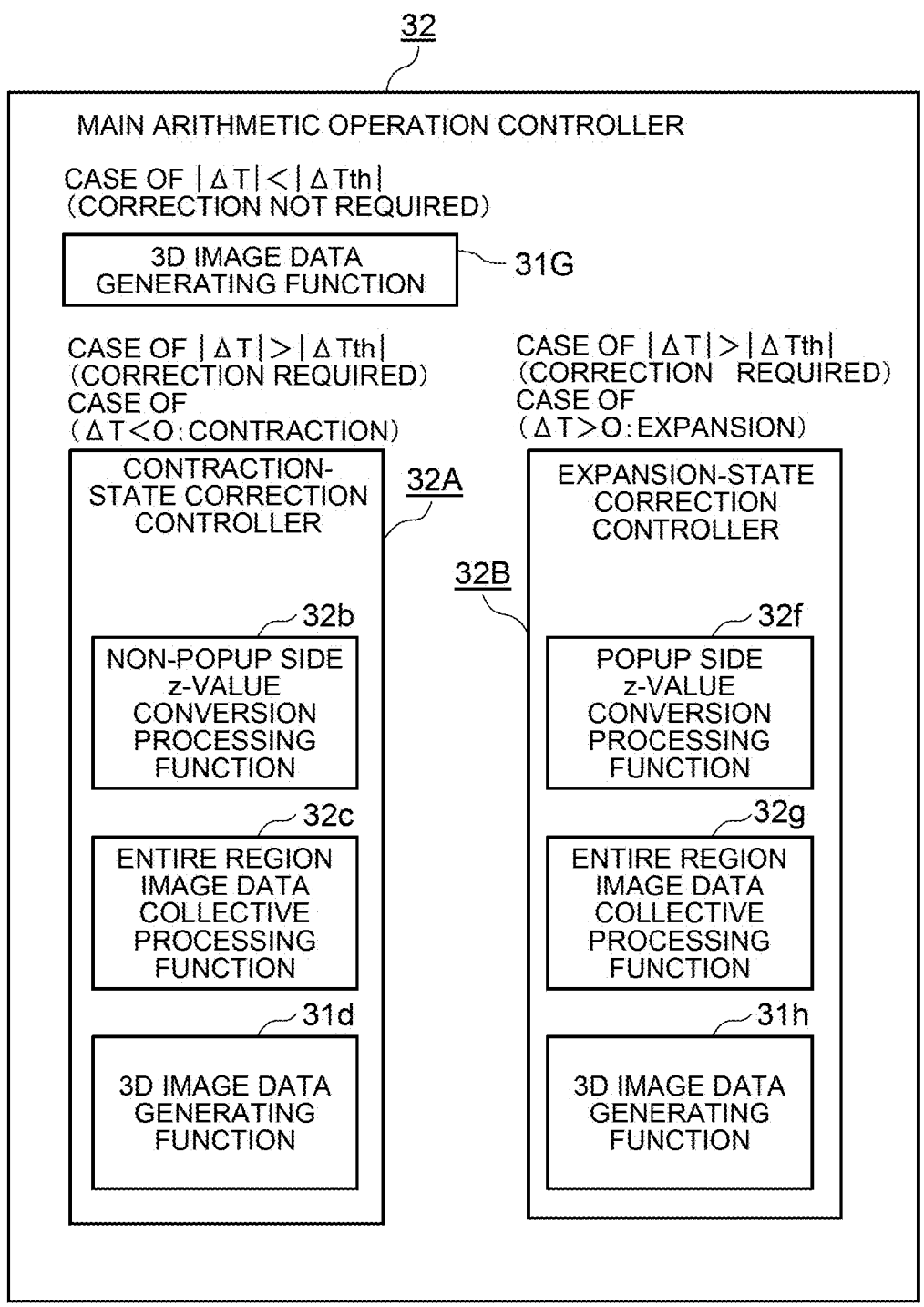

FIG. 1 is a sectional view showing an example of a stereoscopic display device according to the present invention. To a sectional view of FIG. 1, an explanatory chart which schematically shows the state of stereoscopic display of an image within the sectional view is added. Further, FIG. 2A and FIG. 2B are block diagrams showing a specific structural example for embodying the content of the stereoscopic display shown in FIG. 1, and FIG. 2C is a block diagram which shows a main part (main arithmetic operation controller) of a modification example to be described later.

(Basic Structure)

In FIG. 1 to FIG. 2, a stereoscopic display device 10 includes a stereoscopic display panel 11 which displays a three-dimensional image towards the outside, and a display controller 12 which drive-controls display actions of the stereoscopic display panel 11. The display controller 12 includes a display panel driving section 23 which directly drives the stereoscopic display panel 11, and a stereoscopic image generating module 22 which controls actions of the display panel driving section 23 and generates 3D image data for driving the display panel based on three-dimensional data specified by three axes of xyz including depth information of the z-axis direction set in advance.

As shown in FIG. 1, the stereoscopic display panel 11 is constituted with: substrates 2, 3; a display panel section 11A constituted with a plurality of unit pixels 4a, 4b disposed in a layer form between the substrates 2 and 3; and a lenticular lens 1 as an image distributing section which distributes and outputs visual-recognition stereoscopic image data outputted from the stereoscopic display panel 11 to the outside as visual-recognition stereoscopic image information.

Those are disposed as illustrated in the drawing. Among those, used as the lenticular lens 1 in the first exemplary embodiment is a lens array type that is formed as a sheet as a whole.

The stereoscopic display device 10 further includes a temperature sensor 21 which detects the temperature of the lenticular lens (image distributing section) 1, and includes a data storage section 25 which stores the stereoscopic viewing region defined based on the effective linear expansion coefficient difference between the lenticular lens 1 and the display panel section 11A, size of the display panel section 11A, resolution of the unit pixels, a reference temperature Tth, a 3D crosstalk property, and the like, which define the parameter information regarding the stereoscopic viewing region intrinsic to the stereoscopic display panel 11A.

Further, the stereoscopic image generating module 22 is constituted by including: a deformation amount calculating section 28 which calculates a temperature difference $\Delta T$ between temperature information T detected from the temperature sensor 21 and the reference temperature Tth, and calculates the deformation amount as the contraction amount or the expansion amount that changes due to a change in the peripheral environmental temperature of the lenticular lens (image distributing section) 1 based on the temperature difference $\Delta T$; and a main arithmetic operation controller 31 which, when the three-dimensional data is inputted, performs accumulation processing thereof as the information of the object that is a display target to the data storage section 25 and, when the deformation amount regarding contraction or expansion is calculated by the deformation amount calculating section 28, and generates the display panel driving 3D image data corresponding thereto.

Note here that reference numeral 24 is an input section for inputting a command from the outside to the main arithmetic operation controller 31, necessary data, and the like.

This provides a structure capable of generating the 3D image data by effectively corresponding to the temperature change when there is a change in the peripheral environmental temperature of the lenticular lens 1 and the display panel section 11A.

The stereoscopic image generating module 22 further includes: a camera setting information instruction section 22A which stores in advance a plurality of pieces of camera setting information that specifies parameters of setting positions of a pair of cameras as a condition for rendering processing the three-dimensional data accumulated in the data storage section 25; and a temperature difference judging section 30 which performs an arithmetic operation regarding whether or not the absolute value of the temperature difference $\Delta T$ of the detected temperature with respect to the reference temperature Tth is equal to or less than the absolute value of a reference value $\Delta Tth$ set in advance, and judges whether or not it is a temperature environment that requires correction for the parallax amount specified on the x-axis on an xy plane that is the display face (screen face) of the three-dimensional image containing z-axis information as the depth information. Note here that setting parameters regarding each of the first to third camera settings A, B, C shown in FIGS. 7A, 7B, and 7C or setting parameters regarding each of the fourth to fifth camera settings D, E corresponding thereto are stored in the camera setting information storage section 22A, respectively.

Thereby, when there is a change in the peripheral environmental temperature described above, it is possible to immediately make judgment regarding necessity of correcting the parallax amount described above by corresponding thereto.

In that case, the main arithmetic operation controller 31 includes a 3D image data generating function 31G which: operates when it is judged by the temperature difference judging section 30 that the temperature difference $\Delta T$ is $|\Delta T| \le |\Delta Tth|$ and it is under a temperature environment that does not require correction of the parallax amount; performs rendering processing on the three-dimensional data containing the depth information under the first camera setting A; and generates and outputs 3D image data based on two-dimensional parallax images having the parallax amount determined by the three-dimensional data and the camera setting A for driving the display panel (see FIG. 2B).

Further, the above-described main arithmetic operation controller 31 is provided with a correction environment judging section 29 which operates when it is judged by the temperature difference judging section 30 that the temperature difference $\Delta T$ is $|\Delta T| > |\Delta Tth|$ and it is under a temperature environment that requires correction of the parallax amount to make judgment whether the lenticular lens 1 is in a state of $\Delta T < 0$ showing a contraction state or a state of $\Delta T > 0$ showing an expansion state (see FIG. 2A).

Further, as shown in FIG. 2B, the main arithmetic operation controller 31 includes: a contraction-state correction controller 31A which operates when it is judged by the correction environment judging section 29 that the temperature difference $\Delta T$ is in a state of $\Delta T < 0$ (a state where the lenticular lens 1 is contracted); and an expansion-state correction controller 31B which operates when it is judged by the correction environment judging section 29 that the temperature difference $\Delta T$ is in a state of $\Delta T > 0$ (a state where the lenticular lens 1 is expanded).

The contraction-state correction controller 31A includes a popup side image data processing function 31a which operates when it is judged by the correction environment judging section 29 that the lenticular lens 1 is in a contraction state ($\Delta T < 0$) to judge whether or not the depth of the object is at a position of $z \ge 0$ on the popup side and, when judged that it is located at a position of $z \ge 0$, performs rendering processing on the three-dimensional data of $z \ge 0$ under the condition of the first camera setting A.

Further, similarly, the contraction-state correction controller 31A includes a non-popup side image data processing function 31b which operates when it is judged that the lenticular lens 1 is in a contraction state ($\Delta T < 0$) to judge whether or not the depth of the object is at a position of $z \ge 0$ on the popup side and, when judged that it is located at a position of $z < 0$ on the non-popup side, performs rendering processing on the three-dimensional data of $z < 0$ under the condition of the second camera setting B (see FIG. 7) that has a smaller included angle than an included angle formed between the optical axes of each of the cameras and the z-axis in the first camera setting A.

Further, the contraction-state correction controller 31A includes: an image data synthesizing function 31c which performs synthesizing processing on the image data on which rendering processing is performed by the popup side image data processing function 31a and the non-popup side image data processing function 31b, respectively; and a 3D image data generating function 31d (contraction state) which generates and outputs 3D image data based on the synthesized image data for driving the display panel.

Thereby, even when the lenticular lens 1 is in a contraction state, 3D image data can be effectively generated for the object located on the popup side (z≥0) and the non-popup side (z<0) as will be described later.

In the meantime, the expansion-state correction controller 31B of the main arithmetic operation controller 31 includes a non-popup side image data processing function 31e which operates when it is judged by the correction environment judging section 29 that the temperature difference ΔT is ΔT>0 and the lenticular lens 1 is in an expansion state to judge whether or not the object is at a position of z<0 on the non-popup side and, when judged that it is located at a position of z<0, performs rendering processing on the three-dimensional data of z<0 under the condition of the first camera setting A.

Further, similarly, the expansion-state correction controller 31B includes a popup side image data processing function 31f which operates when it is judged that the lenticular lens 1 is in an expansion state (ΔT>0) to judge whether or not the depth of the object is at a position of z<0 on the non-popup side and, when judged that it is located at a position of z≥0, performs rendering processing on the three-dimensional data of z≥0 under the condition of the third camera setting C (see FIG. 7) that has a larger included angle than an included angle formed between the optical axes of each of the cameras in the first camera setting A.

Further, the expansion-state correction controller 31B includes: an image data synthesizing function 31g which performs synthesizing processing on the image data on which rendering processing is performed by the non-popup side image data processing function 31e and the popup side image data processing function 31f, respectively; and a 3D image data generating function 31h (expansion state) which generates and outputs 3D image data based on the synthesized image data for driving the display panel.

Thereby, even when the lenticular lens 1 is in an expansion state, 3D image data can be effectively generated for the object located on the popup side and the non-popup side as will be described later.

Further, the main arithmetic operation controller 31 described above is provided with a depth image development processing section 22B which develops two-dimensional image information as an object image for the three-dimensional data regarding the object sent into the main arithmetic operation controller 31 and develops the depth information thereof (depth position) as a depth image. Further, the depth image development processing section 22B includes a gradation value specifying function which sets a gradation value for the three-dimensional data by corresponding to the depth information (depth position) by a pixel unit, and specifies the value of the set gradation value by corresponding to the parallax amount of the two-dimensional image information specified on the x-axis.

Note here that the depth image is basically specified to have the gradation value based on the depth information by the pixel unit.

Hereinafter, this will be described in a more specific manner.

(Specific Structure)

Referring to FIG. 1, the stereoscopic display device 10 is constituted by including the stereoscopic display panel 11 and the display controller 12 as described above. The stereoscopic display panel 11 is constituted with: the lenticular lens (image distributing section) 1; and a display panel section 11A which is constituted with a substrate (counter substrate) 2 that holds the lenticular lens 1 and includes a plurality of unit pixels 4a, 4b placed on a layer form, and another substrate (main substrate) 3 which performs switching operations of the plurality of unit pixels of the substrate 2. Note here that a polarization plate (not shown) may be interposed between the lenticular lanes 1 and the display panel section 11A.

Among those, the display panel section 11A is a liquid crystal panel on which a plurality of unit pixels are formed in matrix as a whole. When performing stereoscopic display, the unit pixels arranged along a horizontal direction that is in parallel to the direction along which both eyes 7a, 7b of the observer are placed are used as the left-eye pixels 4a and the right-eye pixels 4b alternately. In FIG. 1, each of the pixels located in both ends of the panel and the center thereof is illustrated with hatching.

As in the case of the first exemplary embodiment, each of the exemplary embodiments described above explains the case where the lenticular lens 1 is used as the image distributing section. However, the image distributing section is not limited only to the lenticular lens 1. For example, it is possible to broadly employ an optical element including a prism sheet on which a prescribed pattern is formed, a reflection sheet, a diffusion sheet, a barrier sheet, etc. Further, as the lens sheet and the barrier sheet, it is also possible to employ an electro-optical element capable of performing refractive index control and light-shielding control by using the liquid crystal or the like.

Further, while each of the exemplary embodiments is described as examples of the case where a liquid crystal panel is mounted as the display panel section 11A, the present invention is not limited only to that. It is possible to broadly employ a display device that is a light modulator including an organic EL panel, an inorganic EL panel, PDP, FED, CRT, etc. Further, while a case of 2-viewpoints regarding the number of viewpoints is described as a way of example, the present invention is not limited only to that. The present invention can be employed also to the case of arbitrary N-viewpoints.

Incidentally, the lenticular lens 1 of the first exemplary embodiment is constituted with a plurality of cylindrical lenses 9 as shown in FIG. 1 in such a manner that a single cylindrical lens corresponds to a pair of pixels, i.e., the right-eye pixel 4a and the left-eye pixel 4b.

The lenticular lens 1 further functions as a distributing module which distributes right lays emitted from each pixel to both eyes of the observer. The left-eye region 5a is formed by the light rays from the left-eye pixels 4a at the both ends of the stereoscopic display panel 11 and the center, and the right-eye region 5b is formed by the light rays from the right-eye pixels 4b. Further, the observer can observe a prescribed stereoscopic image when the left eye 7a is located within the left-eye region 5a and the right eye 7b is located within the right-eye region 7b.

As described above, the display controller 12 includes a function of driving the display panel section 11A of the stereoscopic display panel 11, and a function of generating a stereoscopic parallax image by corresponding to the use environmental temperature detected by the temperature sensor 21.

That is, as shown in FIG. 2A, the display controller 12 specifically includes: the stereoscopic image generating module (image generating module) 22 which outputs 3D image data as the stereoscopic image data for driving the stereoscopic display panel by corresponding to the environmental temperature detected by the temperature sensor 21; and the display panel driving section 23 which drives the stereoscopic display panel 11 based on the 3D image data outputted from the stereoscopic image generating module 22.

Note here that the temperature sensor 21 is a sensor for detecting the device temperature (particularly the peripheral environmental temperature of the lenticular lens 1). As the temperature sensor 21, it is possible to use a contact type sensor such as a platinum temperature resistor, a thermistor, or a thermocouple, and a noncontact type sensor such as an infrared ray sensor. The device temperature depends largely on the use environmental temperature and the extent of the Joule heat from the electro-optical element and the like within the device.

As described above, the data storage section 25 provided to the stereoscopic image generating module 22 holds the parameter information and the like regarding the stereoscopic viewing region defined based on the temperature information acquired from the temperature sensor 21, the effective linear expansion coefficient difference intrinsic to the stereoscopic display panel, the panel size, the panel resolution, the reference temperature Tth, the 3D crosstalk property, and the like.

As described above, the stereoscopic image generating module 22 includes the function of generating the image data for driving the display panel. As described above, the stereoscopic image generating module 22 is constituted by including: the main arithmetic operation controller 31, a memory (command information storage section 26) which stores in advance various kinds of command information for restricting the action and the arithmetic operation function of the main arithmetic operation controller 31; the above-described data storage section 25 as the data accumulation section; and the deformation amount calculating section 28 which calculates the state of deformation (contraction or expansion) of the lenticular lens 1 and the deformation amount based on the temperature information from the temperature sensor 21.

Further, the stereoscopic image generating module 22 has various functions of: generating 3D image data having a parallax and depth based on the signal from the temperature sensor 21 and the parameter information; generating image data with no parallax (2D image data); synthesizing the 3D image data and the 2D image data; converting the gradation of the depth data; offset processing of the parallax data; and the like. The main function of the stereoscopic image generating module 22 is structured to be executed by the main arithmetic operation controller 31 as will be described later.

Figure 3A:
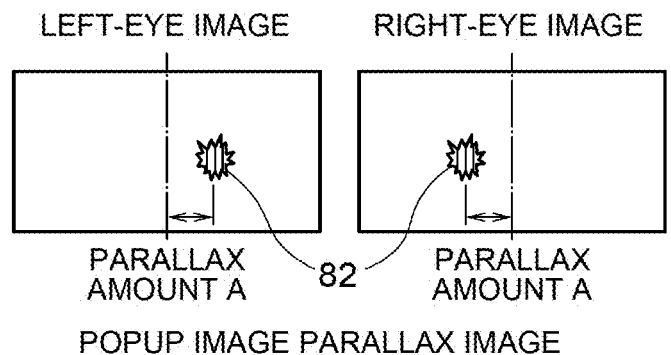
FIG. 3 is an explanatory chart showing an example of 3D image data after rendering processing is executed on three-dimensional data in the first exemplary embodiment disclosed in FIG. 1.
Figure 3B:
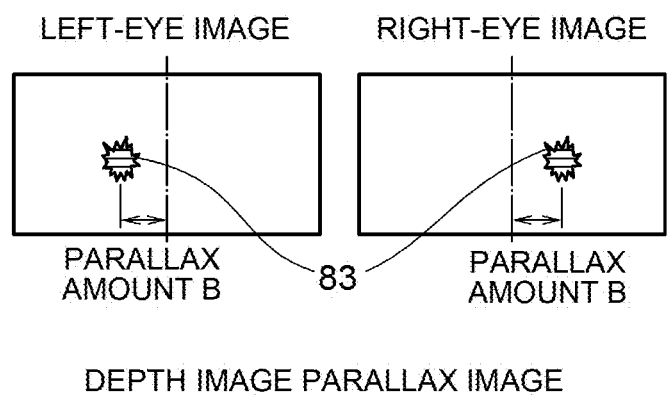

Generation of the image data done by the stereoscopic image generating module 22 is performed by reading out the display target data of the data storage section (data accumulating section) 25 by the main arithmetic operation controller 31 and by applying image processing. The display target data is the three-dimensional data containing the depth information, and the rendering processing is applied thereon by the main arithmetic operation controller 31 to generate the two-dimensional image data constituted with parallax images. In this case, 3D data used for stereoscopic display, i.e., the two-dimensional image data for both of the left and right eyes having a parallax, is generated by performing rendering processing, respectively, by setting two virtual viewpoints corresponding to the left and right eyes of the observer. FIG. 3A and FIG. 3B show examples of the generated image data.

When generating the image data, it is executed by setting the two virtual viewpoints based on the information detected by the temperature sensor 21 and applying the rendering processing according to the temperature information as will be described later.

When merging the 2D image data where a parallax is provided only to a specific object on a plane display with the 3D image data, the 2D image data used for plane display is generated by setting a single viewpoint corresponding to the center of both eyes of the observer and applying rendering processing in advance, and the 3D image data can be generated by setting the two virtual viewpoints and applying rendering processing according to the temperature information.

The specific processing of such case will be disclosed in a second exemplary embodiment.

Figure 3C:
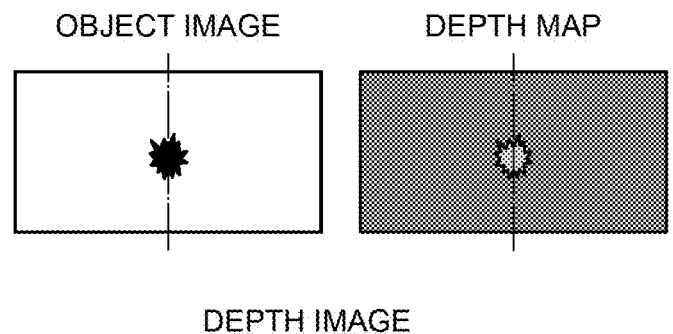

Further, it is also possible to generate the depth data as shown in FIG. 3C by performing the rendering processing based on the temperature information.

The depth data is a gray scale image corresponding to the two-dimensional image, in which gradation values based on the depth information are employed to the pixel units. In this case, the gradation values of the depth map are changed in accordance with the temperature information detected by the temperature sensor 21. The operation processing is all executed by the depth image development processing section 22B by being controlled by the main arithmetic operation controller 31 as will be described later.

When providing stereoscopic display by using those image data, the unit pixels of the display panel 11 are alternately used as the right-eye pixel and the left-eye pixel in the horizontal direction.

Note here that a method for generating the three-dimensional data containing the depth information is preferable for generating the image data. However, it is also possible to accumulate the display target data on which the rendering processing is applied based on the camera setting corresponding to the contraction and expansion of the lens to the data storage section 25 in advance, and to selectively read out the display target data based on the temperature information from the temperature sensor. That is, as described above, FIG. 3A or FIG. 3B is the image generated by setting the two virtual viewpoints and applying the rendering processing. It is also possible to accumulate those images in advance in a form of two-dimensional data corresponding to contraction and expansion of the lens, and to read out those.

When the image data is accumulated in advance in a form of two-dimensional data in this manner, the rendering processing becomes unnecessary. Thus, the load of the main arithmetic operation controller 31 becomes lightened greatly than the method that requires rendering.

Therefore, it is possible to correspond effectively even with devices with low processing capacity and arithmetic operation speed, so that the stereoscopic image generating module (image generating section) 22 can be structured at a low cost. In the case of merging the 2D image data with the 3D image data, the 2D image data may also be accumulated in advance in the same manner.

The stereoscopic image generating module 22 has the function of generating the 2D/3D image data according to the signal from the temperature sensor 21 and outputting it to the display panel driving section 23 in the manner described above.

Note here that, as the 2D/3D image data, the stereoscopic image generating module 22 can output various forms of data such as data acquired by synthesizing images of each view point such as side by side, line by line, and dot by dot, data acquired by combining a center image and a depth image, and data acquired by transmitting videos of each viewpoint in a time series manner.

Further, the display panel driving section 23 has a function of generating signals (synchronizing signals and the like) required for driving the 3D display panel 11. In this case, when the lenticular lens (image distributing section) 1 constituting the 3D display panel 11 is an electro-optical element such as a liquid crystal barrier or a liquid crystal lens, it is possible to employ a structure that includes a function of outputting a prescribed signal to the lenticular lens from the display panel driving section 23 according to the 2D/3D data.

Regarding the main arithmetic operation controller 31 shown in FIG. 2A, a function of processing another function (e.g., communication control) of a mobile display device to be employed or a part of the processing, function may be provided within another processor.

(Regarding Image Data Correction (Revising Processing))

Next, correction (revising processing) of the 3D image data executed according to the change in the temperature of the lenticular lens 1 will be described.

FIGS. 4A and 4B are schematic charts of a case where the popup and depth parallax images of the first exemplary embodiment are shown for the optical model in the lens contraction state disclosed in FIG. 71 described above.

In FIG. 4, FIG. 4A shows the state at the time of observing the popup image. Further, the light ray in the P-direction according to the parallax amount A specified on the x-axis of the display plane 40 described above makes incident within the left-eye region 5a and the right-eye region 5b as in the case shown in FIG. 71A described above.

Further, FIG. 4B shows the state at the time of observing the depth image. The light ray in the Q-direction according to the parallax amount A shown in FIG. 71B does not make incident within the range of the left-eye region 5a and the right-eye region 5b. Thus, by performing an arithmetic operation and forming the light ray in the Q-direction according to a parallax amount A−β acquired by subtracting β from the parallax amount A by the main arithmetic operation controller 31, the light ray can make incident within the range of the left-eye region 5a and the right-eye region 5b. Such correction (revising processing) is executed by the contraction-state correction controller 31A of the main arithmetic operation controller 31 disclosed in FIG. 2B described above.

Thereby, under the lens contraction state, the first exemplary embodiment makes it possible to turn to the state of being able to securely recognize the depth image from the state where the observer can recognize only the popup image but cannot recognize the depth image.

FIGS. 5A and 5B are schematic charts of a case showing a popup parallax image and a depth image according to the first exemplary embodiment regarding the optical model in the lens expansion state shown in FIG. 72.

FIG. 5A shows the state at the time of observing the popup image. The light ray in the P-direction according to the parallax amount A shown in FIG. 72A does not make incident within the range of the left-eye region 5a and the right-eye region 5b. Thus, by forming the light ray in the P-direction according to a parallax amount A−α acquired by subtracting α from the parallax amount A, the light ray comes to make incident within the range of the left-eye region 5a and the right-eye region 5b.

Further, FIG. 5B shows the state at the time of observing the depth image. The light ray in the Q-direction according to the parallax amount A makes incident within the range of the left-eye region 5a and the right-eye region 5b as in the case shown in FIG. 72B. Such correction (revising processing) is executed by the contraction-state correction controller 31B of the main arithmetic operation controller 31 described above.

Thereby, under the lens expansion state, the first exemplary embodiment makes it possible to turn to the state of being able to securely recognize the popup image from the state where the observer conventionally can recognize only the depth image but cannot recognize the popup image.

(Image Data Generating Action)

In order to achieve the optical model disclosed in FIG. 4 and FIG. 5, a specific generating action of the image data thereof will be described in details hereinafter.

In order to simplify the explanation of FIG. 4 and FIG. 5, either the popup image or the depth image is limitedly used as the parallax image. However, as the actual images, there are many cases that the popup and depth images exist in a mixed manner. Thus, regarding the image data generating action hereinafter, a case where the popup and depth images are mixed is employed for the explanation.

Figure 6:
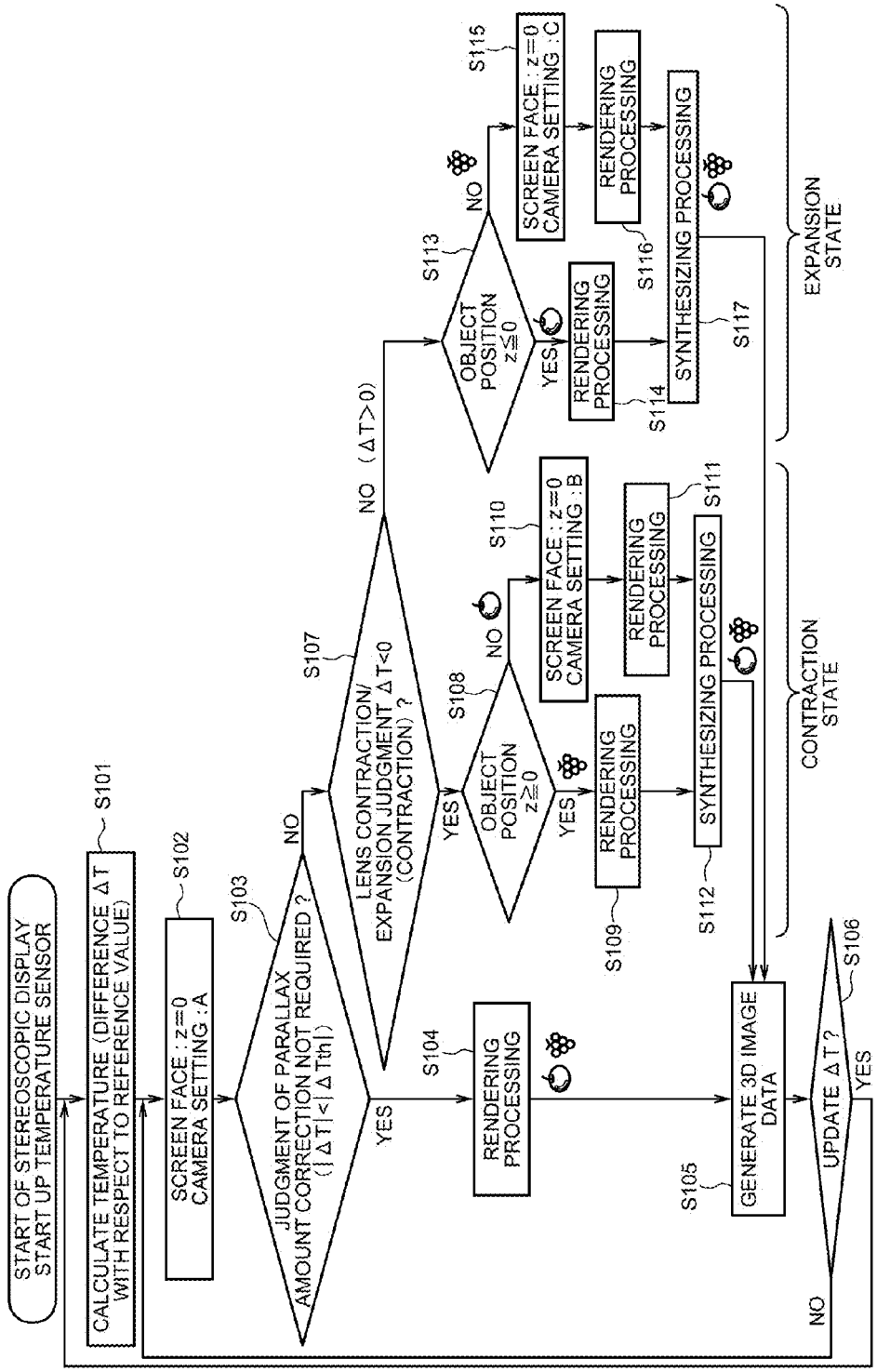
FIG. 6 is a flowchart showing an example of a 3D image data generating action of the first exemplary embodiment disclosed in FIGS. 2A and 2B.

FIG. 6 is a flowchart showing an example of a 3D image data generating action according to the first exemplary embodiment.

First, stereoscopic display is started and, at the same time, the temperature sensor 21 for detecting the temperature of the display device (specifically the lenticular lens 1) is started up.

Then, the difference ΔT between the temperature T of the lenticular lens 1 detected by the temperature sensor 21 and the reference temperature Tth set in advance is calculated by the deformation amount calculating section 28 (FIG. 6: step S101/temperature difference calculating step). Note here that the reference temperature Tth is set arbitrarily in accordance with an application of the image display device. In the first exemplary embodiment, it is set to a normal temperature. Then, the screen face (display face) 40 required for the rendering processing condition (z=0 on the z-axis for displaying the depth) and the camera setting A are set (FIG. 6: step S102).

Figure 7A:
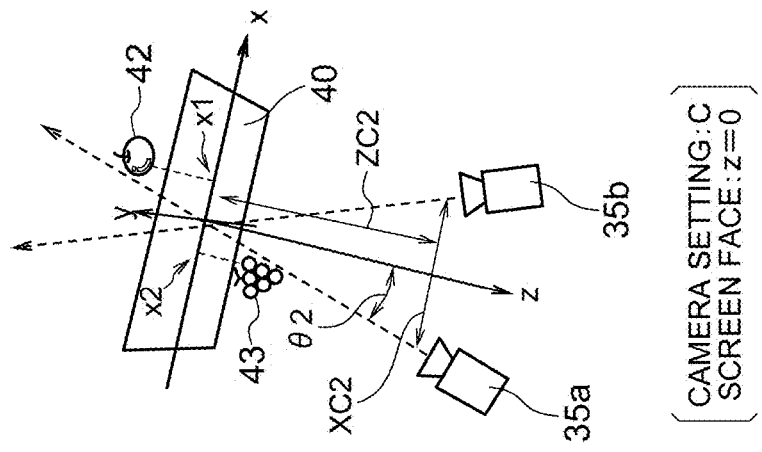
FIG. 7 is an explanatory showing that rendering processing is executed under a set condition of a pair of cameras specified in advance for acquiring parallax images regarding object examples (in a case of two objects) including depth information.

FIG. 7A shows an example of the camera setting A (first camera setting A). In the first camera setting A, as has already been disclosed in FIG. 64 described above, the cameras are placed in such a manner that the intersection point 41 between the optical axes of the left-eye camera 35a and the right-eye camera 35b comes on a regular screen (i.e., at a reproduction position of the screen face 40) by using the above-described cross method. It is so defined that the horizontal direction of the screen face 40 is the x-axis, the direction orthogonal to the x-axis is the y-axis, the direction orthogonal to the xy plane is the z-axis, the intersection point 41 is taken as the origin, and the positive and negative directions of the xyz-axes (setting of the places for collecting stereoscopic information) are as shown in FIG. 7A. In this state, camera position ZC, inter-camera distance XC, and camera viewing angle (not shown) may be considered as examples of the camera setting parameters.

Note here that the camera position ZC is the position of the camera in the direction along the z-axis for the screen face (z=0) 40, and the inter-camera distance XC is the space between the pair of cameras 35a and 35b in the x-axis direction, and the angle in this state between the z-axis and the optical axis of each of the cameras 35a and 35b, i.e., the included angle, is defined as η. In the first exemplary embodiment, an apple object 42 is placed on the far side (z<0) of the screen face 40, and a grape object 43 is placed on the front side (z≥0), respectively. The camera setting A (first camera setting A) is set in accordance with the panel size, the panel resolution, and the like among the parameter information. However, it is also possible to employ a structure with which the camera setting A can be set arbitrarily as necessary or according to the preference of the panel observer.

Then, each of the absolute values of the difference $\Delta T$ (the difference between the detected temperature T and the reference temperature Tth) and the judgment threshold value $\Delta$Tth is compared to judge whether or not the correction (revising) of the parallax amount is necessary (FIG. 6: step S103/correction necessity judging step). This judgment is executed by the temperature difference judging section 30 of the stereoscopic image generating module 22 as described above.

Figure 8:
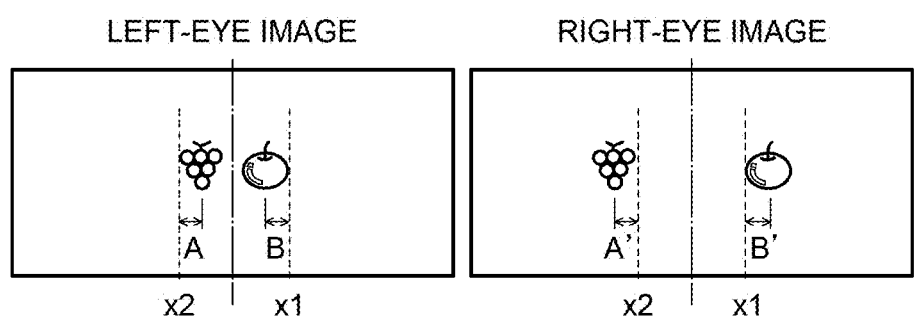
FIG. 8 is an explanatory chart showing an example of 3D image data that requires no parallax amount correction in the image processing action of FIG. 6.

When judged in the correction necessity judging step of step S103 as $|\Delta T| \leq |\Delta Tth|$, it is considered that the deformation amount of the lenticular lens 1 due to the change in the temperature is small and that the parallax amount correction is unnecessary. Thus, the three-dimensional data is immediately rendering-processed under the condition of the first camera setting A (FIG. 6: step S104/image processing step). Subsequently, it is converted to the 3D image data as shown in FIG. 8 for driving the display panel based on the rendering-processed parallax image, and then outputted (FIG. 6: step S105/3D image data generating step).

In the meantime, in a case of $|\Delta T| > |\Delta Tth|$, it is considered that the deformation amount of the lenticular lens 1 due to the change in the temperature is large and that the parallax amount correction is necessary. Thus, in order to detect whether the lenticular lens 1 is in the direction of contraction or the direction of expansion, it is shifted to execute judgment on the sign of $\Delta T$ (FIG. 6: step S107/correction environment judging step). The $\Delta T$ sign judging step is executed by the correction environment judging section 29 of the stereoscopic image generating module 22 as described above.

Further, in a case where $\Delta T < 0$ in step S107 of FIG. 6, it is considered that the lenticular lens 1 is in a contraction state with respect to the reference state and shifted to step S108 as described above. Meanwhile, in a case where $\Delta T > 0$, it is considered that the lenticular lens 1 is in an expansion state with respect to the reference state and shifted to step S113. In both cases, the depth position of the object is investigated as the next processing.

Figure 9A:
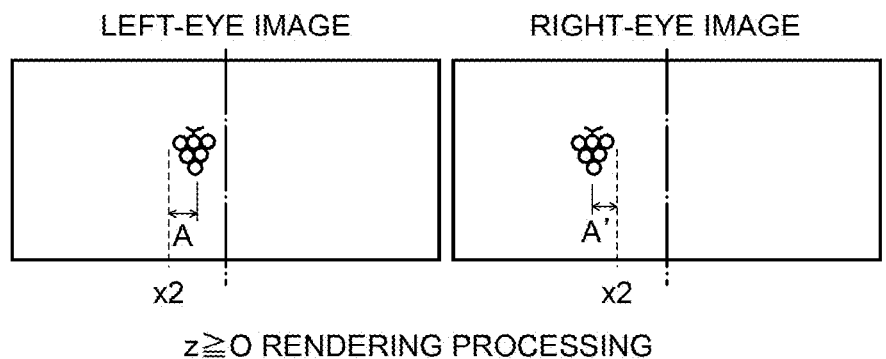
FIG. 9 is an explanatory chart showing an example of 3D image data after rendering processing is executed on three-dimensional data under a lens contraction state in the image processing action of FIG. 6.

In the former case where $\Delta T < 0$, i.e., when it is judged that the lenticular lens 1 is in a contraction state, it is judged in step S108 of FIG. 6 whether or not the position of the object having the depth information with respect to the z-axis is on the front side (i.e., $z \geq 0$) than the screen face 40. As described above, this judging action is executed by the contraction-state correction controller 31A of the main arithmetic operation controller 31. Further, when $z \geq 0$, the rendering processing is executed on the three-dimensional data of the object 43 under the condition of the first camera setting A (FIG. 6: step S109/popup-side image data processing step). Thereby, the 3D image data as shown in FIG. 9A can be acquired.

Figure 7B:
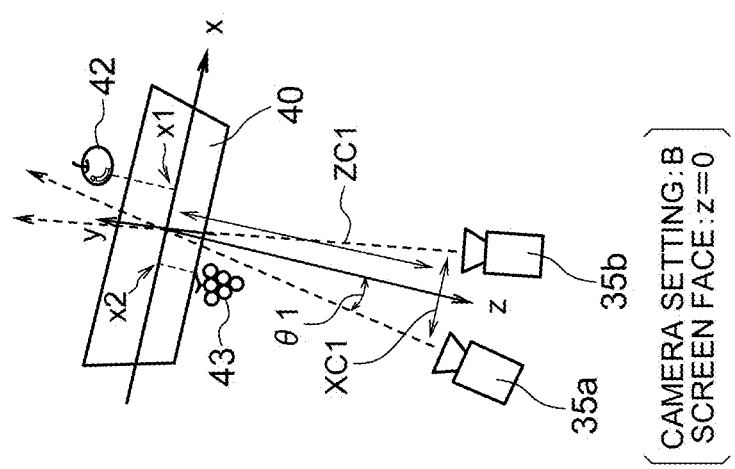
Figure 9B:
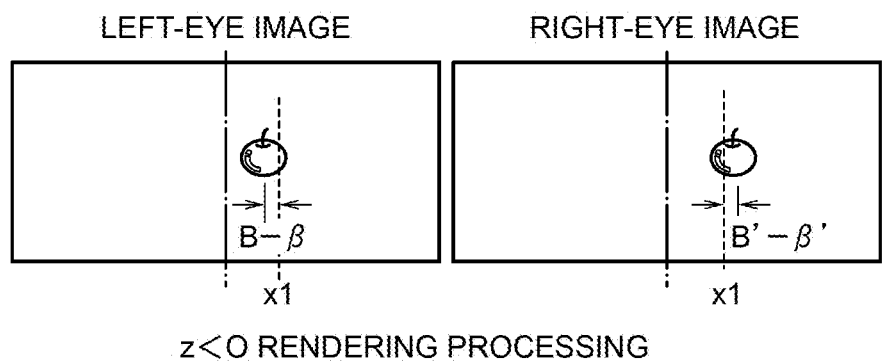

In the meantime, in a case where $z < 0$, i.e., when the position of the object with respect to the z-axis is the far side with respect to the screen face 40, the condition of the camera setting B (the second camera setting B) shown in FIG. 7B is selected (FIG. 6: step S110), and the rendering processing is executed on the three-dimensional data of the corresponding object 42 (FIG. 6: step S111/non-popup side image data processing step). Thereby, the 3D image data as shown in FIG. 9B can be acquired.

Note here that, as shown in FIG. 7B, the angle $\theta 1$ formed between the optical axes of each of the cameras 35a and 35b and the z-axis in the second camera setting B shown in FIG. 7B is set to be smaller than $\theta$ of the first camera setting A shown in FIG. 7A. The parameters for determining $\theta 1$ are the difference $\Delta T$, and the contents stored in the data storage section 25 (i.e., the effective linear expansion coefficient difference of the materials constituting the display panel, the panel size, the panel resolution, and the 3D stroke).

The parameters other than $\Delta T$ can be treated as constants normally, so that only $\Delta T$ is a variable. $\theta 1$ becomes smaller as $\Delta T$ becomes lager. However, the relation between $\theta 1$ and $\Delta T$ is not limited only to a linear form but may also be a non-linear form.

Thereby, the parallax amount of the object 42 on the x-axis coordinate becomes smaller from a dimension B as B–$\beta$ in the left-eye image and becomes smaller from a dimension B as B–$\beta$ in the right-eye image, thereby providing an image that can be observed even in a lens contraction state as described above in FIG. 4. In this case, inter-camera distance XC1 and inter-camera distance ZC1 for determining the angle $\theta 1$ can be set arbitrarily for the camera setting A. For example, in FIG. 7, it is possible to set as XC1=XC, ZC1>ZC, to set as ZC1=ZC, XC1<XC, or to set as XC1<XC, ZC1>ZC.

Figure 9C:
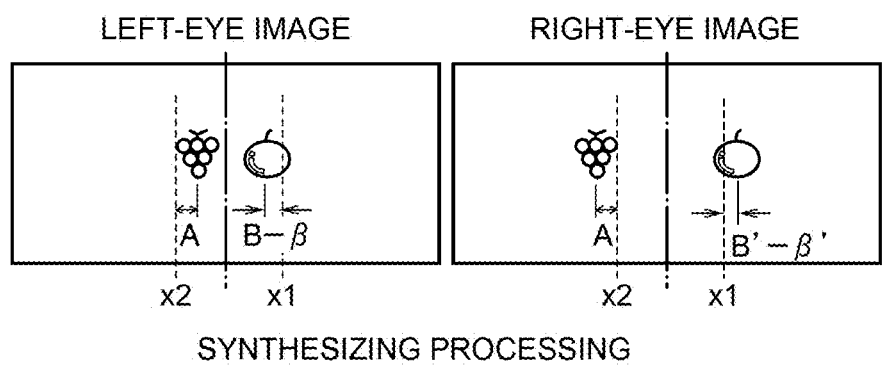

Then, the image data of FIG. 9A acquired by the rendering processing in step S109 of FIG. 6 and the image data of FIG. 9B acquired by the rendering processing in step S111 are synthesized by the image data synthesizing function 31c (FIG. 6: step S112). Based on the synthesized image data, the 3D image data as shown in FIG. 9C is generated by the 3D image data generating function 31d (FIG. 6: step S105/3D image data generating step).

While the rendering processing is executed on the three-dimensional data as the target under the condition of the first camera setting A in step S109 of FIG. 6, the condition is not limited only to that. The rendering processing may be executed on the three-dimensional data as the target by using the condition by slightly changing $\theta$, XC, and ZC of FIG. 7A from those of the camera setting A as the camera setting (camera setting A).

In the meantime, in a case of the state of $\Delta T > 0$ (i.e., the state where the lenticular lens 1 is expanded with respect to the reference state), it is set to be shifted to step S113 (investigate the depth position of the object).

In step S113, executed is the judgment regarding whether or not the position of the object having the depth information with respect to the z-axis is on the far side than the screen face 40, i.e., where or not $z < 0$.

Figure 10A:
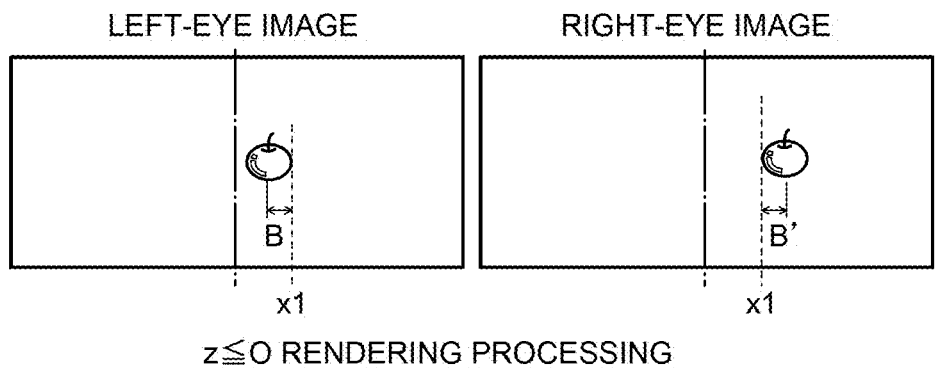
FIG. 10 is an explanatory chart showing an example of 3D image data after rendering processing is executed on three-dimensional data under a lens expansion state in the image processing action of FIG. 6.

Then, in a case of $z < 0$, the rendering processing is executed on the three-dimensional data of the object 42 under the condition of the first camera setting A (FIG. 6: step S114/non-popup side image data processing step). Thereby, the 3D image data as shown in FIG. 10A can be acquired.

Figure 7C:
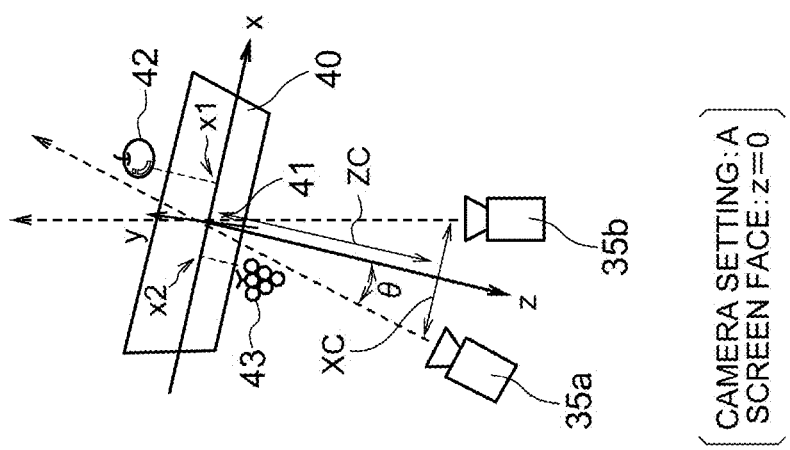

Further, in a case of $z < 0$, i.e., when the position of the object with respect to the z-axis is the far side with respect to the screen face 40, a condition of a third camera setting C shown in FIG. 7C is selected (FIG. 6: step S115), and the rendering processing is executed on the three-dimensional data of the corresponding object 43 (FIG. 6: step S116/popup side image data processing step).

Figure 10B:
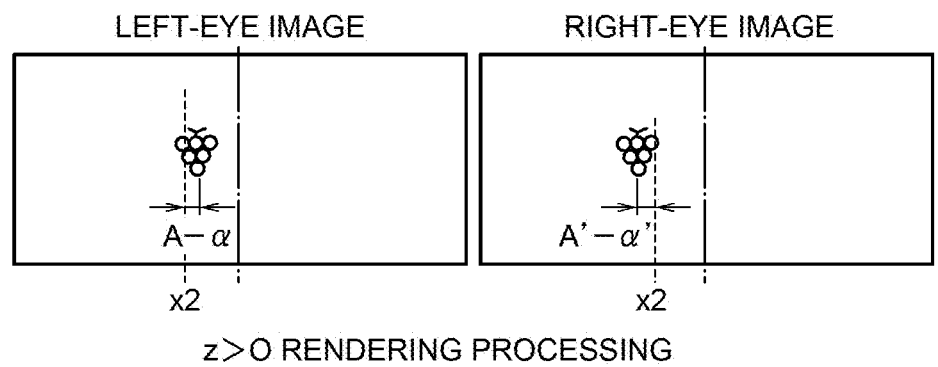

Thereby, the 3D image data as shown in FIG. 10B is acquired.

Note here that, the angle $\theta 2$ formed between the optical axes of each of the cameras 35a and 35b and the z-axis in the third camera setting C shown in FIG. 7C is set to be larger than $\theta$ of the first camera setting A shown in FIG. 7A. As in the case of $\theta 1$, $\theta 2$ is also a function regarding $\Delta T$ described above and the contents stored in the data storage section 25, and $\theta 2$ becomes larger as $\Delta T$ becomes larger. However, the relation therebetween is not limited only to a linear form but may also be a non-linear form.

Thereby, the parallax amount of the object 43 becomes smaller from A as A−α and from A as A−−α, thereby providing an image that can be observed even in a lens expansion state as described in FIG. 5.

As shown in FIG. 7C, inter-camera distance XC2 and inter-camera distance ZC2 for determining the angle θ2 can be set arbitrarily for the camera setting A. For example, it is possible to set as XC2=XC, ZC2<ZC, to set as ZC2=ZC, XC2>XC, or to set as XC2>XC, ZC2<ZC.

Figure 10C:
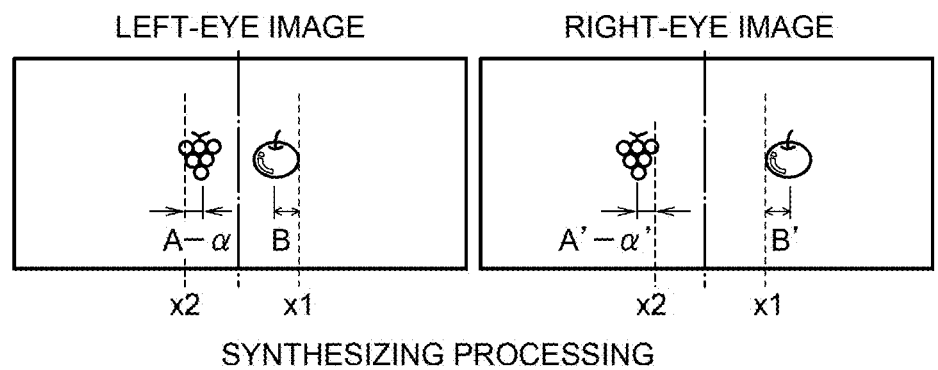

Then, the image data of FIG. 10A acquired by the rendering processing in step S114 and the image data of FIG. 10B acquired by the rendering processing in step S116 are synthesized in the manner described above (FIG. 6: step S117). Based on the synthesized image data, the 3D image data as shown in FIG. 10C is generated (FIG. 6: step S105/3D image data processing step).

These are both executed by the main arithmetic operation controller 31.

While the rendering processing is executed on the three-dimensional data as the target under the condition of the first camera setting A in step S114 of FIG. 6, the condition is not limited only to that. The rendering processing may be executed on the three-dimensional data as the target under the camera setting condition A (not shown) that is acquired by slightly changing θ, XC, and ZC of the camera setting A.

While it is judged in step S108 and S113 that the position of the object having the depth information with respect to the z-axis as the front side z≥0 of the screen face 40 and the far side z<0, the positions are not limited only to such case. It is also possible to judge as the front side z>0 and the far side z≤0 or to judge as the front side z≥0 and the far side z≤0. This also applies in the second and third exemplary embodiments to be described later.

As has been described above, the rendering processing is performed according to the value of the temperature difference ΔT, and the 3D image data acquired in step S105 is transmitted to the stereoscopic display panel 11 via the display panel driving section 23 as the 2D/3D image data (display panel driving data) shown in FIG. 2A. Thereby, the observer can view a prescribed stereoscopic image.

Then, judgment regarding update of ΔT is executed (FIG. 6: step S106). When judged that the update is necessary, the procedure is returned to step S101. When judged that the update is unnecessary, the procedure is returned to step S102 to return to the camera setting A.

Note here that step S106 of FIG. 6 is a function for the observer to correspond to the change in the use temperature environment of the stereoscopic display device 10. For example, assumed for a mobile device is a case of entering inside a building from outside, and assumed for a fixed-type device is a case before and after activating an air conditioner.

Thus, it is not necessary to execute the judgment of step S106 shown in FIG. 6 for every passage.

It is possible to employ a structure with which the number of passages is counted and the observer gives a command to execute a judging action from an operation switch or the like of the stereoscopic display device 10 when it reaches a proper count value or to employ a structure with which a judging action is automatically executed when reaching a prescribed count value.

Figure 11A:
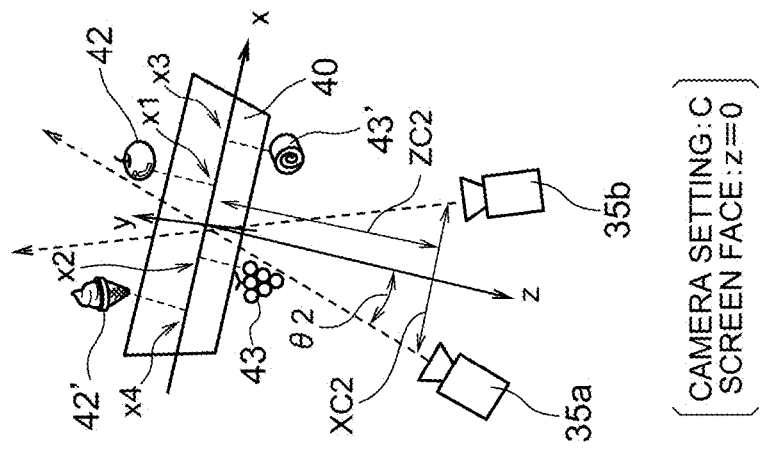
FIG. 11 is an explanatory chart showing that rendering processing is executed under a set condition of a pair of cameras specified in advance for acquiring parallax images regarding object examples (in a case of four objects) including depth information.
Figure 11B:
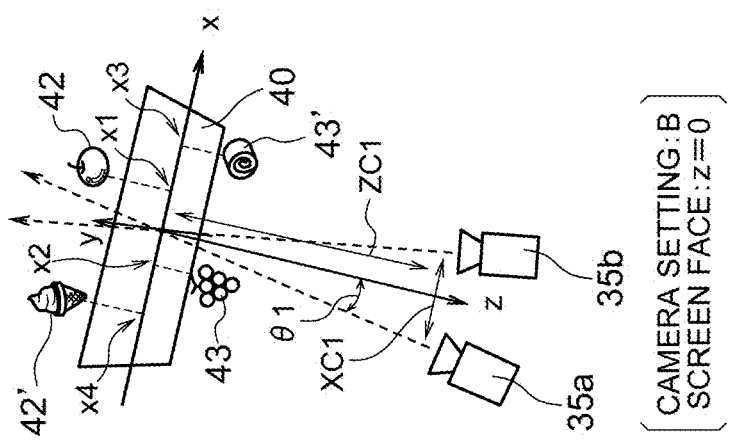
Figure 11C:
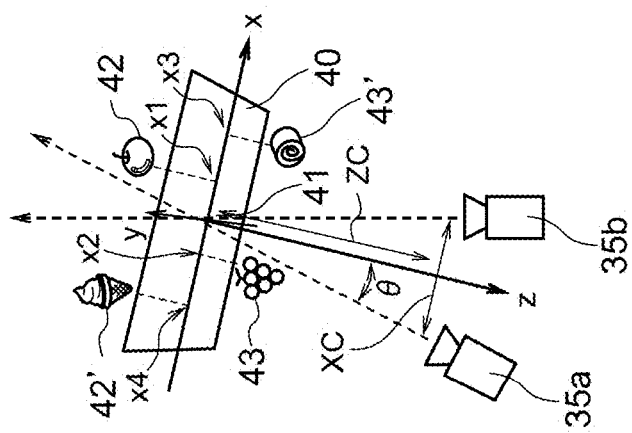

While the case where there are one each of the objects 42 and 43 having the depth information described in FIG. 7 existing on the front side and the far side of the screen face (z=0) 40 has been described, the same processing can be done also in a case where two each or more of those exist (objects 42, 43, 43). An example thereof is shown in FIGS. 11A, 11B, and 11C.

Figure 12A:
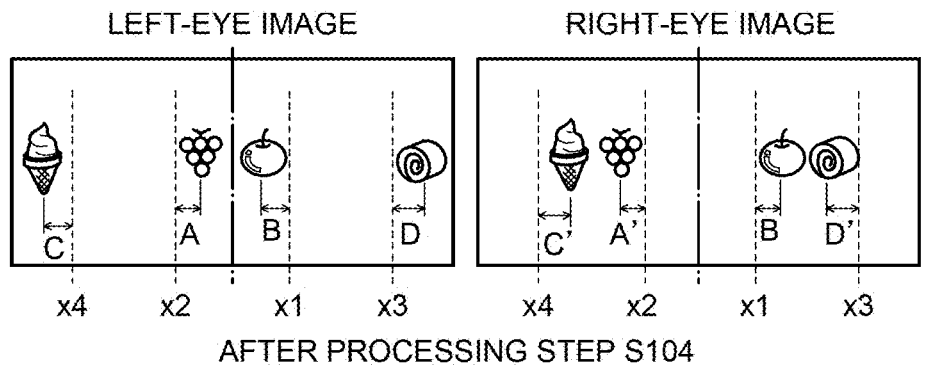
FIG. 12 is an explanatory chart showing an example of 3D image data having a parallax acquired by executing rendering processing in accordance with a lens contraction/expansion state in the procedure shown in FIG. 6 under the condition of FIG. 11.
Figure 12B:
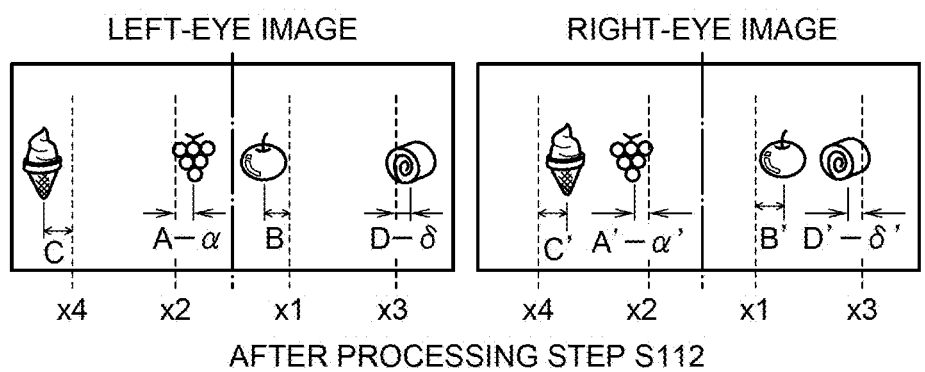
Figure 12C:
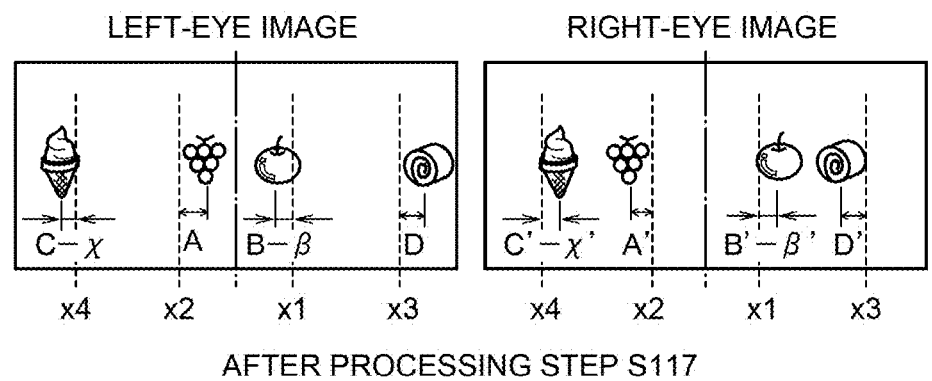

At the same time, generation of the image data for this example of FIG. 11 is shown in FIG. 12. In this case, image data according to ΔT as shown in FIGS. 12A to 12C can be acquired by a flowchart shown in FIG. 6 completely in the same manner as that of FIG. 8 to FIG. 10.

Further, while the content of the present invention has been described in the first exemplary embodiment by mainly referring to the example where the three-dimensional data is rendering-processed to develop the parallax image, the present invention is not limited only to that. For example, the result acquired by the rendering processing can be developed into a two-dimensional image and a depth image showing the depth information thereof as shown in FIG. 13. Hereinafter, this will be described in details.

That is, the main arithmetic operation controller 31 of the first exemplary embodiment is provided with the depth image development processing section 22B which develops the two-dimensional image information of the three-dimensional data regarding the object sent into the main arithmetic operation controller 31 as an object image and the depth information (depth position on the z-axis) as a depth image. Further, the depth image development processing section 22B has a function which sets gradation values corresponding to the depth information by the pixel unit for the three-dimensional data and specifies the set gradation values by corresponding to the parallax amount of the two-dimensional image information specified on the x-axis.

In this case, the depth image undergoes the specifying processing by the gradation value specifying function of the depth image development processing section 22B to have the gradation values based on the depth information basically by the pixel unit as described above.

The processing content of the depth image development processing section 22B of this case is shown in FIGS. 13A, 13B, and 13C. In the explanations below, used as a depth image is an image in which the gradation larger than the gradation value of the screen face is defined as the popup side and the gradation smaller than that is defined as the depth side.

In FIG. 13A, first, when it is assumed that the maximum gradation width as 256, for example, a gradation value 128 that is a half thereof is defined as the gradation value on the screen face 40. According to the definition described above, values larger than the gradation value 128 are employed for the popup objects 46c, 46d for the screen face 40, and values smaller than the gradation value 128 are employed for the depth objects 46a, 46b.

It is possible to make the background as the same plane with the screen face 40 by setting the gradation value of a background 46e as 128. It is also possible to set the background as a popup or depth plane by using the gradation values larger or smaller than the gradation value 128.

The depth image developing processing is executed by the depth image development processing section 22B of the main arithmetic operation controller 31.

FIG. 13B shows a depth image corresponding to the parallax images of FIG. 12B, in which a' popup object 47d is in a gradation value corresponding to A−α, A−α of FIG. 12B and a popup object 47c is in a gradation value corresponding to D−δ, D−δ, respectively. In other words, smaller gradation values than the popup objects 46c, 46d of FIG. 13A are employed for the popup objects 47c, 47d.

Similarly, FIG. 13C shows a depth image corresponding to the parallax image of FIG. 12C, in which a popup object 48b is in a gradation value corresponding to B−β, B−β of FIG. 12C and a popup object 47a is in a gradation value corresponding to C−χ, C−χ, respectively. In other words, larger gradation values than the depth objects 46a, 46b of FIG. 13A are employed for the popup objects 47a, 47b.

Further, while the cross method is used for the explanation as the image capturing method for acquiring the parallax images or the depth images, it is also possible to execute the similar processing with a parallel method.

For the stereoscopic display device 10 disclosed in the first exemplary embodiment, the 3D image data generating method disclosed in FIG. 6 for driving the stereoscopic display panel has been described in details. Regarding the 3D image data generating action, each of the information processing contents in a series of data processing steps starting from the lenticular lens temperature measuring processing may be put into a program to have it achieved by a computer provided to the stereoscopic image generating module 22. This is the same for a modification example to be described later and for all the exemplary embodiments from the second exemplary embodiment and thereafter as well as the modification examples thereof.

Further, regarding the invention of the program, the programmed content may be recorded to a non-transitory recording media such as a DVD, a CD, a flash memory, and the like. In such case, the recorded program is read out and executed by a computer.

With this, it is also possible to achieve the above-described object of the present invention effectively.

Next, the content of the evaluation of the stereoscopic viewing regions under the use environmental temperatures executed by using the method of the first exemplary embodiment will be described.

FIG. 14 shows the evaluation result of the stereoscopic viewing regions when the use environmental temperature of the stereoscopic display device 11 is changed from −20° C. to 60° C. The effective linear expansion coefficient difference between the both when the lenticular lens 1 and the display panel section 11 are fixed is 30 ppm.

Note here that the evaluation was done under a condition that the proportion of the size of the parallax image with respect to the entire screen for the X-axis direction defined in FIG. 7 was considered as a 3D region and parallax images with 10%, 40%, 85% of the 3D images from the center of the screen were prepared. That is, "10% 3D region" means that there are parallax images relatively in the center part of the screen as shown in FIG. 8, and "85% 3D region" means that there are parallax images in almost the entire screen as shown in FIG. 12.

The data having a mixture of the popup and depth images as shown in FIG. 8 and FIG. 12 was employed for the image data used in the evaluation. An average value of three test subjects was used for the stereoscopic viewing region. Referring to FIG. 14, a prescribed stereoscopic viewing region is secured from −20° C. to 60° C. in the 40% 3D region even though the effective linear expansion coefficient difference is 30 ppm as described above.

This is because the parallax amount is controlled for a specific parallax direction according to the use environmental temperature. It is verified that the use temperature range is greatly improved compared to the case of FIG. 73. In FIG. 14, an example in which the effective linear expansion coefficient difference is 30 ppm is shown. However, it goes without saying that, in the case where the effective linear expansion coefficient difference is 30 ppm or more, it is notably verified that the use environmental temperature is greatly improved by this parallax amount control.

In the actual contents, it is rare to provide the 3D region with a large parallax on the entire screen.

It is more common to provide the 3D region with a large parallax in the region of about 40 to 60% with respect to the center of the screen.

Comparing FIG. 14 with FIG. 73, regarding the change in the stereoscopic viewing region for the 40% 3D region, it can be found that the first exemplary embodiment is very effective at the point over ±15° C. with respect to 25° C.

Further, according to the result, the effective linear expansion coefficient difference that becomes effective at the point over ±15° C. with respect to the 60% 3D region is about 15 ppm. It is therefore found that the first exemplary embodiment is very effective when the effective linear expansion coefficient difference becomes 15 ppm or more.

As described above, with the first exemplary embodiment, whether or not the correction control of the image data outputted in each of the contraction state and the expansion state of the lenticular lens 1 can be judged by the temperature difference judging section 30 promptly. It is designed to subsequently operate the contraction state correction controller 31A or the expansion state correction controller 31B by corresponding to each of the contraction state or the expansion state of the lenticular lens 1, respectively, so that the correction control of the image data can be achieved efficiently by promptly corresponding to the change in the environmental temperature.

This makes it possible to acquire an excellent stereoscopic image display device which can effectively display the stereoscopic image display by the lenticular lens 1 continuously even when there is a change in the environmental temperature of the surroundings.

Further, the stereoscopic image display device can use materials whose linear expansion coefficients are different for the display panel, i.e., a typical plastic substrate can be used as the lenticular lens, and a typical glass substrate can be used as the display panel, so that there is such a merit that a great number of display devices can be supplied at a low cost.

Further, as the 2D/3D data corresponding to the change in the environmental temperature of the surroundings, the stereoscopic image display device can output various forms of data such as data acquired by synthesizing images of each view point such as side by side, line by line, and dot by dot, data acquired by combining a center image and a depth image, and data acquired by transmitting videos of each viewpoint in a time series manner from the stereoscopic image generating module. Thus, the stereoscopic image display device exhibits the flexibility for the interface specification of the display panel driving section, so that it can be employed to wide variety of display devices. This results in achieving high performance of the display panel and to reducing the cost.

Figure 15:
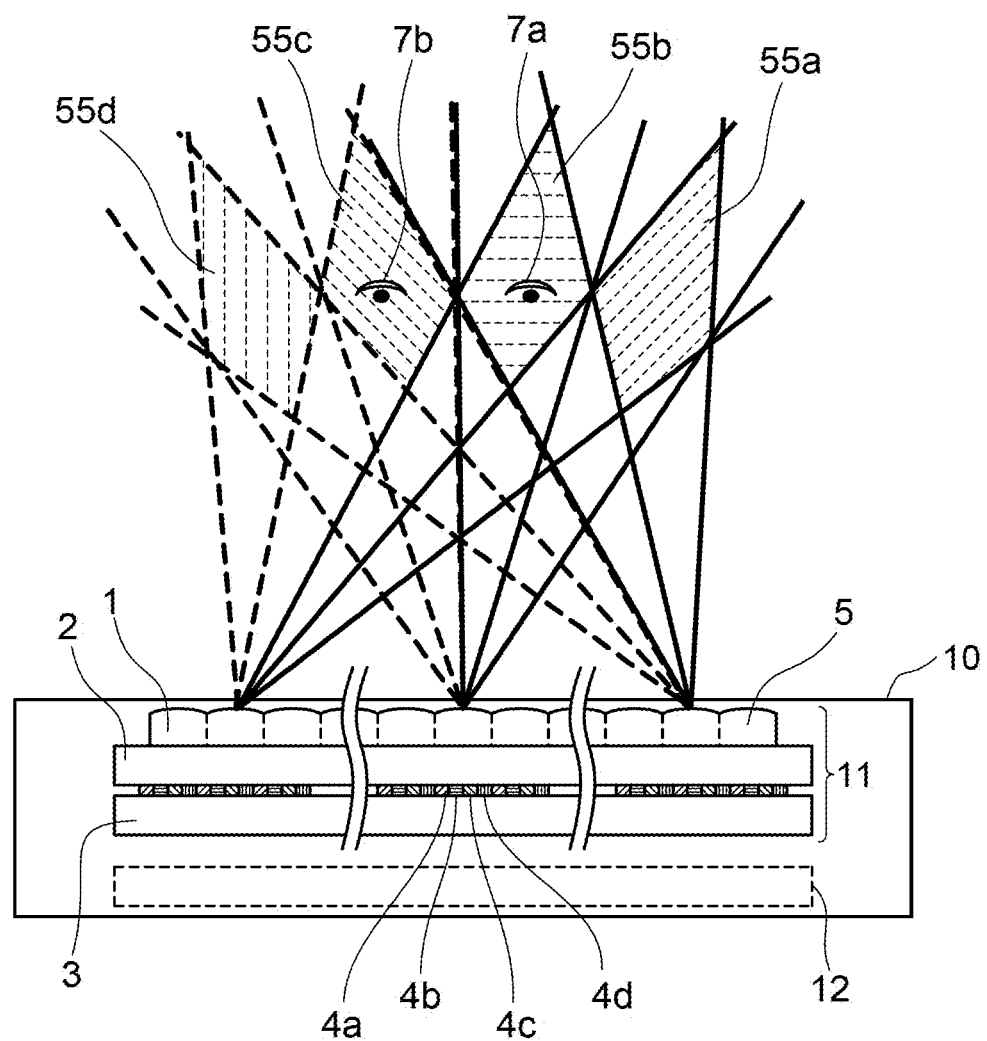
FIG. 15 is a sectional view showing an example of actions of the stereoscopic display device according to the first exemplary embodiment in a case where the viewpoints of the observer are N-viewpoints (N=4)

While the case of two viewpoints has been described in the first exemplary embodiment, the present invention is not limited only to that. The present invention can also be applied to N-viewpoints in the same manner. FIG. 15 shows a case of N=4, in which a first-viewpoint pixel 51a, a second-viewpoint pixel 51b, a third-viewpoint pixel 51c, and a fourth-viewpoint pixel 51d are arranged as the unit pixel of the stereoscopic display panel 11 in the horizontal direction that is in parallel to the direction along which both eyes 7a, 7b of the observer are located, and a first-viewpoint region 52a to a fourth-viewpoint region 42d are formed via the lenticular lens 1 as the light distributing module. Rendering processing is executed by using four cameras for generating image data projected at each viewpoint. However, the processing can be executed in the same manner as the case of the two viewpoints described above.

(Modification Example)

Next, a modification example of the first exemplary embodiment will be described by referring to FIG. 2C.

Note here that same reference numerals are used for the same structural members as those of the first exemplary embodiment.

FIG. 2C is a block diagram showing each structural element of a main arithmetic operation controller 32 according to the modification example of the first exemplary embodiment. In the first exemplary embodiment described above, as shown in FIG. 2B, the contraction-state correction controller 31a of the main arithmetic operation controller 31 executes the rendering processing under the first camera setting A regarding the popup-side image data processing function 31a and executes the rendering processing under the second camera setting B in which the included angle is smaller than the included angle formed between the camera optical axis and the z-axis in the first camera setting A regarding the non-popup image data processing function 31b (see FIG. 6: steps S110, S111).

Meanwhile, in the modification example of the first exemplary embodiment, as shown in FIG. 2C, a contraction-state correction controller 32A of the main arithmetic operation controller 32 is characterized to include a non-popup side z-value conversion processing function 32b which performs conversion of z-value (in the direction to become smaller than the original z-value) by multiplying a correction coefficient α to z (absolute value) of the object of z<0, instead of the non-popup side image data processing function 31b described above.

The non-popup side z-value conversion processing function 32b can acquire 3D image data similar to that of the first exemplary embodiment by performing the z-value conversion processing on the three-dimensional data at the time of the first camera setting A based on the included angle information of a pair of cameras under the second camera setting B by taking the z-axis on the depth coordinate under the first camera setting A as the reference.

The correction coefficient α described above is less than a numerical value "1" and, as described above, it can be determined based on the included angle information of the first camera setting A and the included angle information of the second camera setting B. Further, the correction coefficient α is not limited only to that. It is possible to define the coefficient as a constant value regardless of the extent of the z-value as long as it is within a range with which the stereoscopic visibility is not deteriorated for the temperature change. Alternatively, it is also possible to change the coefficient linearly or nonlinearly depending on the extent of the z-value.

Further, instead of the image data synthesizing function 31c disclosed in FIG. 2B of the first exemplary embodiment, this modification example is provided with an entire region image data collective data processing function 32c which executes rendering processing for the popup side and the non-popup side whose z-value is being converted by using a same camera setting (e.g., the first camera setting A). Therefore, the image data synthesizing function 31c shown in FIG. 2B of the first exemplary embodiment becomes unnecessary.

Further, in this modification example, the expansion-state correction controller 31B of the first exemplary embodiment described above is also employed. Instead of the expansion-state correction controller 31B, an expansion-state correction controller 32B is provided.

That is, in this modification example, as shown in FIG. 2C, the expansion-state correction controller 32B of the main arithmetic operation controller 32 is characterized to include a popup-side z-value conversion processing function 32f which performs conversion of z-value (in the direction to become smaller than the original z-value) by multiplying a correction coefficient β to z (absolute value) of the object of z≥0, instead of the popup side image data processing function 31f described above.

The non-popup side z-value conversion processing function 32f can acquire 3D image data similar to that of the first exemplary embodiment by performing the z-value conversion processing on the three-dimensional data at the time of the first camera setting A based on the included angle information of a pair of cameras under the third camera setting C by taking the z-axis on the depth coordinate under the first camera setting A as the reference.

Note here that the extent of the correction coefficient β can be set in the same manner as the case of the correction coefficient α described above.

Further, instead of the 3D image data synthesizing function 31g disclosed in FIG. 2B of the first exemplary embodiment, this modification example is provided with an entire region image data collective data processing function 32g which executes rendering processing for the popup side and the non-popup side whose z-value is being converted by using a same camera setting (e.g., the first camera setting A). Therefore, the image data synthesizing function 31g shown in FIG. 2B of the first exemplary embodiment becomes unnecessary.

Thereby, it becomes unnecessary to change the camera setting between the popup-side image data processing function 31a and the non-popup side z-value conversion processing function 32b of the contraction-state correction controller 32A and between the non-popup side image data processing function 31e and the popup-side z-value conversion processing function 32f of the expansion-state correction controller 32B, respectively. Further, the image data synthesizing function becomes unnecessary. Therefore, load on the system side (particularly the main arithmetic operation controller) can be lightened greatly, and the speed of the image processing can be increased as well.

Other structures and the operation effects thereof are the same as the case of the first exemplary embodiment described above.

(Second Exemplary Embodiment)

Next, a second exemplary embodiment of the present invention will be described by referring to FIG. 16 to FIG. 18.

Figure 16B:
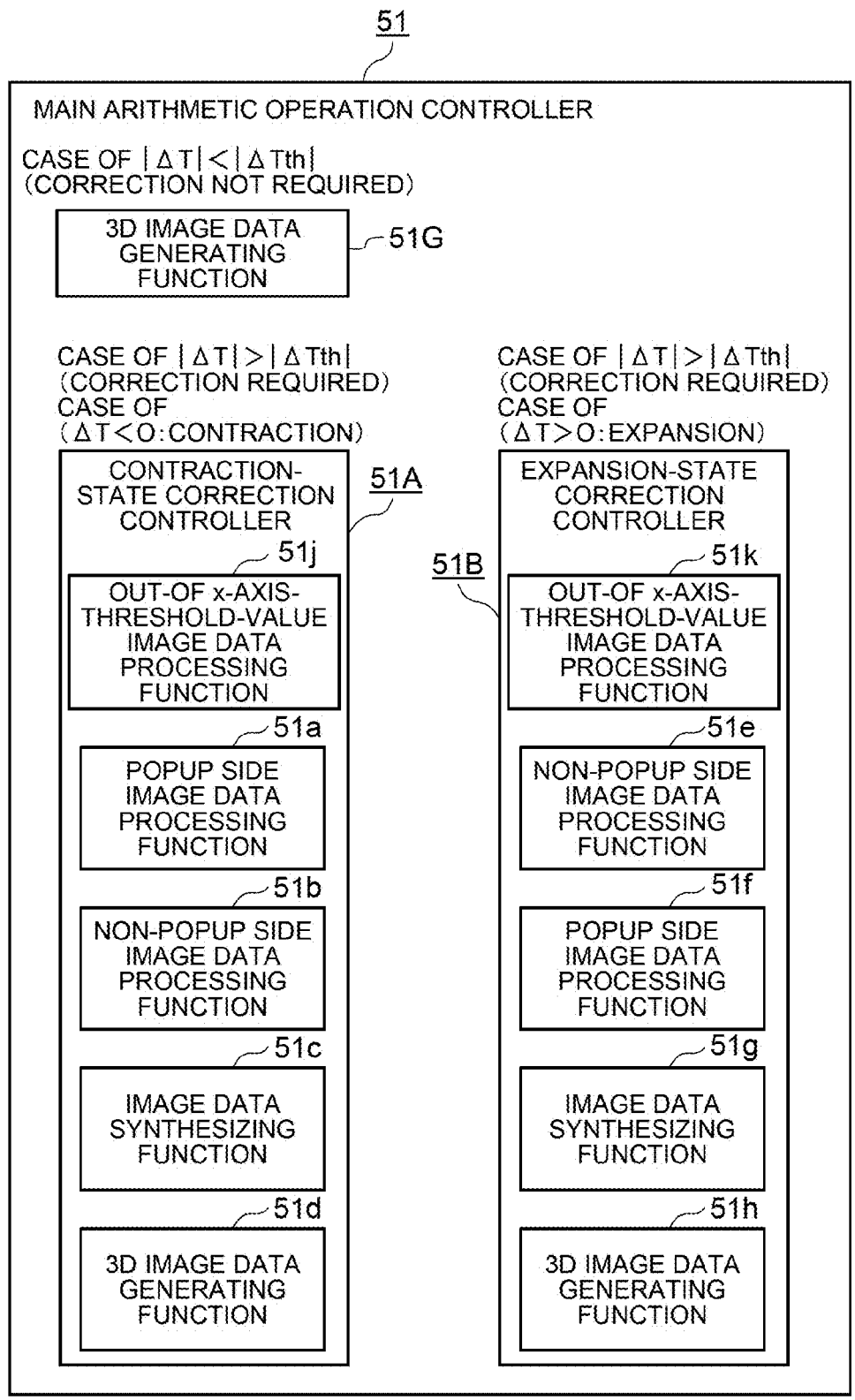

FIG. 16A and FIG. 16B are block diagrams showing the structural contents of a controller 50 of a stereoscopic display device according to the second exemplary embodiment and a main arithmetic operation controller 51 that forms the main part of the controller.

Figure 16C:
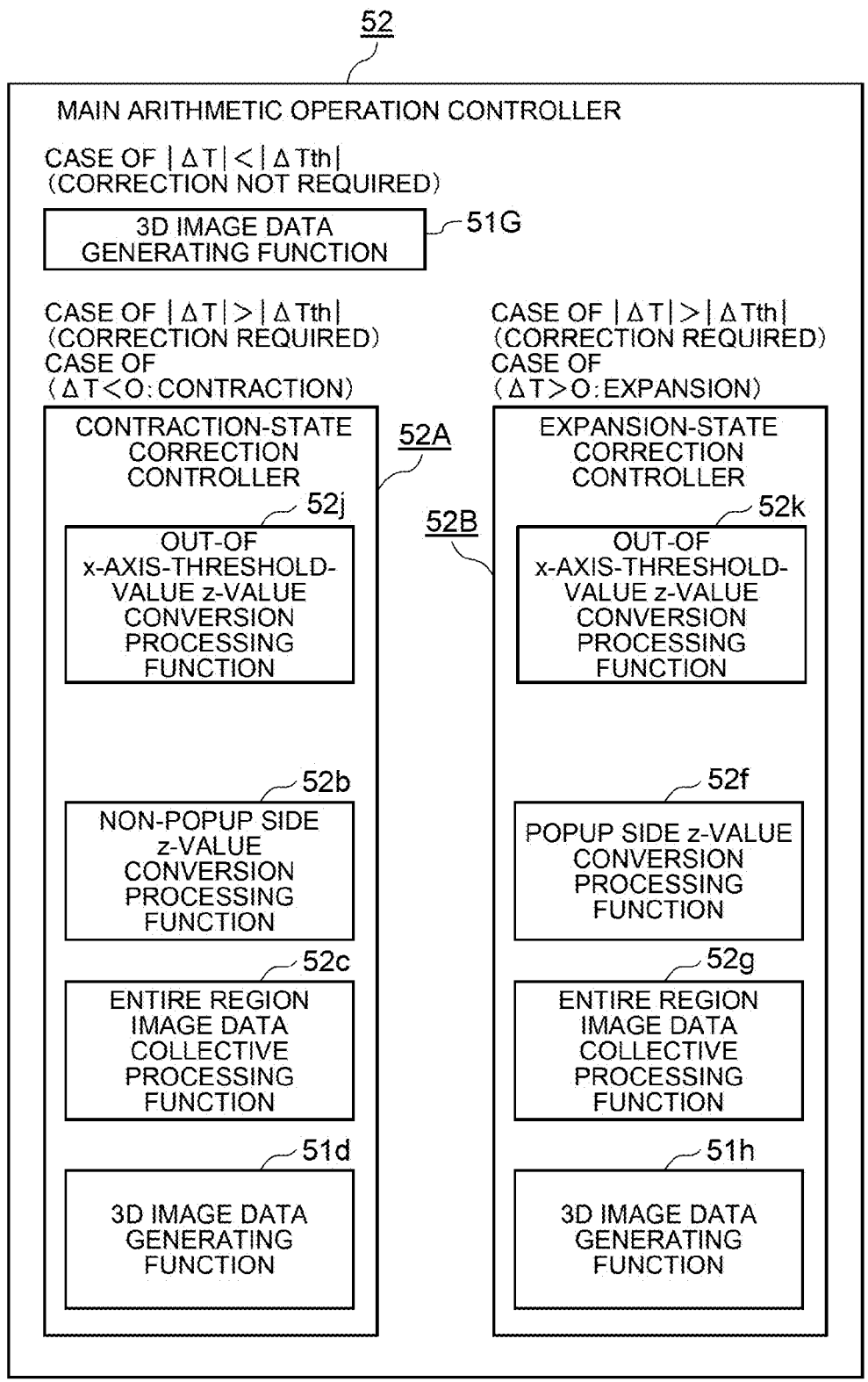

Further, FIG. 16C is a block diagram showing a main part (main arithmetic operation controller) 52 of a modification example of the second exemplary embodiment.

Note here that same reference numerals are used for the same structural members as those of the first exemplary embodiment.

The second exemplary embodiment is characterized to restrict the camera setting when performing the rendering processing on the three-dimensional data of the object having the depth information that is used in the first exemplary embodiment by the extent of a threshold value (reference value) xth regarding the parallax on the x-axis that is set in accordance with the extent of the difference ΔT.

Hereinafter, this will be provided by taking the contents depicted in the first exemplary embodiment as a presupposition.

(Structure)

First, as in the case of the first exemplary embodiment, the stereoscopic display device according to the second exemplary embodiment includes the display controller 50 which drive-controls the stereoscopic display panel 11. The display controller 50 is provided with the stereoscopic image generating module 50A having the main arithmetic operation controller 51 for restricting the actions of each of the entire structural elements to be described later.

As in the case of the first exemplary embodiment, the main arithmetic operation controller 51 is provided with an x-position threshold value setting section 50B which, when it is judged by the temperature difference judging section 30 that the temperature difference ΔT is |ΔT|>|ΔTth| and it is under a temperature environment that requires correction of the parallax amount, sets the threshold value xth on the x-axis directly related to the correction of the parallax amount to be smaller as the value of the difference ΔT becomes larger, as the threshold value xth which makes it possible to secure the stereoscopic viewing region that changes according to the extent of the temperature difference ΔT.

Further, in order to execute the correction of the parallax amount promptly and accurately, the above-described main arithmetic operation controller 51 is provided with a correction environment judging section 29 which makes judgment whether the lenticular lens 1 as the image distributing module is in a state of ΔT<0 showing a contraction state or a state of ΔT>0 showing an expansion state.

Further, as in the case of the first exemplary embodiment described above, the main arithmetic operation controller 51 includes: a contraction-state correction controller 51A which operates in a case where |ΔT|>|ΔTth| is satisfied and the temperature difference is ΔT is ΔT<0 (when the lenticular lens 1 is being contracted); and an expansion-state correction controller 51B which operates in a case where |ΔT|>|ΔTth| is satisfied and the temperature difference is ΔT is ΔT>0 (when the lenticular lens 1 is being expanded).

Out of those, the contraction-state correction controller 51A executes three data processing functions shown below different from the case of the first exemplary embodiment and synthesizes those to output the 3D image data (synthesized image data) for driving the display panel.

That is, the contraction-state correction controller 51A constituting a part of the main arithmetic operation controller 51 includes an out-of x-axis threshold value image data processing function 51*j* which operates when it is judged by the temperature environment judging section 28 that the temperature difference ΔT is ΔT<0 and the lenticular lens 1 (image distributing module) is in a contraction state to specify the coordinate position x of the object on the x-axis, and to perform rendering processing on the three-dimensional data of the object that satisfies |x|>|xth| under a condition of a fourth camera setting D that has a narrower included angle than the included angle of the first camera setting A.

Further, the contraction-state correction controller 51A includes a popup side image data processing function 51*a* which, regarding the object of the case where the temperature difference ΔT is ΔT<0 and |x|≤|xth| is satisfied, further judges whether or not the depth position z of the object is z≥0 on the popup side and, when judged as z≥0, performs rendering processing on the three-dimensional data of z≥0 under the condition of the first camera setting A.

Furthermore, the contraction-state correction controller 51A includes a non-popup side image data processing function 51*b* which, regarding the object of the case where the temperature difference ΔT is ΔT<0 and |x|≤|xth| is satisfied, further judges whether or not the depth position z of the object is z≥0 on the popup side and, when judged as z<0, performs rendering processing on the three-dimensional data of z<0 under the condition of the second camera setting B.

Further, the contraction-state correction controller 51A includes: an image data synthesizing function 51*c* which performs synthesizing processing of each image data on which rendering processing is performed by the out-of x-axis threshold value image data processing function 51*j*, the popup side image data processing function 51*a*, and the non-popup side image data processing function 51*b*; and a 3D image data generating function 51*d* which generates 3D image data based on the synthesized image data, and outputs it for driving the display panel.

Thereby, as in the case of the first exemplary embodiment described above, when the lenticular lens 1 is in a contraction state, the correction control can be done by following the change in the temperature since it is designed to further add, to the synthesizing processing, the image data acquired by setting the prescribed camera setting by classifying the depth position z of the object to the popup side and non-popup side, performing synthesizing processing on the image data acquired thereby, and operating the out-of x-axis threshold value image data processing function 51*j*. This makes it possible to further decrease the influence of the changes in the temperature, so that the display control can be achieved more effectively than the case of the first exemplary embodiment described above.

Further, an expansion-state output controller 51B constituting a part of the main arithmetic operation controller 51 executes three data processing functions shown below and synthesizes those to effectively output the 3D image data (synthesized image data) for driving the display panel when the lenticular lens 1 is in an expansion state.

That is, the expansion-state output controller 51B includes an out-of x-axis threshold value image data processing function 51*k* which operates when it is judged by the correction environment judging section 29 that the temperature difference ΔT is LT>0 and the lenticular lens 1 (image distributing module) is in an expansion state to specify the coordinate position x of the object on the x-axis, and performs rendering processing on the three-dimensional data of the object that satisfies |x|>|xth| under a condition of a fifth camera setting E that has a narrower included angle than the included angle of the first camera setting A.

Further, the expansion-state output controller 51B includes a non-popup side image data processing function 51*e* which, regarding the object of the case where the temperature difference ΔT is ΔT>0 and |x|≤|xth| is satisfied, further judges whether or not the depth position z of the object is z<0 on the non-popup side and, when judged as z<0, performs rendering processing on the three-dimensional data of z<0 under the condition of the first camera setting A.

Furthermore, the expansion-state output controller 51B includes a popup side image data processing function 51*f* which, regarding the object of the case where the temperature difference ΔT is ΔT>0 and |x|<|xth| is satisfied, further judges whether or not the depth position z of the object is z≥0 on the popup side and, when judged as z≥0, performs rendering processing on the three-dimensional data of z≥0 under the condition of the third camera setting C.

Further, the contraction-state correction controller 51B constituting a part of the main arithmetic operation controller 51 includes: an image data synthesizing function 51*g* which performs synthesizing processing of each image data on which rendering processing is performed by the out-of x-axis threshold value image data processing function, the non-popup side image data processing function, and the popup side image data processing function; and a 3D image data generating function 51*h* which generates 3D image data based on the synthesized image data, and outputs it for driving the display panel.

Thereby, as in the case of the first exemplary embodiment described above, even when the lenticular lens 1 is in an expansion state, the correction control can be done by following the change in the temperature since it is designed to further add, to the synthesizing processing, the image data acquired by setting the prescribed camera setting by classifying the depth position z of the object to the popup side and non-popup side, performing synthesizing processing on the image data acquired thereby, and operating the out-of x-axis threshold value image data processing function 51*k*. This makes it possible to further decrease the influence of the changes in the temperature, so that the display control can be achieved more effectively than the case of the first exemplary embodiment described above.

Note here that the main arithmetic operation controller 51 described above is further provided with a depth image development processing section 22B which develops two-dimensional image information as an object image for the three-dimensional data regarding the object sent into the main arithmetic operation controller 51 and develops the depth information thereof (depth position) z as a depth image.

Further, the depth image development processing section 22B includes a gradation value specifying function which sets a gradation value for the three-dimensional data by corresponding to the depth information (depth position) by a pixel unit, and specifies value of the set gradation value by corresponding to the parallax amount of the two-dimensional image information specified on the x-axis.

Thereby, the depth information of the depth image can be effectively displayed as a 3D image in accordance with the actual circumstance.

Other structures are the same as those of the first exemplary embodiment described above.

(Overall Actions)

Next, the overall actions of the second exemplary embodiment will be described by referring to FIG. 17 to FIG. 18.

Figure 17:
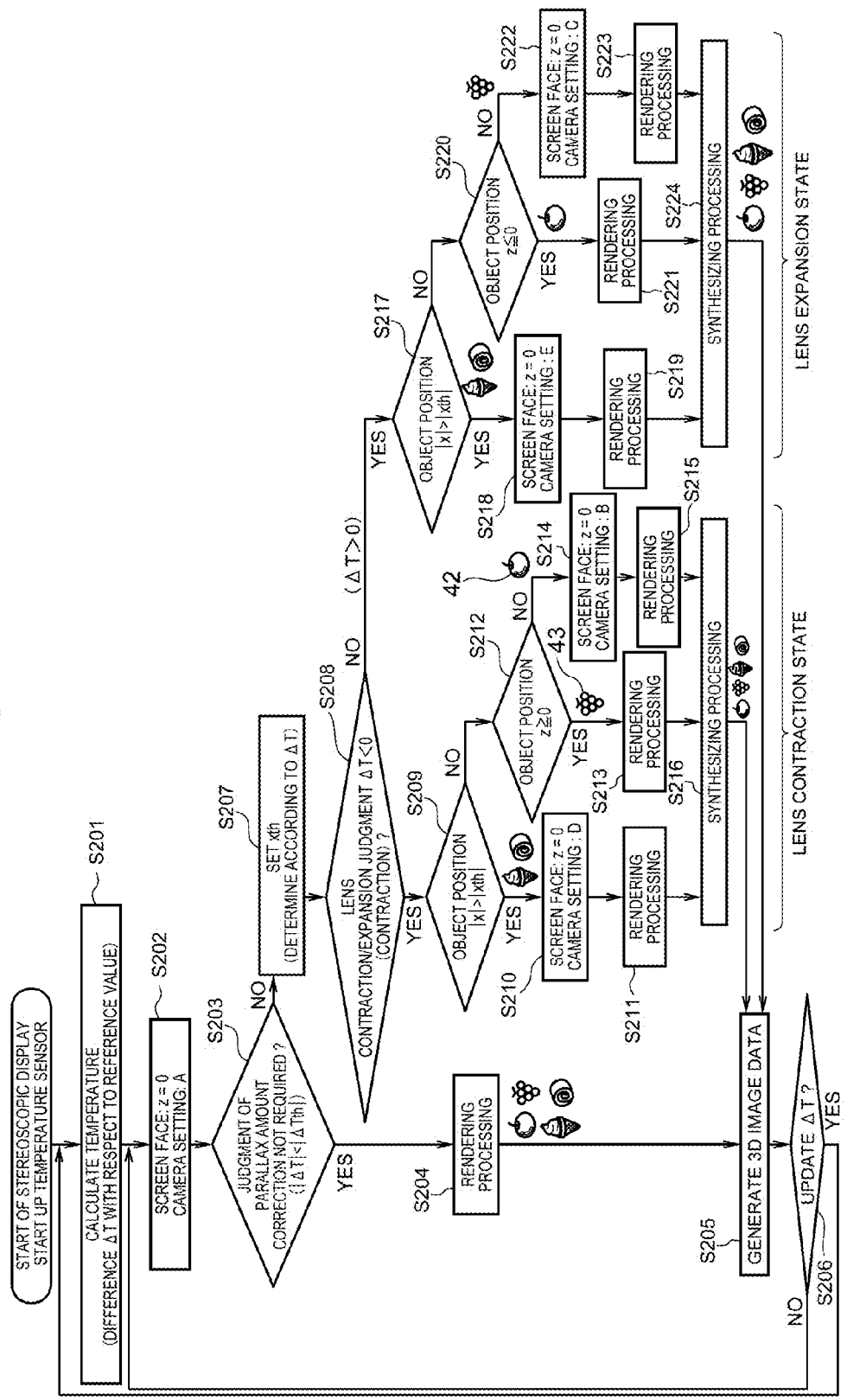
FIG. 17 is a flowchart showing an example of a 3D image data generating action according to the second exemplary embodiment disclosed in FIG. 16.

Note here that FIG. 17 is a flowchart showing an example of a 3D image data generating action of the second exemplary embodiment.

In FIG. 17, actions from step S201 to ST204 are the same as those of steps S101 to S104 described in FIG. 6.

That is, first, the temperature sensor 21 is started up, and the difference ΔT between the detected temperature T of the lenticular lens 1 and the reference temperature Tth (normal temperature in the first exemplary embodiment) set in advance is calculated by the deformation amount calculating section 28 (FIG. 17: step S201/temperature difference calculating step).

Subsequently, the screen face 40 and the camera setting (first camera setting A) as the condition required for the rendering processing are selected (FIG. 17: step S202).

Thereafter, each of the absolute values of the temperature difference ΔT and the judgment threshold value ΔTth set in advance is compared by the temperature difference judging section 30 to judge whether or not the correction of the parallax amount is necessary (FIG. 17: step S203/correction necessity judging step).

Figure 18A:
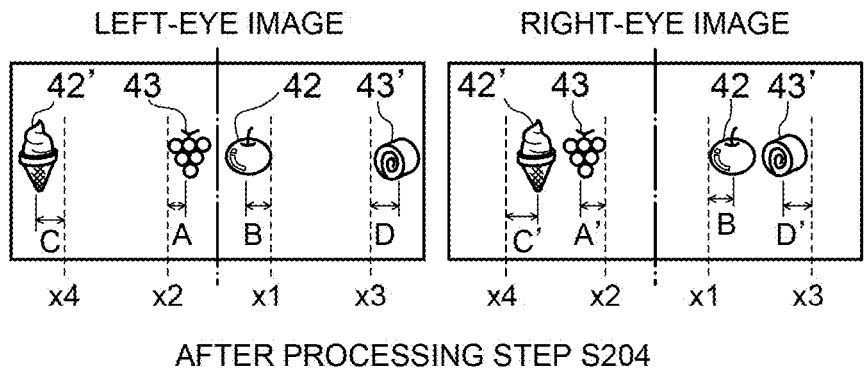
FIG. 18 is an explanatory chart showing an example of 3D image data having depth acquired by executing rendering processing in accordance with a lens contraction/expansion state by executing a generating action according to the flowchart of FIG. 17.

When judged as |ΔT|<|ΔTth|, the 3D image data generating function 51G is operated, as in the case of the first exemplary embodiment described above, and it is considered that the deformation amount of the lenticular lens 1 due to the change in the temperature is small and that the parallax amount correction is unnecessary. Thus, the three-dimensional data is immediately rendering-processed under the condition of the first camera setting A (FIG. 17: step S204/image processing step). Subsequently, it is converted to parallax images for driving the display panel, and the 3D image data as shown in FIG. 18A is generated and outputted (FIG. 17: step S205/3D image data generating step).

In the meantime, in a case where it is judged in the correction necessity judging step of step S203 as |ΔT|>|ΔTth|, the parallax amount correction is necessary. Thus, for correcting the parallax amount, in the second exemplary embodiment, the threshold value xth on the x-axis directly related to the correction of the parallax amount is set in a form that corresponds to the extent of the temperature difference ΔT described above.

That is, the threshold value xth on the x-axis is a threshold value that defines the first rendering processing range of the three-dimensional data (3D information) on the x-axis, and it is set to become smaller as the value of the temperature difference ΔT becomes larger (FIG. 17: step S207/x-position threshold value setting step). Setting of the threshold value xth on the x-axis is executed by the x-position threshold value setting section 52 based on a command from the main arithmetic operation controller 51.

Note here that the stereoscopic viewing region with respect to the use environmental temperature changed depending on the size of the 3D region as shown in the evaluation result (see FIG. 14) of the first exemplary embodiment described above.

For example, in a case where the reference temperature is 25° C. and the use environmental temperature is 0° C. (ΔT=−25° C.), the stereoscopic viewing region in the 85% 3D region is zero. Meanwhile, 60% of the stereoscopic viewing region is secured in the 40% 3D region.

As described, the 3D regions where the stereoscopic viewing region according to the extent of the temperature difference ΔT, i.e., the threshold value xth, can be secured in advance can be defined in a form of LUT (lookup table), a prescribed function, or the like. In a case where the position of the object as the target is at a position on the x-axis larger than the threshold value xth, used is the camera setting with which the parallax becomes as small as possible. Such camera setting is defined as the camera setting D and the camera setting E. This threshold value xth can be determined in accordance with the parameters regarding the stereoscopic viewing region defined based on the effective linear expansion coefficient difference inherent to the stereoscopic display panel, the panel size, the panel resolution, the reference temperature, the 3D crosstalk property, and the like. When the panel size is large in particular, it is effective to reduce the proportion of the threshold value xth with respect to the panel size.

Next, as in step S107 of FIG. 6, prior to correction of the parallax amount, it is shifted to execute judgment on the sign of ΔT (FIG. 17: step S208/correction environment judging step) in order to detect whether the lenticular lens 1 is in the direction of contraction or the direction of expansion.

The ΔT sign judging step is executed by the correction environment judging section 29.

Then, first, in a case where it is in a lens contraction state of ΔT<0, it is shifted to execute the judgment regarding the values of the position |x| of the object on the x-axis and |xth| (FIG. 17: step S209). Thereafter, the camera setting D is selected as the camera setting of the condition for performing the rendering processing on the three-dimensional data when the lenticular lens 1 is in a contraction state (FIG. 17: step S210).

Now, a case where |x1| and |x2| are smaller than |xth| and a case where |x3| and |x4| are larger than |xth| are assumed, respectively, for the respective x-axis positions x1, x2, x3, and x4 of the objects 42, 43, 43', and 42' of FIG. 18 as a way of example.

In this case, the procedure is advanced to step S210 of FIG. 17 when it is judged in step S209 described above that |x|>|xth| is satisfied, i.e., in a case of the objects 43' and 42' of FIG. 18.

Then, the camera setting D is selected in step S210, and the rendering processing is performed (FIG. 17: step S211) to acquire 3D image data regarding the objects 43 and 42.

That is, when it is judged in the correction environment judging step (FIG. 17: step S208) that the temperature difference ΔT is ΔT<0 and the lenticular lens 1 is in a contraction state, the coordinate position x of the object on the x-axis is specified, and the rendering processing is performed on the three-dimensional data of the object that satisfies |x|>|xth| under the condition of the fourth camera setting D that has a narrower included angle than the included angle of the first camera setting A (FIG. 17: step S211/out-of x-axis threshold value image data processing step). Thereby, the 3D image data regarding the objects 43' and 42' can be acquired as shown in FIG. 18.

Then, the objects 42 and 43 of the case where the temperature difference ΔT is ΔT<0 and |x|≤|xth| is satisfied are checked and specified with the judgment of step S209 of FIG. 17. Regarding each of the objects 42 and 43, it is further judged whether or not the depth position z of the object is z≥0 on the popup side (FIG. 17: step S212).

When judged as z≥0, rendering processing is performed on the three-dimensional data of the object 43 that satisfies z≥0 under the condition of the first camera setting A (FIG. 17: step S213/popup-side image data processing step). Thereby, the 3D image data regarding the object 43 can be acquired as shown in FIG. 18.

Furthermore, regarding the objects 42 and 43 of the case where the temperature difference ΔT is ΔT<0 and |x|≤|xth| is satisfied, it is further judged whether or not the depth position z of the object is z≥0 on the popup side (FIG. 17: step S212). When judged in step S212 that the depth position z of the object 42 is z<0 on the non-popup side, rendering processing is performed on the three-dimensional data of the object 42 that satisfies z<0 under the condition of the second camera setting B (FIG. 17: steps S214, S215/non-popup side image data processing step).

Thereby, the 3D image data regarding the object 42 can be acquired as shown in FIG. 18.

Figure 18B:
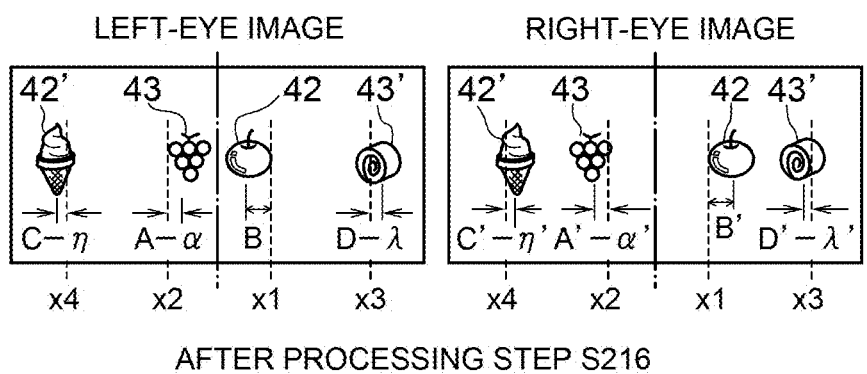

Subsequently, each piece of the image data 43, 42, 43, and 42 acquired by performing the rendering processing in the out-of x-axis threshold value image data processing step, the popup side image data processing step, and the non-popup side image data processing step is synthesized (FIG. 17: step S216/image data synthesizing step), and the 3D image data for driving the display panel shown in FIG. 18B is generated based on the synthesized image data (FIG. 17: step S205/3D image data generating step).

In the case where the z-values (the depth on the z-axis) are the same between the objects 42 and 42 and between the objects 43 and 43, respectively, the parallax C–η, C'–η' and D–λ, D'–λ' under |x|>|xth| are smaller than A–α, A'–α' under |x|≤|xth|.

Then, when it is judged in step S208 of FIG. 17 as being in a lens expansion state of ΔT>0, it is shifted to execute the judgment regarding the values of the position |x| of the object on the x-axis and |xth| (step S217). The same processing as the case of the lens contraction state (step S207 to step S209) is executed in step S217 to S219, while a part of the camera setting is different.

That is, when it is judged in the correction environment judging step (FIG. 17: step S208) that the temperature difference ΔT is ΔT>0 and in an expansion state, the coordinate position x of the object on the x-axis is specified, and the fourth camera setting E that has a narrower included angle than the included angle of the first camera setting A is set (FIG. 17: step S218) for the objects 42' and 43' judged to satisfy |x|>|xth| (FIG. 17: S217). Then, the rendering processing is performed on the three-dimensional data corresponding thereto (FIG. 17: step S219/out-of x-axis threshold value image data processing step). Thereby, the 3D image data regarding the objects 42' and 43' can be acquired as shown in FIG. 18C.

Then, regarding the objects 42 and 43 of the case where the temperature difference ΔT is ΔT>0 and |x|≤|xth| is satisfied, it is judged whether or not the depth position z of the object is z<0 on the non-popup side (FIG. 17: step S220). When judged as z<0, rendering processing is performed on the three-dimensional data of the object that satisfies z<0 under the condition of the first camera setting A (FIG. 17: step S221/non-popup side image data processing step).

Figure 18C:
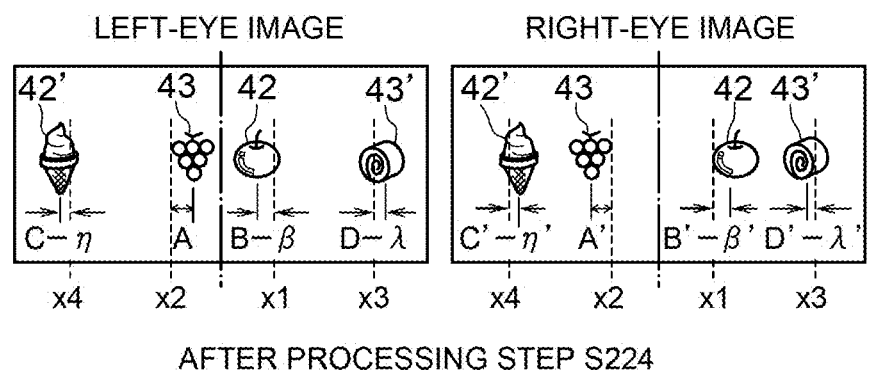

Thereby, the 3D image data regarding the object 42 can be acquired as shown in FIG. 18C.

Similarly, regarding the objects 42 and 43 of the case where the temperature difference ΔT is ΔT≥0 and |x|≤|xth| is satisfied, it is judged whether or not the depth position z of the object is z≥0 on the popup side (FIG. 17: step S220). The third camera setting C corresponding thereto is set for the object 43 that is judged to satisfy z≥0, (FIG. 17: step S222), and rendering processing is performed on the three-dimensional data of the object 43 under the condition of the third camera setting C (FIG. 17: steps S223/popup side image data processing step). Thereby, the 3D image data regarding the object 43 can be acquired as shown in FIG. 18C.

Then, each piece of the image data 43, 42, 43, and 42 acquired by performing the rendering processing in the out-of x-axis threshold value image data processing step, the non-popup side image data processing step, and the popup side image data processing step is synthesized (FIG. 17: step S224/image data synthesizing processing step), and the 3D image data for driving the display panel shown in FIG. 18C is generated based on the synthesized image data (FIG. 17: step S205/3D image data generating step).

In the overall actions of the second exemplary embodiment described above, when the z-values are the same between the objects 42 and 42 and between the objects 43 and 43, respectively, the parallax C–η, C'–η' and D–λ, D'–λ' under |x|>|xth| are smaller than B–β, B'–β' under |x|≤|xth|.

The actions of each of the data processing, the comparison judgment, and the like from step S201 to steps S224 and S305 in the overall actions of the second exemplary embodiment described above may be put into a program to have it achieved by a computer provided to the stereoscopic image generating module 50A.

Other structures and the operation effects thereof are the same as the case of the first exemplary embodiment described above.

The second exemplary embodiment is structured and functions in the manner described above, so that it has the operation effects equivalent to that of the first exemplary embodiment. Further, since the parallax threshold value (reference value) xth on the x-axis is provided, it is possible to promptly correspond to the change in the parallax amount particularly in the left and right directions. This makes it possible to perform correction of the temperature by corresponding to the actual circumstances in a finer manner.

Further, while the case of performing development into the parallax image by the rendering processing is disclosed in the second exemplary embodiment, the present invention is not limited only to that. As in the case of the first exemplary embodiment described above, it is also possible to perform development into a depth image.

Further, in the case of the second exemplary embodiment, it is defined not to increase the parallax amount by corresponding to ΔT for the outer side of the angle of view. Thus, there is an effect that the stereoscopic viewing region can be secured at all times even when the use environmental temperature T changes largely. In particular, when the panel size is large, the panel width becomes larger compared to the interpupillary distance IPD. Thus, the influence of the temperature changes in the outer end of the panel becomes still greater. However, in that case, it is very effective to reduce the proportion of the threshold value xth for the panel size for securing the stereoscopic viewing region. Further, since the parallax amount control is executed for a specific parallax direction according to the use environmental temperature T, there is an effect of making it possible to secure the stereoscopic viewing region without losing the ambience.

Further, while a case of 2-viewpoints regarding the number of viewpoints is disclosed in the second exemplary embodiment, the present invention is not limited only to that. The present invention can be employed also to the case of N-viewpoints in the same manner.

(Modification Example)

Next, a modification example of the second exemplary embodiment will be described by referring to FIG. 16C.

Note here that same reference numerals are used for the same structural members as those of the second exemplary embodiment.

FIG. 16C is a block diagram showing each structural element of a main arithmetic operation controller 52 according to the modification example of the second exemplary embodiment.

In the second exemplary embodiment described above, as shown in FIG. 16B, the contraction-state correction controller 51A of the main arithmetic operation controller 51 executes the rendering processing under the fourth camera setting D having a narrower included angle than the included angle between the camera optical axis and the z-axis in the first camera setting A regarding the out-of x-axis threshold value image data processing function 51$j$ (see FIG. 17: steps S210, S211), executes the rendering processing under the first camera setting A regarding the popup-side image data processing function 31$a$ (see FIG. 17: step S213), and executes the rendering processing under the second camera setting B in which the included angle is smaller than the included angle formed between the camera optical axis and the z-axis in the first camera setting A regarding the non-popup image data processing function 51$b$ (see FIG. 17: steps S214, S215).

Meanwhile, in the modification example, as shown in FIG. 16C, a contraction-state correction controller 52A of a main arithmetic operation controller 52 is characterized to include an out-of x-threshold-value z-value conversion processing function 52$j$ instead of the out-of x-threshold-value image data processing function 51$j$ and includes a non-popup side z-value conversion processing function 52$b$ instead of the non-popup side image data processing function 51$b$ described above.

Regarding those z-value conversion processing functions, the former out-of x-threshold-value z-value conversion processing function 52$j$ performs z-value conversion (in the direction the value becomes smaller than the original z-value) by multiplying a correction coefficient γ to |z| regardless of the sign of the z-value for the object that satisfies |x|>|xth|. Further, the latter non-popup side image data processing function 52$b$ performs z-value conversion (in the direction the value becomes smaller than the original z-value) by multiplying a correction coefficient δ to |z| of the object that satisfies |x|≤|xth| and z<0.

The correction coefficient γ in the out-of x-threshold-value z-value conversion processing function 52$j$ is less than a numerical value "1", and it can be determined based on the included angle information of the first camera setting A and the included angle information of the second camera setting D. Further, the correction coefficient δ in the non-popup side image data processing function 52$b$ is also less than a numerical value "1", and it can be determined based on the included angle information of the first camera setting A and the included angle information of the second camera setting B. Furthermore, the values of the correction coefficients γ and δ are not limited only to those. It is possible to define the coefficients as constant values regardless of the extent of the z-value as long as those are within a range with which the stereoscopic visibility is not deteriorated for the temperature change. Alternatively, it is also possible to change the coefficients linearly or nonlinearly depending on the extent of the z-value.

Further, instead of the image data synthesizing function 51$c$ disclosed in FIG. 16B of the second exemplary embodiment, this modification example is provided with an entire region image data collective data processing function 52$c$ which executes rendering processing for the popup side that satisfies |x|≤|xth|, the non-popup side whose z-value is being converted, and the out-of x-threshold-value z-value conversion processing function 52$j$ that satisfies |x|>|xth| by using a same camera setting (e.g., the first camera setting A) as shown in FIG. 16C. Therefore, the image data synthesizing function 51$c$ shown in FIG. 16B of the first exemplary embodiment becomes unnecessary.

Further, in this modification example, the expansion-state correction controller 51B of the second exemplary embodiment described above is also employed. Instead of the expansion-state correction controller 51B, an expansion-state correction controller 52B is provided.

That is, in this modification example, as shown in FIG. 16C, the expansion-state correction controller 52B of the main arithmetic operation controller 32 is characterized to include an out-of x-threshold-value z-value conversion processing function 52$k$ instead of the out-of x-threshold-value image data processing function 51$k$, and to include a popup-side z-value conversion processing function 52$f$ instead of the popup side image data processing function 51$f$ described above. Compared to the contraction-state correction controller 51A, the z-value conversion processing function is the same except that the target object of the popup-side z-value conversion processing function 52$f$ satisfies z≥0.

In other words, employed is the structure which includes the out-of x-threshold-value z-value conversion processing function 52$k$ which performs z-value conversion on the object that satisfies |x|<|xth| by multiplying a correction coefficient ε to |z| value in the direction that makes it smaller than the original z-value instead of the out-of x-threshold-value image data processing function 51$k$, and further includes the popup-side z-value conversion processing function 52$f$ which performs z-value conversion on the object that satisfies |x|≥|xth| and z≥0 by multiplying a correction coefficient ζ to |z| value in the direction that makes it smaller than the original z-value instead of the popup side image data processing function 51$f$ described above.

Further, instead of the 3D image data synthesizing function 51g disclosed in FIG. 16B of the second exemplary embodiment, the expansion-state correction controller 51B of this modification example is provided with the entire region image data collective data processing function 52g which executes rendering processing by using a same camera setting (e.g., the first camera setting A) as shown in FIG. 16C.

Thereby, it becomes unnecessary to change the camera setting among the out-of x-threshold-value z-value conversion processing function 52j, the popup-side image data processing function 51a, and the non-popup side z-value conversion processing function 52b of the contraction-state correction controller 52A and among the out-of x-threshold-value z-value conversion processing function 52k, the non-popup side image data processing function 51e, and the popup-side z-value conversion processing function 52f of the expansion-state correction controller 52B, respectively. Further, the image data synthesizing function becomes unnecessary. Therefore, load on the system side (particularly the main arithmetic operation controller) can be lightened greatly, and the speed of the image processing can be increased as well.

Other structures and the operation effects thereof are the same as the case of the second exemplary embodiment described above.

(Third Exemplary Embodiment)

Next, a third exemplary embodiment of the present invention and modifications examples (1) and (2) thereof will be described by referring to FIG. 19 to FIG. 25.

Note here that same reference numerals are used for the same structural members as those of the first exemplary embodiment.

The third exemplary embodiment is characterized to restrict the camera setting when performing the rendering processing on the three-dimensional data of the object having the depth information that is used in the first exemplary embodiment by the extent of a threshold value (reference value) xth regarding the parallax on the x-axis that is set in accordance with the extent of the difference ΔT, and to perform 2D rendering processing so as to synthesize each piece of those data when exceeding the threshold value.

Hereinafter, this will be described by taking the contents depicted in the first exemplary embodiment as a presupposition.

The entire contents of the third exemplary embodiment will be described first, and the two modification examples of the third exemplary embodiment will be described thereafter.

(Structure)

As in the case of the first exemplary embodiment, the stereoscopic display device according to the third exemplary embodiment includes a display controller 60 which drive-controls the stereoscopic display panel 11. The display controller 60 is provided with a stereoscopic image generating module 60A having a main arithmetic operation controller 61 for restricting the actions of each of the entire structural elements to be described later (see FIG. 19A).

As in the case of the second exemplary embodiment, the main arithmetic operation controller 61 is provided with an x-position threshold value setting section 50B which sets a threshold value xth on the x-axis used for correction.

The x-position threshold value setting section 50B functions to set the threshold value (correction reference value) xth on x-axis when it is judged by the temperature difference judging section 30 that the temperature difference ΔT is |ΔT|>|ΔTth| and it is under a temperature environment that requires correction of the parallax amount. The threshold value (correction reference value) xth is the threshold value xth on the x-axis which makes it possible to secure the stereoscopic viewing region that changes according to the extent of the temperature difference ΔT, and it is set to become smaller as the value of the difference ΔT becomes larger.

Further, as in the cases of each of the first and second exemplary embodiments, the above-described main arithmetic operation controller 61 is provided with a correction environment judging section 29 which operates when it is judged by the temperature difference judging section 30 that the temperature difference ΔT is |ΔT|>|ΔTth| and it is under a temperature environment that requires correction of the parallax amount to make judgment whether the lenticular lens 1 is in a state of ΔT<0 showing a contraction state or a state of ΔT>0 showing an expansion state in order to execute correction of the parallax amount promptly and accurately according to the circumstances.

Further, as in the cases of each of the first and second exemplary embodiments, the main arithmetic operation controller 61 includes: a contraction-state correction controller 61A which is executed when the lenticular lens 1 is contracted (a state where ΔT<0); and an expansion-state correction controller 61B which is executed when the lenticular lens 1 is expanded (a state where ΔT>0).

Among those, the contraction-state correction controller 61A executes three data processing functions shown below different from each of the cases of the first and second exemplary embodiments and synthesizes those to output the 3D image data (synthesized image data) for driving the display panel.

That is, the contraction-state correction controller 61A constituting a part of the main arithmetic operation controller 61 includes a 2D image data processing function 61j which: operates when it is judged by the temperature environment judging section 29 that the temperature difference ΔT is ΔT<0 (the lenticular lens 1 is in a contraction state) to specify the coordinate position x of the object on the x-axis; and, regarding the object that satisfies |x|>|xth|, performs rendering processing on the two-dimensional data under a two-dimensional camera setting of a single camera that is set anew along the z-axis instead of the three-dimensional data.

Further, the contraction-state correction controller 61A includes a popup side image data processing function 61a which: regarding the object of the case where the temperature difference ΔT is ΔT<0 (a state where the lens 1 is contracted) and |x|≤|xth| is satisfied, further judges whether or not the depth position z of the object is z≥0 on the popup side; and when judged as z≥0, immediately starts up to perform rendering processing on the three-dimensional data under the condition of the first camera setting A.

Furthermore, the contraction-state correction controller 61A includes a non-popup side image data processing function 61b which: regarding the object of the case where the temperature difference ΔT is ΔT<0 and |x|≤|xth| is satisfied, further judges whether or not the depth position z of the object is z≥0 on the popup side; and when judged as z<0, performs rendering processing on the three-dimensional data of z<0 under the condition of the second camera setting B.

Further, the contraction-state correction controller 61A constituting a part of the main arithmetic operation controller 61 includes: an image data synthesizing function 61c which performs synthesizing processing of each image data on which rendering processing is performed by the 2D image data processing function 61j, the popup side image data processing function 61a, and the non-popup side image data processing function 61b; and a 3D image data generating function 61d which generates 3D image data based on the synthesized image data, and outputs it for driving the display panel.

Thereby, even when the lenticular lens 1 is in a contraction state, it is possible to correspond to the change in the temperature of the three-dimensional data of the object located on the popup side and the non-popup side and to correct it effectively. This makes it possible to effectively drive the display panel 11 by the 3D image data containing the 2D image data as will be described later.

Further, the contraction-state correction controller 61B is also structured to specify with the same reference as that of the case of the contraction-state correction controller 61A, to execute three data processing functions shown below, and to synthesize those to output the 3D image data (synthesized image data) for driving the display panel.

That is, the contraction-state correction controller 61B constituting a part of the main arithmetic operation controller 61 includes a 2D image data processing function 61k which: operates when it is judged by the temperature environment judging section 29 that the temperature difference ΔT is ΔT>0 and in an expansion state to specify the coordinate position x of the object on the x-axis; and, regarding the object that satisfies |x|>|xth|, performs 2D rendering processing on the three-dimensional data under a two-dimensional camera setting that corresponds to a single camera that is set along the z-axis instead of the three-dimensional data.

Further, the expansion-state correction controller 61B includes a non-popup side image data processing function 61e which: regarding the object of the case where the temperature difference ΔT is ΔT>0 and |x|≤|xth| is satisfied, further judges whether or not the depth position z of the object is z<0 on the non-popup side; and when judged as z<0, immediately starts up to perform rendering processing on the three-dimensional data under the condition of the first camera setting A.

Furthermore, the expansion-state correction controller 61B includes a popup side image data processing function 61f which: regarding the object of the case where the temperature difference ΔT is ΔT>0 and |x|≤|xth| is satisfied, further judges whether or not the depth position z of the object is z≥0 on the popup side; and when judged as z≥0, performs rendering processing on the three-dimensional data of z≥0 under the condition of the third camera setting C.

Further, the expansion-state correction controller 61B includes: an image data synthesizing processing function 61g which performs synthesizing processing of each image data on which rendering processing is performed by the 2D image data processing function 61k, the non-popup side image data processing function 61e, and the popup side image data processing function 61f; and a 3D image data generating function 61h which generates 3D image data based on the synthesized image data, and outputs it for driving the display panel.

Thereby, even when the lenticular lens 1 is in an expansion state, it is possible to correspond to the change in the temperature of the three-dimensional data of the object located on the popup side and the non-popup side and to correct it effectively. This makes it possible to effectively drive the display panel 11 by the 3D image data containing the 2D image data as will be described later.

Further, the main arithmetic operation controller 61 of the third exemplary embodiment is also provided with a depth image development processing section 22B which develops the two-dimensional image information of the three-dimensional data regarding the object sent into the main arithmetic operation controller 61 as an object image and the depth information (depth position) as a depth image. Further, as in the case of the first exemplary embodiment, the depth image development processing section 22B has a gradation value specifying function which sets gradation values corresponding to the depth information (depth position) by the pixel unit and specifies the set gradation values by corresponding to the parallax amount specified on the x-axis, and it is mounted to effectively function for both the contraction-state correction controller 61A and the expansion-state correction controller 61B.

Other structures are the same as the case of the first exemplary embodiment described above.

(Overall Actions)

Next, the overall actions of the third exemplary embodiment will be described by referring to FIG. 20 to FIG. 22.

Figure 20:
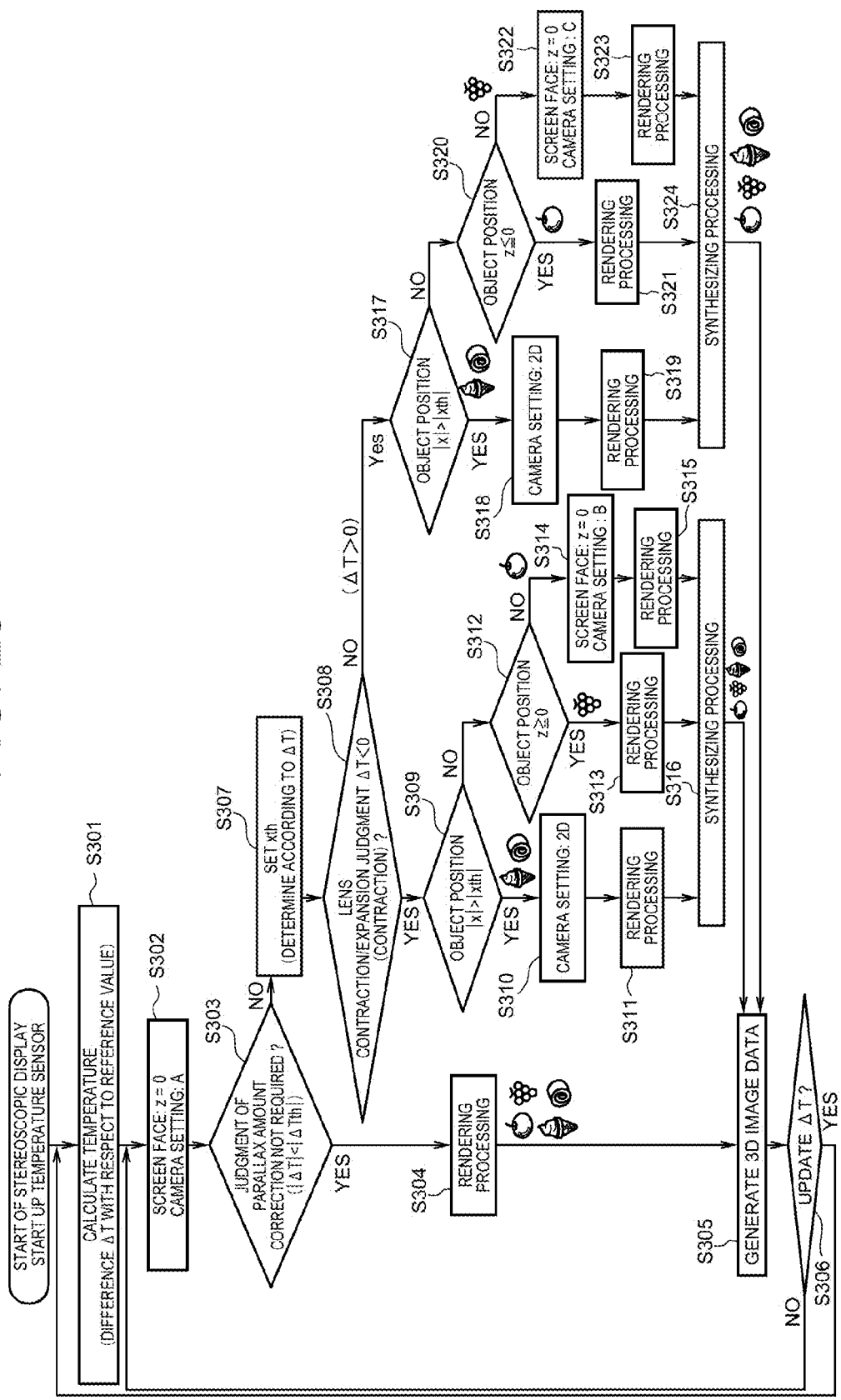
FIG. 20 is a flowchart showing an example of a 3D image data generating action including 2D rendering processing according to the third exemplary embodiment disclosed in FIG. 19.

Note here that FIG. 20 is a flowchart showing an example of a 3D image data generating action of the third exemplary embodiment.

In FIG. 20, actions from step S301 to S305 are the same as those of steps S101 to S105 disclosed in FIG. 6 of the first exemplary embodiment described above.

That is, first, the temperature sensor 21 is started up, and the difference ΔT between the detected temperature T of the lenticular lens 1 and the reference temperature Tth (normal temperature in the first exemplary embodiment) set in advance is calculated by the deformation amount calculating section 28 (FIG. 20: step S301/temperature difference calculating step). Subsequently, the screen face 40 and the camera setting (first camera setting A) as the condition required for the rendering processing are specified (FIG. 20: step S302).

Thereafter, each of the absolute values of the temperature difference ΔT and the judgment threshold value ΔTth set in advance is compared by the temperature difference judging section 30 to judge whether or not the correction of the parallax amount is necessary (FIG. 20: step S303/correction necessity judging step).

Figure 22A:
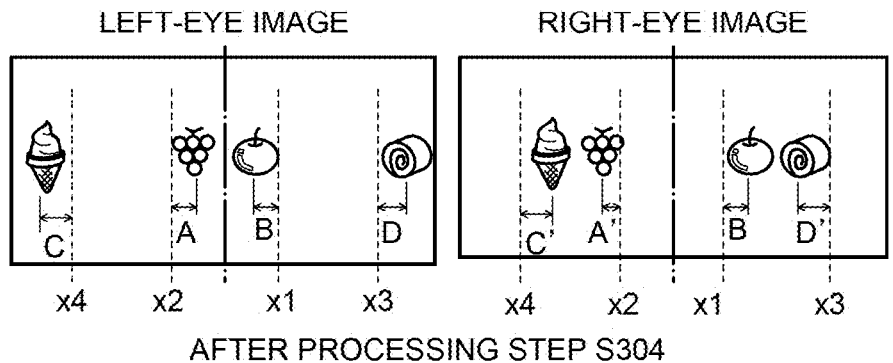
FIG. 22 is an explanatory chart showing an example of 3D image data having depth acquired by executing rendering processing in accordance with a lens contraction/expansion state in the 3D image data generating action according to the third exemplary embodiment shown in FIG. 20.

When judged as |ΔT|≤|ΔTth|, the 3D image data generating function 51G is operated and it is considered that the change in the temperature of the lenticular lens 1 is small and that the parallax amount correction is unnecessary. Thus, the three-dimensional data is immediately rendering-processed under the condition of the first camera setting A (FIG. 20: step S304/image processing step). Subsequently, it is converted to parallax images for driving the display panel, and the 3D image data as shown in FIG. 22A is generated and outputted (FIG. 20: step S305/3D image data generating step).

In the meantime, in a case where it is judged in the correction necessity judging step of step S303 in FIG. 20 as |ΔT|>|ΔTth|, the parallax amount correction is necessary. Thus, the threshold value xth is set according to the extent of the temperature difference ΔT described above (FIG. 20: step S307). As disclosed also in the second exemplary embodiment, the threshold value xth is a threshold value that defines the range of the 3D rendering processing on the x-axis.

Note here that the stereoscopic viewing region with respect to the use environmental temperature changed depending on the size of the 3D region as shown FIG. 14 of the first exemplary embodiment described above. For example, in a case where the reference temperature is 25° C. and the use environmental temperature is 0° C. (ΔT=−25° C.), the stereoscopic viewing region in the 85% 3D region is zero. Meanwhile, 60% of the stereoscopic viewing region is secured in the 40% 3D region.

As described, the 3D regions where the stereoscopic viewing region according to the extent of the temperature difference ΔT, i.e., the threshold value xth, can be defined in advance in a form of LUT (lookup table), a prescribed function, or the like.

Next, as in step S107 of FIG. 6, it is shifted to execute judgment on the sign of the temperature difference ΔT (FIG. 20: step S308/correction environment judging step) in order to detect whether the lens is in the direction of contraction or the direction of expansion. The judgment of the sign of the temperature difference ΔT is executed by the correction environment judging section 29.

In a case where ΔT<0, the lens is in a contraction state. Thus, it is immediately shifted to make judgment regarding values of the position |x| of the object on the x-axis and |xth| of the threshold value xth (FIG. 20: step S309).

Figure 21:
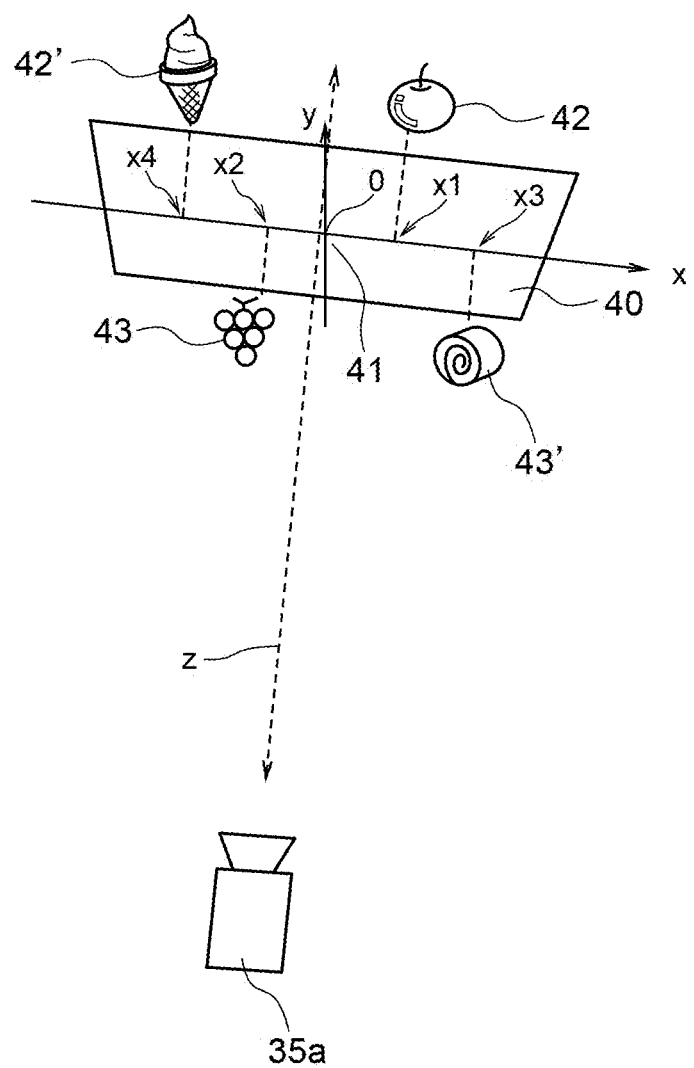
FIG. 21 is an explanatory chart showing a 2D image data generation structure in 2D rendering processing executed partially within the 3D image data generating action shown in FIG. 20.

In the third exemplary embodiment, it is so defined that |x1| and |x2| are smaller than |xth|, and |x3| and |x4| are larger than |xth| for the respective x-axis positions x1, x2, x3, and x4 of the objects 42, 43, 43, and 42 of FIG. 21 as a way of example.

In this condition, the cameras are set to 2D (for two-dimensional data) as the camera setting condition when it is judged in step S309 that |x|>|xth| is satisfied, i.e., in a case of the objects 43' and 42' (FIG. 20: step S310). The camera setting 2D in step S310 is set so that the camera optical axis becomes in parallel to the z-axis as shown in FIG. 21, and the rendering processing is performed on the two-dimensional data specified thereby (FIG. 20: step S311) to acquire 2D image data of the objects 42' and 43'.

The above contents can be summarized as follows.

That is, when it is judged in the correction necessity judging step (FIG. 20: step S303) that the temperature difference ΔT is |ΔT|>|ΔTth| and in a temperature environment that requires correction of the parallax amount, the threshold value xth on the x-axis which makes it possible to secure the stereoscopic viewing region that changes according to the extent of the temperature difference ΔT is set next in the third exemplary embodiment.

The threshold value xth is set to become smaller as the value of the absolute value of ΔT described above becomes larger (FIG. 20: step S307/x-position threshold value setting step).

Then, when the threshold value xth required for correcting the parallax amount is set, first, the correction environment judging section 29 judges whether the lenticular lens 1 is in a state of ΔT<0 showing a contraction state or in a state of ΔT>0 showing an expansion state (FIG. 20: step S308/correction environment judging step) in order to embody the parallax amount and the correction thereof.

When it is judged in the correction environment judging step of step S308 that the temperature difference ΔT is ΔT<0 and the lenticular lens 1 is in a contraction state, the coordinate position x of the object on the x-axis is specified.

Then, the specified coordinate position x of the object on the x-axis is compared with the reference value xth (FIG. 20: step S309). Regarding the objects 42' and 43' that satisfy |x|>|xth|, two-dimensional data is specified by the two-dimensional camera setting 2D which corresponds to a single camera set along the z-axis instead of the three-dimensional data (FIG. 20: step S310). At the same time, rendering processing is performed on the specified two-dimensional data to acquire the 2D image data regarding the objects 42' and 43' (FIG. 20: step S311/2D image data processing step).

Then, the object judged to satisfy |x|≤|xth| by comparing the coordinate position x of the object on the x-axis with the reference value xth is subjected to judgment of the position on the z-axis (FIG. 20: step S312). In this case, the objects 42 and 43 are the targets.

For the processing hereafter (FIG. 20: step S312 to step S315), almost the same processing of step S108 to step S111 shown in FIG. 6 of the first exemplary embodiment is executed as a whole even though a part of the camera setting condition for specifying the information is different.

That is, for the object of a case where the temperature difference ΔT is ΔT<0 and |x|≤|xth| is satisfied, it is further judged whether or not the depth position x of the object is z≥0 (FIG. 20: S312). Then, the rendering processing is performed on the object 43 judged as z≥0 regarding the three-dimensional data specified by the first camera setting A (FIG. 20: step S313/popup side image data processing step).

Then, when it is judged that the depth position z of the object is z<0 on the non-popup side by the judgment regarding whether or not the depth position z of the object is z≥0 (FIG. 20: step S312) under the same condition where the temperature difference ΔT is ΔT<0 and |c|≤|xth| is satisfied, the three-dimensional data of the object 42 by the second camera setting B is specified (FIG. 20: step S314). At the same time, rendering processing is performed on the three-dimensional data under the condition of the second camera setting B (FIG. 20: step S315/non-popup side image data processing step).

Subsequently, each piece of the image data acquired by performing the rendering processing in the 2D image data processing step, the popup side image data processing step, and the non-popup side image data processing step is synthesized (FIG. 20: step S314), and the 3D image data for driving the display panel is generated based on the synthesized image data (FIG. 20: step S305/3D image data generating step).

Figure 22B:
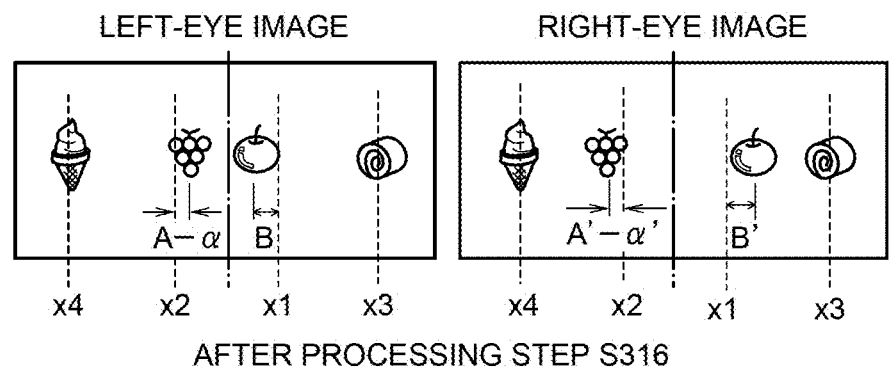

FIG. 22B shows the 3D image data of the objects 42, 43, 42, and 43 generated in the 3D image data generating step.

Next, returning to step S308 of FIG. 20, a method for generating corrected 3D image data in a case of lens expansion state under ΔT>0 will be described.

In this case, the rendering targets are classified into three as in the case of the lens contraction state by the judgment regarding the values of the position |x| of the object on the x-axis and the threshold value |xth| (FIG. 20: step S317). The same processing as the case of the lens contraction state is executed for the processing of this case. However, the camera setting different from the case of the lens contraction state is employed because of the correction of the parallax according to the position |x| of the object on the x-axis.

That is, when judged that the temperature difference ΔT is ΔT>0 and in a lens expansion state, the coordinate position x of the object on the x-axis is specified and it is judged whether or not |x|>|xth| is satisfied (FIG. 20: step S317). For the objects 42' and 43' where |x|>|xth| is satisfied, two-dimensional camera setting corresponding to a single camera along the z-axis is employed (FIG. 20: step S318), and rendering processing is performed regarding the two-dimensional data of the objects 42' and 43' specified (FIG. 20: step S319/2D image data processing step).

Further, regarding the objects 42 and 43 of the case where the temperature difference ΔT is ΔT>0 and |x|≤|xth| is applied, it is further judged whether or not the depth position z of the object is z<0 on the non-popup side (FIG. 20: step S320). Regarding the object 42 judged to be located at a position of z<0, the three dimensional data is specified by the first camera setting A, and rendering processing is performed on the three-dimensional data of the specified object 42 (FIG. 20: step S321/non-popup side image data processing step).

Further, regarding the object of the case where the temperature difference ΔT is ΔT>0 and |x|≤|xth| is applied, it is further judged whether or not the depth position z of the object is z≥0 on the popup side.

Then, for the object 43 that is judged to be located at a position of z≥0, the three-dimensional data is specified further by the third camera setting C (FIG. 20: step S322), and rendering processing is performed on the three-dimensional data of the specified object 43 (FIG. 20: step S323/popup side image data processing step).

Figure 22C:
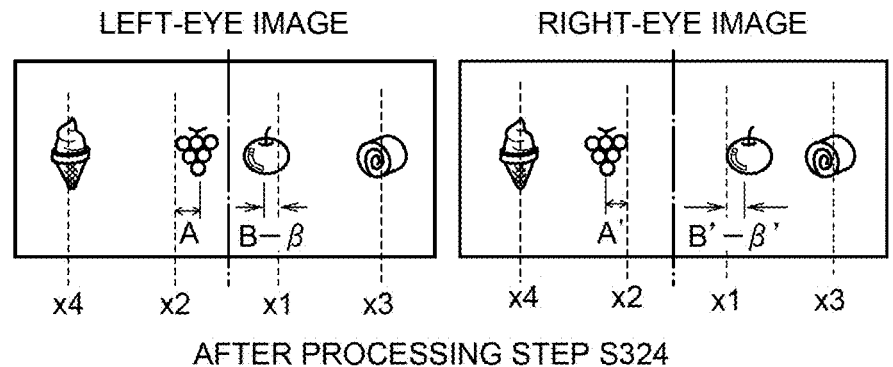

Then, each piece of the image data acquired by performing the rendering processing in the 2D image data processing step, the non-popup side image data processing step, and the popup side image data processing step is synthesized (FIG. 20: step S324/image data synthesizing processing step), and the 3D image data for driving the display panel is generated based on the synthesized image data (FIG. 20: step S305/3D image data generating step). FIG. 22C shows the 3D image data of the objects 42, 43, 42, and 43 generated in the 3D image data generating step.

In the third exemplary embodiment, the overall actions thereof are described in details.

However, the display panel driving 3D data generating action, i.e., each of the information processing contents of a series of data processing steps starting from the temperature measuring processing of the lenticular lens 1, may be put into a program to have it achieved by a computer provided to the stereoscopic image generating module 60A. The object of the present invention can also be achieved effectively with such structure.

With the third exemplary embodiment as described above, the same operation effects as those of the first exemplary embodiment can be achieved: In addition, it is possible to acquire the image data in which 2D and 3D images are mixed. Further, the 3D region is defined by corresponding to the temperature difference ΔT, so that there is an effect that the stereoscopic viewing region can be secured at all times even when the use environmental temperature changes largely.

Further, since the parallax amount control is executed for a specific parallax direction according to the use environmental temperature, there is an effect of making it possible to secure the stereoscopic viewing region without losing the ambience.

In a case where the positions of the objects on the x-axis exist by going across the threshold value (correction reference value) xth, it is possible to add processing for bringing the z-position in the vicinity of xth that is the border between the 2D and 3D images closer to the screen face (z=0) according to the value of |xth|−|x| by using a linear or nonlinear function in the synthesizing processing of step S314 or step S322. Thereby, natural image data in which 2D and 3D images are mixed can be acquired.

(Modification Example (1))

Next, a modification example (1) of the third exemplary embodiment will be described by referring to FIG. 23A.

In the third exemplary embodiment, it is also possible to perform z-value conversion processing in the same manner as in the case of the first exemplary embodiment for processing z-axis information showing the depth. This is shown in FIG. 23A.

Figure 19B:
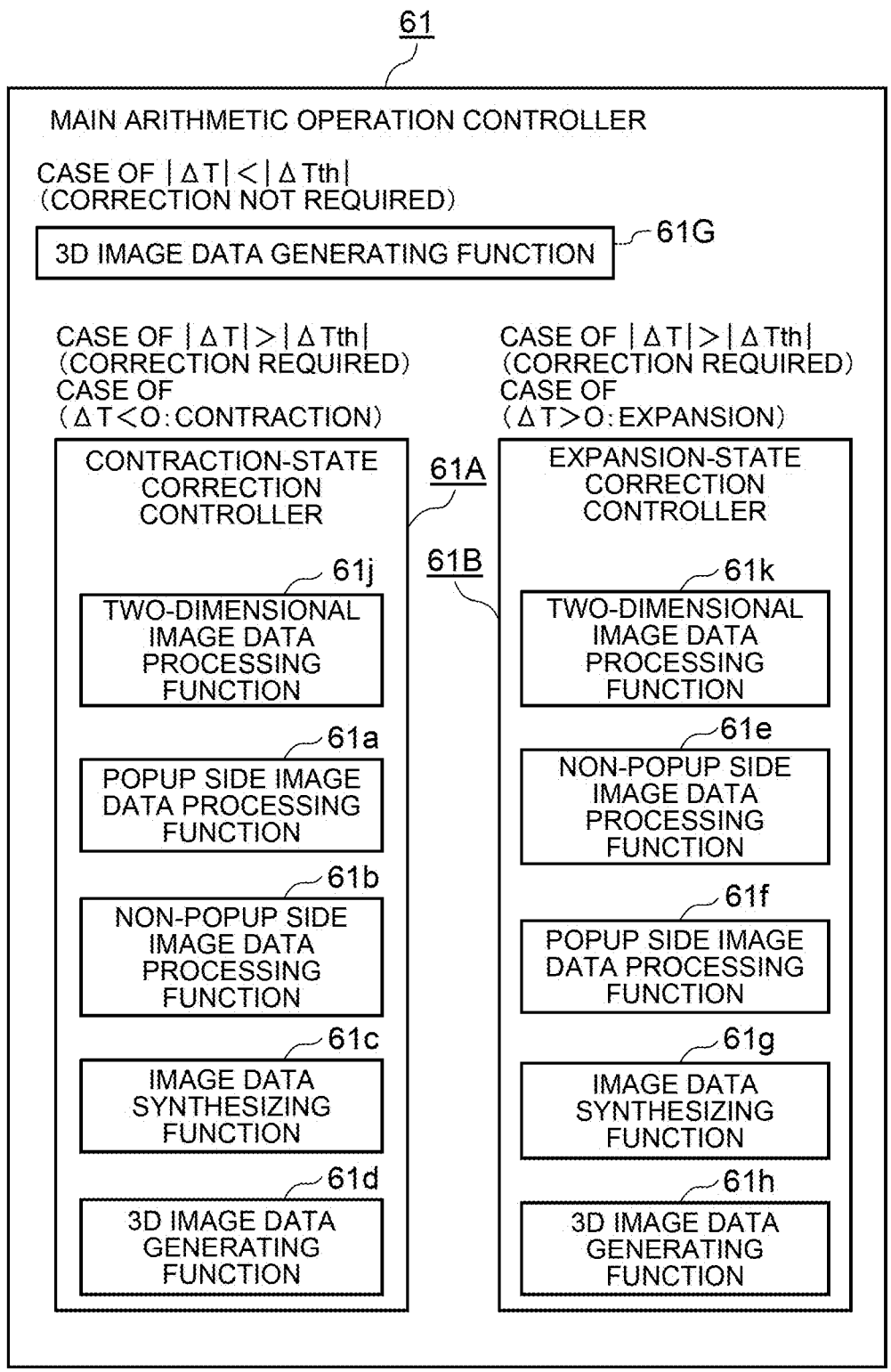

Note here that same reference numerals as those of the third exemplary embodiment shown in FIGS. 19A and 19B are used for the same structural members.

Figure 23A:
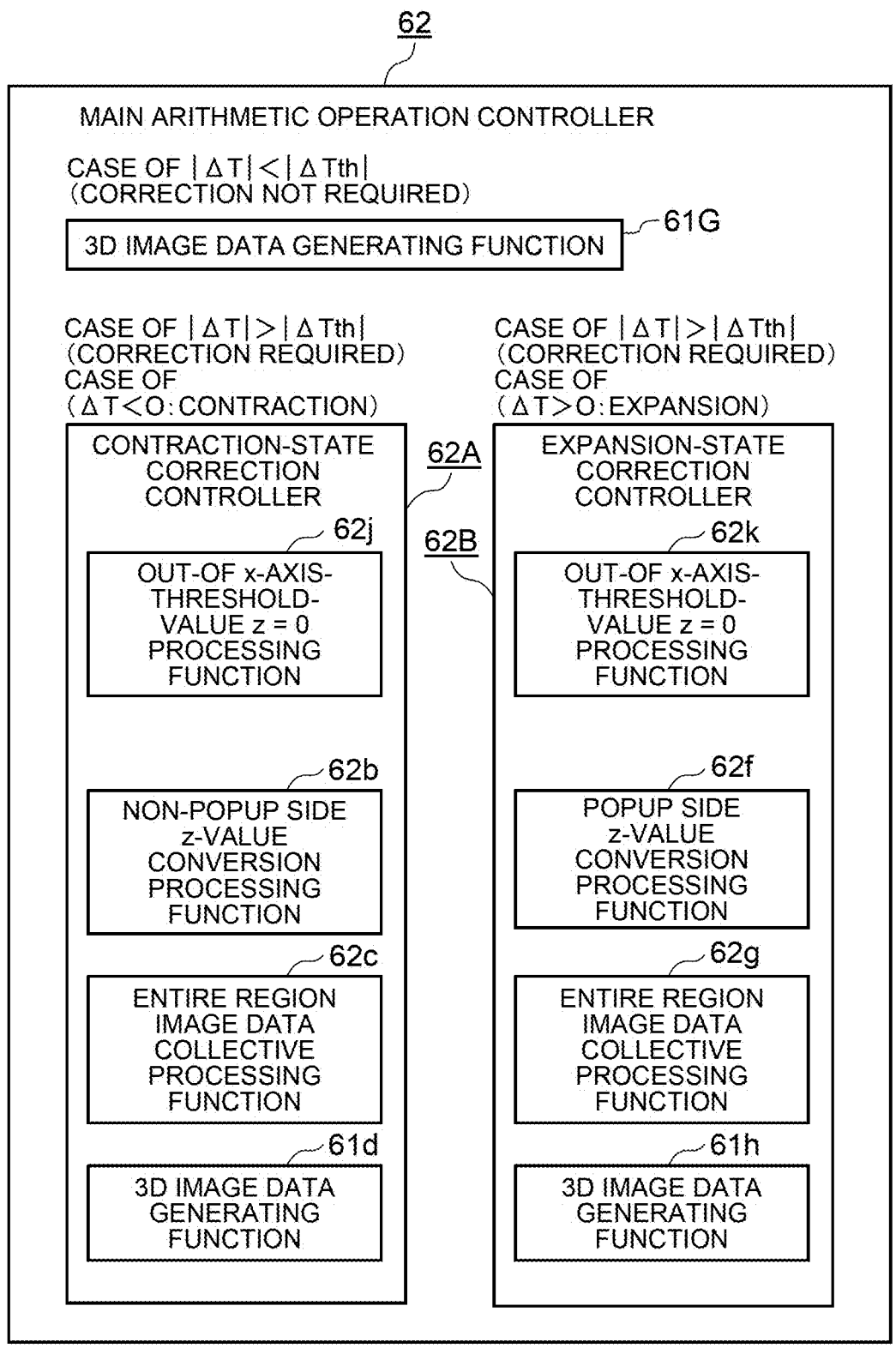

FIG. 23A is a block diagram showing each structural element of a main arithmetic operation controller 61 according to the modification example (1) of the third exemplary embodiment. In the modification example (1) of the third exemplary embodiment, a main arithmetic operation processing section 62 was employed instead of the main arithmetic operation processing section 61 of the third exemplary embodiment as shown in FIG. 23A.

As shown in FIG. 23A, a contraction-state correction controller 62A of the main arithmetic operation processing section 62 is characterized to include an out-of x-axis-threshold-value z=0 processing function 62j instead of the two-dimensional image data processing function 61j of FIG. 19B and includes a non-popup side z-value conversion processing function 62b instead of the non-popup side image data processing function 61b, respectively.

Regarding those z-value conversion processing functions, the out-of x-threshold-value z=0 conversion processing function 62j performs processing to satisfy z=0 on the object that satisfies |x|>|xth|. Further, the non-popup side z-value conversion processing function 62b performs z-value conversion (in the direction the value becomes smaller than the original z-value) by multiplying a correction coefficient ζ to |z| of the object that satisfies |x|≤|xth| and z<0.

The correction coefficient ζ in the non-popup side z-value conversion processing function 62b is less than a numerical value "1", and it may be defined as a constant regardless of the extent of the z-value. It is also possible to change the correction coefficient linearly or nonlinearly depending on the extent of the z-value.

Further, instead of the image data synthesizing function 61c disclosed in FIG. 19B, this modification example is characterized to include an entire region image data collective data processing function which executes rendering processing for the popup side image data processing function 61a that satisfies |x|≤|xth|, the non-popup side z-value conversion processing function 62b whose z-value is being converted, and the out-of x-threshold-value z=0 conversion processing function 62j that satisfies |x|>|xth| by using a same camera setting (e.g., the first camera setting A).

Further, in this modification example (1), the expansion-state correction controller 61B of the third exemplary embodiment described above is also employed. Instead of the expansion-state correction controller 61B, an expansion-state correction controller 62B is provided.

That is, in this modification example (1), as shown in FIG. 23A, the expansion-state correction controller 62B of the main arithmetic operation controller 62 is characterized to include an out-of x-threshold-value z=0 conversion processing function 62k instead of the two-dimensional image data processing function 61k and to include a popup-side z-value conversion processing function 62f instead of the popup side image data processing function 61f, respectively. Compared to the case of the contraction-state correction controller 62A, the z-value conversion processing function is the same except that the target object of the popup-side z-value conversion processing function 62f satisfies z≥0.

Further, instead of the 3D image data synthesizing function 61g disclosed in FIG. 19B, the expansion-state correction controller 62B of this modification example (1) is characterized to include the entire region image data collective data processing function 62g which executes rendering processing by using a same camera setting (e.g., the first camera setting A) as shown in FIG. 23A.

In other words, in this case, it is characterized to include the out-of x-threshold-value z=0 conversion processing function 62k which performs processing to make z=0 on the object that satisfies |x|≤|xth| instead of the two-dimensional image data processing function 61k, and to include the popup-side z-value conversion processing function 62f which performs z-value conversion on by multiplying a correction coefficient x in the direction that makes it smaller than the original z-value to |z| of the object that satisfies |x|>|xth| and z≥0 instead of the popup side image data processing function 61f described above.

Thereby, it becomes unnecessary to change the camera setting among the out-of x-threshold-value z=0 conversion processing function 62j, the popup-side image data processing function 61a, and the non-popup side z-value conversion processing function 62b of the contraction-state correction controller 62A and among the out-of x-threshold-value z=0 conversion processing function 62k, the non-popup side image data processing function 61e, and the popup-side z-value conversion processing function 62f of the expansion-state correction controller 62B, respectively. Further, the image data synthesizing functions 61c and 61g become unnecessary. Therefore, load on the system side (particularly the main arithmetic operation controller) can be lightened greatly, and the speed of the image processing can be increased as well.

Other structures and the operation effects thereof are the same as the case of the second exemplary embodiment described above.

(Modification Example (2))

Next, a modification example (2) of the third exemplary embodiment will be described by referring to FIG. 23B to FIG. 25.

The modification example (2) of the third exemplary embodiment is the same as that disclosed in FIG. 19 to FIG. 22 described above from which the change in the camera position setting by the position of the object on the z-axis is omitted. It is characterized as a result that the judgment of lens contraction/expansion becomes unnecessary.

Figure 24:
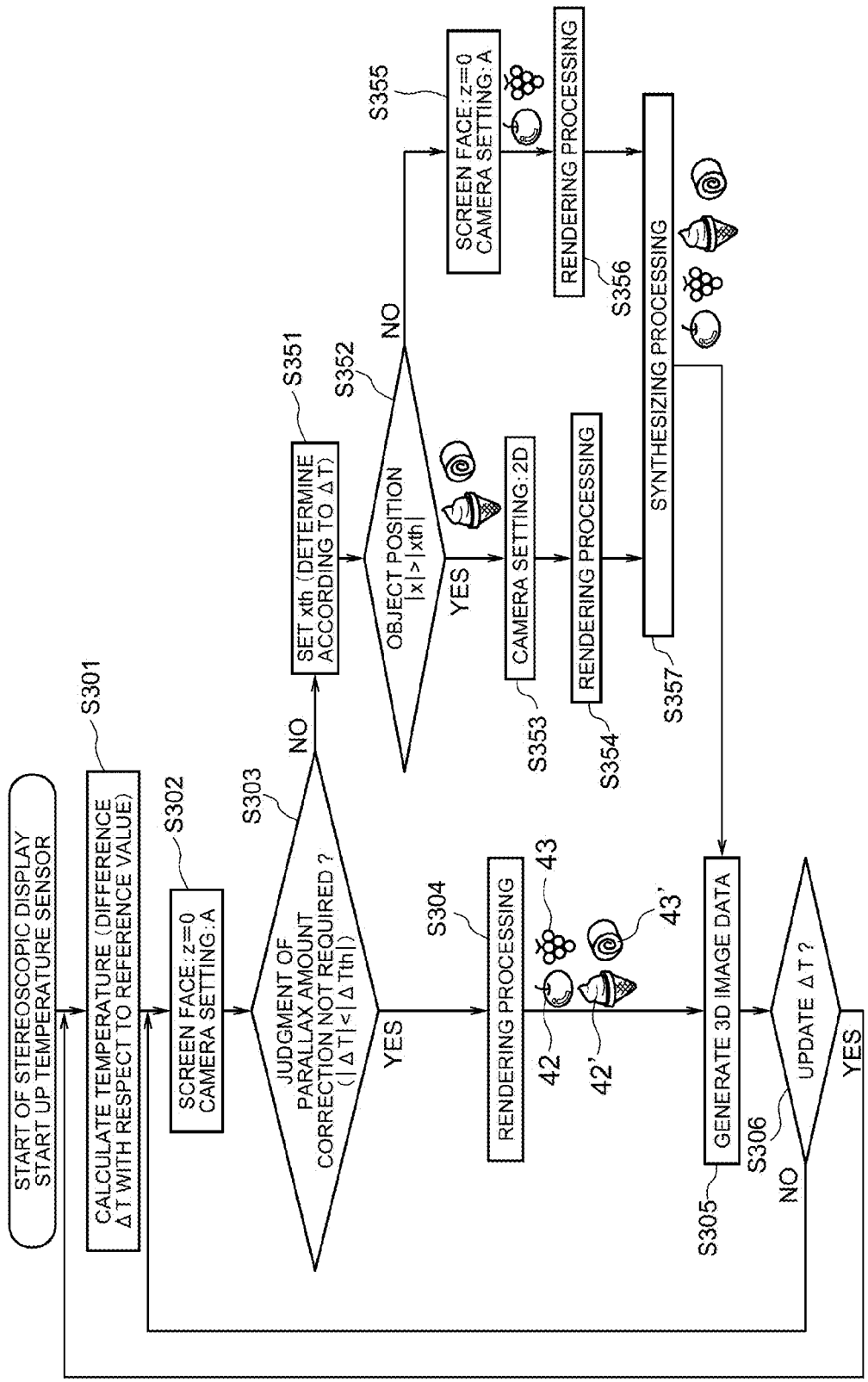
FIG. 24 is a flowchart showing a 3D image data generating action (unnecessary to judge contraction/expansion) executed by the main arithmetic controller of Modification Example (2) shown in FIG. 23B.

Therefore, the contents of the overall actions become simple correspondingly as shown in step S351 to step S356 of FIG. 24 in both cases where the lenticular lens 1 is contracted and expanded.

Hereinafter, this will be described.

Figure 23B:
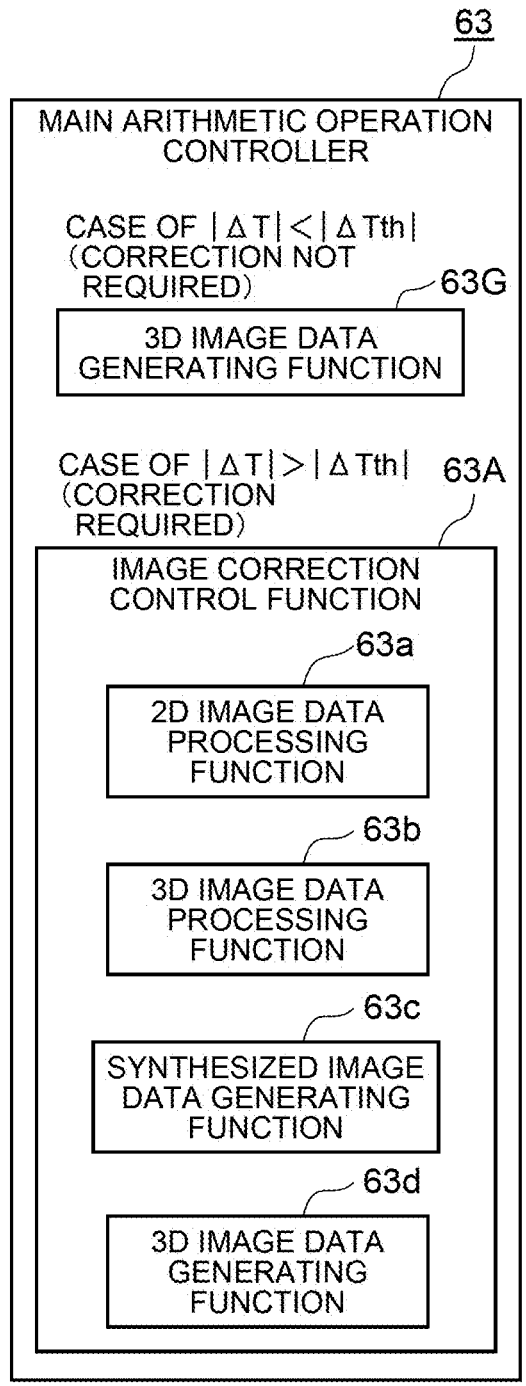

First, in the modification example (2) of the third exemplary embodiment, a main arithmetic operation controller 63 shown in FIG. 23B is used instead of the main arithmetic operation controller 61 of FIG. 19A.

As in the case of the third exemplary embodiment, the main arithmetic operation controller 63 is provided with an x-position threshold value setting section 52 which, when it is judged by the temperature difference judging section 30 that the temperature difference $\Delta T$ is $|\Delta T|>|\Delta Tth|$ and it is under a temperature environment that requires correction of the parallax amount, sets the threshold value xth on the x-axis which changes according to the extent of the temperature difference $\Delta T$ and makes it possible to secure the stereoscopic viewing region. In this case, the threshold value xth on the x-axis is set to be smaller as the value of the difference $\Delta T$ becomes larger as in the case of the third exemplary embodiment of FIG. 19A and FIG. 19B described above.

That is, the main arithmetic operation controller 63 includes a 2D image data processing function 63a which specifies the coordinate position x of the object on the x-axis and, regarding the object that satisfies $|x|>|xth|$, performs rendering processing on the two-dimensional data under a two-dimensional camera setting corresponding to a single camera that is set along the z-axis instead of the three-dimensional data.

Further, the main arithmetic operation controller 63 includes a 3D image data processing function 62b which immediately starts up to perform rendering processing on the three-dimensional data under the condition of the first camera setting A regarding the object of case where the temperature difference $|x|\le|xth|$ is satisfied for the coordinate position x on the x-axis.

Further, the main arithmetic operation controller 63 includes: an image data synthesizing function 63c which performs synthesizing processing of each image data on which rendering processing is performed by the 2D image data processing function 63a and the 3D image data processing function 63b; and a 3D image data generating function 63d which generates 3D image data based on the synthesized image data, and outputs it for driving the display panel. Other structures are the same as those of the above-described third exemplary embodiment shown in FIG. 19A.

Next, the overall actions of the structural contents will be described.

Figure 25A:
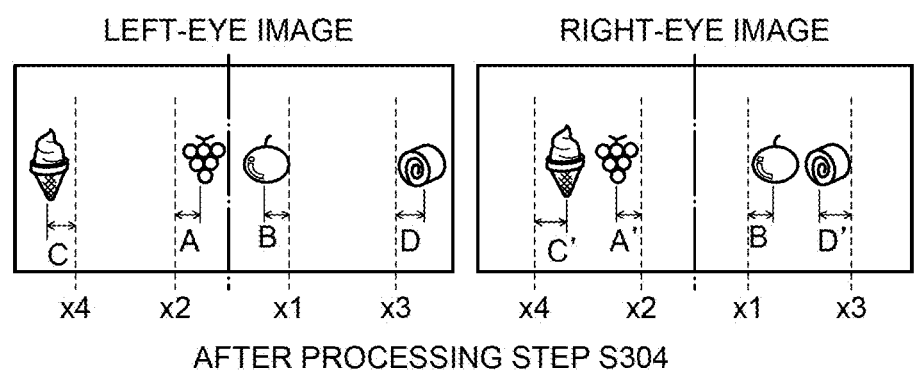
FIG. 25 is an explanatory chart showing an example of 3D image data having a parallax acquired by the 3D image data generating action disclosed in FIG. 24.

First, in FIG. 24, for step S301 to step S306, step 301 to step 306 shown in FIG. 20 (third exemplary embodiment) are mounted just as they are, and those steps function in the same manner. FIG. 25A shows 3D image data acquired by step S304 of FIG. 24.

Subsequently, as in the case of the third exemplary embodiment, it is judged in a correction necessity judging step of step S503 by the temperature judging section 30 whether or not the temperature difference $\Delta T$ satisfies $|\Delta T|\le|\Delta Tth|$. In a case of "Yes", correction of the parallax amount is unnecessary. In a case of "No", it is judged that correction of the parallax amount is necessary.

When it is judged by the temperature difference judging section 30 that the temperature difference $\Delta T$ is $|\Delta T|>|\Delta Tth|$ and it is under a temperature environment that requires correction of the parallax amount, the above-described x-position threshold value setting section 52 sets the threshold value xth on the x-axis which makes it possible to secure the stereoscopic viewing region that changes according to the extent of the temperature difference $\Delta T$ (FIG. 24: step S351/x-position threshold value setting step). In this case, the threshold value xth is set to be smaller as the absolute value of $\Delta T$ becomes larger.

Then, the coordinate positions x on the x-axis regarding each of the objects (e.g., 42, 43, 42, 43) shown in FIG. 24 are specified, and it is judged whether or not $|x|>|xth|$ is satisfied (FIG. 24: step S352).

The data of the objects 42' and 43' judged that $|x|>|xth|$ is satisfied is specified by a two-dimensional camera 2D by a single camera (see FIG. 21) along the z-axis set instead of the three-dimensional data (FIG. 24: step S353). The setting condition of the two-dimensional camera 2D is stored in the camera setting information storage section 22A, and it is set by the arithmetic operation controller 63 based thereupon.

Then, rendering processing is performed on the two-dimensional data acquired based on the two-dimensional camera setting 2D (FIG. 24: step S354/2D image data processing step).

Subsequently, for the objects 42 and 43 where $|c|\le|xth|$ is satisfied for the coordinate position x on the x-axis, rendering processing is performed on the three-dimensional data of the objects 42 and 43 under the condition of the first camera setting A (FIG. 24: step S354/3D image data processing step).

Figure 25B:
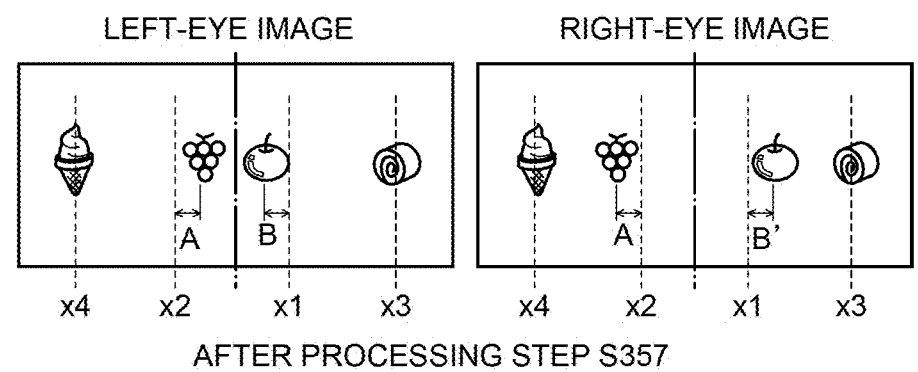

Then, each image data rendering-processed in the 2D image data processing step and the 3D image data processing step is synthesized (FIG. 24: step S357), and the 3D image data for driving the display panel is generated based thereupon (FIG. 24: step S306/3D image data generating step). FIG. 25B shows the 3D image data acquired in step S357 of FIG. 24.

The image generating processing (FIG. 24: step S301 to step S305) of a case where the temperature difference $\Delta T$ is judged as $|\Delta T|\le|\Delta Tth|$ and that the correction of the parallax is unnecessary has the same content as that of the image generating processing (FIG. 20: step S301 to step S305) of the third exemplary embodiment described above, and it is executed in advance before executing step S351 to step S354 of FIG. 24. Other structures and operation effects are the same as the case of the third exemplary embodiment described above.

Note here that each action of each data processing, comparison judgment, and the like from step S301 to S304 and each action of each data processing, comparison judgment, and the like from step S351 to S359 (i.e., execution contents in each of the steps) of FIG. 24 of the entire actions of the modification example (2) of the third exemplary embodiment described above may be put into a program to have it achieved by a computer that is provided to the stereoscopic image generating module 60A.

Further, while the modification example (2) of the third exemplary embodiment has been described by mainly referring to the example where rendering processing is performed to develop into the parallax image, the present invention is not limited only to that. It is also possible to develop into a depth image as in the case of the first exemplary embodiment described above.

Further, as shown in FIG. 19A, the main arithmetic operation controllers 61, 62, and 63 described above are provided with a depth image development processing section 22B which develops the three-dimensional data regarding the object sent into the main arithmetic operation controllers 61, 62, 63 as a depth image having the two-dimensional image information and the depth information z thereof (depth position). Furthermore, the depth image development processing section 22B includes a gradation value specifying function which sets a gradation value by corresponding to the depth information (depth position) by a pixel unit, and specifies the value of the set gradation value by corresponding to the parallax amount of the two-dimensional image information specified on the x-axis.

Therefore, by employing the gradation value specifying function of the depth image development processing section 22B to each of the objects 42, 43, 42, and 43, each of the main arithmetic operation controllers 61, 62, and 63 can develop those as the depth images.

In the modification example (2) of the third exemplary embodiment, it is unnecessary to perform judgment action of the contraction and expansion of the lenticular lens 1 as described above, so that there is an advantage that the 3D image data for driving the display panel can be generated by the simplified data processing of step S351 to step S357 of FIG. 24 in both cases.

Further, in the case of the third exemplary embodiment, the 3D region is defined by corresponding to the temperature difference ΔT as described above. Thus, there is an effect that the stereoscopic viewing region can be secured at all times even when the use environmental temperature changes largely. In particular, when the panel size is large, the panel width becomes larger compared to the interpupillary IPD. Thus, the influence of the temperature changes in the outer end of the panel becomes still greater. However, in that case, it is very effective to reduce the proportion of the threshold value xth for the panel size for securing the stereoscopic viewing region. Further, since the parallax amount control is executed for a specific parallax direction according to the use environmental temperature T, there is an effect of making it possible to secure the stereoscopic viewing region without losing the ambience.

Furthermore, when the object position x is larger than xth in the third exemplary embodiment, 2D processing is performed. Thus, there is a merit of being able to reduce the system load. In addition, the actions of each judgment regarding the lens contraction and expansion are integrated in the modification example. As a result, there is also an advantage of making it possible to simplify the actions, so that the system load can be reduced greatly.

Further, while a case of 2-viewpoints regarding the number of viewpoints is disclosed in the third exemplary embodiment and the modifications examples (1), (2), the present invention is not limited only to that. The present invention can be employed also to the case of N-viewpoints in the same manner.

(Fourth Exemplary Embodiment)

Next, a fourth exemplary embodiment of the present invention and a modification example thereof will be described by referring to FIG. 26 to FIG. 33. Note here that same reference numerals are used for the same structural members as those of the first exemplary embodiment.

In the fourth exemplary embodiment, a depth map is used as the 3D image data, and gray scale conversion (gradation value correction) of the depth map is executed according to the use environmental temperature to secure the stereoscopic viewing region effectively by corresponding to expansion and contraction of the lenticular lens 1.

Hereinafter, this will be provided by taking the contents depicted in the first exemplary embodiment as a presupposition.

The entire contents of the fourth exemplary embodiment will be described first, and a modification example of the fourth exemplary embodiment will be described thereafter.

(Structure)

As in the case of the first exemplary embodiment, the stereoscopic display device according to the fourth exemplary embodiment includes a display controller 70 which drive-controls a stereoscopic display panel 11. The display controller 70 is provided with a stereoscopic image generating module 70A having a main arithmetic operation controller 71 which individually restricts the actions of each of the entire structural elements to be described later (see FIG. 26A).

Figure 28A:
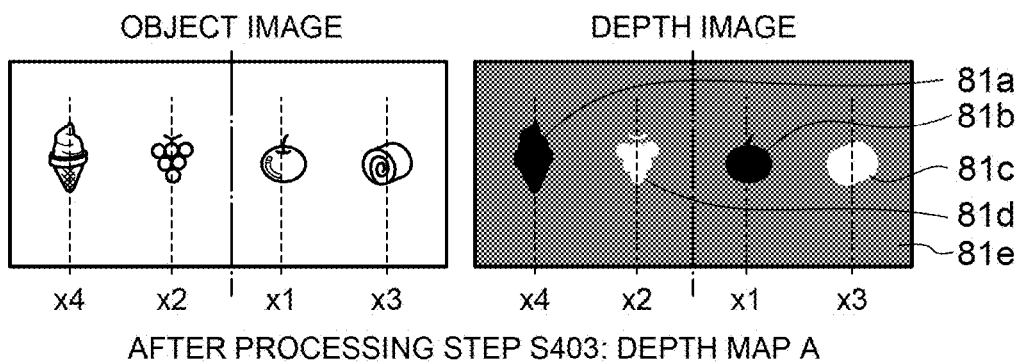
FIG. 28 is an explanatory chart showing an example of 3D image data having the depth acquired by executing the 3D image data generating action (flowchart) of the fourth exemplary embodiment disclosed in FIG. 27.
Figure 28B:
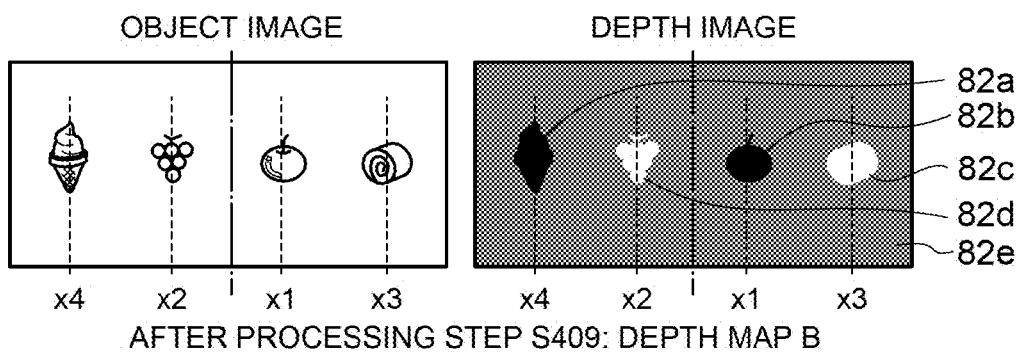

As shown in FIG. 26A, the stereoscopic image generating module 70A includes: a target image data setting section 77 which stores, to a data storage section 25, 3D image data constituted with a depth map having depth information being rendering-processed in advance; a temperature difference judging section 30 which performs an arithmetic operation regarding whether or not the absolute value of the temperature difference ΔT of the detected temperature detected by a temperature sensor 21 with respect to the reference temperature Tth is equal to or less than the absolute value of the reference value ΔTth set in advance, and judges whether or not it is a temperature environment that requires correction for the parallax amount of each object specified on the x-axis on the depth map display face (screen face/xy plane) containing z-axis information as the depth information; and the above-described main arithmetic operation controller 71 for restricting the actions of each of those sections. Note here that the depth map is 3D image data constituted with an object image as two-dimensional image information and a depth image having the depth information (depth position) z thereof as shown in FIG. 28A.

Figure 26B:
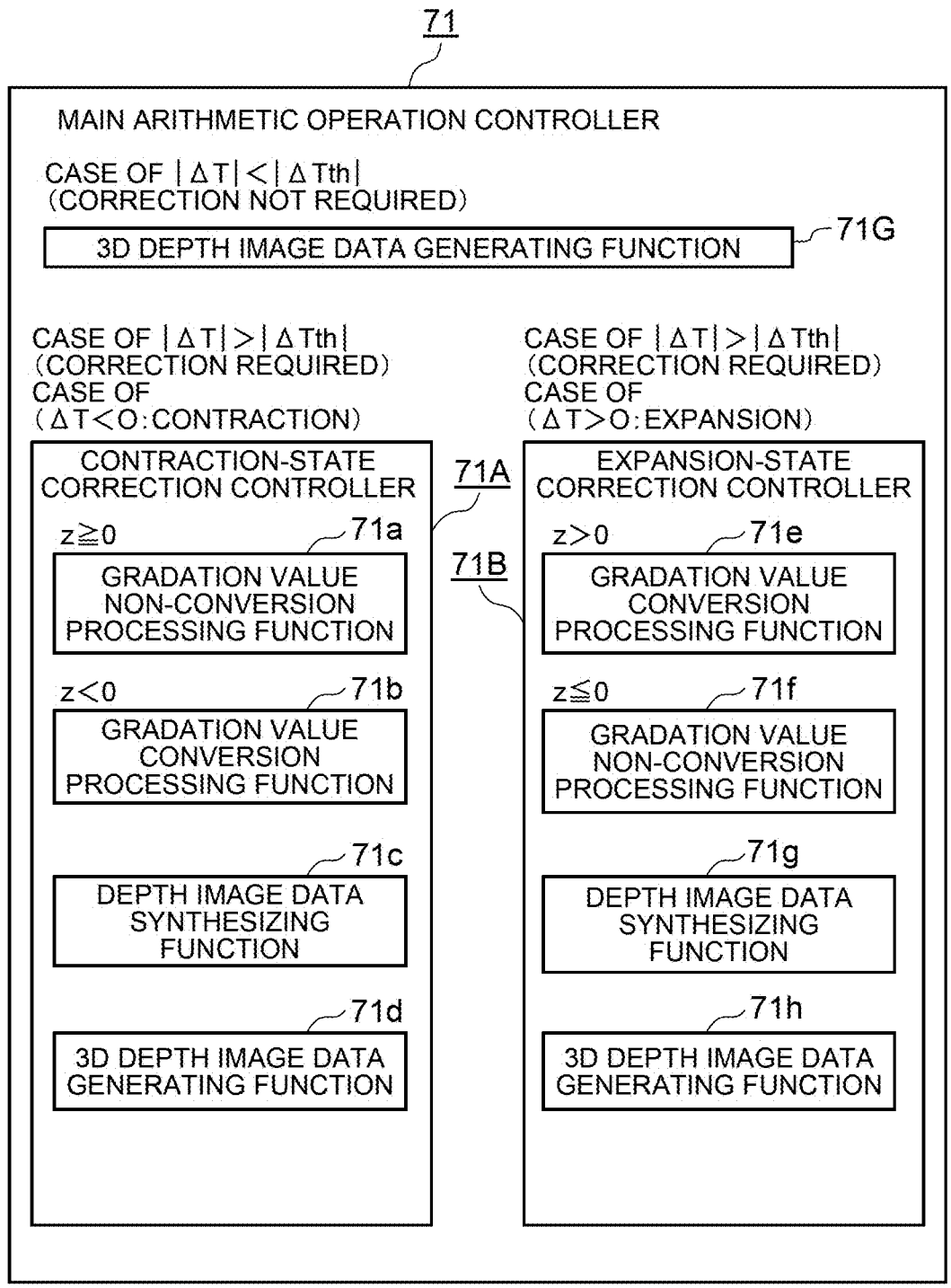

Among those, the main arithmetic operation controller 71 includes a 3D image data generating function 71G which operates when it is judged by the temperature difference judging section 30 that the temperature difference ΔT is |ΔT|≤|ΔTth| and it is under a temperature environment that does not require correction of the parallax amount to output two-dimensional 3D image data having the depth information among the image data stored in the data storage section 25 for driving the display panel (see FIG. 26B).

As in the case of the first exemplary embodiment described above, the main arithmetic operation controller 71 is provided with a correction environment judging section 29 which operates when it is judged by the temperature difference judging section 30 that the temperature difference ΔT is |ΔT|>|ΔTth| and it is under a temperature environment that requires correction of the parallax amount to make judgment whether the lenticular lens 1 is in a state of ΔT<0 showing a contraction state or a state of ΔT>0 showing an expansion state.

Further, as in the case of the first exemplary embodiment described above, the main arithmetic operation controller 71 includes a contraction-state correction controller 71A which operates in a case where the lenticular lens 1 is in a contraction state (ΔT<0), and an expansion-state correction controller 71B which operates in a case where the lenticular lens 1 is in an expansion state (ΔT>0).

Out of those, the contraction-state correction controller 71A is structured to execute two following data processing functions different from the cases of each of the above-described exemplary embodiments, to synthesize the results thereof, and to output the 3D image depth map (synthesized depth map) for driving the display panel.

That is, the contraction-state correction controller 71A constituting a part of the main arithmetic operation controller 70 as shown in FIG. 26B includes a gradation value non-conversion processing function 71a which: functions when it is judged by the correction environment judging section 29 that the temperature difference ΔT is ΔT<0 and the lenticular lens 1 is in a contraction state to judge whether or not the depth of the object is at a position of z≥0 on the popup side and the depth gradation is equal to or more than the intermediate value of the entire gradation; and when judged that it is located at a position of z≥0 and the depth gradation is equal to or more than the intermediate value of the entire gradation, holds it without performing gray scale conversion.

Further, similarly, the contraction-state correction controller 71A includes a gradation value conversion processing function 71b which functions when it is judged by the correction environment judging section 29 that the temperature difference ΔT is ΔT<0 and the lenticular lens 1 is in a contraction state and, when judged that the depth of the object is located at a position of z<0 on the opposite side from the popup-side on the z-axis and the depth gradation is equal to or lower than the intermediate value of the entire gradation, performs gray scale conversion by a first gradation conversion with which a larger gradation value than the original depth information can be acquired and holds the result acquired thereby.

Further, the contraction-state correction controller 71A constituting a part of the main arithmetic operation controller 71 includes: a depth image data synthesizing function 71c which performs synthesizing processing on the depth image data held by the gradation value non-conversion processing function 71a and the gradation value conversion processing function 71b, respectively; and a synthesized depth image data generating function 71d which generates two-dimensional 3D depth image data having the depth based on the synthesized depth image data, and outputs it for driving the display panel.

Thereby, even when the lenticular lens 1 is in a contraction state, it is possible to effectively correct the collected depth information of the objects on the popup side and the non-popup side by corresponding to the change in the temperature and to use it as the 3D depth image data to effectively drive the display panel.

Further, the expansion-state correction controller 71B constituting a part of the main arithmetic operation controller 71 is also structured to execute two following data processing functions and to synthesize the results thereof under the same criterion as the case of the contraction-state correction controller 71, and to output the 3D depth image data (synthesized depth image data) for driving the display panel.

That is, the expansion-state correction controller 71B includes a gradation value non-conversion processing function 71e which: functions when it is judged by the correction environment judging section 29 that the temperature difference ΔT is ΔT>0 and the lenticular lens 1 is in an expansion state to judge whether or not the depth of the object is at a position of z<0 on the non-popup side and the depth gradation is equal to or less than the intermediate value of the entire gradation; and when judged that it is located at a position of z<0 and the depth gradation is equal to or less than the intermediate value of the entire gradation, holds it without performing gray scale conversion.

Further, similarly, the expansion-state correction controller 71B includes a gradation value conversion processing function 71f which: functions when it is judged by the correction environment judging section 29 that the temperature difference ΔT is ΔT>0 and the lenticular lens 1 is in an expansion state to judge whether or not the depth of the object is located at a position of z<0 and whether or not the depth gradation is equal to or less than the intermediate value of the entire gradation; and when judged that the depth of the object is located at a position of z≥0 and the depth gradation is equal to or more than the intermediate value of the entire gradation, performs gray scale conversion by a second gradation conversion with which a smaller gradation value than the original depth information can be acquired, and holds the result acquired thereby.

Further, the expansion-state correction controller 71B constituting a part of the main arithmetic operation controller 71 includes: a depth image data synthesizing function 71g which performs synthesizing processing on the depth image data held by the gradation value non-conversion processing function 71e and the gradation value conversion processing function 71f, respectively; and a synthesized image data generating function 71h which generates two-dimensional 3D depth image data based on the synthesized depth image data, and outputs it for driving the display panel.

Thereby, even when the lenticular lens 1 is in an expansion state, it is possible to effectively correct the collected depth information of the objects on the popup side and the non-popup side by corresponding to the change in the temperature and use it as the 3D depth image data to effectively drive the display panel.

Other structures are the same as the case of the first exemplary embodiment described above.

(Overall Actions)

Next, the overall actions of the fourth exemplary embodiment will be described by referring to FIG. 27 to FIG. 30.

Figure 27:
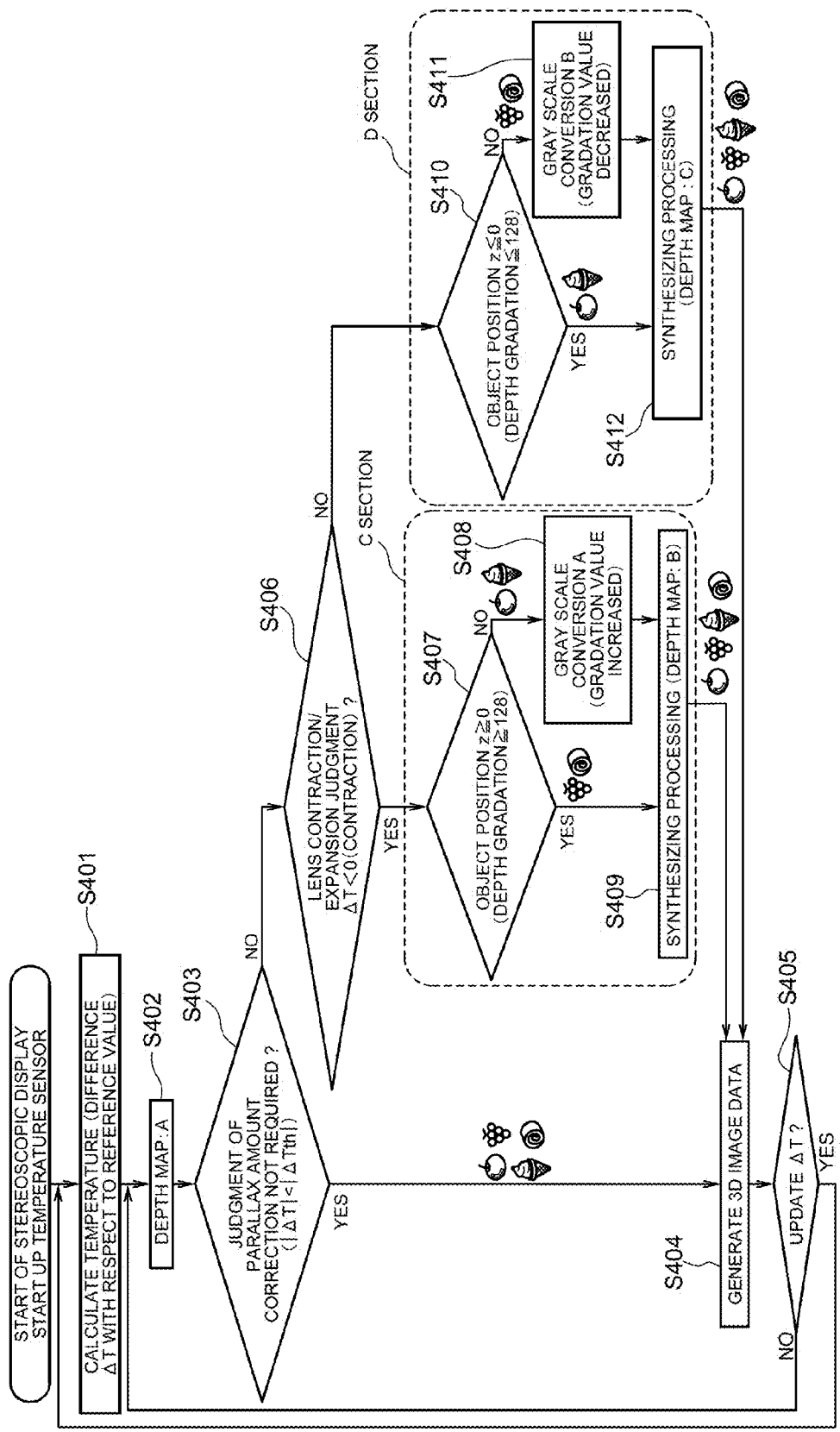
FIG. 27 is a flowchart showing an example of a 3D image data generating action when 3D image data is generated based on the depth map A set in advance in the fourth exemplary embodiment disclosed in FIG. 26.

Note here that FIG. 27 is a flowchart showing an example of a 3D image data generating action of the fourth exemplary embodiment.

As shown in FIG. 27, in the fourth exemplary embodiment, first, the environmental temperature T including the lenticular lens 1 is measured by the temperature sensor 21, and the temperature difference ΔT with respect to the reference temperature Tth is calculated by a deformation amount calculating section 28 (FIG. 27: step S401/temperature difference specifying step).

Then, a depth map A as the target of correction is set, and it is stored to the data storage section 25 as 3D image data (FIG. 27: step S402).

In the depth map, it is so defined that the maximum gradation width is 256 gradations, 128 gradations located in the center part thereof are defined as the screen face 40 (z-axis is the position of origin 0), the side of the direction smaller than the 128 gradations is defined as the back side (z-axis corresponds to negative), and the side of the direction larger than the 128 gradations is defined as the front side (z-axis corresponds to positive). Such defined information is stored in advance to the data storage section 25.

Then, judgment of depth correction for the temperature difference ΔT is executed. When judged that the correction is unnecessary, the depth map A is employed as it is as the 3D image data.

That is, the absolute values of the temperature difference ΔT calculated by the deformation amount calculating section 28 and the judgment threshold value ΔTth set in advance is compared by the temperature difference judging section 30, and it is judged that the correction of the parallax amount of the 3D image data, i.e., correction of the depth, is necessary in a case of |ΔT|>|ΔTth| (FIG. 27: step S403/correction necessity judging step).

Meanwhile, when judged in step S403 (the correction necessity judging step) that the temperature difference ΔT is |ΔT| |ΔTth| and it is in the temperature environment that does not require correction of the parallax amount, the 3D image data stored in the data storage section is outputted as the two-dimensional 3D depth map image data having the depth information (FIG. 27: step S404/3D depth image data generating step). FIG. 28A shows an example of the depth map A of such case.

In the meantime, as described above, in a case where it is judged in the correction necessity judging step of step S403 as |ΔT|>|ΔTth| and that correction of the depth is necessary, it is then judged whether the lenticular lens 1 is in a contraction state or in an expansion state (FIG. 27: step S406/correction environment judging step).

That is, when it is judged in the correction necessity judging step of step S403 as |ΔT|>|ΔTth| and that it is under the temperature environment that requires correction of the depth, it is judged whether the lenticular lens 1 is in a state of ΔT<0 showing a contraction state or in a state of ΔT>0 showing an expansion state. Then, when the lenticular lens 1 is in a case of ΔT<0 showing a contraction state, correction for the lens contraction state is required as the correction thereof.

The correction of the lens contraction state (ΔT<0) is executed by a following procedure.

Further, in a case where it is judged in the correction environment judging step (FIG. 27: step S406) that the temperature difference ΔT is ΔT<0 and the lenticular lens 1 is in a contraction state, it is judged whether or not the depth of the object is at a position of z≥0 and the depth gradation is equal to or more than the intermediate value of the entire gradation and, when judged that it is located at a position of z≥0 and the depth gradation is equal to or more than the intermediate value of the entire gradation, it is held to the data storage section 25 without performing gray scale conversion (FIG. 27: step S407/gradation value non-conversion processing step).

Further, similarly, in a case where it is judged that z on the popup-side of the depth of the object is located at a position of z<0 on the opposite side from the popup-side on the z-axis and the depth gradation is equal to or lower than the intermediate value of the entire gradation under the state where the temperature difference ΔT is ΔT<0 and the lenticular lens 1 is in a contraction state (FIG. 27: step S406/correction environment judging step), gray scale conversion is performed thereon by a first gradation conversion with which a larger gradation value than the original depth information is acquired, and the result acquired thereby is held (FIG. 27: step S408/gradation value conversion processing step).

Specifically, those actions can be described as follows.

That is, in a case where the correction is required, judgment of lens contraction/expansion is executed in step S406. When the lens is in a contraction state (ΔT<0), the procedure is shifted to step S407. In step S407, it is judged whether or not the position of the object on the z-axis is positive (i.e., the depth gradation value is 128 or more). In a case where the value is 128 or more, the information of the depth map A is employed as it is.

In the meantime, it is judged whether or not the position of the object on the z-axis is negative (i.e., the depth gradation value is 128 or less). The gray scale conversion A (see FIG. 27: step S408) is performed on objects 81a and 82b whose depth gradation value is smaller than 128 to correct the gradation thereof into the gradation corresponding to objects 82a and 82b of FIG. 28B.

In this state, the objects 82a, 82b have the larger gradation value compared to the value of the objects 81a, 81b. Examples of the parameters used for the gray scale conversion A may be ΔT and the contents held to the data storage section 25 (i.e., the effective linear expansion coefficient difference of the materials constituting the display panel, the panel size, the panel resolution, and the 3D stroke). Among those, the parameters other than the temperature difference ΔT can be treated as constants, and a variable is only ΔT.

In the gray scale conversion A, correction processing for increasing the gradation value according to the extent of ΔT is executed. However, it is also possible to employ correction processing according to the original gradation value to increase the gradation correction value as the gradation value of the original depth map A is smaller.

Subsequently, the depth image synthesizing processing function 71c synthesizes the depth image data held in the gradation value non-conversion processing step and the gradation value conversion processing step, respectively (FIG. 27: step S409/generation of depth map B). Then, the 3D depth image generating function 71d generates the two-dimensional 3D image data based on the synthesized depth image data, and outputs it as the stereoscopic depth image data for driving the display panel (FIG. 27: step S404/3D depth image data generating step).

The processing from step S407 to S409 described above is defined as a gradation processing C section. The action control of the gradation processing C section is executed by the contraction-state correction controller 71A.

Next, in a case of a lens contraction state where the temperature difference ΔT is ΔT>0, the following is executed.

First, in a case where it is judged in the temperature environment judging step that the temperature difference ΔT is ΔT>0 and the lenticular lens 1 is in an expansion state, it is judged whether or not the depth of the object is at a position of z<0 and the depth gradation is equal to or less than the intermediate value of the entire gradation. When judged that it is located at a position of z<0 and the depth gradation is equal to or less than the intermediate value of the entire gradation, it is held without performing gray scale conversion (FIG. 27: step S410/gradation value non-conversion processing step).

Further, in a case where it is judged in the temperature environment judging step that the temperature difference ΔT is ΔT>0 and the lenticular lens 1 is in an expansion state and, at the same time, it is judged that the depth of the object is located at a position of z≥0 and the depth gradation is equal to or less than the intermediate value of the entire gradation in the judgment regarding whether the depth of the object is located at a position of z<0 on the non-popup side, or whether the depth gradation value thereof is equal to or less than the intermediate value of the entire gradation (step S410), gray scale conversion is performed thereon by a second gradation conversion (gray scale conversion B) with which a smaller gradation value than the original gradation value is acquired, and the result thereof is held (FIG. 27: step S411/gradation value conversion processing step).

Subsequently, the depth image synthesizing processing function 71g synthesizes the depth image data held in the gradation value non-conversion processing step and the gradation value conversion processing step, respectively (FIG. 27: step S412/generation of depth map C). Then, the 3D depth image generating function 71h generates the two-dimensional 3D image data based on the synthesized depth image data, and outputs it as the stereoscopic depth image data for driving the display panel (FIG. 27: step S404/3D depth image data generating step).

The processing from step S410 to S412 described above is defined as a gradation processing D section. The control of the gradation processing D section is executed by the expansion-state correction controller 71B.

Specifically, those actions can be described as follows.

That is, when the lens is in an expansion state of ΔT>0, first, it is shifted to step S410 of FIG. 27 as described above. Here, it is judged (step S410) whether or not the position of the object on the z-axis is negative (i.e., the depth gradation value is 128 or less). In a case where the value is 128 or less, the information of the depth map A is employed as it is.

Figure 28C:
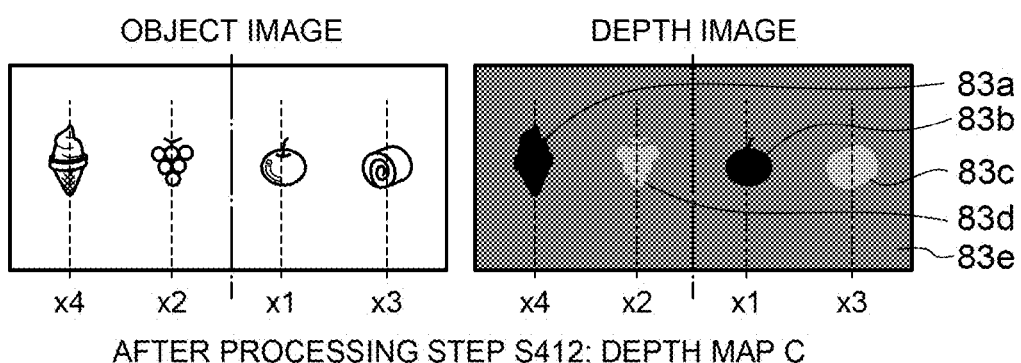

Further, the gray scale conversion B (step S411) is performed on objects 81c and 81d whose positions on the z-axis are positive (z≥0, i.e., the depth gradation value is 128 or more), for example, to correct the gradation thereof into the gradation corresponding to objects 83c and 83d of FIG. 28C.

In this case, the objects 83c, 83d have the smaller gradation value compared to the objects 81c, 81d. The parameters used for the gray scale conversion B are the same as the case of the conversion A described above.

In the gray scale conversion B, correction processing for decreasing the gradation value according to the extent of ΔT is executed. However, it is also possible to employ correction processing according to the original gradation value to increase the gradation correction value as the gradation value of the original depth map A is larger. Subsequently, the depth map C as shown in FIG. 28C is acquired by the synthesizing processing (FIG. 27: step S412).

The processing from step S410 to S412 described above is defined as a gradation processing D section. The action control of the gradation processing D section is executed by the expansion-state correction controller 71B.

Regarding the gradation processing C section and the gradation processing D section shown in the flowchart of FIG. 27, gradation correction can also be executed, respectively, according to the extent of ΔT and the extent of the position of the object on the x-axis in addition to the above-described processing. FIG. 29 and FIG. 30 show examples thereof.

Out of those, FIG. 29 shows an example where the processing is executed by defining the gradation value correction amount for the position of the object on the x-axis by a form of LUT (lookup table), a prescribed function, or the like.

Figure 29A:
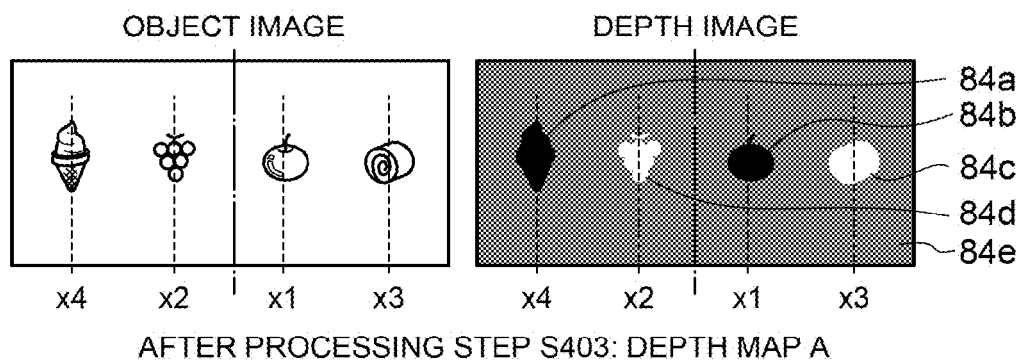
FIG. 29 is an explanatory chart showing an example of 3D image data having the depth acquired by executing 3D processing in accordance with a position of an object on x-axis for three-dimensional information at the time of executing the 3D image data generating action shown in FIG. 27.
Figure 29B:
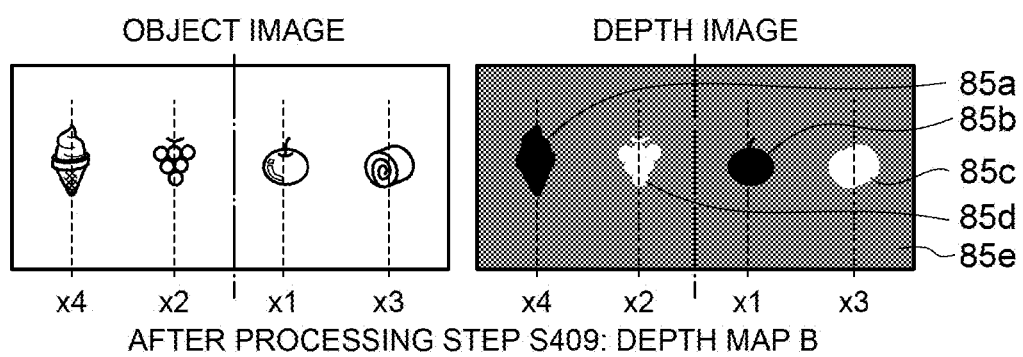
Figure 30A:
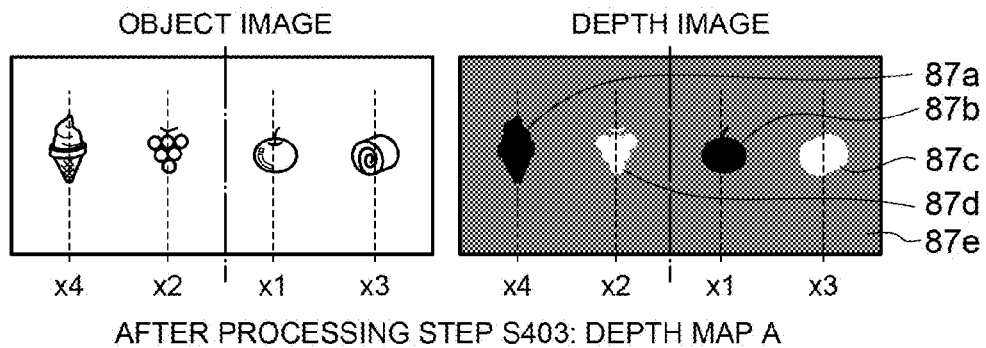
FIG. 30 is an explanatory chart showing an example of 3D image data having the depth acquired by executing 2D processing in accordance with positions of an object on x-axis for three-dimensional information at the time of executing the 3D image data generating action shown in FIG. 27.
Figure 30B:
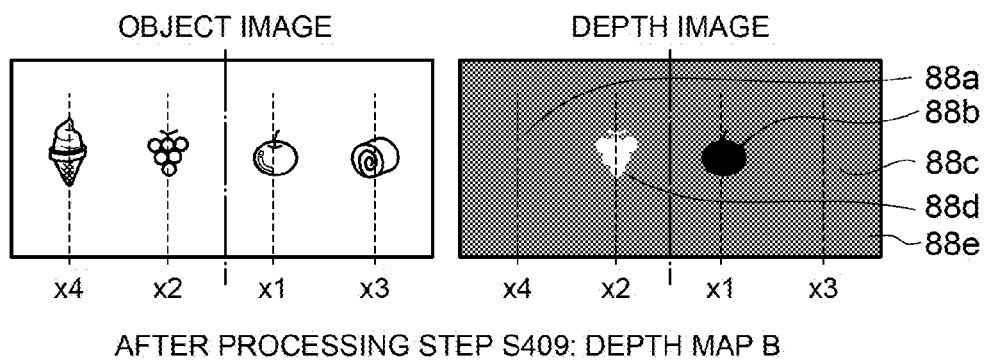

With respect to the depth map A of FIG. 29A, processing with which the gradation value correction amount of the object 85a located at x4 closer to the screen edge is larger than that of the object 85b located at x1 closer to the center of the screen is applied on the depth map B shown in FIG. 29B.

Figure 29C:
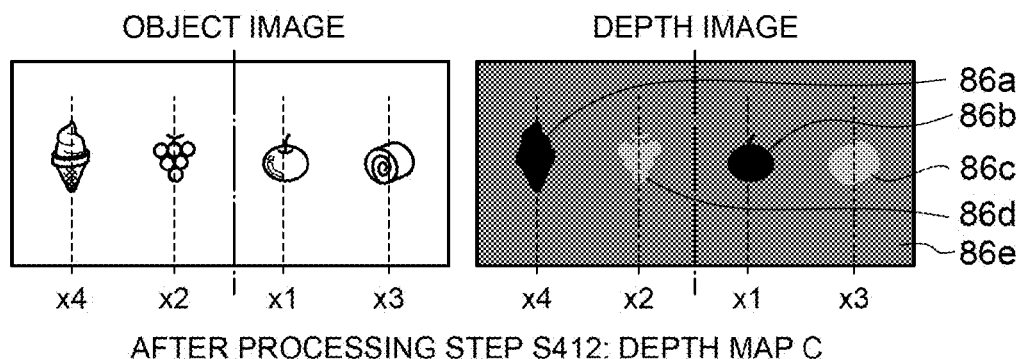

Similarly, processing with which the gradation value correction amount of the object 86c located at x3 closer to the screen edge is larger than the object 86d located at x2 closer to the center of the screen is applied on the depth map C shown in FIG. 29C.

Further, FIG. 30 shows an example where the reference value xth is set according to the extent of ΔT and the gradation value is set as 128 that is the same as the case of 2D when the position of the object on the x-axis is |x|>|xth|.

In this case, when it is assumed that |x1| and |x2| are smaller than |xth| and |x3| and |x4| are larger than |xth| regarding the positions x1 to x4 of the object on the x-axis, the gradations of the object 88a located at x3 and the object 88c located at x4 on the x-axis are 128, respectively, in the depth map B shown in FIG. 29B with respect to the depth map A of FIG. 29A.

Similarly, the gradations of the object 89a located at x3 and the object 89c located at x4 on the x-axis are 128, respectively, in the depth map C shown in FIG. 29C.

Note here that execution contents of each of the steps of the overall actions of the fourth exemplary embodiment described above may be put into a program to have it executed by a computer provided to the stereoscopic image generating module 70A.

As described above, regarding the gradation processing C section and the gradation processing D section shown in the flowchart of FIG. 27 described in the fourth exemplary embodiment, the gradation value correction can be done in the manner described above, respectively, according to the extent of ΔT and the extent of the position of the object on the x-axis. Other structures and operation effects thereof are the same as the case of the first exemplary embodiment described above.

(Modification Example)

Next, a modification example of the fourth exemplary embodiment will be described by referring to FIG. 31 to FIG. 33.

The modification example of the fourth exemplary embodiment is characterized to perform gray scale conversion uniformly on the depth map A regardless of the signs of the object on the z-axis, i.e., regardless of the extent of the value with respect to the gradation value 128 on the plane of z=0 in FIG. 27 to FIG. 30 (the fourth exemplary embodiment). Thus, this modification example does not employ a method which performs gradation value correction that varies depending on the depth of the object z≥0 or z<0 and synthesizes the results thereof.

This will be described hereinafter.

Figure 31:
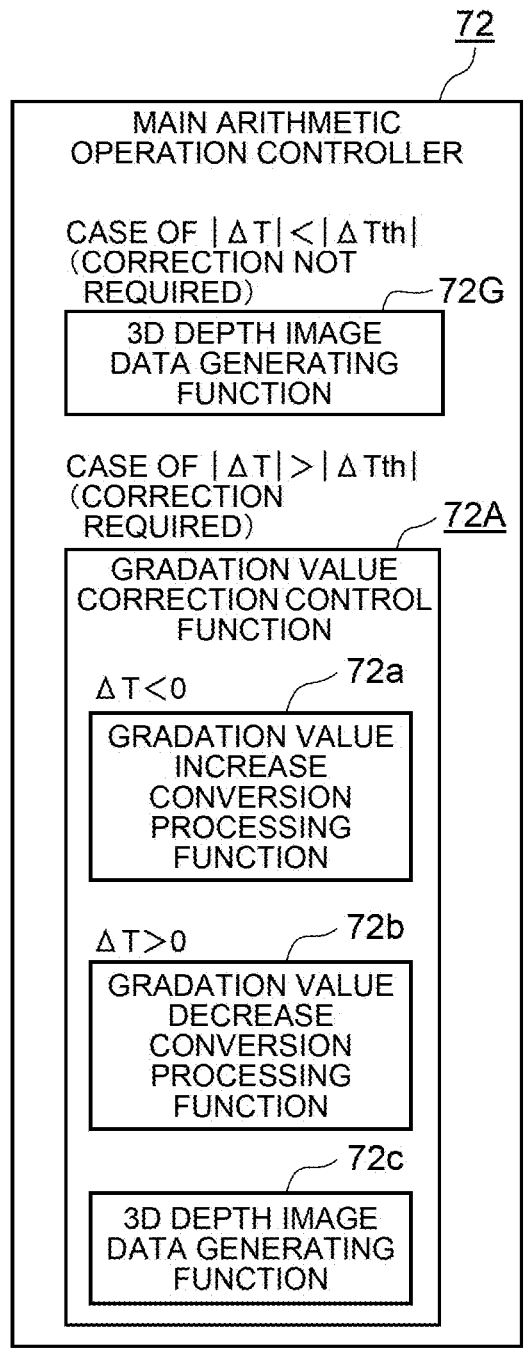
FIG. 31 is a block diagram showing a modification example of the main arithmetic operation controller which constitutes a part of the stereoscopic display device according to the fourth exemplary embodiment of the present invention.

First, instead of the main arithmetic operation controller 71 of FIG. 26A, the modification example of the fourth exemplary embodiment uses a main arithmetic operation controller 72 having the same function (see FIG. 31).

As shown in FIG. 31, the main arithmetic operation controller 72 among those includes a 3D image data generating function 72G which operates when it is judged by the temperature difference judging section 30 that the temperature difference ΔT is |ΔT|≤|ΔTth| and it is under a temperature environment that does not require correction of the parallax amount to output two-dimensional 3D image data having the depth information that corresponds to the parallax amount as the 3D image data stored in the data storage section 25 for driving the display panel.

As in the case of the fourth exemplary embodiment described above, the main arithmetic operation controller 72 is provided with a correction environment judging section 29 which operates when it is judged by the temperature difference judging section 30 that the temperature difference ΔT is |ΔT|>|ΔTth| and it is under a temperature environment that requires correction of the parallax amount to make judgment whether the lenticular lens 1 is in a state of ΔT<0 showing a contraction state or a state of ΔT>0 showing an expansion state.

Further, the main arithmetic operation controller 72 includes a gradation value correction control function 72A which increase-controls or decrease-controls the gradation value by corresponding to the judgment result done by the correction environment judging section 29.

The gradation value correction control function 72A includes a gradation value increase conversion processing function 72a which operates when it is judged by the correction environment judging section 29 that the temperature difference ΔT is ΔT<0 and the lenticular lens 1 is in a contraction state to perform gray scale conversion by a third gradation value conversion (gray scale conversion C) on the entire depth map regardless of the depth position of each object with which the larger gradation value than the original depth map can be acquired and to hold it.

Further, the gradation value correction control function 72A of the main arithmetic operation controller 72 includes a gradation value decrease conversion processing function 72b which operates when it is judged by the correction environment judging section 29 that he temperature difference ΔT is ΔT>0 and the lenticular lens 1 is in an expansion state to perform gray scale conversion by a fourth gradation value conversion (gray scale conversion D) on the entire depth map regardless of the depth position of each object with which the smaller gradation value than the original depth map can be acquired and to hold it.

Further, the gradation value correction control function 72A of the main arithmetic operation controller 72 includes a 3D image data generating function 72c which performs 3D depth image processing on the depth image data processed by the gradation value increase conversion processing function 72a and the gradation value decrease conversion processing function 72b, respectively, and outputs it as the 3D depth image processing data for driving the display panel.

Other structures are the same as the case of the fourth exemplary embodiment shown in FIG. 26A described above.

Next, the overall actions regarding the above-described structural contents will be described. First, as shown in FIG. 32, the temperature sensor 21 is started up along with the start of the operation of the entire device to start measurement of the temperature of the lenticular lens 1 and, at the same time, the temperature difference ΔT thereof with respect to the reference value is calculated as in the case of the fourth exemplary embodiment described above (FIG. 32: step S401).

A series of steps from step S401 to step S404 (3D image data generating step) and step S405 (update of ΔT) are the same as the case of the fourth exemplary embodiment described above.

Figure 32:
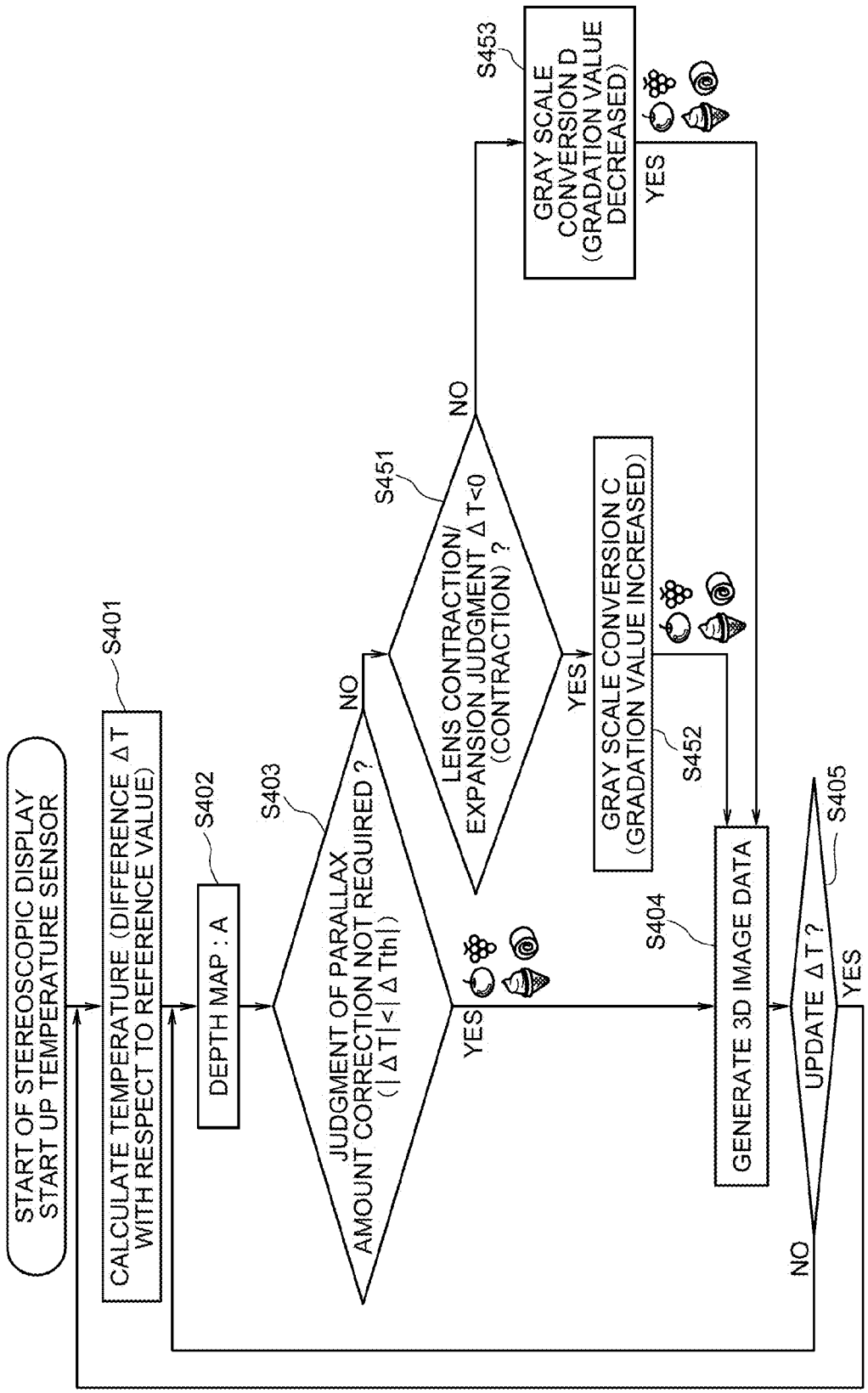
FIG. 32 is a flowchart showing an example of a 3D image data generating action executed based on the depth map A specified in advance by the main arithmetic operation controller (modification example) shown in FIG. 31.

As in the case of the fourth exemplary embodiment, in the modification example, it is judged by the temperature judging section 30 whether or not the temperature difference ΔT satisfies |ΔT|≤|ΔTth| in a correction necessity judging step (FIG. 32: step S403). When judged as satisfied, correction of the parallax amount becomes unnecessary as in the case of the fourth exemplary embodiment, and the procedure is shifted to step S404.

In the meantime, when it is judged by the temperature difference judging section 30 that the temperature difference ΔT is |ΔT|>|ΔTth| and it is under a temperature environment that requires correction of the parallax amount, it is then judged by the correction environment judging step 29 whether the lenticular lens 1 is in a state of ΔT<0 showing a contraction state or in a state of ΔT>0 showing an expansion state (FIG. 32: step S451/correction environment judging step).

When it is judged in the correction environment judging step (FIG. 32: step S451) that the temperature difference ΔT is ΔT<0 and the lenticular lens 1 is in a contraction state, the gradation value increase conversion processing function 72a operates immediately to perform gray scale conversion by the gray scale conversion C as the third gradation value conversion on the entire depth map regardless of the depth position of each object with which the larger gradation value than the original depth map information can be acquired (FIG. 32: step S452/depth gradation increase conversion step). Then, the 3D depth image data generating function 72c performs depth image processing, and the result thereof is outputted as the 3D depth image data for driving the stereoscopic display panel (FIG. 32: step S404/3D depth image data generating step).

In the meantime, when it is judged in the judgment of the temperature in step S451 that the temperature difference ΔT is ΔT>0 and the lenticular lens 1 is in an expansion state, the gradation value decrease conversion processing function 72b operates immediately to perform gray scale conversion by the gray scale conversion D as the fourth gradation value conversion on the entire depth map regardless of the depth position of each object with which the smaller gradation value than the original depth map information can be acquired (FIG. 32: step S453/depth gradation decrease conversion step). Then, the 3D depth image data generating function 72c performs depth image processing, and the result thereof is outputted as the 3D depth image data for driving the stereoscopic display panel (FIG. 32: step S404/3D depth image generating step).

Figure 33A:
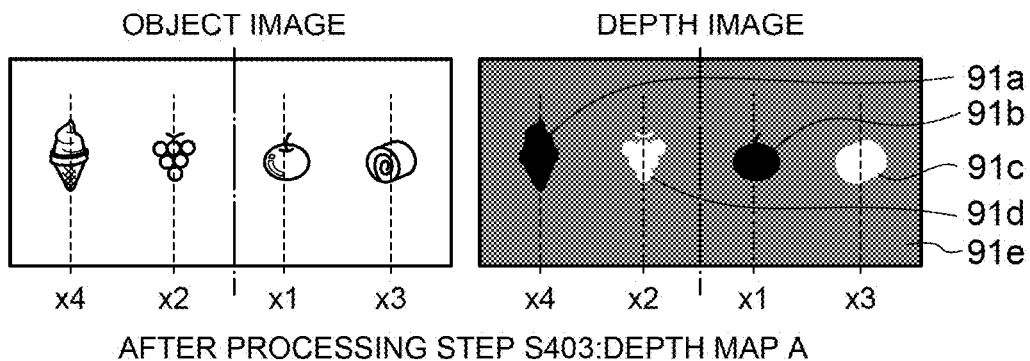
FIG. 33 is an explanatory chart showing an example of 3D image data having the depth acquired by the 3D image data generating action disclosed in FIG. 32.
Figure 33B:
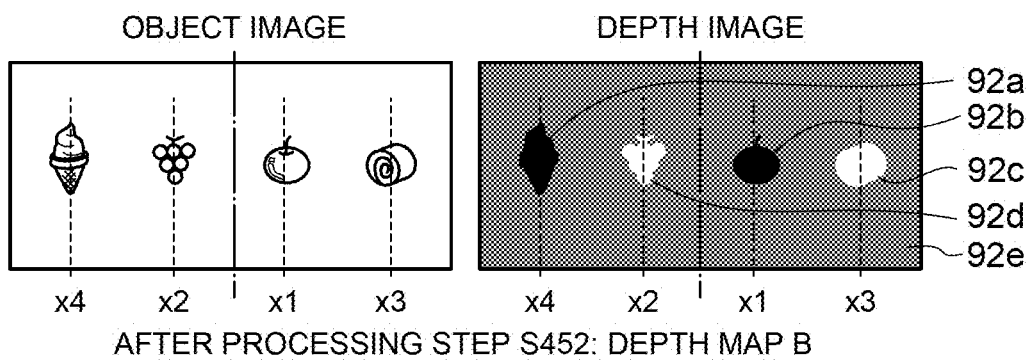
Figure 33C:
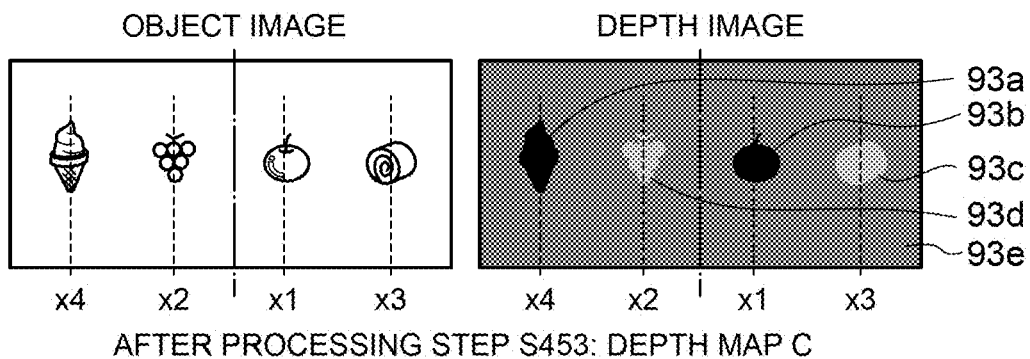

That is, in the modification example, the gray scale conversion C is executed in the lens contraction state shown in FIG. 33B in step S452 of FIG. 32, and the gray scale conversion D is executed in the lens expansion state shown in FIG. 33C in step S453.

Unlike the cases described before, in FIG. 33B and FIG. 33C, gradation value correction is done also in the part with the gradation value 128 (background part) in FIG. 33A according to the state of lens contraction/expansion in those gray scale conversions. Other structures and operation effects thereof are the same as the case of the fourth exemplary embodiment described above.

Note here that execution contents of each of the steps of the overall actions of the modification example of the fourth exemplary embodiment described above may be put into a program to have it executed by a computer provided to the stereoscopic image generating module 70A.

Further, in the case of the fourth exemplary embodiment including the modification example thereof, the 3D region is defined in the depth map by corresponding to the temperature difference ΔT as described above. Thus, there is an effect that the stereoscopic viewing region can be secured at all times even when the use environmental temperature changes largely. Further, since the gradation amount control is executed for a specific gradation direction according to the use environmental temperature, there is an effect of making it possible to secure the stereoscopic viewing region without losing the ambience. Furthermore, the fourth exemplary embodiment takes the gray scale conversion of the depth as a base. Thus, compared to the case of the above-described exemplary embodiments where the rendering processing by the camera is required, it is possible to use the arithmetic operation device whose performance regarding the processing capacity and arithmetic operation speed required therefore is low. Therefore, there is an advantage that the controller 110 can be structured at a low cost.

Further, while a case of 2-viewpoints regarding the number of viewpoints is disclosed in the fourth exemplary embodiment, the present invention is not limited only to that. The present invention can be employed also to the case of N-viewpoints in the same manner.

(Fifth Exemplary Embodiment)

Next, a fifth exemplary embodiment of the present invention will be described by referring to FIG. 34 to FIG. 38.

Note here that same reference numerals are used for the same structural members as those of the first exemplary embodiment.

In the fifth exemplary embodiment, two virtual viewpoints are set for an object having depth information, and a parallax image generated in advance by performing rendering processing on three-dimensional data of the object and parallax images captured by a stereoscopic camera are accumulated in a form of two-dimensional data. Then, it is characterized to perform offset processing for the parallax direction of the parallax image according to the use environmental temperature and to output it when reading out the accumulated parallax image.

This will be described hereinafter by taking the contents depicted in the first exemplary embodiment as a presupposition.

(Structure)

As in the case of the first exemplary embodiment, the stereoscopic display device according to the fifth exemplary embodiment includes a display controller 110 which drive-controls a stereoscopic display panel 11. The display controller 110 is provided with a stereoscopic image generating module 110A having a main arithmetic operation controller 111 which restricts the actions of each of the entire structural elements to be described later (see FIG. 34A).

The stereoscopic image generating module 110A includes: a target image data setting section 77 which inputs accumulates a pair of parallax image data A for the right eye and the left eye rendering-processed in advance for generating 3D image data and accumulates those to the data storage section 25; a temperature difference judging section 30 which individually performs an arithmetic operation regarding whether or not the absolute value of the temperature difference ΔT of the detected temperature regarding each of the parallax image data A detected by a temperature sensor 21 with respect to the reference temperature is equal to or less than the absolute value of the reference value ΔTth set in advance, and judges whether or not it is under a temperature environment that requires correction for the parallax amount of each object specified on the x-axis on the xy plane; and the above-described main arithmetic operation controller 111 for restricting the actions of each of those sections.

Figure 34A:
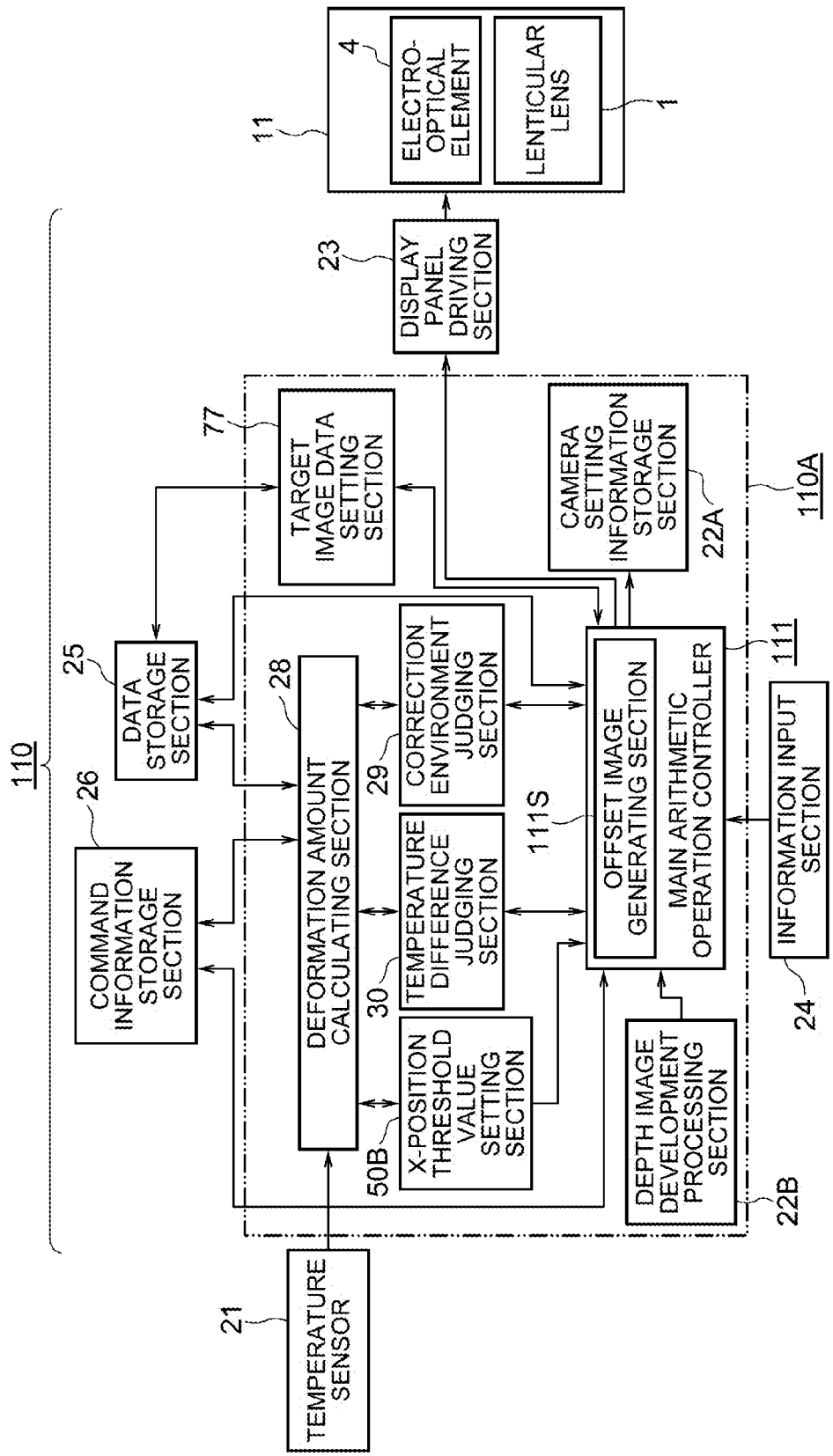
Figure 34B:
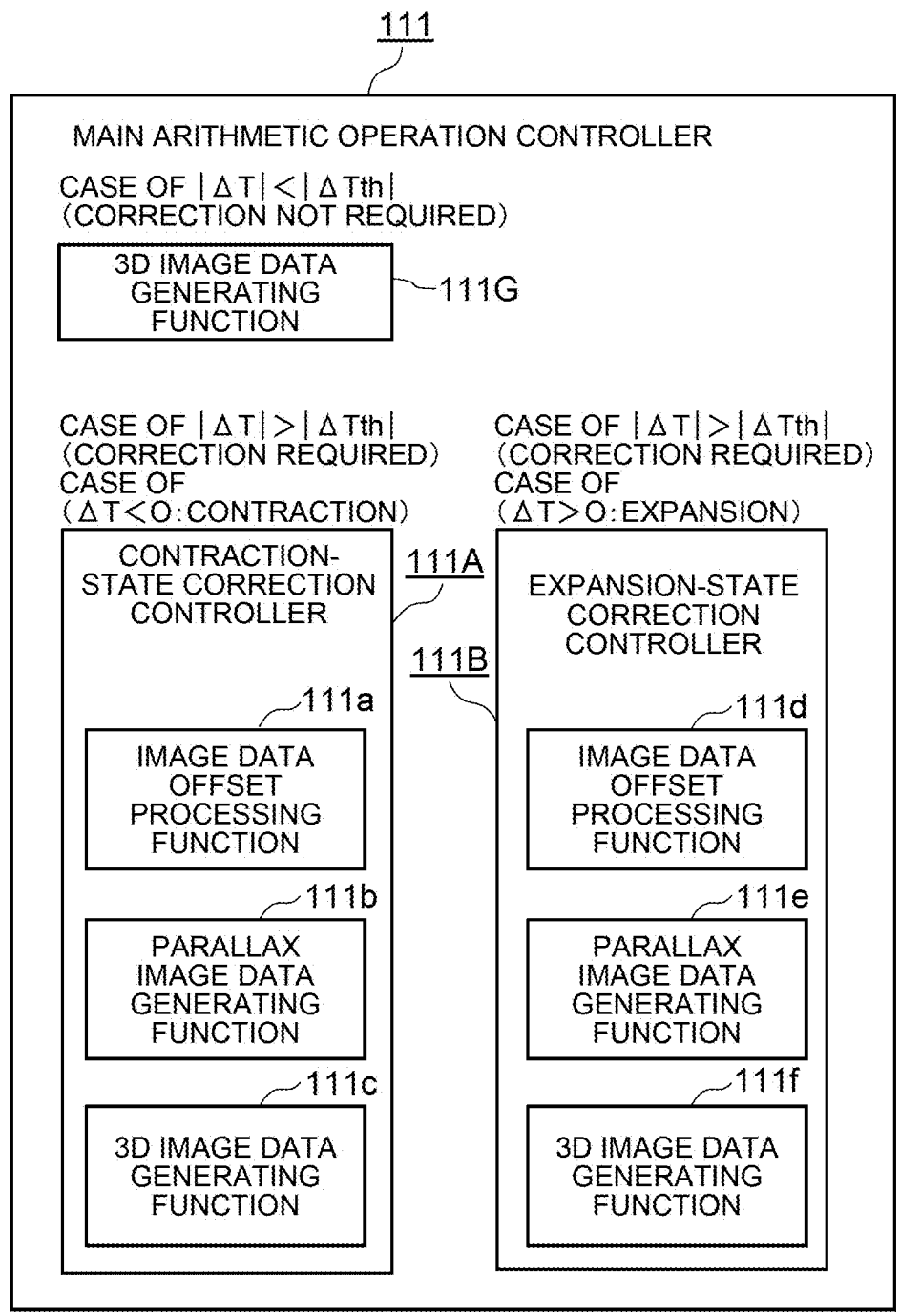

Among those, the main arithmetic operation controller 111 includes a 3D image data generating function 111G which operates when it is judged by the temperature difference judging section 30 that the temperature difference ΔT is |ΔT|≤|ΔTth| and it is under a temperature environment that does not require correction of the parallax amount to generate two-dimensional 3D image data based on the pair of parallax image data A stored in the data storage section 25 and to output it for driving the display panel (see FIG. 34B).

As in the case of the first exemplary embodiment described above, the main arithmetic operation controller 111 is provided with a correction environment judging section 29 which operates when it is judged by the temperature difference judging section 30 that the temperature difference ΔT regarding the parallax image data A is |ΔT|>|ΔTth| and it is under a temperature environment that requires correction of the parallax amount to make judgment whether the lenticular lens 1 is in a state of ΔT<0 showing a contraction state or a state of ΔT>0 showing an expansion state.

Further, as in the case of the first exemplary embodiment described above, the main arithmetic operation controller 111 includes: a contraction-state correction controller (contraction-state offset image generating section) 111A which operates when it is judged by the correction environment judging section 29 that the lenticular lens 1 is in a state of ΔT<0 showing a contraction state; and an expansion-state correction controller (expansion-state offset image generating section) 111B which operates when it is judged by the correction environment judging section 29 that the lenticular lens 1 is in a state of ΔT>0 showing an expansion state.

Out of those, specifically, the contraction-state correction controller (contraction-state offset image generating section) 111A includes: an image data offset processing function 111a which performs slight shift processing on the left-eye image data of the parallax image data A in the left direction and the right-eye image data in the right direction with a prescribed offset amount of respective parallax levels; a parallax image data generating function 111b which generates parallax image data B by superimposing the image data acquired by the image offset processing on the respective image data of before the offset processing; and a 3D image data generating function 111c which generates and outputs two-dimensional 3D image data of a case where the temperature difference ΔT is ΔT<0 based on the parallax image data B generated by the parallax image data generating function 111b.

Thereby, when the lenticular lens 1 is in a contraction state (ΔT<0), the correction control is executed to perform slight shift processing on the left-eye image data in the left direction and the right-eye image data in the right direction with a prescribed offset amount of respective parallax levels by corresponding to the extent of the temperature difference ΔT. Thus, the contraction state of the lenticular lens 1 is corrected, so that the stereoscopic display panel 11 can be driven with the same output state as that of the state before being contracted even when the lenticular lens 1 of the stereoscopic display panel 11 is in a contraction state.

Then, when the lenticular lens 1 is in ΔT>0 showing an expansion state, the correction control with which the stereoscopic display panel 11 can be driven with the same output state as that of the state before being expanded is performed as in the case of the contraction state.

That is, the expansion-state offset image data generating section (expansion-state correction controller) 111B operates when it is judged that the temperature difference ΔT is ΔT>0 and the lenticular lens 1 is an expansion state to generate parallax image data by applying the second parallax offset processing C on the parallax image data A.

Specifically, the expansion-state offset image generating section (expansion-state correction controller) 111B includes: an image data offset processing function 111d which performs slight shift processing on the left-eye image data of the parallax image data A in the right direction and the right-eye image data in the left direction with a prescribed offset amount of respective parallax levels; a parallax image data generating function 111e which generates parallax image data by superimposing the image data acquired by the image offset processing on the respective image data of before the offset processing; and a 3D image data generating function 111f which generates and outputs two-dimensional 3D image data based on the parallax image data generated by the parallax image data generating function 111e.

Thereby, when the lenticular lens 1 is in an expansion state (ΔT>0), the correction control is executed to perform slight shift processing on the left-eye image data in the right direction and the right-eye image data in the left direction with a prescribed offset amount of respective parallax levels by corresponding to the extent of the temperature difference ΔT. Thus, the expansion state of the lenticular lens 1 is corrected, so that the stereoscopic display panel 11 can be driven with the same output state as that of the state before being expanded even when the lenticular lens 1 of the stereoscopic display panel 11 is in an expansion state. Other structures are the same as those of the first exemplary embodiment described above.

(Overall Actions)

Next, the overall actions of the fifth exemplary embodiment will be described by referring to FIG. 34 to FIG. 38.

Note here that FIG. 35 is a flowchart showing an example of a 3D image data generating action of the fifth exemplary embodiment.

As shown in FIG. 35, in the fifth exemplary embodiment, first, the environmental temperature T including the lenticular lens 1 is measured by the temperature sensor 21, and the temperature difference ΔT with respect to the reference temperature Tth is calculated by a deformation amount calculating section 28 (FIG. 35: step S501/temperature difference specifying step).

Then, as the target of correction, a pair of parallax image data A for the right eye and the left eye rendering processed or captured by a stereoscopic camera in advance are set.

Specifically, almost simultaneously with the calculation of the temperature difference ΔT done by a deformation amount calculating section 28, 3D image data constituted with parallax images stored in a data storage section for generating the 3D image data is specified as the target (parallax image data A) of correction by a command from outside (FIG. 35: step S502/target image data setting step).

Then, judgment of parallax amount correction for the temperature difference ΔT is executed by the temperature difference judging section 30. When judged that the correction is unnecessary, the 3D image data generating function 111G of the main arithmetic operation controller 111 immediately starts to perform 3D image data generating processing on the parallax image data A as the target (FIG. 35: steps S503, S504).

Further, when judged that the correction is unnecessary, the state of the correction environment is judged in the next step, and an optimum correction control suited for the correction environment is executed (FIG. 35: step S506 and thereafter).

This will be described in more details.

First, regarding the judgment of the parallax amount correction for the temperature difference ΔT, absolute values of the temperature difference ΔT calculated by the deformation amount calculating section 28 and the reference value ΔTth set in advance are compared by the temperature difference judging section 30 to judge whether or not the correction of the parallax amount regarding each of the objects specified on the x-axis is necessary (FIG. 35: step S503/correction necessity judging step).

When judged in the correction necessity judging step that the temperature difference ΔT is |ΔT|≤|ΔTth| and it is under a temperature environment that does not require correction of the parallax amount, the 3D image data generating function 111G is operated as described above to generate two-dimensional 3D image data based on the pair of parallax image data A stored in the data storage section as it is and to output it for driving the display panel (FIG. 35: step S504/3D image data generating step). FIG. 36A shows an example of a case of the parallax image data A.

In the meantime, when judged in the correction necessity judging step of step S503 that the temperature difference ΔT is |ΔT|≤|ΔTth| and it is under a temperature environment that requires correction of the parallax amount, it is then judged by the correction environment judging section 29 whether the lenticular lens 1 is in a state of ΔT<0 showing a contraction state or in an state of ΔT>0 showing an expansion state (FIG. 35: step S506/correction environment judging step).

When it is judged in the correction environment judging step of step S506 that the temperature difference ΔT regarding the parallax image data A is ΔT<0 and the lenticular lens 1 is in a contraction state, the contraction-state correction controller 111A of the main arithmetic operation controller 111 immediately operates to execute first parallax offset processing B on the parallax image data A so as to generate parallax image data B (FIG. 35: step S507/offset image generating step).

In the offset image generating step of step S507, specifically, executed are an image data offset processing step in which the image data offset processing function 111a of the main arithmetic operation controller 111 performs shift processing on the left-eye image data of the parallax image data A in the left direction and the right-eye image data in the right direction with a respective prescribed offset amount, and a parallax image data generating step in which the parallax image data generating function 111b operates to generate the parallax image data B by superimposing the image data acquired by each image offset processing on the respective image data of before the offset processing.

Now, regarding the parallax image data B, the processing contents thereof will be described in a specific manner.

Regarding the offset processing B executed when judged that the correction is necessary, the left-eye image is shifted to the left with respect to the parallax image A shown in FIG. 36a, for example, and the right-eye image is shifted to the right by a shift amount e, respectively, as shown in FIG. 36B. Such actions are executed by the image data offset processing function 111a of the contraction-state correction controller 111A.

The parameters for determining the shift amount e are ΔT and the contents held to a memory of the image generating section 22 (i.e., the effective linear expansion coefficient difference of the materials constituting the display panel 11, the panel size, the panel resolution, and the 3D stroke). Among the materials constituting the display panel 11, the parameters other than ΔT can be treated as constants, and a variable is only ΔT.

The shift amount e can be set according to the extent of the temperature difference ΔT. However, it is preferable to set the shift amount e to become larger as ΔT becomes larger. The left end of the left-eye image and the right end of the right-eye image are unable to be used as the image data for the amount of the width e when the offset processing is applied. Thus, the image data of such part is set to black, for example.

Correspondingly, the image data in the right end of the left-eye image and the left end of the right-eye image for the amount of the width e are set to black.

Figure 30C:
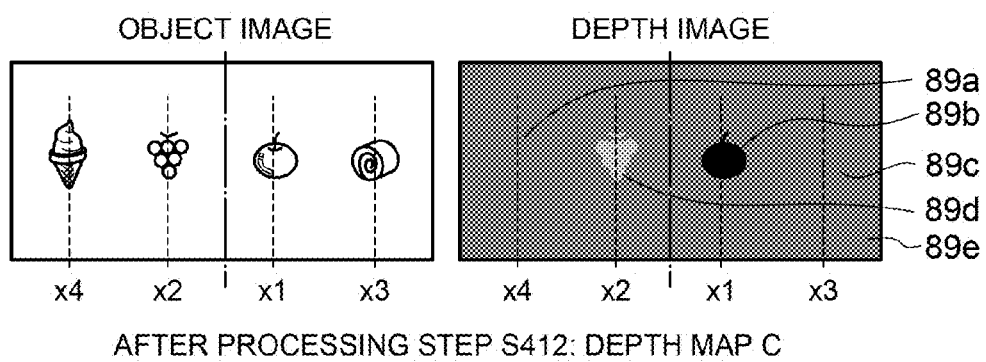

Therefore, the parallax image acquired after performing the offset processing B is in a form of the parallax image B whose both ends are black images for the width e as shown in FIG. 30C.

Subsequently, based on the parallax image data B generated in the offset image generating step of step S507, the 3D image data generating function 111c of the contraction-state correction controller 111A generates and outputs the two-dimensional 3D image data (FIG. 35: step S504/3D image data generating step).

Then, when it is judged in step S506 (the correction environment judging step) of FIG. 35 that the temperature difference ΔT is ΔT>0 and the lenticular lens 1 is in an expansion state, the expansion-state correction controller 111B of the main arithmetic operation controller 111 immediately operates to execute second parallax offset processing C on the parallax image data A so as to generate parallax image data C (FIG. 35: step S508/offset image generating step). FIG. 37 shows the procedure for generating the parallax image data C of this case.

In the offset image generating step of step S508, specifically, executed are an image data offset processing step in which the image data offset processing function 111*d* performs shift processing on the left-eye image data of the parallax image data A in the right direction and the right-eye image data in the left direction with a respective prescribed offset amount, and a parallax image data generating step in which the parallax image data generating function 111*e* operates to generate the parallax image data C by superimposing the image data acquired by each image offset processing on the respective image data of before the offset processing.

Subsequently, based on the parallax image data C generated in the offset image generating step of step S508, the 3D image data generating function 111*f* of the expansion-state correction controller 111B generates and outputs the two-dimensional 3D image data (FIG. 35: step S504/3D image data generating step).

Now, regarding the parallax image data B, the processing contents thereof will be described in a specific manner.

Figure 37A:
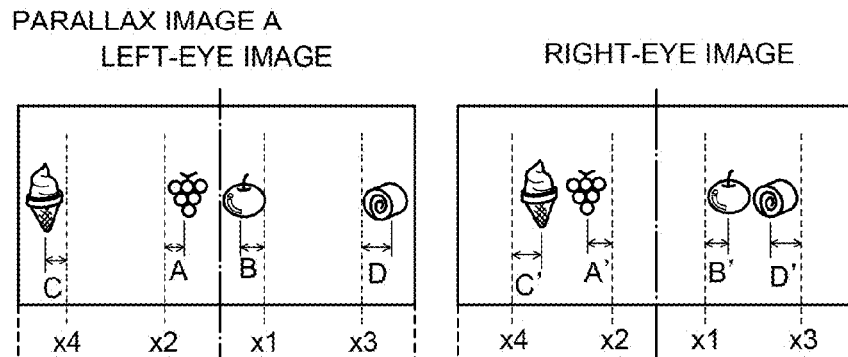
FIG. 37 is an explanatory chart showing a state of offset processing executed in a lens expansion state and an example of 3D image data acquired by the offset processing in the 3D image data generating action along the flowchart shown in FIG. 35.
Figure 37B:
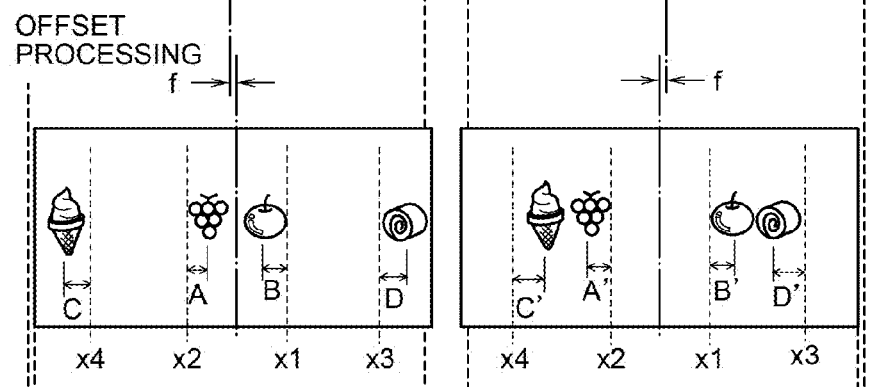
Figure 37C:
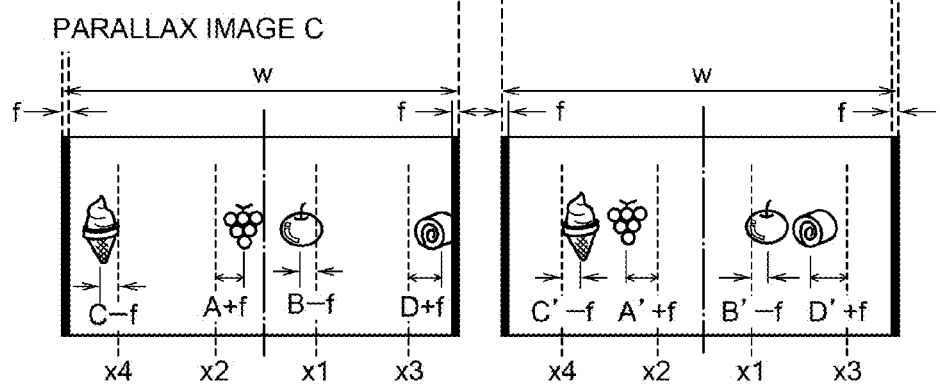

In the case of the lens expansion state, the procedure of the processing is shifted to the offset processing C of step S508 shown in FIG. 35 in which the left-eye image is shifted to the right with respect to the parallax image A shown in FIG. 37A and the right-eye image is shifted to the left by a small amount of shift amount f of a parallax level, respectively, as shown in FIG. 37B.

The parameters for determining the shift amount f are the same as the case of the shift amount e of FIG. 36, and it can be set according to the extent of $\Delta T$. However, it is preferable to set the shift amount f to become larger as $\Delta T$ becomes larger.

As described, the right end of the left-eye image and the left end of the right-eye image are unable to be used as the image data for the amount of the width f when the offset processing is applied. Thus, the image data of such part is set to black, for example. Correspondingly, the image data in the left end of the left-eye image and the right end of the right-eye image for the amount of the width f are set to black. Therefore, the parallax image acquired after performing the offset processing C is in a form of the parallax image C whose both ends are black images for the width f as shown in FIG. 31C.

Figure 38:
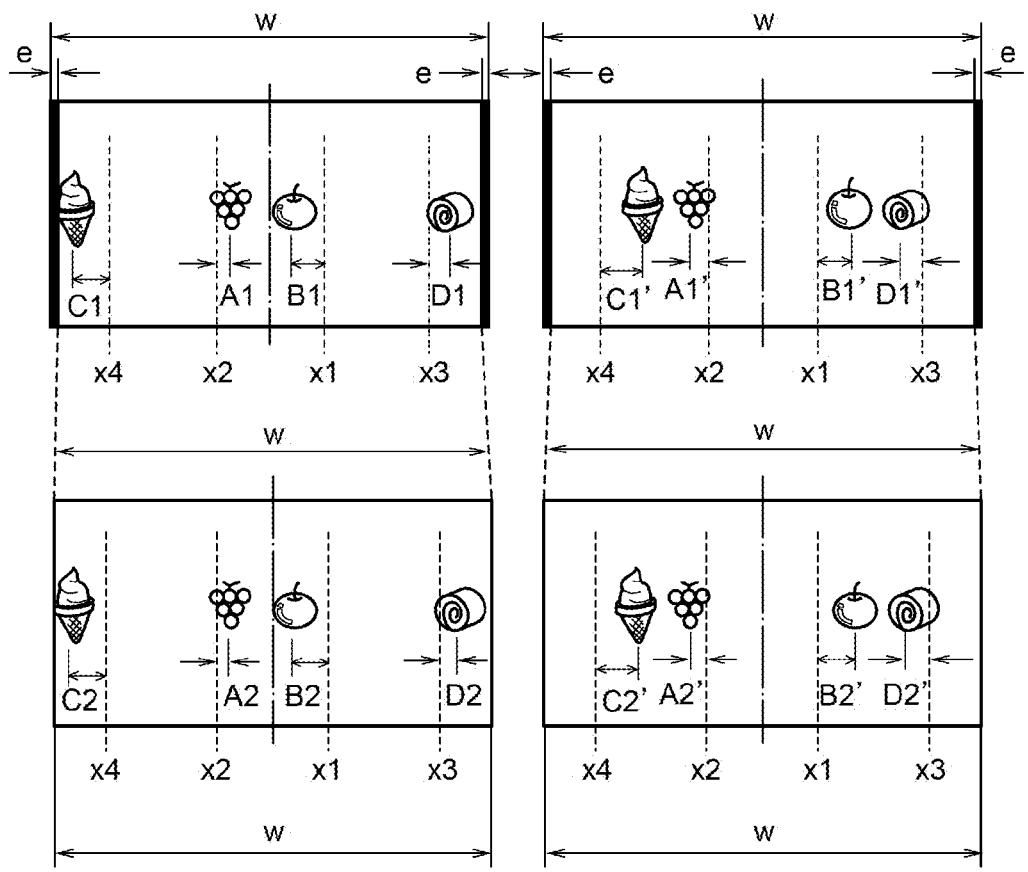
FIG. 38 is an explanatory chart showing an example of scaling processing after the offset processing shown in FIG. 36 and FIG. 37.

While the black image is inserted to both ends of the image in the fifth exemplary embodiment, the present invention is not limited only to that. For example, a background color of the image can be extracted and used for the both ends of the image. Further, it is also possible to cancel the black image part on the both ends of the image once, and scaling processing to expand w−2e to w as shown in FIG. 38 may be applied. With such processing, no black image is displayed in both ends of the generated image.

Note here that execution contents of each of the steps of the overall actions of the fifth exemplary embodiment described above may be put into a program to have it executed by a computer provided to the stereoscopic image generating module 110A.

Other structures and operation effects thereof are the same as the case of the first exemplary embodiment described above.

Further, as described above, the rendering processing is not required in the fifth exemplary embodiment. Thus, compared to the case of the above-described exemplary embodiments where the rendering processing is required, it is possible to use the arithmetic operation device whose performance regarding the processing capacity and arithmetic operation speed required therefore are low. Therefore, there is an advantage that the controller 110 can be structured at a low cost. Further, it is very effective for a case where photographed contents acquired by using a twin-lens reflex camera are used.

Further, while a case of 2-viewpoints regarding the number of viewpoints is described in the fifth exemplary embodiment, the present invention is not limited only to that. The present invention can be employed also to the case of N-viewpoints in the same manner. The same processing can be done also for photographed contents acquired by using a four-lens reflex camera.

(Sixth Exemplary Embodiment)

Next, a sixth exemplary embodiment of the present invention will be described by referring to FIG. 39 to FIG. 56. Note here that same reference numerals are used for the same structural members as those of the first exemplary embodiment.

The sixth exemplary embodiment is characterized to: convert depth information of a 3D object having the depth information to a parallax amount of two-dimensional image information by using a camera setting parameter; accumulate in advance parallax amount adjusting LUT signals to which different changing properties of the stereoscopic viewing region when displaying a popup object and a depth object according to changes in the use environmental temperature are reflected; and execute correction processing for the parallax amount of the two-dimensional image information according to the temperature detected by a temperature sensor and the parallax amount adjusting LUT signals.

(Structure)

Figure 39:
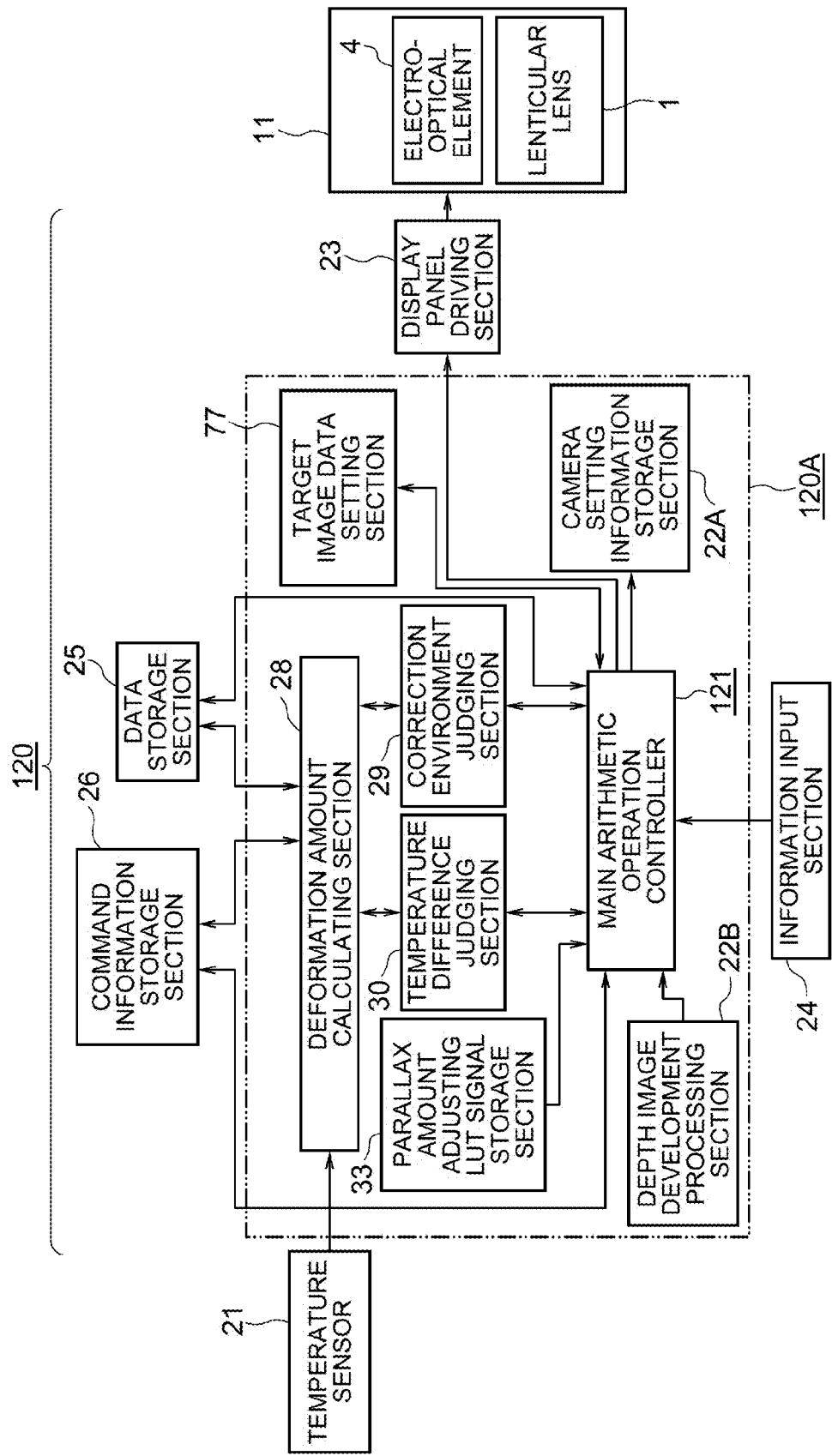

FIG. 39 shows the stereoscopic display device according to the sixth exemplary embodiment.

As in the cases of all the exemplary embodiments described above, the stereoscopic display device includes a display controller 120 which drive-controls a stereoscopic display panel 11. The display controller 120 is provided with a stereoscopic image generating module 120A having a main arithmetic operation controller 121 which restricts the actions of each of the entire structural elements to be described later.

The stereoscopic image generating module 120A includes: a target image data setting section 77 which inputs 3D image data of an object having the depth information or two-dimensional image data rendering-processed in advance (center image data) and depth map data corresponding thereto and accumulates those to the data storage section 25; a parallax amount adjusting signal storage section 33 which accumulates the LUT signals for performing parallax amount correction processing according to the use environmental temperature; a temperature difference judging section 30 which individually performs an arithmetic operation regarding whether or not the absolute value of the temperature difference $\Delta T$ detected by a temperature sensor 21 with respect to the reference temperature is equal to or less than the absolute value of the reference value $\Delta$Tth set in advance, and judges whether or not it is a temperature environment that requires correction for the parallax amount of each object specified on the x-axis on the xy plane; and the above-described main arithmetic operation section 121 for controlling the actions of each of those sections.

Figure 40:
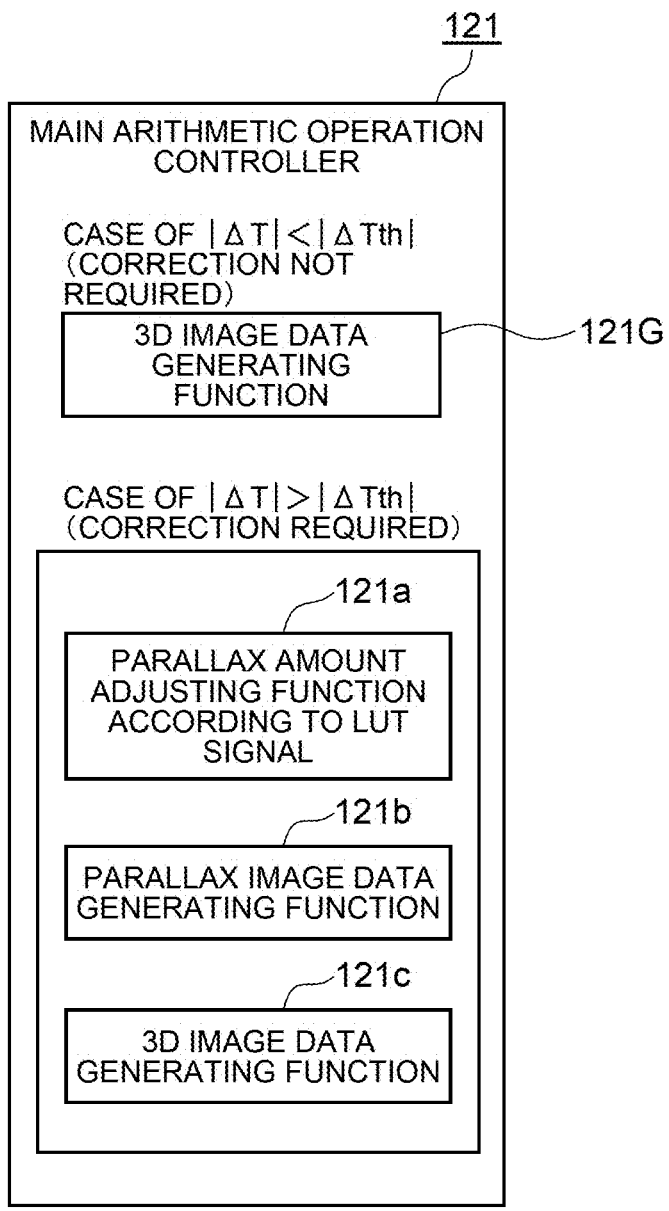
FIG. 40 is a block diagram showing the structure of a main arithmetic operation controller as a main part of the stereoscopic display device according to the sixth exemplary embodiment disclosed in FIG. 39.

Among those, the arithmetic operation controller 121 is shown in FIG. 40. The main arithmetic operation controller includes a 3D image data generating function 121G which operates when it is judged by the temperature difference judging section 30 that the temperature difference $\Delta T$ is $|\Delta T| \le |\Delta Tth|$ and it is under a temperature environment that does not require correction of the parallax amount to convert the depth information of the 3D objects accumulated in the data storage section 25 by using the camera setting information accumulated in the camera information storage section or the two-dimensional image depth map to the parallax amount of the two-dimensional image information, to generate 3D image data based on the two-dimensional parallax image having the parallax amount, and to output it for driving the display panel.

Further, the main arithmetic operation controller 121 includes: a function 121*a* which operates when it is judged by the temperature difference judging section 30 that the temperature difference ΔT is |ΔT|>|ΔTth| and it is under a temperature environment that does not require correction of the parallax amount to adjust the parallax amount of the two-dimensional image information according to the parallax amount adjusting LUT signal that corresponds to the temperature detected by the temperature sensor 21; a function 121*b* which generates parallax images according to the corrected parallax amount; and a function 121*c* which generates 3D image data according to the generated parallax images, and outputs it for driving the display panel. Note here that the parallax amount adjusting LUT signals to which different changing properties of the stereoscopic viewing region when displaying a popup object and a depth object according to changes in the use environmental temperature are reflected can also be generated by using calculated values based on the emitted light rays from the stereoscopic display panel, the actual subjective evaluation values, or the like.

In the sixth exemplary embodiment, the correction amounts for the parallax amounts within a range with which stereoscopic images can be viewed according to all the useable environmental temperatures are put into a single LUT signal, so that it becomes unnecessary to execute the step of judging whether the lenticular lens is in an expansion state or a contraction state based on the signs of ΔT and judgment regarding popup and depth by comparing the depth information and the screen distance. Therefore, the processing speed can be increased further.

(Overall Actions)

Next, the overall actions of the sixth exemplary embodiment will be described by referring to FIG. 41.

Figure 41:
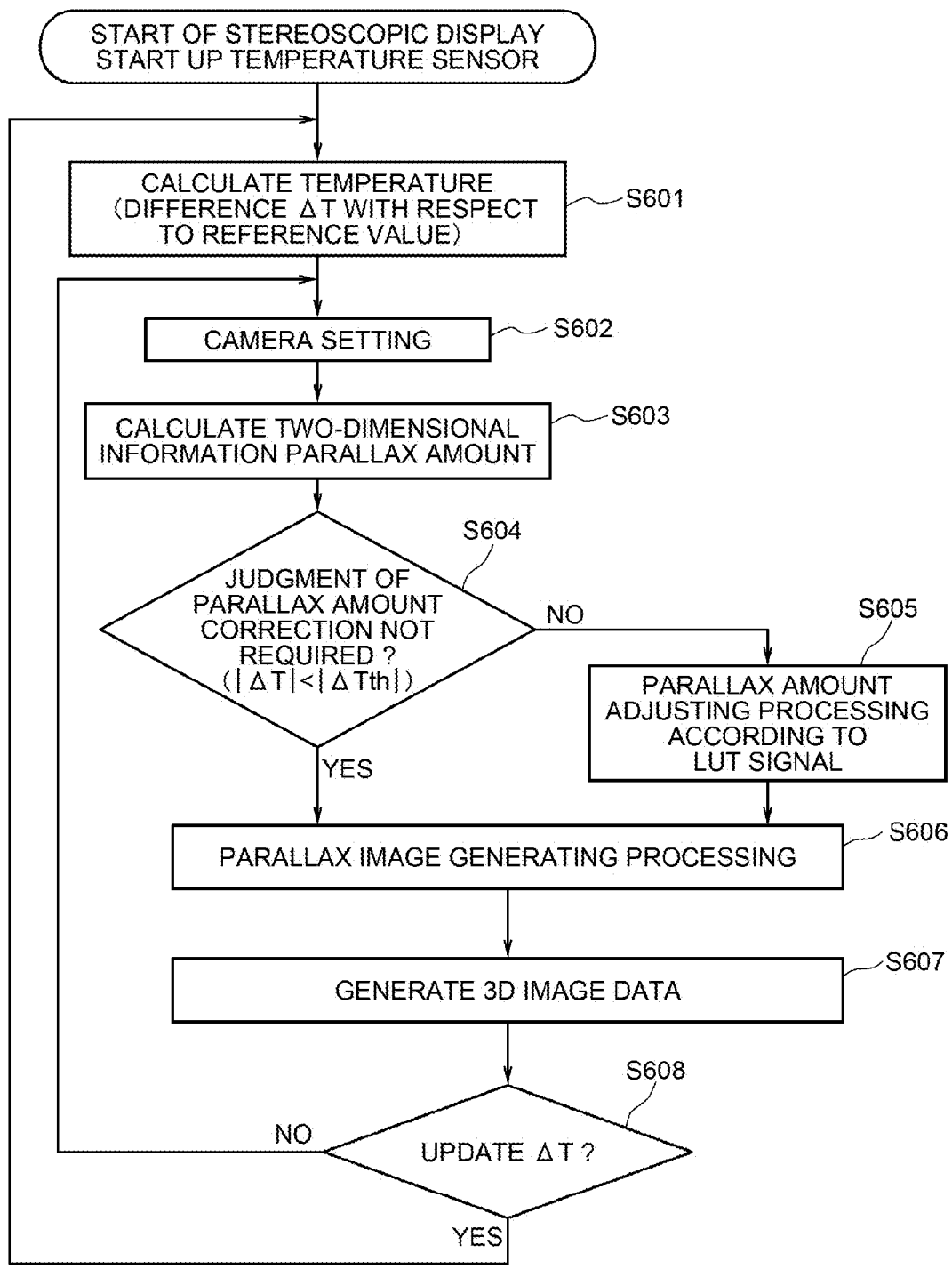
FIG. 41 is a flowchart showing an example of a 3D image data generating action according to the sixth exemplary embodiment disclosed in FIG. 39.

Note here that FIG. 41 is a flowchart showing an example of a 3D image data generating action of this exemplary embodiment.

As shown in FIG. 41, in the sixth exemplary embodiment, first, the environmental temperature T including the lenticular lens 1 is measured by the temperature sensor 21, and the temperature difference ΔT with respect to the reference temperature Tth is calculated by a deformation amount calculating section 28 (FIG. 41: step S601).

Then, the screen face (display face) setting and the camera setting required for the rendering processing condition are done (FIG. 41: step S602). Examples of the camera setting parameters are the camera position ZC, the inter-camera distance XC, the camera viewing angle FOV, and the like as described in the first exemplary embodiment.

Then, the depth map image corresponding to the inputted 3D object depth information and the two-dimensional image data rendering-processed in advance is converted to the parallax amount of the two-dimensional image information by using the set camera information A and the screen face 40 (FIG. 41: step S603/two-dimensional image information parallax amount calculation).

The two-dimensional image information parallax amount calculation step calculates the parallax amount Δu of the two-dimensional image information by a pixel unit by using only the depth information of the z-axis, unlike the case of the rendering processing which generates a two-dimensional image through projection conversion or the like of the three-dimensional data specified by the three axes of x, y, and z described above. While the calculation method thereof varies depending on the image capturing method of the stereoscopic camera, a following expression is used for the case of the cross capturing method.

[Expression 1]

$$\Delta u = XC \cdot \left(\frac{1}{ZC} - \frac{1}{z}\right) \cdot \frac{1}{\tan(FOV/2)} \quad \text{Equation (1)}$$

Note here that Δu is the 2D image information parallax amount by a pixel unit, XC is the inter-camera distance, FOV is the viewing angle of the camera, z is the distance between the 3D object and the camera in the z-axis direction, ZC is the distance between the camera and the screen in the z-axis direction.

While the case of the cross capturing method is described herein, the cases of using other capturing methods such as a parallel capturing method, a shift sensor method, and the like can be handled in the same manner according to the respective equations thereof.

Figure 42:
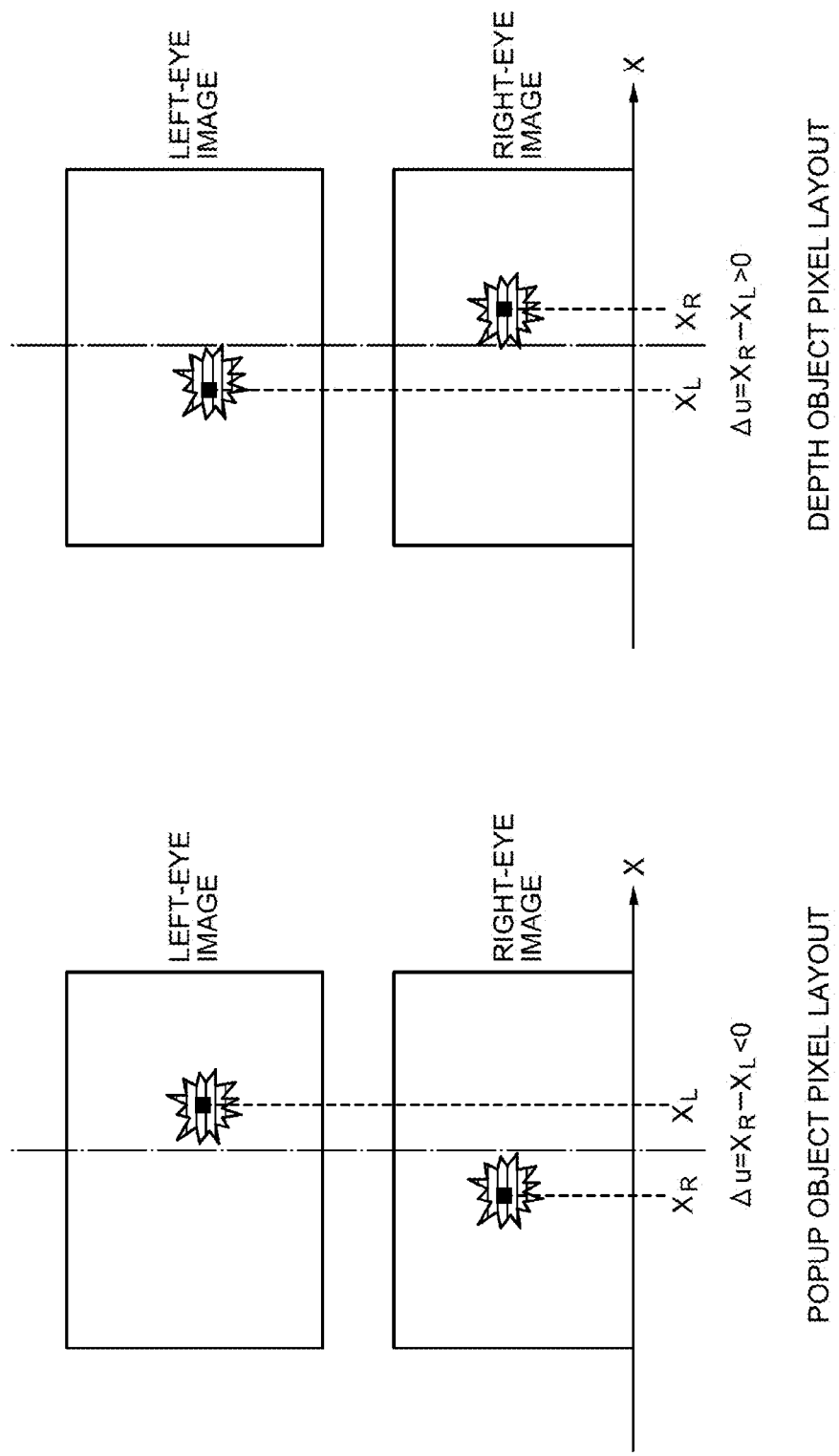
FIG. 42 is an explanatory chart of a parallax amount Δu.

Hereinafter, the definition of Δu will be described in details by using FIG. 42. As the parallax amount Δu, the difference (XR−XL) between an x-axis coordinate value XR of a pixel showing a given 3D object within a right-eye image and an x-axis coordinate value XL of a pixel that shows the same 3D object within the left-eye image and corresponds to the right-eye pixel is defined is defined as 2D image information parallax amount Δu.

From (1/ZC−1/z) included in Equation (1), the parallax amount Δu of the pixel corresponding to an object (z<ZC) on the front side than the screen face is a negative value, the parallax amount Δu of the pixel corresponding to an object (z>ZC) on the farther side than the screen face is a positive value, and the parallax amount Δu of the pixel corresponding to an object (z=ZC) on the screen face is 0.

Then, the temperature difference judging section 30 judges the parallax amount correction for the temperature difference ΔT (FIG. 41: S604/correction necessity judging step). In a case of |ΔT|≤|ΔTth|, i.e., when judged that the correction is unnecessary, parallax images are generated according to the two-dimensional image information, and 3D image data generating processing is executed subsequently based on the two-dimensional parallax image that holds the parallax amount of the two-dimensional image information (FIG. 41: S606/parallax image generating processing).

In the meantime, when judged that |ΔT|>|ΔTth| and the correction is necessary, the parallax amount of the two-dimensional image information is converted to the parallax amount that is optimum to the temperature detected by the temperature sensor 21 by a pixel unit according to the parallax amount adjusting LUT signal (FIG. 41: S605/parallax amount adjusting processing).

Then, parallax images are generated from the adjusted parallax amount of the two-dimensional image information (FIG. 41: S606/parallax image generating processing), and 3D image data generating processing is executed based on the corrected parallax images (FIG. 41: S607/3D image data generation).

Figure 43:
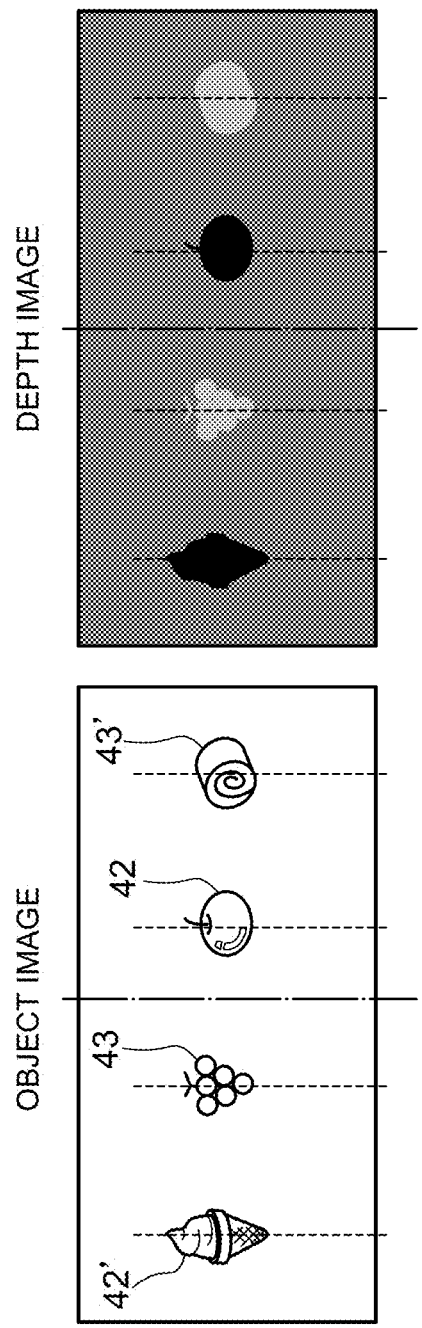
Figure 44:
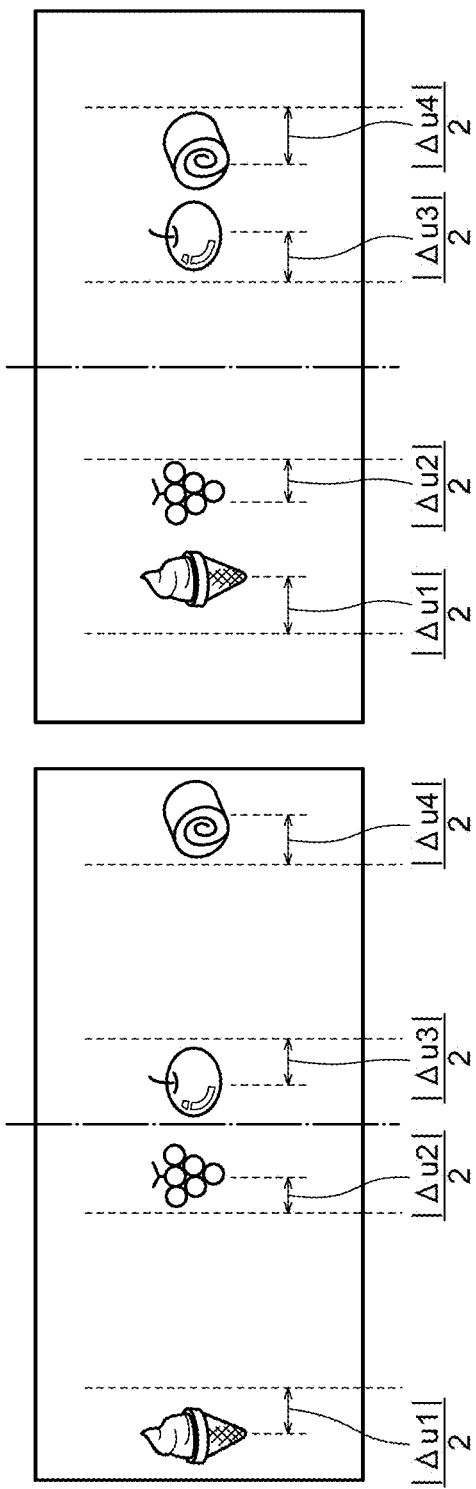
FIG. 44 shows parallax images generated from the images of FIG. 43 in a case where a temperature correction is unnecessary.

Hereinafter, an example of the parallax amount correction executed based on the parallax amount adjusting LUT signal will be described in details by using FIG. 43. As an example of input data, a case of depth image data showing two-dimensional image data rendering-processed in advance (center image data) and depth information thereof will be described. However, the same can be employed for a case where three-dimensional data is inputted. In that case, $\Delta u$ may be calculated directly for the inputted three-dimensional data by using only the depth information of the z-axis direction. Thereafter, the next processing is executed.

First, the environmental temperature T including the lenticular lens 1 is measured by the temperature sensor 21, and the temperature difference $\Delta T$ with respect to the reference temperature Tth is calculated by the deformation amount calculating section 28 (FIG. 41: S601).

Then, the camera parameters accumulated in the camera setting information storage section are read out to the main arithmetic operation controller 121 (FIG. 41: S602). The camera setting parameters read out to the main arithmetic operation controller 121 and the depth image data shown in FIG. 43 are substituted to Equation (1) to calculate the parallax amount of each pixel within the inputted 2D image (FIG. 41: S603). That is, distinctions regarding the pixels showing the popup object and the pixels showing the depth object can be made based on the signs of the parallax amount. Further, from Equation (1), the parallax amount $\Delta u$ becomes smaller to the negative direction as the distance between the object and the camera becomes smaller. The LUT signal can be generated based on that. Values of the parallax amounts of the four objects (42', 43, 42, 43') shown in FIG. 43 are expressed as $\Delta u1$, $\Delta u2$, $\Delta u3$, and $\Delta u4$ in this order. As shown in the gray scale of the depth image shown in FIG. 43, the distance between the camera and the object becomes larger in order of 43, 43', 42', 42. Accordingly, the relation regarding the parallax amounts of the four objects is expressed as $\Delta u2 < \Delta u4 < \Delta u1 < \Delta u3$.

Note here that $\Delta u2$ and $\Delta u4$ are negative values, and $\Delta u1$ and $\Delta u3$ are positive values.

Then, when judged in the correction necessity judging step (FIG. 41: S604) that $|\Delta T| \leq |\Delta Tth|$, i.e., when judged that it is under the temperature environment that does not require the correction of the parallax amount, each of the objects is shifted to the left and right directions, respectively, by a half of the parallax amount absolute value $|\Delta u|$ to generate the parallax images shown in FIG. 44 (FIG. 41: S606). Subsequently, 3D image data generating processing is executed based on the two-dimensional parallax images that hold the parallax amount of the two-dimensional image information (FIG. 43) (FIG. 41: S607).

Figure 46:
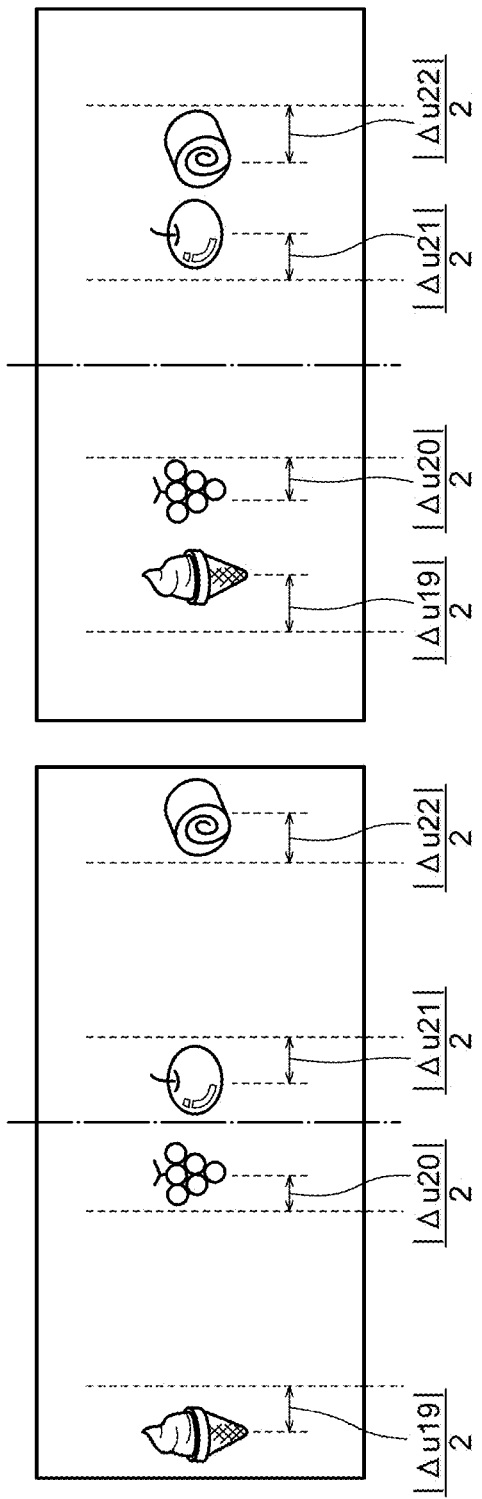
FIG. 46 shows parallax images generated from the images of FIG. 43 after performing temperature correction processing.

In the meantime, when judged that the correction is necessary, the parallax amount of the two-dimensional image information is converted to the parallax amount that is optimum to the temperature detected by the temperature sensor 21 by a pixel unit according to the parallax amount adjusting LUT signal (FIG. 41: S605). For example, when the temperature value outputted from the temperature sensor is T3, the parallax amounts ($\Delta u1$, $\Delta u2$, $\Delta u3$, $\Delta u4$) of the four objects shown in FIG. 43A are converted to the parallax values ($\Delta u19$, $\Delta u20$, $\Delta u21$, $\Delta u22$) which are optimum under the T3 temperature, the parallax images shown in FIG. 46 are generated according to the adjusted two-dimensional image information parallax amounts (FIG. 41: S606), and 3D image data generating processing is executed based on the corrected parallax images (FIG. 41: S607).

(Example for Generating LUT Signal)

As described above, the parallax amount adjusting LUT signal can be generated from the subjective evaluation acquired from an evaluation test regarding the dependency of the stereoscopic viewing region on the temperature, theoretical calculation values regarding the display light rays from the stereoscopic display panel, or the like.

As a way of example, a method for generating the LUT signal from the evaluation test regarding the dependency of the stereoscopic viewing region on the temperature will be described by using FIG. 47. FIG. 47 shows the evaluation result of the stereoscopic viewing region for the objects whose parallax amounts $\Delta u$ are (−15, −10, −5, 5, 10, 15), when the use environmental temperature of the stereoscopic display device 11 is increased from 25° C. to 60° C. and the 3D region is limited to 10% of the screen entire region from the center of the screen at a given temperature. FIG. 47 shows data at the temperatures of 25° C., 45° C., 50° C., 55° C. From FIG. 47, it can be found that the stereoscopic range when observing the object having a positive parallax amount does not change as the temperature increases but the stereoscopic range when observing the object having a negative parallax amount becomes narrower. As described above, the object having the negative parallax amount is a popup object, and the object having the positive parallax amount is a depth object. Thus, this result does not conflict with the contents described above.

Then, an expected value of the stereoscopic viewing region due to the change in the temperature is decided as a correction target. While this correction target is set arbitrarily according to the use environment of the stereoscopic display device, application thereof, and the like, the stereoscopic viewing region at a normal temperature is set as the correction target herein. That is, in order to secure the stereoscopic viewing region of the normal temperature even when there is a change in the use environmental temperature, the parallax amount of the two-dimensional image information is adjusted to the optimum parallax amount.

When the parallax amount is positive in FIG. 47, the stereoscopic viewing region does not change even when the temperature increases. Thus, the optimum parallax amount is set to be the same parallax amount as the amount before being corrected. Further, when the parallax amount is negative, the stereoscopic viewing region is decreased as the temperature increases. In order to keep the stereoscopic viewing region of the normal temperature, it is required to decrease the absolute value of the parallax amount while referring to the actual measurement data shown in FIG. 47. For example, at 25° C., the actual measurement of the stereoscopic viewing region is 70% for the object whose parallax amount is −15 pixels. When the use environmental temperature turns to 50° C., the actual measurement of the stereoscopic viewing region of the object whose parallax amount is −10 pixels is exactly 70%. Thus, in order to keep the actual measurement value of the normal temperature for the object whose parallax amount is −15 pixels, the parallax amount needs to be converted to −10 pixels.

Further, when there is no parallax amount corresponding to the stereoscopic viewing region completely matches the stereoscopic viewing region of the normal temperature found from the actual measurement data under a given use environmental temperature, the optimum parallax amount is calculated by executing average value processing, round-off processing, or the like by referring to the parallax amount corresponding to the value closest to the stereoscopic viewing region of the normal temperature. For example, when the use environmental temperature is at 45° C., there is no parallax amount corresponding to the 70% stereoscopic viewing region for the object whose parallax amount is −15 pixels found in the actual measurement data. However, the evaluation result of the stereoscopic viewing region of the object whose parallax amount is −15 pixels is 80%, so that the stereoscopic viewing region can be returned to the data of the normal temperature by adjusting the object whose parallax amount is −15 pixels to the object of −12 pixels. The generated LUT signal is shown in FIG. 48.

Figure 49:
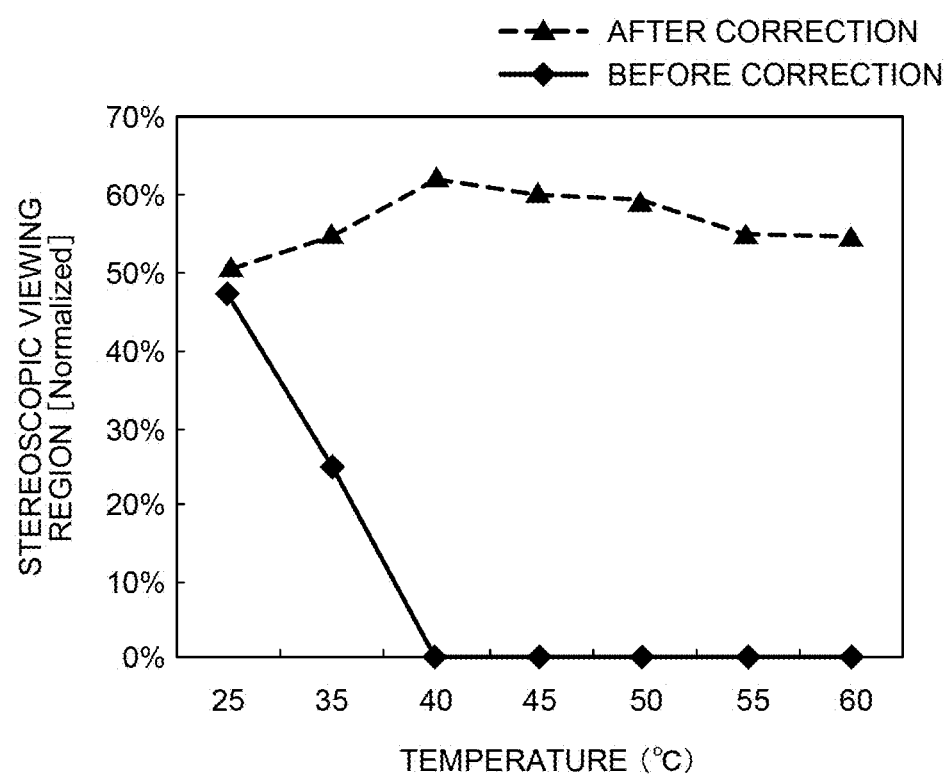
FIG. 49 is a graph showing an evaluation result for an object with a parallax amount of 18 pixels when the use environmental temperature of the stereoscopic display device is changed from 25° C. to 60° C.

Next, the contents of the evaluation of the stereoscopic viewing region for the use environmental temperature executed by using the method of the sixth exemplary embodiment will be described. FIG. 49 shows the evaluation result of the object whose parallax amount is 18 pixels when the use environmental temperature of the stereoscopic display device 11 is changed from 25° C. to 60° C. Note here that the evaluation was done under the condition that the proportion of the size of the parallax image with respect to the entire screen in the X-axis direction defined in FIG. 7 was taken as the 3D region and parallax images where the 3D region was defined to be 10% from the center of the screen were prepared. According to the result shown in FIG. 49, it is verified that the stereoscopic viewing region of the object closer than the center of the screen at the time of high temperatures is returned to the same value at the time of the normal temperature by using the parallax amount adjusting value LUT signal.

Note here that execution contents of each of the steps of the overall actions of the sixth exemplary embodiment described above may be put into a program to have it executed by a computer provided to the stereoscopic image generating module 120A. Other structures and operation effects thereof are the same as the case of the first exemplary embodiment described above.

Further, the judging step of the popup and depth objects is not required in the sixth exemplary embodiment. Thus, compared to the case of the above-described exemplary embodiments, it is possible to use the arithmetic operation device whose performance regarding the processing capacity and arithmetic operation speed required therefore is low. Therefore, there is an advantage that the controller 120 can be structured at a low cost.

Other structures and operation effects thereof are the same as the case of the first exemplary embodiment described above.

(Modification Example (1))

Next, a modification example (1) of the sixth exemplary embodiment will be described. The LUT signal shown in FIG. 48 is generated based on the actual measurement data of the case where the 3D image is limited to the 10% of the entire screen from the center of the screen. As shown in FIG. 73, it is not possible to employ such property that there is a prominent decrease in the stereoscopic viewing region when the popup image is observed than when the depth image is observed on the high-temperature side as the 3D image used for evaluation shifted from the center of the screen and that there is a prominent decrease in the stereoscopic viewing region when the depth image is observed than when the popup image is observed on the low-temperature side. It is because the degrees of the influence of the fluctuation of the lens pitch are different for the case where the 3D image is in the center of the screen and on the outer side of the screen. Particularly, the fluctuation amount of the lens total pitch is great on the outer side of the screen, so that the influence is large. Thus, it is expected that there is a large correction error generated when performing correction of the stereoscopic viewing region of a 3D object at an arbitrary position within the display screen by using the LUT signal generated from the evaluation result of the stereoscopic viewing region for the temperatures regarding the 3D object located at a specific position on the display screen.

Figure 50:
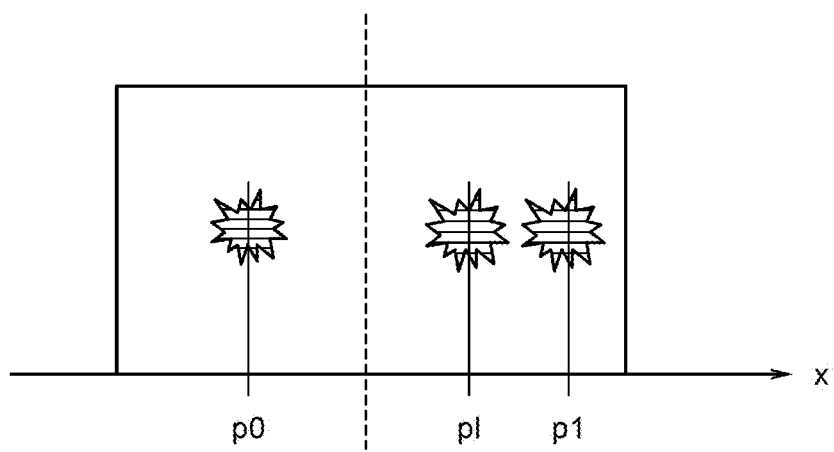
FIG. 50 is a chart showing a 3D object placed on x-axis of a display screen in Modification Example (1) of the sixth exemplary embodiment of the present invention.

In order to prevent such correction error, two smallest measurement positions (p0, p1) are set along the x-axis on the display screen as shown in FIG. 50, and 3D objects for evaluation are located at those measurement positions. Then, the temperature is adjusted to (T1, T2, - - - ), and the evaluation of the stereoscopic viewing region is executed for the objects located at the measurement positions (p0, p1, - - - ) at each temperature. Thereby, the LUT signals (LUT0, LUT1, - - - ) corresponding to each of the measurement positions (p0, p1, - - - ) can be generated.

Note here that those are defined as LUT0 and LUT1. The LUT0 signal is generated based on the evaluation result of the stereoscopic viewing region for the object located at the p0 position, and it is shown in FIG. 51. The LUT1 signal is generated based on the evaluation result of the stereoscopic viewing region for the object located at the p1 position, and it is shown in FIG. 52.

Then, a correction amount most suited for an arbitrary position p1 on the x-axis of the display screen is interpolated based on the acquired LUT0 signal and the LUT signal 1. As a correction method, it is possible to use linear, N-order (N is a natural number of 2 or larger), Gaussian functions, or the like. Correction using a linear function is described hereinafter as a way of example. In a case where the object having the parallax amount $\Delta u1$ is located at the position of p0 shown in FIG. 50 when the use environmental temperature is T2 (° C.), the optimum parallax amount after being corrected is $\Delta u'13$ from the parallax adjusting signal LUT0. In a case where the object having the parallax amount $\Delta u1$ is located at the position of p1 shown in FIG. 50, the optimum parallax amount after being corrected is $\Delta u''13$ from the parallax adjusting signal LUT1. Under the same use environmental temperature T2, the optimum parallax amount $\Delta ui$ after being corrected at the time when the object shifts to the position of pi can be calculate by a following equation.

[Expression 2]

$$\frac{\Delta u_i - \Delta u''13}{pi - p0} = \frac{\Delta u'13 - \Delta u''13}{p1 - p0} \qquad \text{Equation (2)}$$

Figure 53:
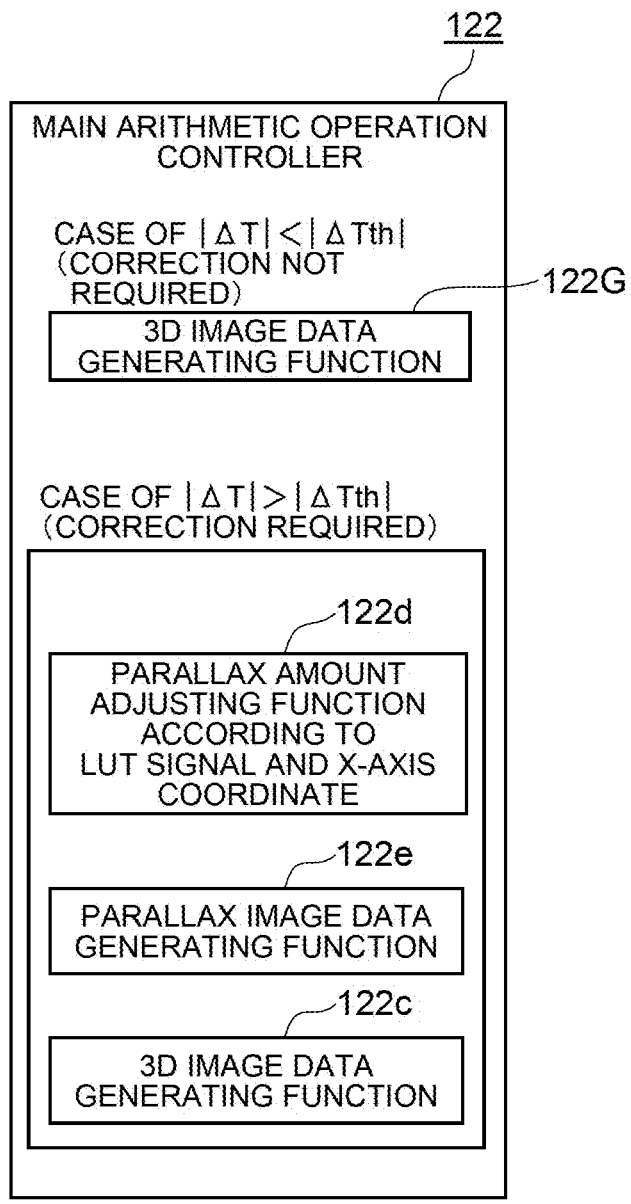
FIG. 53 is a block diagram showing each structural element of a main arithmetic controller 122 according to Modification Example (1) of the sixth exemplary embodiment.

FIG. 53 is a block diagram showing each structural element of the main arithmetic operation controller 122 of the modification example (1) of the sixth exemplary embodiment. The main arithmetic operation controller 122 includes a 3D image data generating function 122G which operates when it is judged by the temperature difference judging section 30 that the temperature difference $\Delta T$ is $|\Delta T| \leq |\Delta Tth|$ and it is under a temperature environment that does not require correction of the parallax amount to convert the depth information of the 3D objects accumulated in the data storage section 25 by using the camera setting information accumulated in the camera information storage section or the two-dimensional image depth map to the parallax amount of the two-dimensional image information, to generate 3D image data based on the two-dimensional parallax image having the parallax amount, and to output it for driving the display panel.

Figure 54:
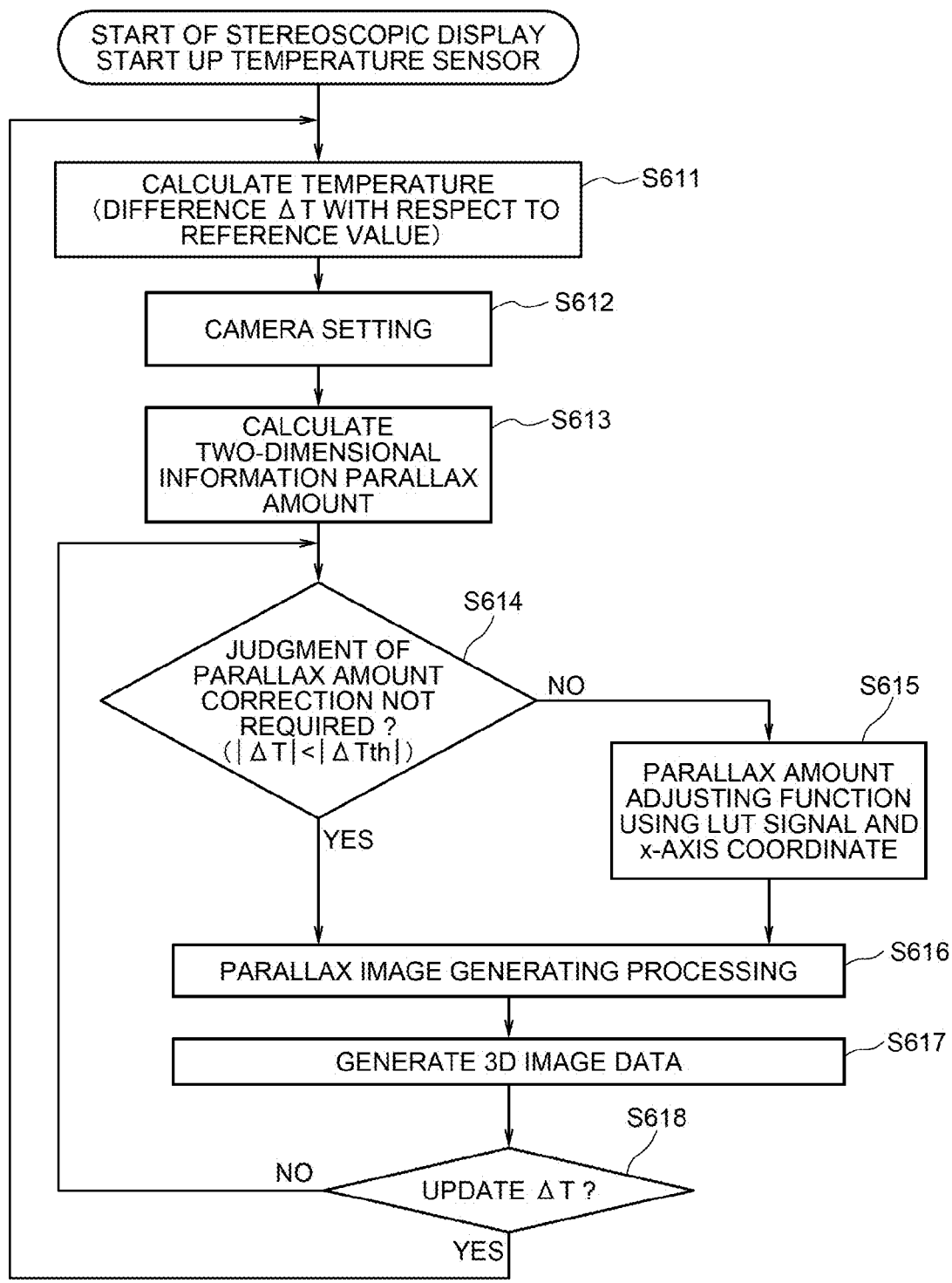
FIG. 54 is a flowchart showing an example of a 3D image data generating action according to Modification Example (1) of the sixth exemplary embodiment.

FIG. 54 is a flowchart showing a 3D image data generating action of the modification example (1) of the sixth exemplary embodiment. As shown in FIG. 53, step 611 to step 614 are the same as step S601 to step S604 described in the sixth exemplary embodiment, so that explanations thereof are omitted.

The temperature difference judging section 30 judges the parallax amount correction for the temperature difference $\Delta T$ (FIG. 54: S614/correction necessity judging step). When judged that the correction is unnecessary, parallax images are generated according to the two-dimensional image information (FIG. 54: S616/parallax image generating processing). Subsequently, 3D image data generating processing is executed based on the two-dimensional parallax image that holds the parallax amount of the two-dimensional image information (FIG. 54: S617/3D image data generation).

In the meantime, when judged that the correction is necessary, a plurality of parallax amount adjusting signals, i.e., LUT0 signal, LUT1 signal, - - -, accumulated in advance to the parallax amount adjusting LUT signal storage section and the x-axis coordinates p0, p1, - - - on the display screen corresponding to each of the LUT signals are substituted to Equation (2) to calculate the optimum parallax amount for a given pixel at an arbitrary x-axis coordinate within the display screen (FIG. 54: S615/parallax amount adjusting function). Parallax images are generated according to the calculated optimum parallax amount of the two-dimensional image information (FIG. 54: S616/parallax image generating processing), and 3D image data generating processing is executed (FIG. 54: S617/3D image data generation). Other structures and operation effects thereof are the same as the case of the sixth exemplary embodiment described above.

In a case where those other than the linear function is used as the correction method, it is possible to generate the LUT signals that correspond to two or more measurement positions to improve the correction accuracy. With the modification example (1), while the LUT signals are increased, there is an advantage that a prescribed stereoscopic viewing region can be secured even when the display screen is in a large scale, in addition to securing the stereoscopic viewing region of a 3D object at an arbitrary position within the display screen.
(Modification Example (2))

Next, a modification example (2) of the sixth exemplary embodiment will be described by referring to FIG. 55 to FIG. 56. The sixth exemplary embodiment is described for the case where the 2D image data having depth information or 3D data is used as the input data.

However, as shown in the fifth exemplary embodiment, it can also be applied to parallax images generated in advance by performing rendering processing and to two-dimensional data having no depth information such as parallax images captured by a stereoscopic camera. A case of using the two-dimensional data will be described hereinafter.

Figure 55:
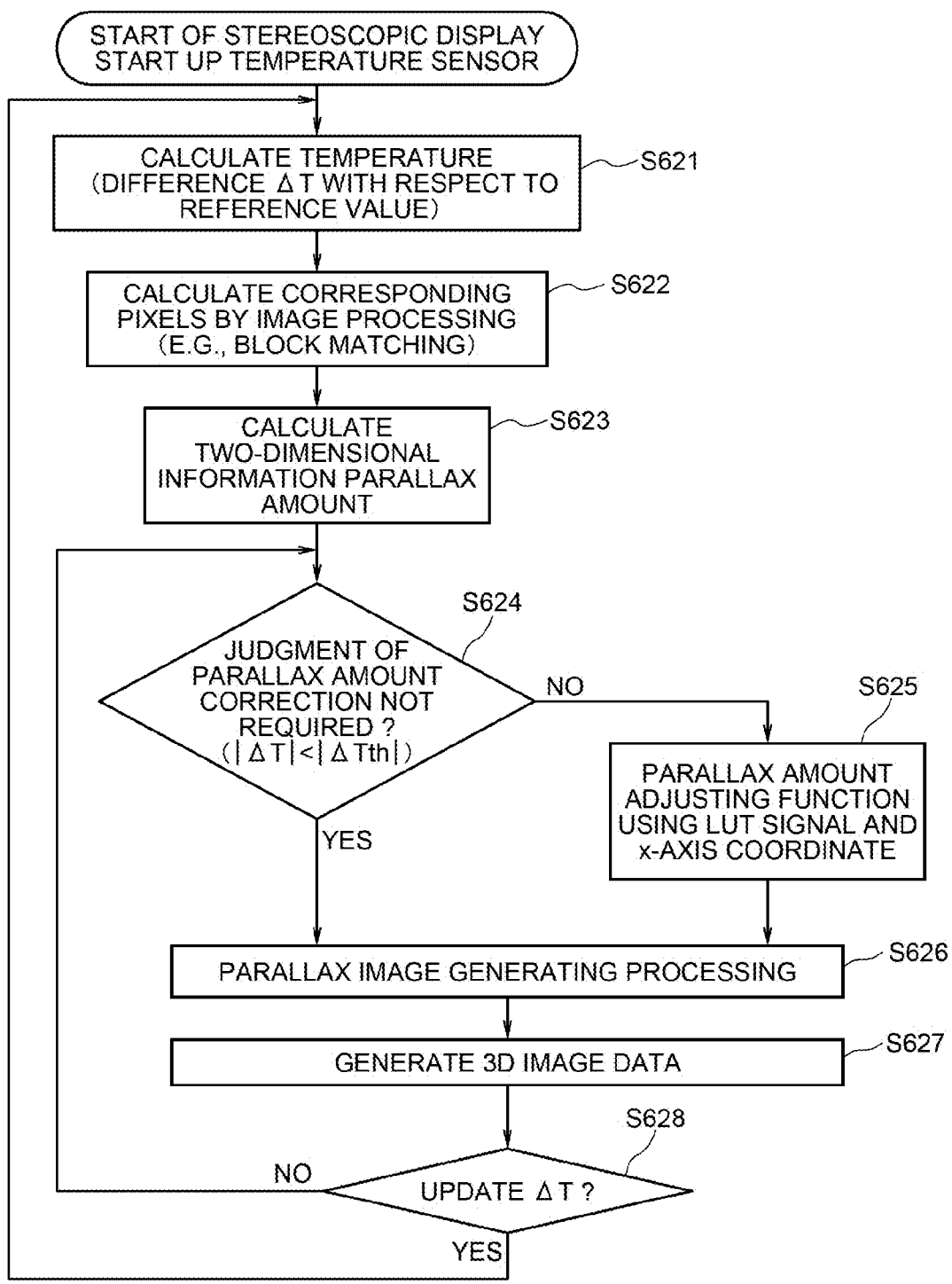
FIG. 55 is a flowchart showing an example of a 3D image data generating action according to Modification Example (2) of the sixth exemplary embodiment.
Figure 56:
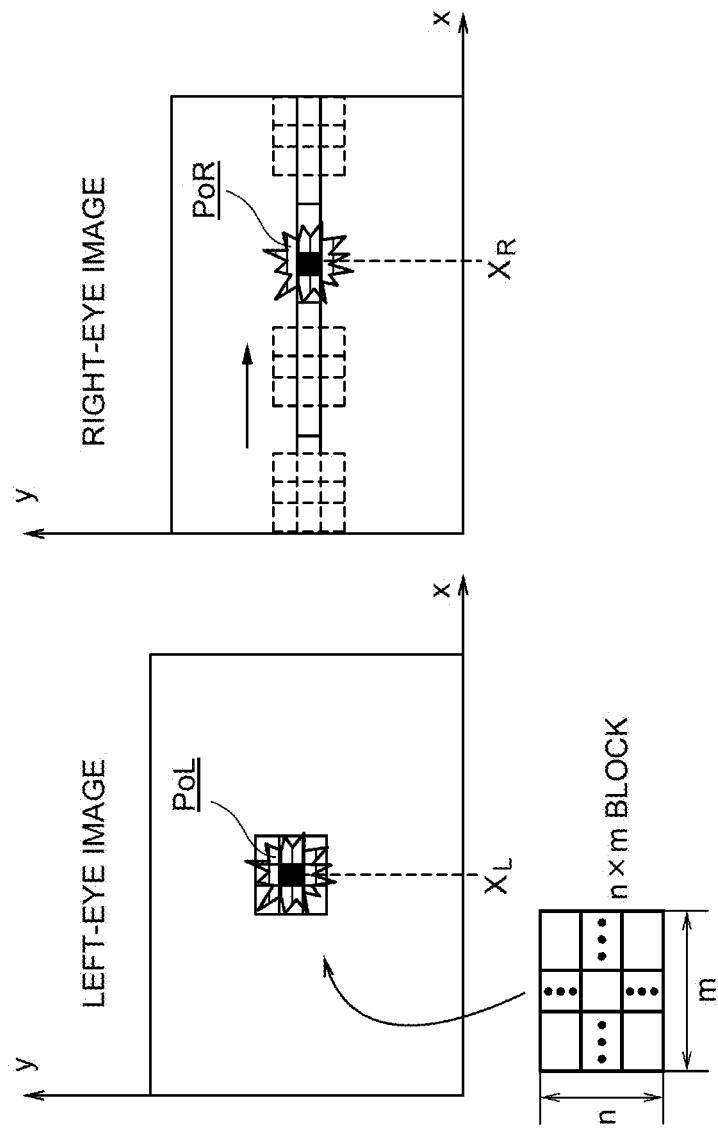
FIG. 56 is a chart showing an example of a corresponding pixel searching method by using a block matching technique.

FIG. 55 is a flowchart showing an example of a 3D image data generating action of the modification example (2) of the sixth exemplary embodiment. First, the temperature sensor 21 is started up, and ΔT that is the difference between the detected temperature T of the lenticular lens 1 and the reference temperature Tth (normal temperature in the first exemplary embodiment) set in advance is calculated by the deformation amount calculating section 28 (FIG. 55: step S621/temperature detection step).

Subsequently, for the parallax images generated in advance by performing rendering processing and the two-dimensional data having no depth information such as parallax images captured by a stereoscopic camera, corresponding pixels in the left-eye image and the right-eye image are searched by using image processing techniques such as block matching, SIFT (Scale-invariant feature transform), image division, and the like.

An example of a corresponding pixel searching method by the block matching technique will be described hereinafter. FIG. 56 is a chart for describing the method for searching the corresponding pixels in the left-eye image and the right-eye image by using block matching. Note here that the left-eye image shown in FIG. 56 is defined as a reference image, and the right-eye image is defined as a search image. When searching a corresponding pixel of a given pixel PoL of the left-eye image in the right-eye image, first, a block window of n×m, by having the pixel PoL as the center is set. Then, a pixel having the same y-axis coordinate as that of PoL in the right image is taken as the search target. The block windows of the above-described size (n×m) are set by having those search target pixels as the centers. Thereafter, differences between the pixels of each block window set within the search image and the block window having the pixel PoL within the reference image are calculated. When the difference becomes the minimum, the center pixel PoR of the block window within the search image is searched as the corresponding pixel of PoL. The, as described above, the difference of the coordinate of the corresponding pixel with respect to the x-axis is calculated as the parallax amount of the pixel (FIG. 55: S622/corresponding pixel calculating step).

Step S623 to step S628 shown in FIG. 55 are the same as step S613 to S618 of FIG. 54 described in the modification example (1) of the sixth exemplary embodiment. For the parallax amount adjusting function, it is possible to use the same processing (parallax amount adjustment that does not use the x-axis coordinate) as that of S605 of FIG. 41 described in the sixth exemplary embodiment. Other structures and operation effects thereof are the same as the case of the sixth exemplary embodiment.

With the modification example (2), image data having no depth information can be utilized. Thus, the camera setting shown in FIG. 42 becomes unnecessary. It is very effective when photographed contents acquired by using a twin-lens reflex camera are used.
(Seventh Exemplary Embodiment)

Next, a seventh exemplary embodiment of the present invention will be described by referring to FIG. 57 to FIG. 63.

The seventh exemplary embodiment is characterized to adjust the parallax amount of 3D image data according to the temperature difference ΔT as depicted in all the above-described exemplary embodiments and to adjust the parallax amount of the 3D image data according to the contrast difference between the 2D background and the 3D object (see FIG. 57) when performing rendering processing of the 3D object in the 2D background.

Figure 57:
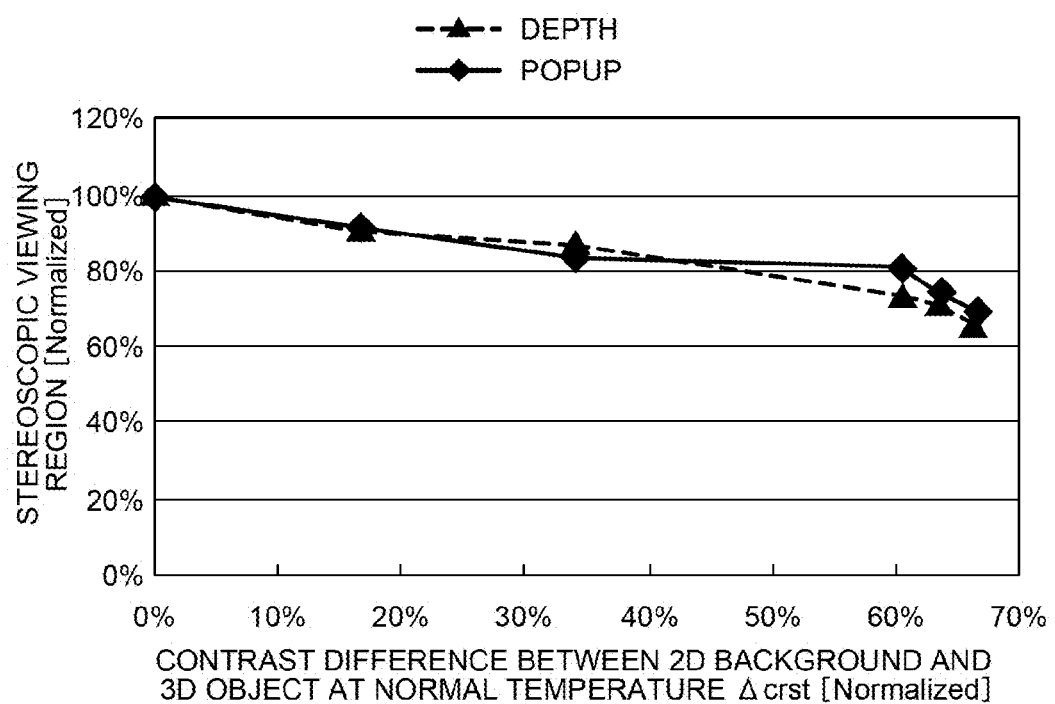
FIG. 57 is a graph showing a stereoscopic viewing region evaluation result when the contrast difference between a 2D background and a 3D object on a display screen at a normal temperature is changed from 0% to 70%.
Figure 58:
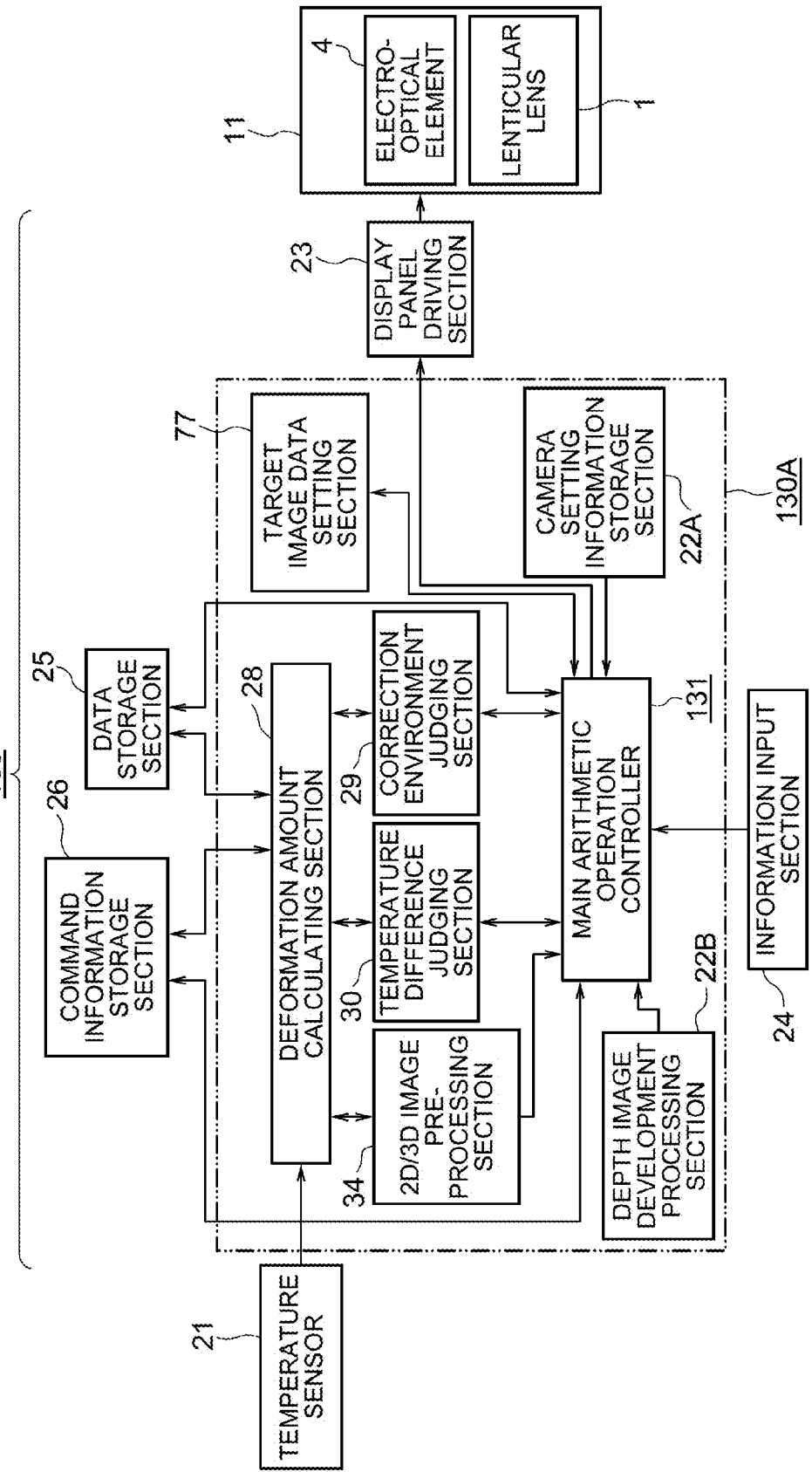
FIG. 58 is a block diagram showing an entire structural example as an example of a stereoscopic display device according to a seventh exemplary embodiment of the present invention.
Figure 59:
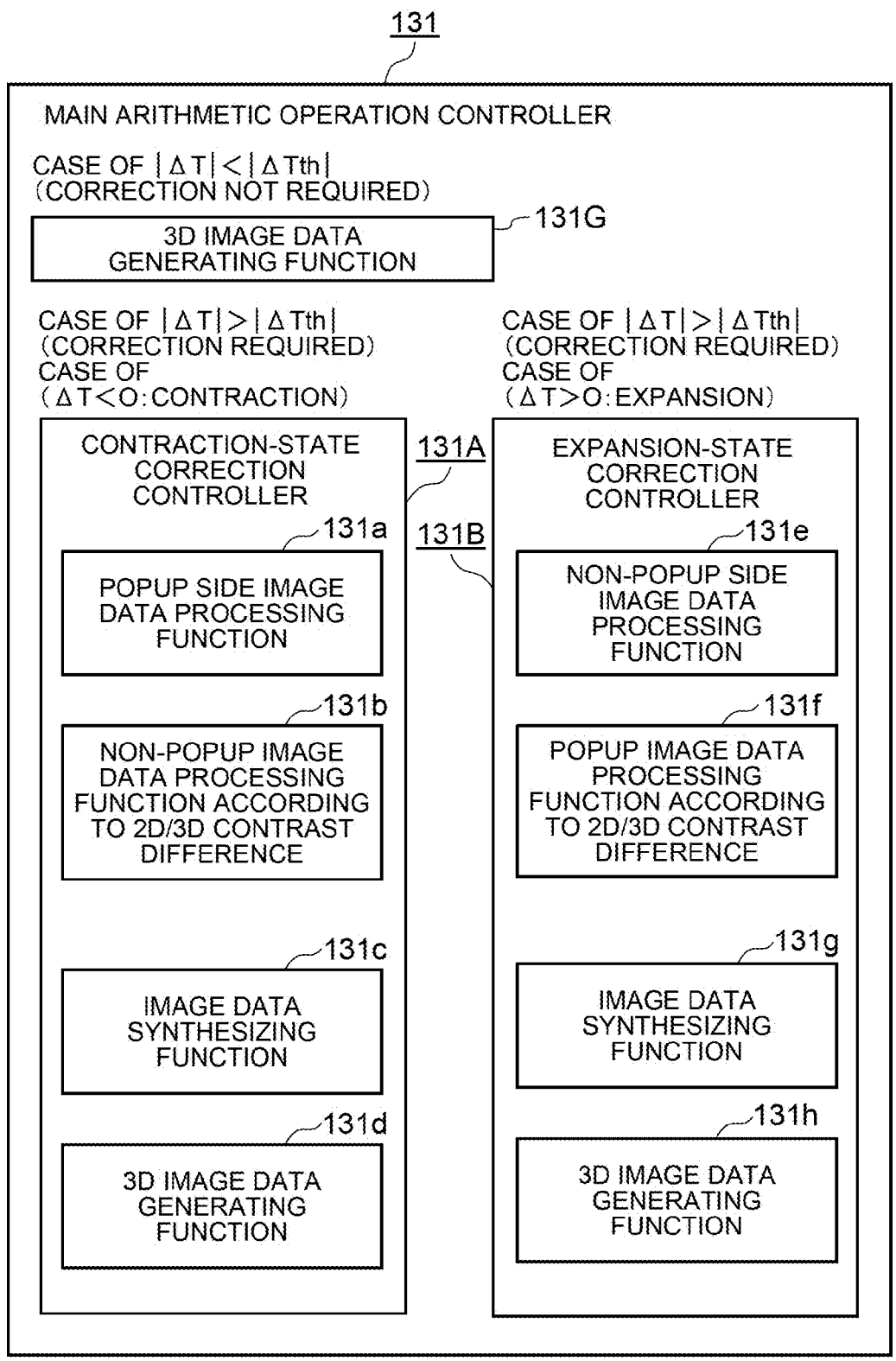
FIG. 59 is a block diagram showing the structure of a main arithmetic operation controller as a main part of the seventh exemplary embodiment disclosed in FIG. 58.

In terms of the light ray geometrics described by using the 3D crosstalk concept in FIG. 83 to FIG. 84 and FIG. 89 to FIG. 90, the contrast difference Δcrst between the 2D background and the 3D object is considered not to depend on the stereoscopic viewing region when viewing the 3D object on 2D. However, it is found by the eager evaluation done by the Inventors that there is actually a difference in the regions where double images are generated depending on the contrast difference between the 2D background and the 3D object by the subjective evaluation result. The evaluation result is shown in FIG. 57 in which the stereoscopic viewing region becomes narrower as the contrast difference Δcrst between the 2D background and the 3D image data becomes greater. This is because the sensitivity of the eyes for the 3D object is increased when the contrast difference Δcrst between the 2D background and the 3D image is large, so that the region where the left and right focused pixels showing the 3D object is viewed by one of the eyes, i.e., the region where double images are generated, becomes wider. The correction utilizing the influence of the contrast difference Δcrst between the 2D background and the 3D image to the stereoscopic viewing region along with the influence of the use environmental temperature difference ΔT of the stereoscopic display device 11 can provide a fine effect for securing the stereoscopic viewing region.

This will be described hereinafter by taking the contents depicted in the first exemplary embodiment as a presupposition. First, as in the case of the first exemplary embodiment, the stereoscopic display device according to the seventh exemplary embodiment includes a display controller 130 which drives a stereoscopic display panel. The display controller 130 is provided with a stereoscopic image generating module 130A having a main arithmetic operation controller 131 which restricts the actions of each of the entire structural elements to be described later (see FIG. 58 to FIG. 59).

The main arithmetic operation controller 131 is provided with a 2D/3D image preprocessing section 34 which calculates the 2D/3D contrast difference for correcting the parallax amount according to the extent of the contrast difference between the 2D background and the 3D object when it is judged by the temperature difference judging section 30 that the temperature difference ΔT is |ΔT|>|ΔTth| and it is under a temperature environment that requires correction of the parallax amount. As the 2D contrast used for calculating the 2D/3D contrast difference, it is possible to calculate a 2D image region that overlaps on the image acquired by performing rendering processing on the 3D object and to use a value such as a gradation minimum value, a gradation average value, or the like for that region. Further, as the 2D contrast, it is also possible to simply use a value such as a gradation minimum value, a gradation average value, or the like of the entire image of the 2D background.

As in the case of the first exemplary embodiment, the main arithmetic operation controller 131 is provided with a correction environment judging section 29 which judges whether the lenticular lens 1 as the image distributing module is in a state of ΔT<0 showing a contraction state or a state of ΔT>0 showing an expansion state.

Further, as in the case of the first exemplary embodiment described above, further, as in the case of the first exemplary embodiment described above, the main arithmetic operation controller 131 includes a contraction-state correction controller 131A which operates when it is judged that |ΔT|>|ΔTth| and the temperature difference ΔT is ΔT<0 (when the lenticular lens 1 is contracted), and an expansion-state correction controller 131B which operates when it is judged that |ΔT|>|ΔTth| and the temperature difference ΔT is ΔT>0 (when the lenticular lens 1 is expanded).

Out of those, the contraction-state correction controller 131A is structured to execute a popup image processing function 131a and a non-popup image processing function 131b according to the 2D/3D contrast difference, to synthesize those functions, and to output the 3D image data (synthesized image data) for driving the display panel.

That is, the contraction-state correction controller 131A constituting a part of the main arithmetic operation controller 131 includes a popup side image data processing function 131a which operates when it is judged by the temperature environment judging section 28 that the temperature difference ΔT is ΔT<0 and the lenticular lens 1 (image distributing module) is in a contraction state to further judge whether or not the depth position z of the object is z≥0 on the popup side, and to perform rendering processing on the three-dimensional data of the object that satisfies z≥0 under the condition of the first camera setting A.

The contraction-state correction controller 131A includes a non-popup image data processing function 131b which operates in a case where the temperature difference ΔT is ΔT<0 to judge whether or not the depth position z of the object is z≥0 on the popup side and, when judged as z<0, performs rendering processing on the three-dimensional data according to the 2D/3D contrast difference under a condition of a sixth camera setting G having the contrast difference Δcrst between the 2D background and the 3D object outputted from the 2D/3D image preprocessing section 34 as a parameter.

Further, the contraction-state correction controller 131A includes: an image data synthesizing function 131c which performs synthesizing processing on the image data on which rendering processing is performed by the popup side image data processing function 131a and the non-popup side image data processing function 131b that uses the 2D/3D contrast difference threshold value; and a 3D image data generating function 131d which generates 3D image data based on the synthesized image data, and outputs it for driving the display panel.

Further, the expansion-state correction controller 131B is structured to effectively output the 3D image data (synthesized image data) for driving the display panel in a state where the lenticular lens 1 is expanded by executing two following data processing functions and synthesizing those.

That is, the expansion-state correction controller 131B includes a non-popup side image data processing function 131e which operates when it is judged by the correction environment judging section 29 that the temperature difference ΔT is ΔT>0 and the lenticular lens 1 (image distributing module) is in an expansion state to further judge whether or not the depth position z of the object is z≥0 on the popup side and, when judged as z<0, performs rendering processing on the three-dimensional data of the object that satisfies z<0 under the condition of the first camera setting A.

Further, the expansion-state correction controller 131B includes a popup image data processing function 131f which operates in a case where the temperature difference ΔT is ΔT≥0 to judge whether or not the depth position z of the object is z≥0 on the popup side and, when judged as z≥0, performs rendering processing on the three-dimensional data under a condition of a seventh camera setting G having the contrast difference Δcrst between the 2D background and the 3D object outputted from the 2D/3D image preprocessing section 34 as a parameter.

Further, the expansion-state correction controller 131B constituting a part of the main arithmetic operation controller 131 includes: an image data synthesizing function 131g which performs synthesizing processing on the image data on which rendering processing is performed by the non-popup side image data processing function 131e, the popup side image data processing function 131f that uses the 2D/3D contrast difference threshold value, and the popup-side image data processing function; and a 3D image data generating function 131h which generates 3D image data based on the synthesized image data, and outputs it for driving the display panel.

Thereby, the prescribed camera setting is done by setting the depth position z of the object separately for the popup side and non-popup side as in the case of the first exemplary embodiment according to the contraction/expansion of the lenticular lens 1, and the image data acquired thereby is synthesized. Further, the image data acquired by operating the image data processing 131b and 131f using the 2D/3D contrast threshold value is added to the synthesizing processing. Therefore, still more effective correction than the case of the first exemplary embodiment described above can be acquired.

Next, the overall actions of the seventh exemplary embodiment will be described by referring to FIG. 60.

Figure 60:
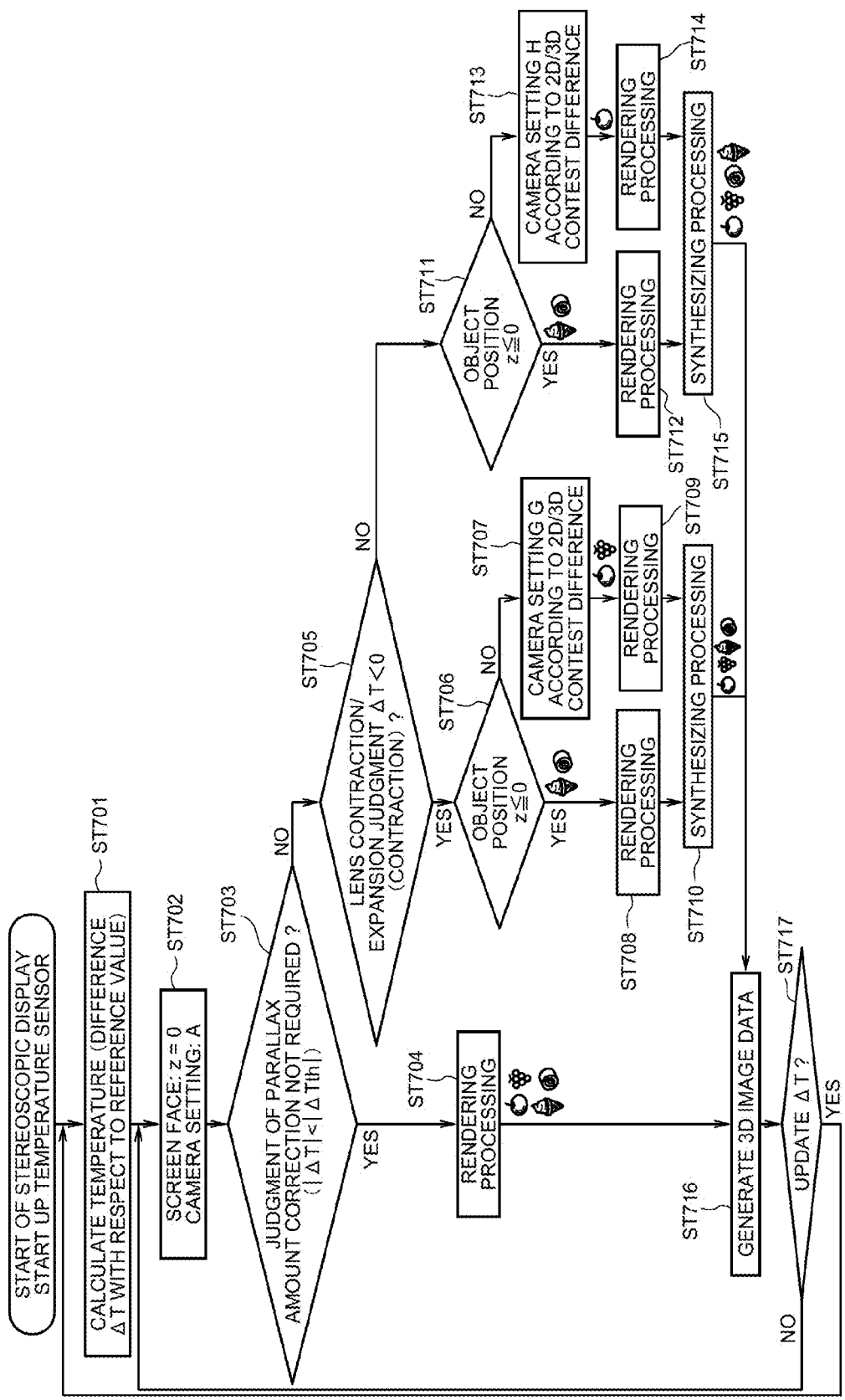
FIG. 60 is a flowchart showing an example of a 3D image data generating action according to the seventh exemplary embodiment disclosed in FIG. 58.

Note here that FIG. 60 is a flowchart showing an example of a 3D image data generating action of the seventh exemplary embodiment.

In FIG. 60, actions from step S701 to S704 are the same as those of steps S101 to S104 described in the first exemplary embodiment.

That is, first, the temperature sensor 21 is started up, and the difference ΔT between the detected temperature T of the lenticular lens 1 and the reference temperature Tth (normal temperature in the first exemplary embodiment) set in advance is calculated by the deformation amount calculating section 28 (FIG. 17: step S201/temperature difference calculating step). Subsequently, the screen face 40 and the camera setting (first camera setting A) as the condition required for the rendering processing are selected.

Thereafter, each of the absolute values of the temperature difference ΔT and the judgment threshold value ΔTth set in advance is compared by the temperature difference judging section 30 to judge whether or not the correction of the parallax amount is necessary.

Figure 61A:
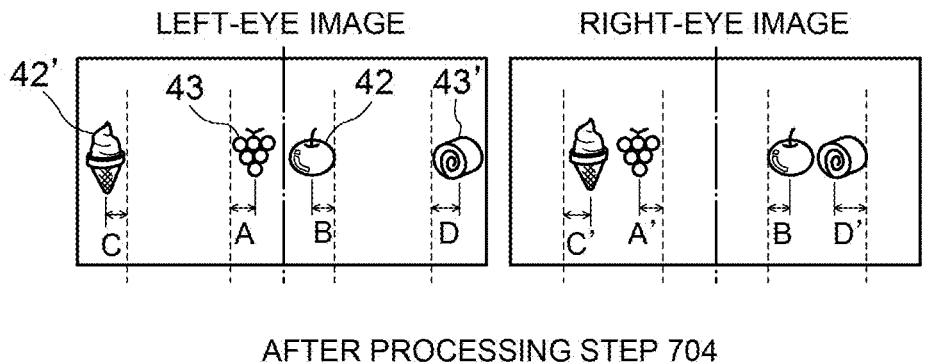
FIG. 61 is an explanatory chart showing an example of 3D image data having a parallax acquired by executing rendering processing in accordance with a lens contraction/expansion state in the procedure shown in FIG. 58 under the condition of FIG. 11.

Then, when judged that the temperature difference is |ΔT|<|ΔTth|, the 3D image data generating function 131G is operated as in the case of the first exemplary embodiment and it is considered that the deformation amount of the lenticular lens 1 due to the change in the temperature is small and that the parallax amount correction is unnecessary. Thus, the three-dimensional data is immediately rendering-processed under the condition of the first camera setting A. Subsequently, it is converted to a parallax image for driving the display panel, and the 3D image data as shown in FIG. 61A is generated and outputted.

In the meantime, in a case where it is judged in the correction necessity judging step of step S703 as |ΔT|>|ΔTth|, the parallax amount correction is necessary. Thus, in order to detect whether the lenticular lens 1 is in a direction of contraction or in a direction of expansion, the procedure is shifted to judgment of the signs of ΔT. The ΔT sign judging action is executed by the correction environment judging section 29 of the stereoscopic image generating module 131A as described above.

Then, in step S705 of FIG. 60, it is judged that the lenticular lens 1 is in a contraction state compared to the reference state. Thus, the procedure is shifted to step S706 as described above.

Further, in a case of ΔT>0, it is judged that the lenticular lens 1 is in an expansion state compared to the reference state. Thus, the procedure is shifted to step S711. In both cases, executed is the next processing where the depth position of the object is investigated.

Out of those, when judged as the former case of ΔT<0, i.e., judged that the lenticular, lens 1 is in a contraction state, it is judged in step S706 of FIG. 60 whether the position of the object having the depth information with respect to the z-axis is on the front side than the screen face 40 (i.e., z≥0). As described above, this judging action is executed by the contraction-state correction controller 131A of the main arithmetic operation controller 131.

Figure 61B:
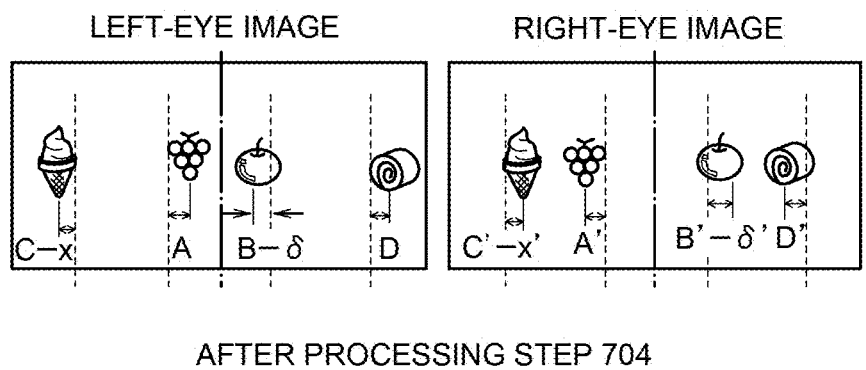

Further, in a case of z≥0, rendering processing is executed on the three-dimensional data of the objects 43 and 43' shown in FIG. 61, and 3D image data regarding the objects 43' and 43 can be acquired thereby as shown in FIG. 61B.

In the meantime, in a case of z<0, i.e., when the position of the object with respect to the z-axis is on the farther side than the screen face 40, it is necessary to take the influence of the contrast difference between the 2D background and the 3D object on the stereoscopic viewing region into consideration. Thus, rendering processing is performed on the object of z<0 by the camera setting G having the contrast difference Δcrst between the 2D background and the 3D object as a parameter. Thereby, 3D image data regarding the objects 43' and 43 can be acquired as shown in FIG. 61B.

There is a tendency that the stereoscopic viewing region is decreased as the contrast difference Δcrst between the 2D background and the 3D object increases by the actual measurement data in FIG. 57. Thus, the included angle of a case where the contrast difference Δcrst between the 2D background and the 3D object is large is set to be larger than a case where the contrast difference Δcrst between the 2D background and the 3D object is small. An included angle θ_G of the camera setting G can be acquired by a following function that satisfies two conditions described below having the included angle θ_A of the camera setting A and the 2D/3D contrast difference Δcrst as the parameters.

$$\theta\_G = f(\theta\_A, \Delta crst) \qquad \text{Equation (3)}$$

As a condition (1), it is necessary that the function value θ_G of f(θ_A, Δcrst) to be smaller than the included angle θ_A of the camera setting A where the correction is unnecessary. Further, as a condition (2), it is necessary for the function f(θ_A, Δcrst) to narrow the function value θ_G as Δcrst increases.

For calculating θ_G, it is possible to use a function that is reciprocal proportion to the absolute value Δcrst of the contrast of the 2D background and the 3D object by taking the included angle θ_A of the first camera setting A as shown in Equation (4). Alternatively, as shown in Equation (5), it is also possible to use a function with which θ_G becomes linear relation with the absolute value Δcrst of the contrast of the 2D background and the 3D object. Further, in order to secure to satisfy the two conditions described above, an argument k may be adopted into the function (3) as in the cases shown in Equation (4) and Equation (5).

[Expression 3]

$$\theta\_G = \frac{k \cdot \theta\_A}{|\Delta crst|} \qquad \text{Equation (4)}$$

[Expression 4]

$$\theta\_G = \theta\_A - k \cdot |\Delta crst| \qquad \text{Equation (5)}$$

The reciprocal proportion to the absolute value Δcrst of the contrast of the 2D background and the 3D object and the camera setting G having the included angle θ_G as a linear function are described above as a way of example. However, the present invention is not limited to those. It is also possible to acquire θ_G of the camera setting G by using Gaussian, quadratic function, or high-order function having the contrast difference Δcrst of the 2D background and the 3D object as a parameter.

While the explanations are provided above based on the first exemplary embodiment, it is also within the scope of the present invention to calculate the optimum depth value according to a depth function having the contrast Δcrst of the 2D background and the 3D object as the parameter in the fourth exemplary embodiment and to calculate the optimum parallax amount according to a parallax amount function having the contrast Δcrst of the contrast of the 2D background and the 3D object as the parameter in the sixth exemplary embodiment.

Then, the image data regarding the objects 43', 43 acquired by performing the rendering processing in step S708 of FIG. 60 and the image data regarding the objects 42', 42 acquired by performing the rendering processing in step S709 are synthesized by the image data synthesizing function 131c, and the 3D image data as shown in FIG. 61B is generated by the 3D image data generating function 131d based on the synthesized image data.

When it is assumed that the contrast difference between the objects 42', 42 and the 2D background in the back side thereof becomes |Δcrst_42'|>|Δcrst_42| in the case shown in FIG. 61, the parallax amount B−β of the object 42 after correction is smaller than the parallax amount C−x of the object 42'.

While an example of correcting the parallax amount according to the contrast difference Δcrst of the 2D background and the 3D object for the object of z<0 under the condition of ΔT<0 is described, it is also possible to execute the same processing for the object of z>0.

In the latter case where ΔT>0, i.e., when the lenticular lens 1 is in an expansion state, it is judged in step S711 of FIG. 60 whether or not the position of the object having the depth information with respect to the z-axis is the far side with respect to the screen face 40 (i.e., z<0). As described above, this judging action is executed by the expansion-state correction controller 131A.

Further, in a case of z<0, the rendering processing is executed on the three-dimensional data of the objects 42, 42' shown in FIG. 11 under the condition of the first camera setting A. Thereby, the 2D image data regarding the objects 42', 42 as shown in FIG. 61C can be acquired.

In the meantime, in a case of z>0, i.e., when the position of the object with respect to the z-axis is on the front side than the screen face 40 (see FIG. 21), it is necessary to take the influence of the contrast difference between the 2D background and the 3D object on the stereoscopic viewing region into consideration. Thus, rendering processing is performed on the object of z>0 by the camera setting H having the contrast difference Δcrst between the 2D background and the 3D object as a parameter. The included angle θ_H of the camera setting H is set by the same functions as those described above. Thereby, 3D image data regarding the objects 43' and 43 can be acquired as shown in FIG. 61C.

Figure 61C:
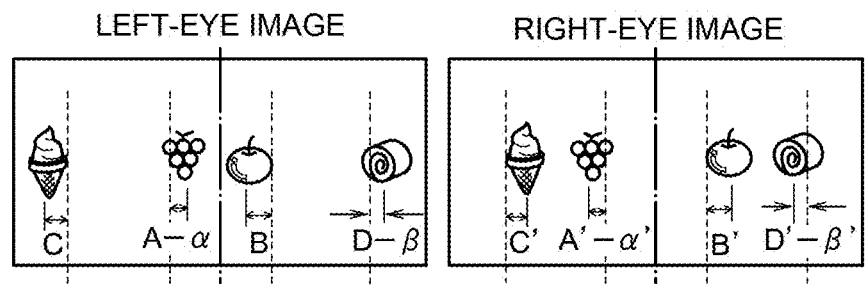

Then, the image data regarding the objects 42', 42 acquired by performing the rendering processing in step S712 of FIG. 60 and the image data regarding the objects 43', 43 acquired by performing the rendering processing in step S714 are synthesized by the image data synthesizing function 131g (FIG. 60: step S715), and the 3D image data as shown in FIG. 61C is generated by the 3D image data generating function 131h based on the synthesized image data.

When it is assumed that the contrast difference between the objects 42', 42 and the 2D background in the back side thereof becomes |Δcrst_43'|>|Δcrst_43| in the case shown in FIG. 61, the parallax amount D−β of the object 43' after correction is smaller than the parallax amount A−α of the object 43.

While an example of correcting the parallax amount according to the contrast difference Δcrst of the 2D background and the 3D object for the object of z>0 under the condition of ΔT>0 is described, it is also possible to execute the same processing for the object of z<0.

(Modification Example)

While the case of acquiring the optimum correction amount by using the functions having the contrast difference Δcrst of the 2D background and the 3D object as the parameter is described above, it is also possible to perform interpolation only on the object in which the 2D/3D contrast difference is large. In that case, the 2D/3D image preprocessing 34 also includes a function which calculates the 2D/3D contrast difference, and sets the threshold value for judging whether or not it is necessary to perform correction for the 3D object.

Figure 62:
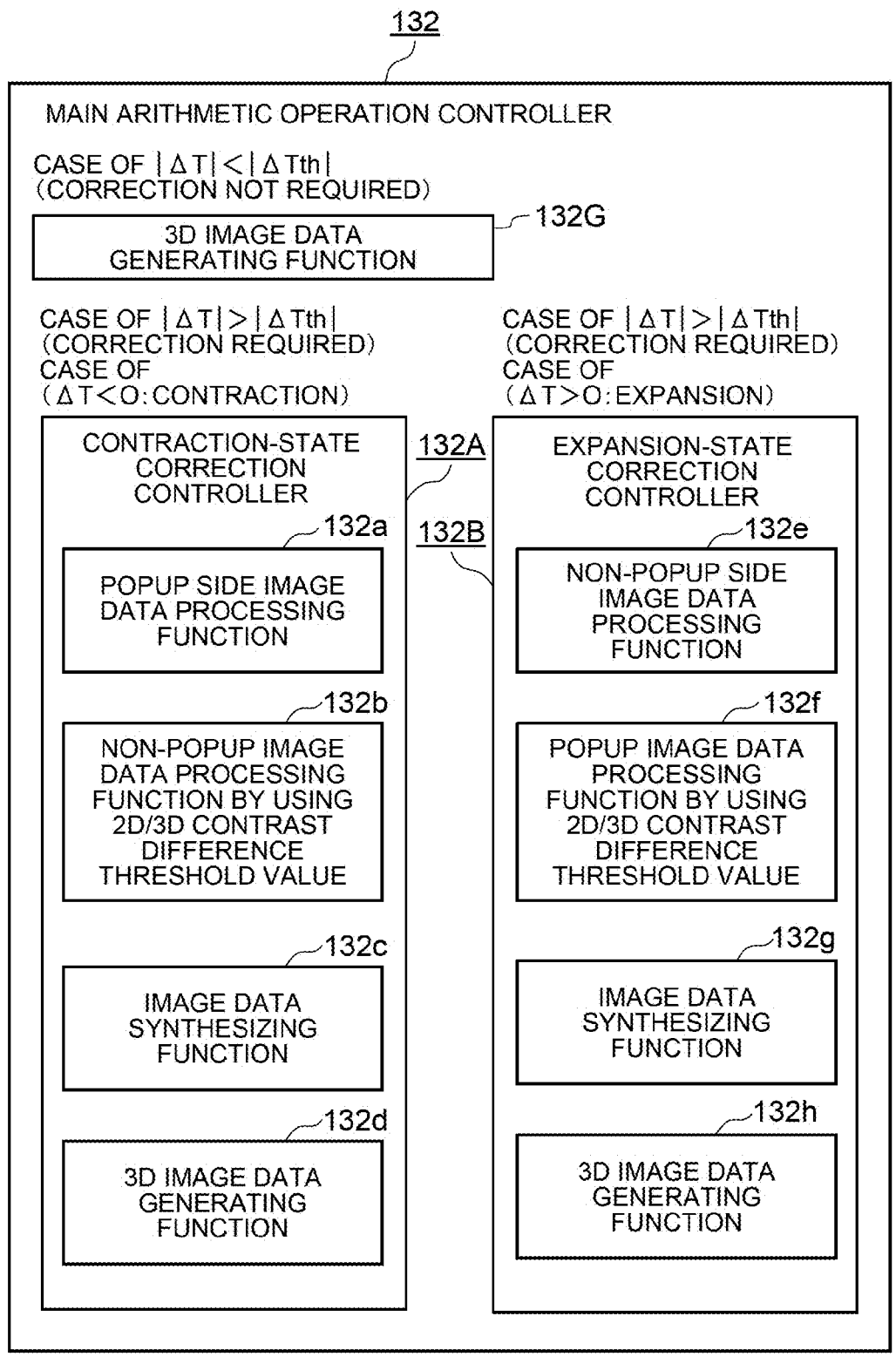
FIG. 62 is a block diagram showing each structural element of a main arithmetic operation controller according to a modification example of the seventh exemplary embodiment.

As in the case of the first exemplary embodiment, the main arithmetic operation controller 132 shown in FIG. 62 is provided with a correction environment judging section 29 which judges whether the lenticular lens 1 as the image distributing module is in a state of ΔT<0 showing a contraction state or a state of ΔT>0 showing an expansion state. Further, as in the case of the first exemplary embodiment described above, the main arithmetic operation controller 132 includes a contraction-state correction controller 132A which operates when it is judged that |ΔT|>|ΔTth| and the temperature difference ΔT is ΔT<0 (when the lenticular lens 1 is contracted), and an expansion-state correction controller 132B which operates when it is judged that |ΔT|>|ΔTth| and the temperature difference ΔT is ΔT>0 (when the lenticular lens 1 is expanded).

Out of those, the contraction-state correction controller 132A is structured to execute a popup image processing function 132a and a non-popup image processing function 132b that uses the 2D/3D contrast difference, to synthesize those functions, and to output the 3D image data (synthesized image data) for driving the display panel.

That is, the contraction-state correction controller 132A constituting a part of the main arithmetic operation controller 132 includes a popup image data processing function 132a which operates when it is judged by the temperature environment judging section 28 that the temperature difference ΔT is ΔT<0 and the lenticular lens 1 (image distributing module) is in a contraction state to further judge whether or not the depth position z of the object is z≥0 on the popup side, and performs rendering processing on the three-dimensional data of the object that satisfies z under the condition of the first camera setting A.

The contraction-state correction controller 132A operates in a case where the temperature difference ΔT is ΔT<0 to judge whether or not the depth position z of the object is z≥0 on the popup side and, when judged as z<0, compares the contrast difference Δcrst between the 2D background and the 3D object outputted from the 2D/3D image preprocessing section 34 with a prescribed 2D/3D contrast difference threshold value Δcrst_th. For the object in which |Δcrst|<|Δcrst_th| is satisfied, rendering processing is performed on the three-dimensional data under the second camera setting B whose included angle is set to be narrower than that of the first camera setting A. Further, there is provided a non-popup image data processing function 132a which performs rendering processing on the three-dimensional data for the object in which |Δcrst|≥|Δcrst_th| is satisfied by using the 2D/3D contrast difference threshold value under a condition of an eighth camera setting J whose included angle is set still narrower than the second camera setting B.

Further, the contraction-state correction controller 132A includes: an image data synthesizing function 132c which performs synthesizing processing on the image data on which rendering processing is performed by the popup image data processing function 132a and the non-popup image data processing function 132b that uses the 2D/3D contrast difference threshold value; and a 3D image data generating function 132d which generates 3D image data based on the synthesized image data, and outputs it for driving the display panel.

Further, the expansion-state correction controller 132B constituting a part of the main arithmetic operation controller 132 is structured to output the 3D image data (synthesized image data) for driving the display panel in a state where the lenticular lens 1 is expanded by executing two following data processing functions and synthesizing those.

That is, the expansion-state correction controller 132B includes a non-popup side image data processing function 132e which operates when it is judged by the correction environment judging section 29 that the temperature difference $\Delta T$ is $\Delta T>0$ and the lenticular lens 1 (image distributing module) is in an expansion state to further judge whether or not the depth position z of the object is z≥0 on the popup side and, when judged as z<0, performs rendering processing on the three-dimensional data of the object that satisfies z<0 under the condition of the first camera setting A.

Further, the contraction-state correction controller 132B operates in a case where the temperature difference $\Delta T$ is $\Delta T \geq 0$ to judge whether or not the depth position z of the object is z≥0 on the popup side and, when judged as z≥0, compares the contrast difference $\Delta crst$ between the 2D background and the 3D object outputted from the 2D/3D image preprocessing section 34 with a prescribed 2D/3D contrast difference threshold value $\Delta crst\_th$. For the object in which $|\Delta crst|<|\Delta crst\_th|$ is satisfied, rendering processing is performed on the three-dimensional data under the second camera setting C whose included angle is set to be larger than that of the first camera setting A. Further, there is provided a non-popup image data processing function 132f which performs rendering processing on the three-dimensional data of the objects in which $|\Delta crst| \geq |\Delta crst\_th|$ is satisfied by using the 2D/3D contrast difference threshold value under a condition of a ninth camera setting K whose included angle is set still larger than that of the third camera setting C.

Further, the expansion-state correction controller 132B constituting a part of the main arithmetic operation controller 132 includes: an image data synthesizing function 132g which performs synthesizing processing on the image data on which rendering processing is performed by the non-popup side image data processing function 132e, the popup side image data processing function 132f that uses the 2D/3D contrast difference threshold value, and the popup-side image data processing function; and a 3D image data generating function 132h which generates 3D image data based on the synthesized image data, and outputs it for driving the display panel.

Thereby, the prescribed camera setting is done by setting the depth position z of the object separately for the popup side and non-popup side as in the case of the first exemplary embodiment according to the contraction/expansion of the lenticular lens 1, and the image data acquired thereby is synthesized. Further, the image data acquired by operating the image data processing 132b and 132f using the 2D/3D contrast threshold value is added to the synthesizing processing. Therefore, still more effective correction than the case of the first exemplary embodiment described above can be achieved.

Next, the overall actions of the seventh exemplary embodiment will be described by referring to FIG. 63.

Figure 63:
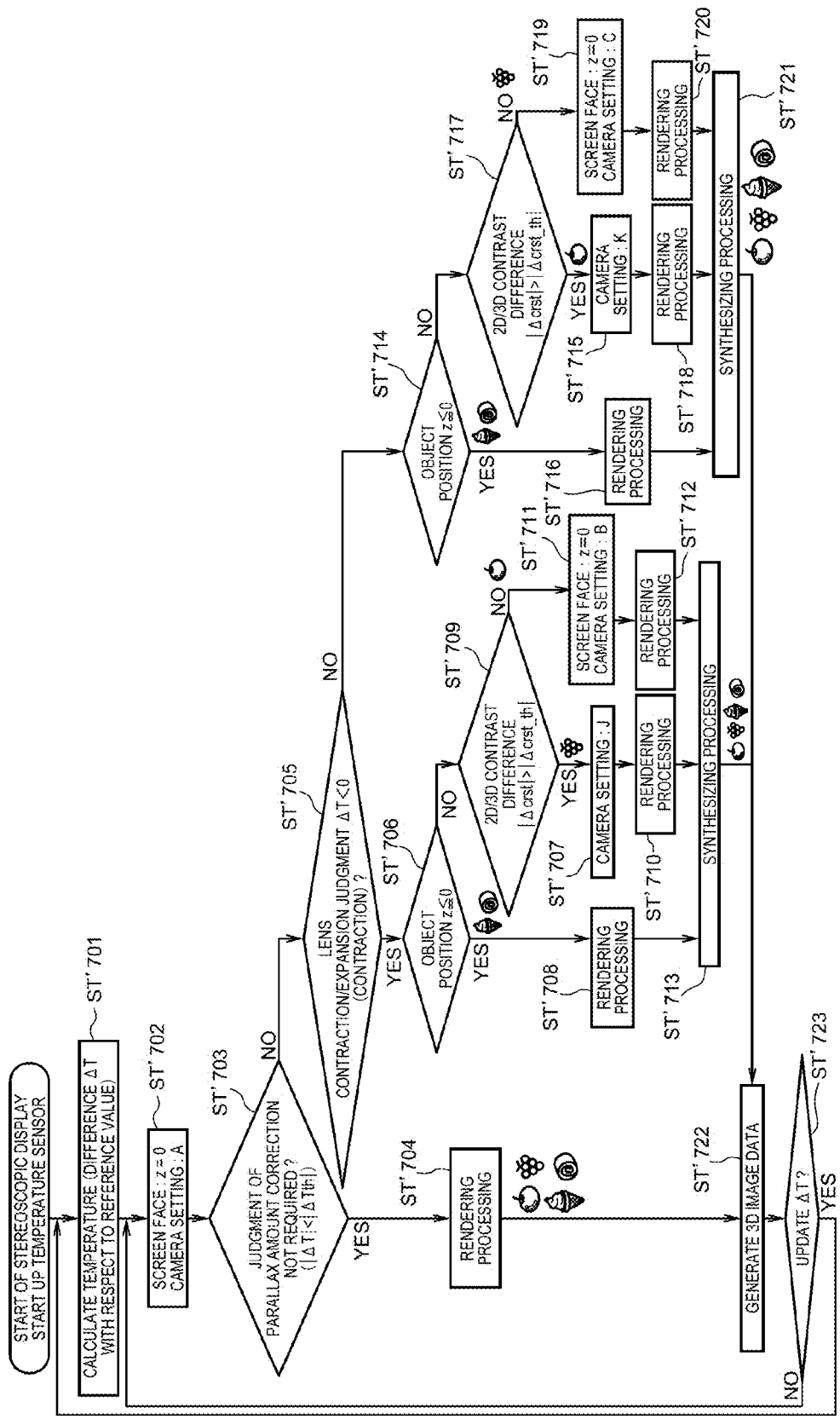
FIG. 63 is a flowchart showing a 3D image data generating action according to the modification example of the seventh exemplary embodiment.

In FIG. 63, actions from step S'701 to S'704 are the same as those of steps S101 to S104 described in the first exemplary embodiment.

That is, first, the temperature sensor 21 is started up, and the difference $\Delta T$ between the detected temperature T of the lenticular lens 1 and the reference temperature Tth (normal temperature in the first exemplary embodiment) set in advance is calculated by the deformation amount calculating section 28. Subsequently, the screen face 40 and the camera setting (first camera setting A) as the condition required for the rendering processing are selected.

Thereafter, each of the absolute values of the temperature difference $\Delta T$ and the judgment threshold value $\Delta Tth$ set in advance is compared by the temperature difference judging section 30 to judge whether or not the correction of the parallax amount is necessary.

Then, when judged that the temperature difference is $|\Delta T|<|\Delta Tth|$, the 3D image data generating function 132G is operated as in the case of the first exemplary embodiment and it is considered that the deformation amount of the lenticular lens 1 due to the change in the temperature is small and that the parallax amount correction is unnecessary. Thus, the three-dimensional data is immediately rendering-processed under the condition of the first camera setting A. Subsequently, it is converted to parallax images for driving the display panel, and the 3D image data is generated and outputted.

In the meantime, in a case where it is judged in the correction necessity judging step of step S'703 as $|\Delta T|>|\Delta Tth|$, the parallax amount correction is necessary. Thus, in order to detect whether the lenticular lens is in a direction of contraction or in a direction of expansion, the procedure is shifted to judgment of the signs of $\Delta T$. The $\Delta T$ sign judging action is executed by the correction environment judging section 29 described above.

Then, in step S'705 of FIG. 60, it is judged that the lenticular lens 1 is in a contraction state compared to the reference state. Thus, the procedure is shifted to step S'706 as described above.

Further, in a case of $\Delta T>0$, it is judged that the lenticular lens 1 is in an expansion state compared to the reference state. Thus, the procedure is shifted to step S'714. In both cases, executed is the next processing where the depth position of the object is investigated.

Out of those, when judged as the former case of $\Delta T<0$, i.e., judged that the lenticular lens 1 is in a contractions state, it is judged in step S'706 of FIG. 63 whether the position of the object having the depth information with respect to the z-axis is on the front side than the screen face 40 (i.e., z≥0). As described above, this judging action is executed by the contraction-state correction controller 132 of the main arithmetic operation controller 131.

Further, rendering processing is executed on the three-dimensional data of z≥0 under the condition of the first camera setting A, and 3D image data can be acquired.

In the meantime, in a case of z<0, correction is further performed by using $\Delta crst\_th$ on the object in which the contrast difference between the 2D background and the 3D object is large. The correction method thereof will be described hereinafter.

The rendering processing is performed on the 3D object that satisfies z<0 and $|\Delta crst| \geq |\Delta crst\_th|$ under the condition of the second camera setting B whose included angle is set to be narrower than that of the first camera setting A.

The rendering processing is performed on the 3D object that satisfies z<0 and $|\Delta crst| \geq |\Delta crst\_th|$ under the condition of the eighth camera setting J whose included angle is set to be narrower than that of the second camera setting B. The threshold value $|\Delta crst\_th|$ can be defined by a form of LUT (Lookup table), a function, or the like by referring to the actual measurement showing the dependency between the 2D/3D contrast difference and the stereoscopic viewing region shown in FIG. 57 executed under each environmental temperature or the theoretical analysis result.

In the latter case of $\Delta T>0$, i.e., when the lenticular lens 1 is in an expansion state, it is judged in step S'714 of FIG. 63 whether or not the position of the object having the depth information with respect to the z-axis is the far side with respect to the screen face 40 (i.e., z<0).

Then, the rendering processing is executed on the three-dimensional data of the object of z<0 under the condition of the first camera setting A. Thereby, the 3D image data can be acquired.

In the meantime, in a case of z>0, i.e., when the position of the object with respect to the z-axis is on the front side than the screen face 40, it is necessary to take the influence of the contrast difference between the 2D background and the 3D object on the stereoscopic viewing region into consideration.

Rendering processing is performed on the object that satisfies z>0 and |Δcrst|<|Δcrst_th| by the third camera setting C whose included angle is set to be still larger than that of the first camera setting A.

Inversely, rendering processing is performed on the object that satisfies z<0 and |Δcrst|≥|Δcrst_th| by the ninth camera setting K whose included angle is set to be still larger than that of the third camera setting C.

Then, the image data acquired by performing the rendering processing in step S'716, step S'718, and step S'720 of FIG. 63 are synthesized by the image data synthesizing function 132g (FIG. 63: step S'712), and the 3D image data is generated by the 3D image data generating function 132h based on the synthesized image data.

The actions of each of the data processing, the comparison judgment, and the like from step S'701 to steps S'723 in the overall actions of the seventh exemplary embodiment described above may be put into a program to have it achieved by a computer provided to the stereoscopic image generating module 131.

The seventh exemplary embodiment is structured and functions in the manner described above, so that it has the operation effects equivalent to that of the first exemplary embodiment. Further, it is designed to take the influence of the contrast difference between the 2D background and the 3D object on the stereoscopic viewing region and to provide the threshold value of the contrast difference between the 2D background and the 3D object, thereby providing an advantage that it is possible perform correction of the temperature by corresponding to the actual circumstances in a still finer manner.

Other structures and operation effects thereof are the same as those of the first exemplary embodiment described above.

While the case of performing development into the parallax image by performing rendering processing on the 3D data having the depth information is disclosed above, the present invention is not limited only to that. As in the case of the first exemplary embodiment described above, it is also possible to develop the data into a depth image. Further, as described in the fifth exemplary embodiment, it can also be applied to parallax images generated in advance by performing rendering processing and to two-dimensional data such as parallax images captured by a stereoscopic camera.

Each of the first to seventh exemplary embodiments according to the present invention has been described above. All of those exemplary embodiments provide the possibility of using the lenticular lens 1 and the display panel 11A constituting the stereoscopic display panel 11 by assembling and unifying those even when there is a difference between the thermal expansion coefficients thereof. Thus, the present invention largely contributes to reduce the cost of the entire device, to reduce the weight, and to increase the flexibility without losing the ambience.

While the present invention has been described heretofore by referring to the embodiments (and EXAMPLES), the present invention is not limited only to the embodiments (and EXAMPLES). Various changes and modifications occurred to those skilled in the art can be applied to the structures and details of the present invention without departing from the scope of the present invention.

This application claims the Priority right based on Japanese Patent Application No. 2009-276439 filed on Dec. 4, 2009 and the disclosure thereof is hereby incorporated by reference in its entirety.

INDUSTRIAL APPLICABILITY

The display device according to the present invention directed to the lenticular lens sheet can be effectively applied to all the stereoscopic display devices such as liquid crystal and other electro-optical elements. It is extremely effective for thin-type stereoscopic display devices in particular, and exhibits a high multiplicity of uses.

REFERENCE NUMERALS

1 Image distributing section (lenticular lens)
4a Left-eye pixel
4b Right-eye pixel
5a Left-eye region
5b Right-eye region
7a Observer's left eye
7b Observer's right eye
8 Stereoscopic viewing region
10 Stereoscopic display device
11 Stereoscopic display panel
11A Display panel section
12, 50, 60, 70, 110 Display controller
21 Temperature sensor
22, 50A, 60A, 70A, 110A Stereoscopic image generating module
22A Camera setting information storage section
22B Depth image development processing section
23 Display panel driving section
24 Input section
25 Data storage section
26 Command information storage section
28 Deformation amount calculating section
29 Correction environment judging section
30 Temperature difference judging section
31, 51, 61, 62, 63, 71, 72, 111, 121, 131 Main arithmetic operation controller
31A, 51A, 61A, 62A, 63A, 71A, 72A, 111A, 121A, 131A Contraction-state correction controller
31B, 51B, 61B, 62B, 63B, 71B, 72B, 111B, 121B, 131B Expansion-state correction controller
31a, 31f, 51a, 51f, 61a, 61f, 131a, 131f, 132a, 132f Popup side image data processing function
31b, 31e, 51b, 51e, 61b, 61e, 131e, 131b, 132e, 132b Non-popup side image data processing function
31c, 31g, 51c, 51g, 61c, 61g, 131c, 131g Image data synthesizing function
31d, 31h, 31G, 51d, 51h, 51G 61d, 61h, 61G, 62d, 62G, 121G, 121c, 122G, 122c, 131G, 131d, 131h, 132G, 132d, 132h 3D image data generating function
32b, 52b, 62b Non-popup side z-value conversion processing function
32c, 32g Entire region image data collective processing function
32f, 52f, 62f Popup-side z-value conversion processing function
33 Parallax amount adjusting LIT signal storage section
34 2D/3D image preprocessing section
82 Popup object
83 Depth object
35a Left-eye camera
35b Right-eye camera 40 Screen face (display screen)
42, 42' Depth-side (z<0) object
43, 43' Front-side (z≥0) object
46a-46d, 47a-47d, 48a-48d, 81a-81d, 82a-82d, 83a-83d, 84a-84d, 85a-85d, 86a-86d, 87a-87d, 88a-88d, 89a-89d, 91a-91d, 92a-92d, 93a-93d Objects on depth map
46e, 47e, 48e, 81e, 82e, 83e, 84e, 85e, 86e, 87e, 88e, 89e, 91e, 92e, 93e Background on depth map
50 Controller
50B X-position threshold value setting section
51a First viewpoint pixel
51b Second viewpoint pixel
51c Third viewpoint pixel
51d Fourth viewpoint pixel
52a First viewpoint region
52b Second viewpoint region
52c Third viewpoint region
52d Fourth viewpoint region
51j, 51k Out-of x-axis-threshold-value image data processing function
52e, 52g, 62c, 62g Entire region image data collective processing function
52j, 52k Out-of x-axis-threshold-value z-value conversion processing function
61j, 61k, 62a 2D image data processing function
62A Image correction control function
62b 3D image data processing function
62j, 62k Out-of x-axis-threshold-value z=0 processing function
71a, 71f Gradation value non-conversion processing function
71b, 71e Gradation value conversion processing function
71c, 71g Depth image data synthesizing function
71d, 71h, 71G, 72c, 72G 111c, 111f, 111G 3D depth image data generating function
72A Gradation value correction control function
72a Gradation value increase conversion processing function
72b Gradation value decrease conversion processing function
77 Target image data setting section
111a, 111d Image data offset processing function
111b, 111e, 121b, 122e Parallax image data generating function
111s Offset image generating function
121a Parallax amount adjusting function according to LUT signal
122d Parallax amount adjusting function according to LUT signal and x-axis coordinate

The invention claimed is:

1. A stereoscopic display device, comprising: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module which controls actions of the display panel driving section and generates 3D image data for driving the display panel based on three-dimensional data containing depth information specified in advance, wherein
the stereoscopic image generating module is provided with: a temperature sensor which detects temperatures of the image distributing section; and a data storage section which stores information regarding an effective linear expansion coefficient difference between the image distributing section and the display panel section when the both are in a fixed state, size of the display panel section, resolution of the unit pixels, and a reference temperature as parameter information regarding an inherent stereoscopic viewing region of the stereoscopic display panel, and
the stereoscopic image generating module comprises: a deformation amount calculating section which calculates a temperature difference $\Delta T$ between temperature information detected by the temperature sensor and the reference temperature, and calculates a deformation amount that is a contraction amount or an expansion amount which changes due to a change in surrounding environment temperatures of the image distributing section based on the temperature difference $\Delta T$ and the information stored in the data storage section; and a main arithmetic operation controller which, when the deformation amount regarding contraction or expansion is calculated by the deformation amount calculating section, generates 3D image data corresponding thereto and outputs the generated data to the display panel driving section for driving the display panel
wherein the stereoscopic image generating module comprises: a camera setting information storage section which stores a pre-specified setting position parameter regarding a camera setting of rendering processing that is executed for acquiring the 3D image data from the three-dimensional data as a first camera setting A; and a temperature difference judging section which performs an arithmetic operation regarding whether or not an absolute value of the temperature difference $\Delta T$ between the detected temperature and the reference temperature is equal to or less than an absolute value of a reference value $\Delta Tth$ set in advance, and judges whether or not it is under a temperature environment that requires correction of a parallax amount specified on an x-axis on an xy plane as a screen face from the three-dimensional data containing depth information, and
the main arithmetic operation controller comprises a 3D image data generating function which operates when it is judged by the temperature difference judging section that temperature difference $\Delta T$ is $|\Delta T| \le |\Delta Tth|$ and it is under a temperature environment that does not require correction of the parallax amount to perform rendering processing on the three-dimensional data under a condition of the first camera setting A, and to generate and output two-dimensional 3D image data having the parallax amount and the depth information of the three-dimensional data for driving the display panel.

2. The stereoscopic display device as claimed in claim 1, wherein
the image distributing section of the stereoscopic display panel is formed by a lenticular lens sheet in which a plurality of cylindrical lenses that are convex lenses having a columnar surface are arranged in parallel at a same lens pitch.

3. The stereoscopic display device as claimed in claim 2, wherein
a polarization is disposed between the display panel section and the image distributing section.

4. The stereoscopic display device as claimed in claim 1, wherein
the effective linear expansion coefficient difference of the image distributing section and the display panel section constituting the stereoscopic display panel under a state where the both are being fixed is set to be 30 ppm or more for a range of changes of the use environmental temperature of the stereoscopic display panel from −20° C. to 60° C.

5. The stereoscopic display device as claimed in claim 1, wherein:

the main arithmetic operation controller is provided with a correction environment judging section which operates when it is judged by the temperature difference judging section that the temperature difference $\Delta T$ is $|\Delta T|>|\Delta Tth|$ and it is under a temperature environment that requires correction of the parallax amount to make judgment whether the image distributing section is in a state of $\Delta T<0$ showing a contraction state or a state of $\Delta T>0$ showing an expansion state; and the main arithmetic operation controller comprises a popup side image data processing function which operates when it is judged by the correction environment judging section that the temperature difference $\Delta T$ is $\Delta T<0$ and the image distributing section is in a contraction state to judge whether or not depth of the object is at a position of $z≥0$ on a popup side and, when judged that it is located at the position of $z≥0$, performs rendering processing on the three-dimensional data of $z≥0$ under the condition of the first camera setting A, a non-popup side image data processing function which operates when it is judged that the temperature difference $\Delta T$ is $\Delta T<0$ and the image distributing section is in a contraction state by the correction environment judging section to judge whether or not the depth of the object is at a position of $z<0$ on a non-popup side and, when judged that it is located at the position of $z<0$, performs rendering processing on the three-dimensional data of $z<0$ under a condition of a second camera setting B that has a smaller included angle than an included angle of the first camera setting A, which is formed between an optical axis of each camera and the z-axis condition, an image data synthesizing function which performs synthesizing processing of image data that are rendering-processed in the popup side image data processing function and the non-popup side image data processing function, respectively, and a 3D image data generating function which generates and outputs 3D image data based on the synthesize-processed image data for driving the display panel.

6. The stereoscopic display device as claimed in claim 5, wherein the main arithmetic operation controller comprises:

a non-popup side z-value conversion processing function which performs z-value conversion processing by multiplying a correction coefficient a that is smaller than "1" to three-dimensional data of $z<0$ by having a z-axis of a depth coordinate of the three-dimensional data under the first camera setting A as a reference, instead of the non-popup side image data processing function; and an entire region collective image data processing function which performs, based on same camera setting information, image processing on popup side three-dimensional data and non-popup side three-dimensional data on which z-value conversion is executed, instead of the popup side image data processing function, the non-popup side image data processing function, and the image data synthesizing function.

7. The stereoscopic display device as claimed in claim 5, wherein the main arithmetic operation controller comprises:

a non-popup side image data processing function which operates when it is judged by the correction environment judging section that the temperature difference $\Delta T$ is $\Delta T>0$ and the image distributing section is in an expansion state to judge whether or not depth of the object is at a position of $z<0$ on a non-popup side and, when judged that it is located at the position of $z<0$, performs rendering processing on the three-dimensional data of $z<0$ under the condition of the first camera setting A;

a popup side image data processing function which operates when it is judged by the correction environment judging section that the temperature difference $\Delta T$ is $\Delta T>0$ and the image distributing section is in an expansion state to judge whether or not the depth of the object is at a position of $z<0$ on a non-popup side and, when judged that it is located at the position of $z≥0$, performs rendering processing on the three-dimensional data of $z≥0$ under a condition of a third camera setting C that has a larger included angle than the included angle between cameras of the first camera setting A;

an image data synthesizing function which performs synthesizing processing of image data that are rendering-processed in each of three-dimensional data processing functions, i.e., the non-popup side image data processing function and the popup side image data processing function, and a 3D image data generating function which generates and outputs 3D image data based on the synthesize-processed image data for driving the display panel.

8. The stereoscopic display device as claimed in claim 7, wherein:

the main arithmetic operation controller comprises:

a popup side z-value conversion processing function which performs z-value conversion processing by multiplying a correction coefficient $\beta$ that is smaller than "1" to three-dimensional data of $z≥0$ by having a z-axis of a depth coordinate of the three-dimensional data under the first camera setting A as a reference, instead of the popup side image data processing function; and an entire region collective image data processing function which performs, based on same camera setting information, image processing on non-popup side three-dimensional data and popup side three-dimensional data on which z-value conversion is executed, instead of the non-popup side image data processing function, the popup side image data processing function, and the image data synthesizing function.

9. The stereoscopic display device as claimed in claim 1, wherein:

the main arithmetic operation controller is provided with a depth image development processing section which develops three-dimensional data of the object sent into the main arithmetic operation controller into an object image of two-dimensional image information and a depth image of depth information thereof; and the depth image development processing section comprises a gradation value specifying function which sets a gradation value corresponding to the depth information for the three-dimensional data by a pixel unit, and specifies the set gradation value by corresponding to a parallax amount of the two-dimensional image information specified on the x-axis.

10. The stereoscopic display device as claimed in claim 1, wherein the main arithmetic operation controller is provided with: a correction environment judging section which operates when it is judged by the temperature difference judging section that the temperature difference $\Delta T$ is $|\Delta T|>|\Delta Tth|$ and it is under a temperature environment that requires correction of the parallax amount to make judgment whether the image distributing section is in a state of $\Delta T<0$ showing a contraction state or a state of $\Delta T>0$ showing an expansion state; and an x-position threshold value setting section which sets a threshold value xth on an x-axis for making it possible to secure a stereoscopic viewing region that changes according to an extent of the temperature difference $\Delta T$, and sets the threshold value xth to become smaller as the value of the $\Delta T$ becomes larger, and the main arithmetic operation controller comprises an out-of x-axis-threshold-value image data processing function which operates when it is judged by the correction environment judging section that the temperature difference $\Delta T$ is $\Delta T<0$ and the image distributing section is in a contraction state to specify a coordinate position x of the object on the x-axis, and performs rendering processing on the three-dimensional data of the object that satisfies $|x|>|xth|$ under a condition of a fourth camera setting D in which an included angle is set to be narrower than the included angle of the first camera setting A, a popup side image data processing function which further judges whether or not a depth position z of the object in a case where the temperature difference $\Delta T$ is $\Delta T<0$ and $|x|\geq|xth|$ is satisfied is $z\geq 0$ on the popup side and, when judged that the depth position z satisfies $z\geq 0$ on the popup side, performs rendering processing on the three-dimensional data of $z\geq 0$ under the condition of the first camera setting A, a non-popup side image data processing function which further judges whether or not the depth position z of the object in a case where the temperature difference $\Delta T$ is $\Delta T<0$ and $|x|\geq|xth|$ is satisfied is $z\geq 0$ on the popup side and, when judged that the depth position z satisfies $z<0$ on the non-popup side, performs rendering processing on the three-dimensional data of $z<0$ under the condition of the second camera setting B in which an included angle is set to be narrower than the included angle of the first camera setting A, an image data synthesizing function which performs synthesizing processing of each of the image data that are rendering-processed in the out-of x-axis-threshold-value image data processing function, the popup side image data processing function, and the non-popup side image data processing function, and a 3D image data generating function which generates and outputs 3D image data based on the synthesize-processed image data for driving the display panel.

11. The stereoscopic display device as claimed in claim 10, wherein the main arithmetic operation controller comprises:

an out-of x-axis-threshold-value image data processing function which operates when it is judged by the correction environment judging section that the temperature difference $\Delta T$ is $\Delta T>0$ and in an expansion state to specify a coordinate position x of the object on the x-axis, and performs rendering processing on the three-dimensional data of the object that is considered to satisfy $|x|>|xth|$ under a condition of a fifth camera setting E in which an included angle is set to be narrower than the included angle of the first camera setting A;

a non-popup side image data processing function which further judges whether or not a depth position z of the object in a case where the temperature difference $\Delta T$ is $\Delta T>0$ and $|x|\geq|xth|$ is considered to satisfy is $z<0$ on the popup side and, when judged as $z<0$, performs rendering processing on the three-dimensional data of $z<0$ under the condition of the first camera setting A, a popup side image data processing function which further judges whether or not the depth position z of the object in a case where the temperature difference $\Delta T$ is $\Delta T>0$ and $|x|\geq|xth|$ is considered to satisfy is $z\geq 0$ on the popup side and, when judged as $z\geq 0$, performs rendering processing on the three-dimensional data of $z\geq 0$ under the condition of the third camera setting C in which an included angle is set to be larger than the included angle of the first camera setting A, an image data synthesizing function which performs synthesizing processing of each of the image data that are rendering-processed in the out-of x-axis-threshold-value image data processing function, the non-popup side image data processing function, and the popup side image data processing function, and a 3D image data generating function which generates and outputs 3D image data based on the synthesize-processed image data for driving the display panel.

12. The stereoscopic display device as claimed in claim 1, wherein:

the main arithmetic operation controller is provided with an x-position threshold value setting section which sets a threshold value xth on an x-axis for making it possible to secure a stereoscopic viewing region that changes according to an extent of the temperature difference $\Delta T$, and sets the threshold value xth to become smaller as the value of the $\Delta T$ becomes larger, and a correction environment judging section which operates when it is judged by the temperature difference judging section that the temperature difference $\Delta T$ is $|\Delta T|>|\Delta Tth|$ and it is under a temperature environment that requires correction of the parallax amount to make judgment whether the image distributing section is in a state of $\Delta T<0$ showing a contraction state or a state of $\Delta T>0$ showing an expansion state; and the main arithmetic operation controller comprises a 2D image data processing function which operates when it is judged by the correction environment judging section that the temperature difference $\Delta T$ is $\Delta T>0$ and the image distributing section is in a contraction state to specify a coordinate position x of the object on the x-axis, and performs rendering processing on the three-dimensional data of the object that satisfies $|x|>|xth|$ under a condition of two-dimensional camera setting by a single camera that is placed anew along the z-axis instead of the three-dimensional data of the object, a popup side image data processing function which further judges whether or not a depth position z of the object in a case where the temperature difference $\Delta T$ is $\Delta T<0$ and $|x|\geq|xth|$ is satisfied is $z\geq 0$ on the popup side and, when judged as $z\geq 0$, performs rendering processing on the three-dimensional data of $z\geq 0$ under the condition of the first camera setting A, a non-popup side image data processing function which further judges whether or not the depth position z of the object in a case where the temperature difference $\Delta T$ is $\Delta T<0$ and $|x|\geq|xth|$ is satisfied is $z\geq 0$ on the popup side and, when judged that the depth position z is $z<0$ on the non-popup side, performs rendering processing on the three-dimensional data of z<0 under the condition of the second camera setting B in which an included angle is set to be narrower than the included angle of the first camera setting A, an image data synthesizing function which performs synthesizing processing of each of the image data that are rendering-processed in the 2D image data processing function, the popup side image data processing function, and the non-popup side image data processing function, respectively, and a 3D image data generating function which generates and outputs 3D image data based on the synthesize-processed image data for driving the display panel.

13. The stereoscopic display device as claimed in claim 12, wherein the main arithmetic operation controller comprises:

a 2D image data processing function which operates when it is judged by the correction environment judging section that the temperature difference ΔT is ΔT>0 and in an expansion state to specify a coordinate position x of the object on the x-axis, and performs rendering processing on the three-dimensional data of the object that satisfies |x|>|xth| under the condition of the two-dimensional camera setting by using the single camera placed anew along the z-axis instead of the three-dimensional data of the object;

a non-popup side image data processing function which further judges whether or not the depth position z of the object in a case where the temperature difference ΔT is ΔT>0 and |x|≥|xth| is satisfied is located at z<0 on the non-popup side and, when judged to be located at z<0, immediately operates to perform rendering processing on the three-dimensional data under the condition of the first camera setting A, a popup side image data processing function which further judges whether or not the depth position z of the object in a case where the temperature difference ΔT is ΔT>0 and |x|≥|xth| is satisfied is located at z≥0 on the popup side and, when judged to be located at z≥0, performs rendering processing on the three-dimensional data of z ≥0 under the condition of the third camera setting C in which an included angle is set to be larger than the included angle of the first camera setting A, an image data synthesizing function which performs synthesizing processing of each of the image data that are rendering-processed in the 2 D image data processing function, the non-popup side image data processing function, and the popup side image data processing function, and a 3 D image data generating function which generates and outputs 3 D image data based on the synthesize-processed image data for driving the display panel.

14. The stereoscopic display device as claimed in claim 1, wherein:

the main arithmetic operation controller is provided with an x-position threshold value setting section which operates when it is judged by the temperature difference judging section that the temperature difference ΔT is |ΔT|>|ΔTth| and it is under a temperature environment that requires correction of the parallax amount to set a threshold value xth on an x-axis for making it possible to secure a stereoscopic viewing region that changes according to an extent of the temperature difference ΔT, and sets the threshold value xth to become smaller as the value of the absolute value of the ΔT becomes larger; and the main arithmetic operation controller comprises a 2 D image data processing function which specifies a coordinate position x of the object on the x-axis, and performs rendering processing on the three-dimensional data of the object that satisfies |x|>|xth| under a condition of two-dimensional camera setting by a single camera that is placed anew along the z-axis instead of the three-dimensional data, a 3 D image data processing function which, for the object that satisfies |x|≥|xth| for the coordinate position x on the x-axis, immediately operates to perform rendering processing on the three-dimensional data of the object under the condition of the first camera setting A, an image data synthesizing function which performs synthesizing processing of each of the image data that are rendering processed in the 2D image data processing function and the 3D image data processing function, and a 3D image data generating function which generates and outputs 3D image data based on the synthesize-processed image data for driving the display panel.

15. The stereoscopic display device as claimed in claim 1, wherein the stereoscopic image generating module comprises: a target image data setting section which stores a depth map as a 3D image that is rendering-processed in advance in the data storage section; and a temperature difference judging section which performs an arithmetic operation regarding whether or not an absolute value of the temperature difference ΔT between the detected temperature from the temperature sensor and the reference temperature is equal to or less than an absolute value of a reference value ΔTth set in advance, and judges whether or not it is under a temperature environment that requires correction of a parallax amount of each object specified on an x-axis on an xy plane as a screen face for displaying the depth map containing z-axis information as depth information, and the main arithmetic operation controller comprises a 3D image data generating function which operates when it is judged by the temperature difference judging section that the temperature difference ΔT is |ΔT|≥|ΔTth| and it is under a temperature environment that does not require correction of the parallax amount to output two-dimensional 3D image data having the depth information corresponding to the parallax amount of the three-dimensional data that is the image data stored in the data storage section as it is for driving the display panel.

16. The stereoscopic display device as claimed in claim 15, wherein:

the main arithmetic operation controller is provided with a correction environment judging section which operates when it is judged by the temperature difference judging section that the temperature difference ΔT is |ΔT|>|ΔTth| and it is under a temperature environment that requires correction of the parallax amount to make judgment whether the image distributing section is in a state of ΔT<0 showing a contraction state or a state of ΔT>0 showing an expansion state; and the main arithmetic operation controller comprises a gradation value non-conversion processing function which operates when it is judged by the correction environment judging section that the temperature difference ΔT is ΔT>0 and the image distributing section is in an expansion state to judge whether or not the depth of the object is at a position of z<0 on the non-popup side and a depth gradation thereof is equal to or less than an intermediate value of an entire gradation and, when judged that it is located at a position of z<0 on the non-popup side and the depth gradation is equal to or less than the intermediate value of the entire gradation, holds it without performing a gray scale conversion, a gradation value conversion processing function which operates when it is judged by the correction environment judging section that the temperature difference ΔT is ΔT>0 and the image distributing section is in an expansion state to judge whether or not the depth of the object is at a position of z<0 on the popup side and a depth gradation thereof is equal to or less than the intermediate value of the entire gradation and, when judged that the depth of the object is located at a position of z≥0 and the depth gradation is equal to or more than the intermediate value of the entire gradation, performs a gray scale conversion by a second gradation conversion with which a smaller gradation value than the original depth information can be acquired and holds it, a depth image data synthesizing function which performs synthesizing processing of depth image data that are held by the gradation value non-conversion processing function and the gradation value conversion processing function, respectively, and a 3D image data generating function which generates and outputs two-dimensional 3D image data based on the synthesize-processed image data for driving the display panel.

17. The stereoscopic display device as claimed in claim 1, wherein:

the stereoscopic image generating module comprises:

a target image data setting section which inputs and accumulates, to the data storage section, a pair of parallax image data A for the right eye and the left eye rendering-processed in advance or captured by a stereoscopic camera for generating 3D image data, and a temperature difference judging section which individually performs an arithmetic operation regarding whether or not an absolute value of the temperature difference ΔT of the detected temperature from the temperature sensor regarding each of the parallax image data A with respect to an absolute value of the reference temperature is equal to or less than an absolute value of the reference value ΔTth set in advance, and judges whether or not it is a temperature environment that requires correction for the parallax amount of each object specified on an x-axis on an xy plane as a screen face of the stereoscopic display panel; and a 3D image data generating function which operates when it is judged by the temperature difference judging section that temperature difference ΔT is |ΔT|≥|ΔTth| and it is under a temperature environment that does not require correction of the parallax amount to generate and output 3D image data based on the pair of parallax image data A stored in the data storage section for driving the display panel.

18. The stereoscopic display device as claimed in claim 17, wherein the main arithmetic operation controller is provided with: a correction environment judging section which operates when it is judged by the temperature difference judging section that the temperature difference ΔT regarding the parallax image data A is |ΔT|>|ΔTth| and it is under a temperature environment that requires correction of the parallax amount to make judgment whether the image distributing section is in a state of ΔT<0 showing a contraction state or a state of ΔT>0 showing an expansion state;

the main arithmetic operation controller comprises an offset image generating section which operates when it is judged by the correction environment judging section that the temperature difference ΔT regarding the parallax image data A is ΔT>0 and the image distributing section is in an expansion state to generate parallax image data C by performing second parallax offset processing on the parallax image data A;

the 3D image data generating function of the main arithmetic operation controller generates and outputs two-dimensional 3D image data based on the parallax image data C generated by the offset image generating section; and the offset image generating section comprises an image data offset processing function which performs shift processing for shifting left-eye image data within the parallax image data A to a right direction and right-eye image data to a left direction by a prescribed offset amount, respectively, and a parallax image data generating function which generates the parallax image data C by superimposing image data acquired by performing the respective offset processing to corresponding image data that has not undergone the offset processing.

19. The stereoscopic display device as claimed in claim 1, wherein:

the stereoscopic image generating module comprises a camera setting information storage section which stores a camera setting of rendering processing that is executed for acquiring the 3D image data from the three-dimensional data as a first camera setting A in which a setting position parameter is specified in advance, a target image data setting section which stores image data having depth information or image data having parallax information to the data storage section, a temperature difference judging section which performs an arithmetic operation regarding whether or not an absolute value of the temperature difference ΔT between the detected temperature and the reference temperature is equal to or less than an absolute value of a reference value ΔTth set in advance, and judges whether or not it is under a temperature environment that requires correction of a parallax amount specified on an x-axis on an xy plane as a screen face from the image data containing depth information or image data having parallax information, and a parallax amount adjusting LUT signal storage section which accumulates an LUT signal for performing parallax amount correction processing that corresponds to the temperature detected by the temperature sensor; and the main arithmetic operation controller comprises a parallax amount adjusting function which operates when it is judged by the temperature difference judging section that the temperature difference ΔT regarding the parallax image data A is |ΔT|>|ΔTth| and it is under a temperature environment that requires correction of the parallax amount to adjust the parallax amount of two-dimensional image information according to the parallax adjusting LUT signal that corresponds to the temperature detected by the temperature sensor, a function of generating parallax images according to the parallax amount after the correction, and a function of generating 3D image data, which generates and outputs 3D image data based on the generated parallax images for driving the display panel.

20. The stereoscopic display device as claimed in claim 19, wherein
the parallax amount adjusting function is a function which performs adjustment to change a correction value according to the position within the screen face of the stereoscopic display panel.

21. The stereoscopic display device as claimed in claim 1, wherein:
the stereoscopic image generating module is provided with a 2D/3D image preprocessing section which calculates a contrast difference between a 2D background and a 3D object; and
the main arithmetic operation controller comprises a 3D image generating function which generates and outputs 3D image data by performing prescribed parallax amount correction processing according to the $\Delta T$ and the 2D/3D contrast difference for driving the display panel.

22. A stereoscopic display image data generating method used for a stereoscopic display device, comprising: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel according to 3D image data; and a stereoscopic image generating module including a main arithmetic operation controller which controls actions of the display panel driving section and generates 3D image data for driving the display panel based on three-dimensional data containing depth information specified in advance, wherein:
a temperature sensor provided in advance to the stereoscopic image generating module detects temperatures of the image distributing section, and a deformation amount calculating section provided in advance to the main arithmetic operation controller calculates a temperature difference $\Delta T$ between the detected temperature of the image distributing section and a reference temperature set in advance;
a temperature difference judging section provided in advance to the main arithmetic operation controller compares the calculated temperature difference $\Delta T$ and a reference value $\Delta Tth$ set separately in advance by their absolute values and, in a case of $|\Delta T|>|\Delta Tth|$, judges that it is necessary to perform correction regarding a parallax amount of an object specified on the x-axis on an xy plane as a screen face from the three-dimensional data containing z-axis information as depth information;
the main arithmetic operation controller performs rendering processing on the three-dimensional data as it is when it is judged by the judgment of correction necessity as $|\Delta T|\leq|\Delta Tth|$ and that the correction is unnecessary; and
the main arithmetic operation controller generates 3D image data for driving the display panel based on the rendering-processed parallax images.

23. The stereoscopic display image data generating method as claimed in claim 22, wherein:
when it is judged by the judgment of correction necessity that the temperature difference $\Delta T$ is $|\Delta T|<|\Delta Tth|$ and it is under a temperature environment that requires correction of the parallax amount, a correction environment judging section provided to the main arithmetic operation controller judges whether the image distributing section is in a state of $\Delta T<0$ showing a contraction state or a state of $\Delta T>0$ showing an expansion state;
when it is judged by the correction environment judging section that the $\Delta T$ is $\Delta T<0$ and the image distributing section is in a contraction state, the main arithmetic operation controller judges whether or not depth of the object is at a position of $z\geq 0$ on a popup side and, when judged to be located at the position of $z\geq 0$ on the popup side, performs rendering processing on the three-dimensional data of $z\geq 0$ under a condition of a first camera setting A in which a setting position parameter regarding a camera setting of rendering processing that is executed for acquiring the 3D image data from the three-dimensional data is specified in advance to form popup side image data;
when it is judged that the temperature difference $\Delta T$ is $\Delta T<0$ and the image distributing section is in a contraction state, the main arithmetic operation controller further judges whether or not the depth of the object is at a position of $z<0$ on a non-popup side and, when judged to be located at the position of $z<0$, performs rendering processing on the three-dimensional data of $z<0$ under a condition of a second camera setting B that has a smaller included angle than an included angle of the first camera setting A, which is formed between an optical axis of each camera and the z-axis condition, to form non-popup side image data; and
the main arithmetic operation controller performs synthesizing processing on the formed non-popup side image data and the popup side image data, and generates 3D image data for driving the display panel based thereupon.

24. The stereoscopic display image data generating method as claimed in claim 22, wherein:
when it is judged by the correction necessity judging step that the temperature difference $\Delta T$ is $|\Delta T|<|\Delta Tth|$ and it is under a temperature environment that requires correction of the parallax amount, the main arithmetic operation controller sets a threshold value xth on an x-axis for making it possible to secure a stereoscopic viewing region that changes according to an extent of the temperature difference $\Delta T$, and sets the x-position threshold value xth to become smaller as the value of the $\Delta T$ becomes larger;
after setting the x-position threshold value, the correction environment judging section provided to the main arithmetic operation controller judges whether the image distributing section is in a state of $\Delta T<0$ showing a contraction state or in a state of $\Delta T>0$ showing an expansion state;
when it is judged by the judgment of correction environment that the temperature difference $\Delta T$ is $\Delta T<0$ and the image distributing section is in a contraction state, the main arithmetic operation controller immediately operates to specify a coordinate position x of the object on the x-axis and to execute out-of x-axis-threshold-value image data processing which performs rendering processing on the three-dimensional data of the object that satisfies $|x|>|xth|$ under a condition of a fourth camera setting D in which an included angle is set to be narrower than the included angle of the first camera setting A in which a setting position parameter regarding a camera setting of rendering processing that is executed for acquiring the 3D image data from the three-dimensional data is specified in advance,
for the object in a case where the temperature difference $\Delta T$ is $\Delta T<0$ and $|x|\leq|xth|$ is satisfied, the main arithmetic operation controller executes popup side image data processing which judges whether or not a depth position z of the object is z≥0 on the popup side and, when judged as z≥0, immediately operates to perform rendering processing on the three-dimensional data of the object under the condition of the first camera setting A;

for the object in a case where it is judged in the judgment of correction environment that the temperature difference ΔT is ΔT<0 and |x|≤|xth| is satisfied, the main arithmetic operation controller executes non-popup side image data processing which further judges whether or not the depth position z of the object is z≥0 on the popup side and, when judged as z<0, immediately operates to perform rendering processing on the three-dimensional data of the object under the condition of the second camera setting B in which an included angle is set to be narrower than the included angle of the first camera setting A; and then, the main arithmetic operation controller performs synthesizing processing of each of the image data that are rendering-processed in the out-of x-axis-threshold-value image data processing, the popup side image data processing, and the non-popup side image data processing, and generates 3D image data for driving the display panel based thereupon.

25. The stereoscopic display image data generating method as claimed in claim 22, wherein:

when it is judged by the correction necessity judging step that the temperature difference ΔT is |ΔT|<|ΔTth| and it is under a temperature environment that requires correction of the parallax amount, the main arithmetic operation controller sets a threshold value xth on an x-axis for making it possible to secure a stereoscopic viewing region that changes according to an extent of the temperature difference ΔT and sets the threshold value xth to become smaller as an absolute value of the ΔT becomes larger;

after execution of this x-position threshold value setting step, the correction environment judging section judges whether the image distributing section is in a state of ΔT<0 showing a contraction state or in a state of ΔT>0 showing an expansion state;

when it is judged by the correction environment judging step that the temperature difference ΔT is ΔT<0 and the image distributing section is in a contraction state after execution of the correction environment judging step, the main arithmetic operation controller specifies a coordinate position x of the object on the x-axis and executes 2D image data processing which performs rendering processing regarding the three-dimensional data of the object that satisfies |x|>|xth| under a condition of two-dimensional camera setting by a single camera placed anew along the z-axis instead of the three-dimensional data;

for the object in a case where the temperature difference ΔT is ΔT<0 and |x|≤|xth| is satisfied, the main arithmetic operation controller further judges whether or not a depth position z of the object is z≥0 on the popup side and, when judged as z ≥0, immediately operates to execute popup side image data processing which performs rendering processing on the three-dimensional data of z≥0 under the condition of the first camera setting A in which a setting position parameter regarding a camera setting of rendering processing that is executed for acquiring the 3D image data from the three-dimensional data is specified in advance;

for the object in a case where the temperature difference ΔT is ΔT<0 and |x|≤|xth| is satisfied, the main arithmetic operation controller further judges whether or not the depth position z of the object is z ≥0 on the popup side and, when judged as z<0, immediately operates to execute non-popup side image data processing which performs rendering processing on the three-dimensional data of z<0 under the condition of the second camera setting B in which an included angle is set to be narrower than the included angle of the first camera setting A; and then, the main arithmetic operation controller performs synthesizing processing of each of the image data that are rendering processed in the 2D image data processing, the popup side image data processing, and the non-popup side image data processing, and generates 3D image data for driving the display panel based thereupon.

26. The stereoscopic display image data generating method as claimed in claim 22, wherein:

when it is judged by the correction necessity judging step that the temperature difference ΔT is |ΔT|<|ΔTth| and it is under a temperature environment that requires correction of the parallax amount, the main arithmetic operation controller sets a threshold value xth on an x-axis for making it possible to secure a stereoscopic viewing region that changes according to an extent of the temperature difference ΔT and sets the threshold value xth to become smaller as an absolute value of the ΔT becomes larger;

the main arithmetic operation controller specifies a coordinate position x of the object on the x-axis and executes 2D image data processing which performs rendering processing regarding the three-dimensional data of the object that satisfies |x|>|xth| under a condition of two-dimensional camera setting by a single camera placed anew along the z-axis instead of the three-dimensional data;

for the object in which |x|≤|xth| is satisfied for the coordinate position x on the x-axis, the main arithmetic operation controller immediately operates to execute 3D image data processing which performs rendering processing regarding the three-dimensional data under the condition of the first camera setting A in which a setting position parameter regarding a camera setting of rendering processing that is executed for acquiring the 3D image data from the three-dimensional data is specified in advance; and then, the main arithmetic operation controller performs synthesizing processing of each of the image data that are rendering-processed in the 2D image data processing and the 3D image data processing, and generates 3D image data for driving the display panel based thereupon.

27. A stereoscopic display image data generating method used for a stereoscopic display device, comprising: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel; and a stereoscopic image generating module including a main arithmetic operation controller which controls actions of the display panel driving section and generates 3D image data for driving the display panel based on a depth map containing depth information specified in advance, wherein:

when generating the 3D image data, a temperature sensor measures temperatures of the display panel part in advance, and a deformation amount calculating section provided in advance to the main arithmetic operation controller calculates a temperature difference ΔT with respect to a reference temperature set in advance based on the measurement value;

then, the depth map acquired by performing rendering processing on three-dimensional data in advance is stored to a data storage section as 3D image data;

a temperature difference judging section provided in advance compares the calculated temperature difference ΔT with a reference value ΔTth set separately in advance by their absolute values and, in a case of |ΔT|≤|ΔTth| when judging correction necessity, judges that it is necessary to perform correction regarding a depth gradation that corresponds to a parallax amount of the 3D image data; and the depth map stored in the data storage section is outputted as two-dimensional 3D image data when it is judged in the correction necessity judging step that the temperature difference ΔT is |ΔT|<|ΔTth| and it is under a temperature environment that does not require correction of the parallax amount.

28. A stereoscopic display image data generating method used for a stereoscopic display device, comprising: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel according to 3D image data; and a stereoscopic image generating module including a main arithmetic operation controller which controls actions of the display panel driving section and generates 3D image data for driving the display panel based on a pair of parallax images for a right eye and a left eye rendering-processed in advance or captured by a stereoscopic camera, wherein:

when parallax image data A for the right eye and the left eye rendering-processed in advance is inputted, the main arithmetic operation controller accumulates it to a data storage section for generating 3D image data;

then, a deformation amount calculating section provided to the main arithmetic operation controller calculates a temperature difference |ΔT| with respect to a reference temperature set in advance based on the temperature of the image distributing section measured by a temperature sensor when collecting the parallax image data A;

a temperature difference judging section provided to the main arithmetic operation controller individually performs an arithmetic operation regarding whether or not the temperature difference |ΔT| calculated in the temperature difference calculating step is equal to or less than a reference value |ΔTth| set in advance, and judges whether or not it is under a temperature environment that requires correction for parallax amount of each object specified on an x-axis on an xy plane that is a display face; and when it is judged by the temperature difference judging section that the temperature difference ΔT is |ΔT|≤|ΔTth| and it is under a temperature environment that does not require correction of the parallax amount, the main arithmetic operation controller generates and outputs two-dimensional 3D image data having depth information that corresponds to the parallax amount based on a pair of parallax image data A stored in the data storage section for driving the display panel.

29. A stereoscopic display image data generating method used for a stereoscopic display device, comprising: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel according to 3D image data; and a stereoscopic image generating module including a main arithmetic operation controller which controls actions of the display panel driving section and generates 3D image data for driving the display panel based on image data having depth information or image data having parallax information, wherein:

when the image data having depth information or the image data having parallax information is inputted, the main arithmetic operation controller accumulates it to a data storage section provided in advance for generating 3D image data, and accumulates an LUT signal for performing parallax amount correction processing that corresponds to a detected temperature;

then, a deformation amount calculating section provided to the main arithmetic operation controller calculates a temperature difference |ΔT| with respect to a reference temperature set in advance based on the temperature of the image distributing section measured by a temperature sensor;

a temperature difference judging section provided to the main arithmetic operation controller individually performs an arithmetic operation regarding whether or not the temperature difference |ΔT| calculated in the temperature difference calculating step is equal to or less than a reference value |ΔTth| set in advance, and judges whether or not it is under a temperature environment that requires correction for parallax amount of each object specified on an x-axis on an xy plane that is a display face; and when it is judged by the temperature difference judging section that the temperature difference ΔT is |ΔT|>|ΔTth| and it is under a temperature environment that requires correction of the parallax amount, the main arithmetic operation controller generates and outputs 3D image data for driving the display panel by performing parallax amount adjusting processing which corrects the parallax amount from the image data having the depth information stored in the data storage section or the image data having parallax information based on the LUT signal.

30. The stereoscopic display image data generating method as claimed in claim 29, wherein the parallax amount adjusting processing is processing which executes adjustment to change a correction value according to the position within the display screen.

31. The stereoscopic display image data generating method as claimed in claim 22, wherein:

3D image data is generated and outputted by performing prescribed parallax amount correction processing according to ΔT and a contrast difference between a 2D background and a 3D object for driving the display panel.

32. A stereoscopic display image data generating program used for a stereoscopic display device, comprising: a stereoscopic display panel including a display panel section having a plurality of unit pixels and an image distributing section for distributing and outputting visual recognition image data sent out from the display panel section as visual recognition stereoscopic image information towards outside; a display panel driving section which drives the display panel section of the stereoscopic display panel according to 3D image data; and a stereoscopic image generating module which controls actions of the display panel driving section and generates 3D image data for driving the display panel based on three-dimensional data containing depth information specified in advance, the program causing a computer to execute:

a temperature difference calculating function which calculates a temperature difference $\Delta T$ with respect to a reference temperature set in advance separately, when a temperature of the image distributing section is inputted from a temperature sensor provided in advance to the image distributing section;

a correction necessity judging function which compares the calculated temperature difference $\Delta T$ and a reference value $\Delta Tth$ set in advance separately by their absolute values, judges that it is necessary to perform correction regarding a parallax amount of an object specified on an x-axis on an xy plane as a screen face from the three-dimensional data containing z-axis information as depth information in a case of $|\Delta T|>|\Delta Tth|$, and judges that it is unnecessary to perform correction regarding the parallax amount in a case of $|\Delta T|\leq|\Delta Tth|$, an image processing function which performs rendering processing on the three-dimensional data when it is judged by the correction necessity judging function as $|\Delta T|\leq|\Delta Tth|$ and that the correction is unnecessary; and a 3D image data generating function which generates 3D image data for driving the display panel based on the rendering-processed parallax images.

* * * * *